US010732810B1

(12) United States Patent
Cohen et al.

(10) Patent No.: US 10,732,810 B1
(45) Date of Patent: Aug. 4, 2020

(54) SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES INCLUDING SUMMARY DATA SUCH AS TIME SERIES DATA

(71) Applicant: Addepar, Inc., Mountain View, CA (US)

(72) Inventors: Benjamin J. Cohen, New York, NY (US); Michael Lee Greenbaum, Mountain View, CA (US); Ian Gillis, New York, NY (US)

(73) Assignee: Addepar, Inc., Mountain View, CA (US)

( * ) Notice: Subject to any disclaimer, the term of this patent is extended or adjusted under 35 U.S.C. 154(b) by 493 days.

(21) Appl. No.: 15/344,154

(22) Filed: Nov. 4, 2016

Related U.S. Application Data

(60) Provisional application No. 62/252,335, filed on Nov. 6, 2015.

(51) Int. Cl.
*G06F 16/901* (2019.01)
*G06F 3/0484* (2013.01)
(Continued)

(52) U.S. Cl.
CPC ........ *G06F 3/04847* (2013.01); *G06F 3/0482* (2013.01); *G06F 16/901* (2019.01); *G06T 11/206* (2013.01)

(58) Field of Classification Search
CPC .................................................. G06F 3/04847
See application file for complete search history.

(56) References Cited

U.S. PATENT DOCUMENTS

| | | | |
|---|---|---|---|
| 5,704,371 | A | 1/1998 | Shepard |
| 5,893,079 | A | 4/1999 | Cwenar |

(Continued)

FOREIGN PATENT DOCUMENTS

| | | |
|---|---|---|
| CA | 2817652 | 12/2013 |
| CA | 2817660 | 12/2013 |

(Continued)

OTHER PUBLICATIONS

U.S. Appl. No. 15/663,138, Controlled Creation of Reports From Table Views, filed Jul. 28, 2017.

(Continued)

*Primary Examiner* — Amy Ng
*Assistant Examiner* — Samuel Shen
(74) *Attorney, Agent, or Firm* — Knobbe Martens Olson & Bear LLP

(57) ABSTRACT

Various systems and methods are provided for accessing and traversing one or more complex data structures and generating a functional user interface that can enable non-technical users to quickly and dynamically generate detailed reports (including tables, charts, and/or the like) of complex data including time varying attributes and time-series data. The user interfaces are interactive such that a user may make selections, provide inputs, and/or manipulate outputs. In response to various user inputs, the system automatically calculates applicable time intervals, accesses and traverses complex data structures (including, for example, a mathematical graph having nodes and edges), calculates complex data based on the traversals and the calculated time intervals, displays the calculated complex data to the user, and/or enters the calculated complex data into the tables, charts, and/or the like. The user interfaces may be automatically updated based on a context selected by the user.

16 Claims, 86 Drawing Sheets

(51) Int. Cl.

| | |
|---|---|
| ***G06F 3/0482*** | (2013.01) |
| ***G06T 11/20*** | (2006.01) |

(56) References Cited

U.S. PATENT DOCUMENTS

| | | | |
|---|---|---|---|
| 5,930,774 | A | 7/1999 | Chennault |
| 6,338,047 | B1 | 1/2002 | Wallman |
| 6,601,044 | B1 | 7/2003 | Wallman |
| 6,865,567 | B1 | 3/2005 | Oommen et al. |
| 7,046,248 | B1 | 5/2006 | Perttunen |
| 7,171,384 | B1 | 1/2007 | Fitzpatrick et al. |
| 7,222,095 | B2 | 5/2007 | Squyres |
| 7,299,223 | B2 | 11/2007 | Namait et al. |
| 7,395,270 | B2 | 7/2008 | Lim et al. |
| 7,418,419 | B2 | 8/2008 | Squyres |
| 7,512,555 | B2 | 3/2009 | Finn |
| 7,533,057 | B2 | 5/2009 | Whipple et al. |
| 7,533,118 | B2 | 5/2009 | Chaudri |
| 7,644,088 | B2 | 1/2010 | Fawcett et al. |
| 7,769,682 | B2 | 8/2010 | Mougdal |
| 7,818,232 | B1 | 10/2010 | Mead et al. |
| 7,822,680 | B1 | 10/2010 | Weber et al. |
| 7,827,082 | B1 | 11/2010 | Shanmugan |
| 7,836,394 | B2 | 11/2010 | Linder |
| 7,873,557 | B2 | 1/2011 | Guidotti et al. |
| 7,949,937 | B2 | 5/2011 | Wu |
| 7,966,234 | B1 | 6/2011 | Merves et al. |
| 7,991,672 | B2 | 8/2011 | Crowder |
| 7,996,290 | B2 | 8/2011 | Dweck et al. |
| 8,117,187 | B2 | 2/2012 | Mostl |
| 8,249,962 | B1 | 8/2012 | Stephens et al. |
| 8,271,519 | B2 | 9/2012 | Young |
| 8,306,891 | B1 | 11/2012 | Findlay, III et al. |
| 8,458,764 | B2 | 6/2013 | Karjoth et al. |
| 8,745,625 | B2 | 6/2014 | Tobin et al. |
| 8,781,952 | B1 | 7/2014 | Biase |
| 8,819,763 | B1 | 8/2014 | Cheung et al. |
| 8,949,270 | B2 | 2/2015 | Newton et al. |
| 9,015,073 | B2 | 4/2015 | Mirra et al. |
| 9,087,361 | B2 | 7/2015 | Mirra et al. |
| 9,105,062 | B2 | 8/2015 | Posch et al. |
| 9,105,064 | B2 | 8/2015 | Posch et al. |
| 9,218,502 | B1 | 12/2015 | Doermann et al. |
| 9,244,899 | B1 | 1/2016 | Greenbaum |
| 9,424,333 | B1 | 8/2016 | Bisignani et al. |
| 9,485,259 | B1 | 11/2016 | Doermann et al. |
| 9,760,544 | B2 | 9/2017 | Mirra et al. |
| 9,916,297 | B1 * | 3/2018 | Greenbaum ........ G06F 16/9024 |
| 9,935,983 | B1 | 4/2018 | Doermann et al. |
| 10,013,717 | B2 | 7/2018 | Posch et al. |
| 10,331,778 | B1 | 6/2019 | Greenbaum |
| 10,372,807 | B1 | 8/2019 | Greenbaul et al. |
| 10,430,498 | B2 | 10/2019 | Mirra et al. |
| 10,565,298 | B1 | 2/2020 | Bisignani et al. |
| 2001/0039500 | A1 | 11/2001 | Johnson |
| 2002/0042764 | A1 | 4/2002 | Gardner et al. |
| 2002/0059127 | A1 | 5/2002 | Brown et al. |
| 2002/0107770 | A1 | 8/2002 | Meyer et al. |
| 2003/0018556 | A1 | 1/2003 | Squyres |
| 2003/0144868 | A1 | 7/2003 | MacIntyre et al. |
| 2003/0174165 | A1 | 9/2003 | Barney |
| 2003/0208432 | A1 | 11/2003 | Wallman |
| 2004/0039706 | A1 | 2/2004 | Skowron |
| 2004/0236655 | A1 | 11/2004 | Scumniotales et al. |
| 2005/0171886 | A1 | 8/2005 | Squyres |
| 2005/0187852 | A1 | 8/2005 | Hwang |
| 2005/0222929 | A1 | 10/2005 | Steier et al. |
| 2005/0262047 | A1 | 11/2005 | Wu |
| 2005/0267835 | A1 | 12/2005 | Condron et al. |
| 2006/0036525 | A1 | 2/2006 | Ramos et al. |
| 2006/0041539 | A1 | 2/2006 | Matchett |
| 2006/0146719 | A1 | 7/2006 | Sobek et al. |
| 2006/0161485 | A1 * | 7/2006 | Meldahl ................. G06Q 40/00 705/35 |
| 2006/0212452 | A1 | 9/2006 | Cornacchia |
| 2007/0011071 | A1 | 1/2007 | Cuscovitch et al. |
| 2007/0038544 | A1 | 2/2007 | Snow et al. |
| 2007/0050273 | A1 * | 3/2007 | Burke, Jr. .............. G06Q 40/00 705/35 |
| 2007/0244775 | A1 | 10/2007 | Linder |
| 2007/0288339 | A1 | 12/2007 | Squyres |
| 2008/0086345 | A1 | 4/2008 | Wilson et al. |
| 2008/0139191 | A1 | 6/2008 | Melnyk et al. |
| 2008/0243721 | A1 | 10/2008 | Joao |
| 2008/0270316 | A1 | 10/2008 | Guidotti et al. |
| 2009/0006226 | A1 | 1/2009 | Crowder |
| 2009/0006227 | A1 | 1/2009 | Chen-Young et al. |
| 2009/0006271 | A1 | 1/2009 | Crowder |
| 2009/0164387 | A1 | 6/2009 | Armstrong et al. |
| 2009/0198630 | A1 | 8/2009 | Treitler et al. |
| 2009/0240574 | A1 | 9/2009 | Carpenter et al. |
| 2009/0249359 | A1 | 10/2009 | Caunter et al. |
| 2010/0005033 | A1 | 1/2010 | Boyda et al. |
| 2010/0057618 | A1 * | 3/2010 | Spicer ................. G06F 3/04815 705/64 |
| 2010/0083358 | A1 | 4/2010 | Govindarajan et al. |
| 2010/0100802 | A1 | 4/2010 | Delaporte |
| 2010/0169130 | A1 | 7/2010 | Fineman et al. |
| 2011/0066951 | A1 | 3/2011 | Ward-Karet et al. |
| 2011/0078059 | A1 | 3/2011 | Chambers et al. |
| 2011/0161371 | A1 * | 6/2011 | Thomson ............ G06F 16/2428 707/792 |
| 2011/0258139 | A1 | 10/2011 | Steiner |
| 2011/0264467 | A1 | 10/2011 | Green |
| 2011/0271230 | A1 * | 11/2011 | Harris ................... G06F 3/0482 715/810 |
| 2011/0283242 | A1 | 11/2011 | Chew |
| 2011/0302221 | A1 | 12/2011 | Tobin et al. |
| 2011/0313948 | A1 | 12/2011 | Hagerman et al. |
| 2012/0030141 | A1 | 2/2012 | Boyda et al. |
| 2012/0089432 | A1 | 4/2012 | Podgurny |
| 2012/0101837 | A1 | 4/2012 | McCorkle |
| 2012/0136804 | A1 | 5/2012 | Lucia et al. |
| 2012/0182882 | A1 | 7/2012 | Chrapko et al. |
| 2012/0259797 | A1 | 10/2012 | Sarkany et al. |
| 2012/0317052 | A1 | 12/2012 | Heyner et al. |
| 2013/0073939 | A1 | 3/2013 | Honsowetz |
| 2013/0073940 | A1 | 3/2013 | Honsowetz |
| 2013/0166600 | A1 | 6/2013 | Snyder, II et al. |
| 2013/0212505 | A1 | 8/2013 | Herold |
| 2013/0332387 | A1 * | 12/2013 | Mirra ..................... G06Q 40/00 705/36 R |
| 2014/0150114 | A1 | 5/2014 | Sinha et al. |
| 2014/0156560 | A1 | 6/2014 | Sarkany et al. |
| 2014/0157142 | A1 * | 6/2014 | Heinrich ............. H04L 67/1095 715/744 |
| 2014/0172683 | A1 | 6/2014 | Curtis |
| 2014/0250375 | A1 | 9/2014 | Malik |
| 2014/0282034 | A1 * | 9/2014 | Aydin ..................... G06F 17/18 715/738 |
| 2014/0317018 | A1 | 10/2014 | Schneider |
| 2015/0026075 | A1 | 1/2015 | Mondri et al. |
| 2015/0026098 | A1 | 1/2015 | Ramos et al. |
| 2015/0074541 | A1 * | 3/2015 | Schwartz .................. G06F 9/44 715/740 |
| 2015/0106748 | A1 * | 4/2015 | Monte ................... G06F 3/0482 715/753 |
| 2015/0161626 | A1 | 6/2015 | Chu |
| 2015/0186338 | A1 | 7/2015 | Mirra et al. |
| 2015/0378979 | A1 * | 12/2015 | Hirzel ................... G06F 17/246 715/220 |
| 2018/0024970 | A1 | 1/2018 | Mirra et al. |
| 2018/0276758 | A1 | 9/2018 | Posch et al. |

FOREIGN PATENT DOCUMENTS

| | | |
|---|---|---|
| CA | 2834265 | 6/2014 |
| EP | 1862955 | 5/2007 |
| EP | 2439691 | 4/2012 |
| EP | 2672446 | 12/2013 |
| EP | 2672447 | 12/2013 |
| EP | 2743881 | 6/2014 |
| HK | 1193898 | 10/2014 |

(56) References Cited

FOREIGN PATENT DOCUMENTS

| | | | |
|---|---|---|---|
| JP | 2002197277 A | | 7/2002 |
| SG | 195517 | | 12/2013 |
| SG | 195518 | | 4/2015 |
| WO | WO 2005/036364 | | 4/2005 |
| WO | WO 2011/038491 | | 4/2011 |

OTHER PUBLICATIONS

U.S. Appl. No. 15/881,387, Systems and User Interfaces for Dynamic and Interactive Table Generation and Editing Based on Automatic Traversal of Complex Data Structures Including Time Varying Attributes, filed Jan. 26, 2018.

Chabrow, L. (2000). Visualization software: Looking for a market—IT departments search for the best ways to adapt the tools to business users' needs. InformationWeek, 112, Retrieved from http://dialog.proquest.com/professional/professional/docview/669839509?accountid=142257 on Apr. 28, 2017.

MacVittie, L. (2000). An expert on performance monitoring—all three products aim to pinpoint reasons for slow response times, but compuware's superior drill-down capabilities put it on top. Network Computing, 102. Retrieved from http://dialog.proquest.com/professional/prefessional/docview/673199655?accountid=142257 on Apr. 28, 2017.

"PDF Compress Command Line User Manual," VeryPDF.com, Inc., 2006, available at http://www.verypdf.com/pdfinfoeditor/pdfcompress.htm, 4 pages.

State street launches industry leading over-the-counter derivatives servicing platform. (Aug. 21, 2008). Business Wire Retrieved from https://dialog.proquest.com/professional/professional/docview/677663916?accountid=142257 on Apr. 28, 2017.

Examination Report in Canadian Patent Application No. 2817660 dated Mar. 12, 2019.

U.S. Appl. No. 14/644,025, Controlled Creation of Reports From Table Views, filed Mar. 10, 2015.

U.S. Appl. No. 14/683,059, Interactive Look Through User Interface, filed Apr. 9, 2015.

U.S. Appl. No. 14/962,987, Systems and User Interfaces for Dynamic and Interactive Table Generation and Editing Based on Automatic Traversal of Complex Data Structures Including Time Varying Attributes, filed Dec. 18, 2015.

U.S. Appl. No. 15/213,722, Systems and User Interfaces for Dynamic and Interactive Report Generation and Editing Based on Automatic Traversal of Complex Data Structures, filed Jul. 19, 2016.

Chakrabarti, D., & Faloustsos, C. (2006). Graph mining. ACM Computing Surveys, 38(1), 2. doi:http://doi.acm.org.10.1145/1132952.1132954 retrieved on Feb. 6, 2015.

Wagner et al.,: Assessing the Vulnerability of Supply Chain Using Graph Theory, 2010, International Journal of Production Economics 126, pp. 121-129.

Yang et al.,: Incremental Mining of Across-Stream Sequential Patterns in Multiple Data Streams, Mar. 2011, Journal of Computers, vol. 6, No. 3, pp. 449-457.

European Patent Office, "Extended Search Report" in application No. 13170954.5, dated Jan. 21, 2014, 6 pages.

European Patent Office, "Search Report" in application No. 13170952.9, dated Jan. 21, 2014, 6 pages.

European Patent Office, "Search Report" in application No. 13197286.1, dated Mar. 14, 2014, 5 pages.

Singapore, "Search and Examination Report" in application No. 201304378-1, dated Jul. 3, 2014.

Singapore, "Search and Examination Report" in application No. 201304379-9, dated Jan. 23, 2014.

U.S. Appl. No. 16/544,663, Controlled Creation of Reports From Table Views, filed Aug. 19, 2019.

U.S. Appl. No. 16/434,633, Systems and User Interfaces for Dynamic and Interactive Table Generation and Editing Based on Automatic Traversal of Complex Data Structures Including Time Varying Attributes, filed Jun. 7, 2019.

Examination Report in Canadian Patent Application No. 2817652 dated Apr. 29, 2019, 3 pages.

U.S. Appl. No. 16/734,924, Systems and User Interfaces for Dynamic and Interactive Report Generation and Editing Based on Automatic Traversal of Complex Data Structures, filed Jan. 6, 2020.

* cited by examiner

FIG. 13
Mr Uncle Moneypenny
Apple, Inc
Summary
Owner
Attachments
403
1301
1302
1304
1306
1308
1310

Context = Bob & 2012-04-14
Bucketing Factor = Manager -> Asset Type
Column Factor = TWR (5 yr. trailing)
Group by historical values

Paths:

1: B
2: B,C
3: B,C,D
4: B,C,E

Determined time varying attributes:
- Manager

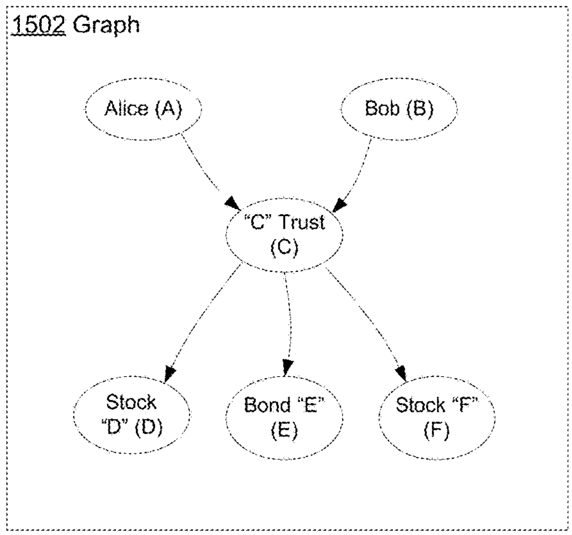
FIG. 26A
Perspective = Bob
Filter = (None)
Bucketing Factor = Asset Type
Column Factor = Asset Value ("Value") on 2012-04-15
Paths:
1: B
2: B,C
3: B,C,D
4: B,C,E
5: B,C,F
FIG. 26B
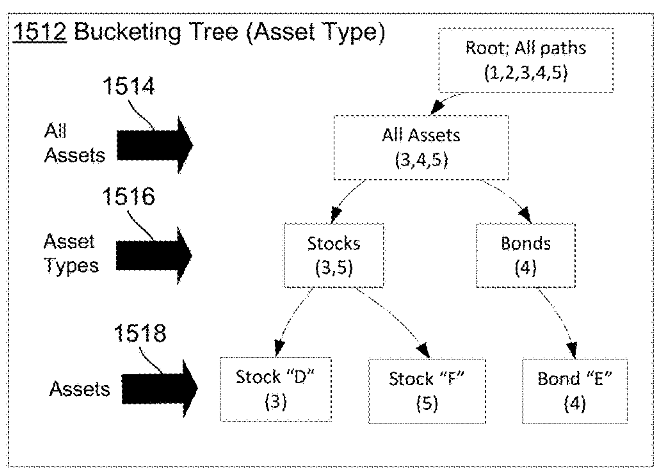
FIG. 26C

2902

| Model ID | Model Attributes | |
|---|---|---|
| 00001 | Perspective | Bob |
| | Filter | (None) |
| | Bucketing Factor(s): | |
| | -Asset Type | Stocks |
| | -Manager | ... |
| | ... | ... |
| 00002 | Perspective | Bob |
| | Filter | (None) |
| | Bucketing Factor(s): | |
| | -Asset Type | Bonds |
| | -Manager | ... |
| | ... | ... |
| ... | ... | ... |

| Model ID | Key | Value |
|---|---|---|
| 00001 | Asset Value | {Asset Value Time Series} |
| 00001 | TWR (1 Year) | {TWR Time Series} |
| 00002 | Asset Value | {Asset Value Time Series} |
| 00002 | TWR (1 Year) | {TWR Time Series} |
| 00003 | Asset Value | {Asset Value Time Series} |
| 00003 | TWR (1 Year) | {TWR Time Series} |
| ... | ... | ... |
| ... | ... | ... |

FIG. 29B

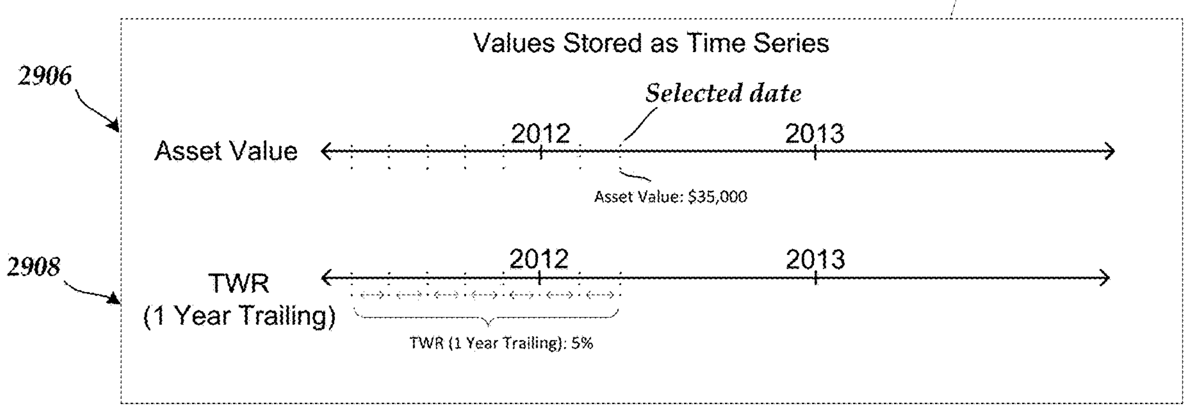

FIG. 29C

Figure 47:
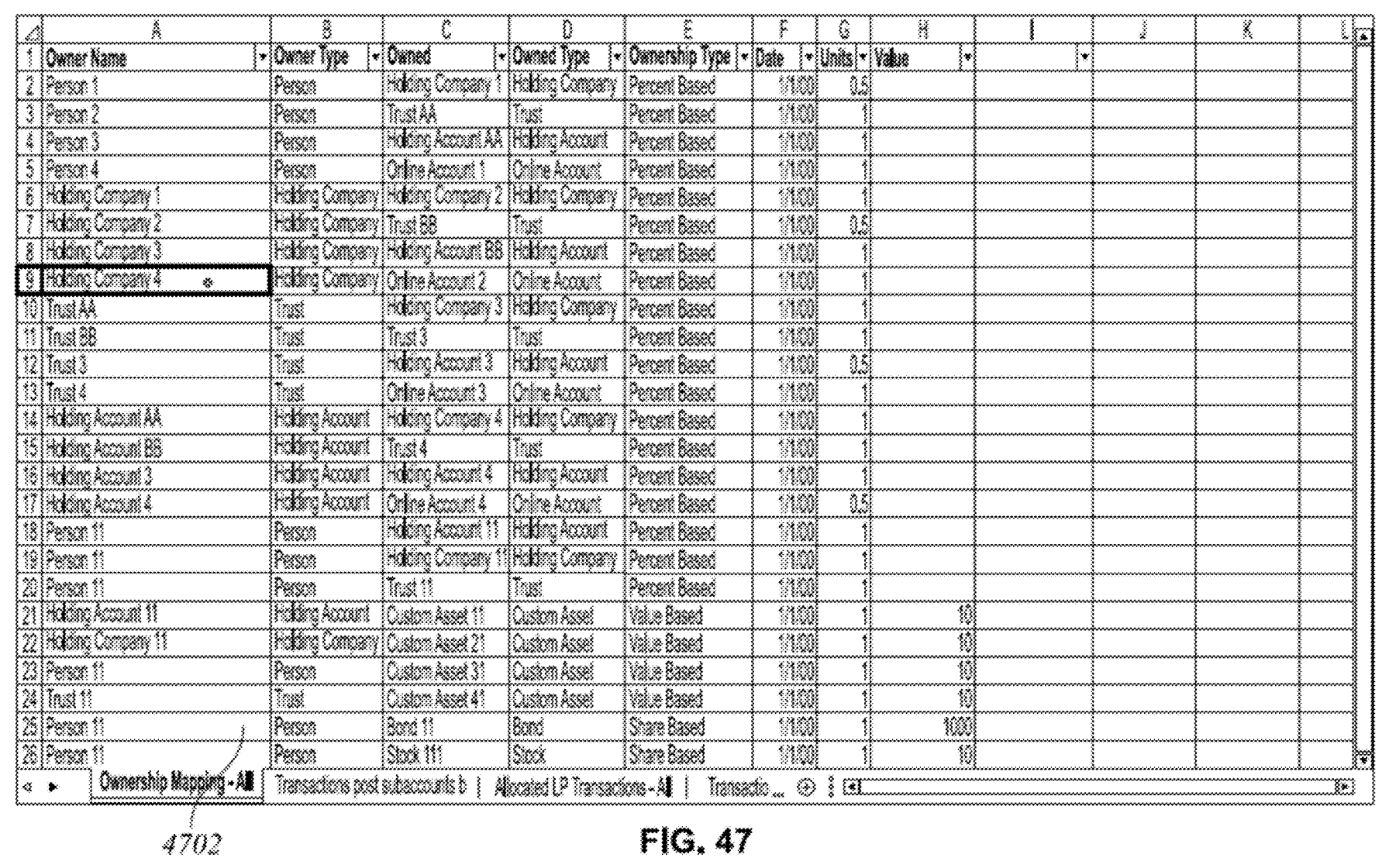

| | A | B | C | D | E | F | G | H | I | J | K | L |
|---|---|---|---|---|---|---|---|---|---|---|---|---|
| 1 | Owner Name | Owner Type | Owned | Owned Type | Ownership Type | Date | Units | Value | | | | |
| 2 | Person 1 | Person | Holding Company 1 | Holding Company | Percent Based | 1/1/00 | 0.5 | | | | | |
| 3 | Person 2 | Person | Trust AA | Trust | Percent Based | 1/1/00 | 1 | | | | | |
| 4 | Person 3 | Person | Holding Account AA | Holding Account | Percent Based | 1/1/00 | 1 | | | | | |
| 5 | Person 4 | Person | Online Account 1 | Online Account | Percent Based | 1/1/00 | 1 | | | | | |
| 6 | Holding Company 1 | Holding Company | Holding Company 2 | Holding Company | Percent Based | 1/1/00 | 1 | | | | | |
| 7 | Holding Company 2 | Holding Company | Trust BB | Trust | Percent Based | 1/1/00 | 0.5 | | | | | |
| 8 | Holding Company 3 | Holding Company | Holding Account BB | Holding Account | Percent Based | 1/1/00 | 1 | | | | | |
| 9 | Holding Company 4 | Holding Company | Online Account 2 | Online Account | Percent Based | 1/1/00 | 1 | | | | | |
| 10 | Trust AA | Trust | Holding Company 3 | Holding Company | Percent Based | 1/1/00 | 1 | | | | | |
| 11 | Trust BB | Trust | Trust 3 | Trust | Percent Based | 1/1/00 | 1 | | | | | |
| 12 | Trust 3 | Trust | Holding Account 3 | Holding Account | Percent Based | 1/1/00 | 0.5 | | | | | |
| 13 | Trust 4 | Trust | Online Account 3 | Online Account | Percent Based | 1/1/00 | 1 | | | | | |
| 14 | Holding Account AA | Holding Account | Holding Company 4 | Holding Company | Percent Based | 1/1/00 | 1 | | | | | |
| 15 | Holding Account BB | Holding Account | Trust 4 | Trust | Percent Based | 1/1/00 | 1 | | | | | |
| 16 | Holding Account 3 | Holding Account | Holding Account 4 | Holding Account | Percent Based | 1/1/00 | 1 | | | | | |
| 17 | Holding Account 4 | Holding Account | Online Account 4 | Online Account | Percent Based | 1/1/00 | 0.5 | | | | | |
| 18 | Person 11 | Person | Holding Account 11 | Holding Account | Percent Based | 1/1/00 | 1 | | | | | |
| 19 | Person 11 | Person | Holding Company 11 | Holding Company | Percent Based | 1/1/00 | 1 | | | | | |
| 20 | Person 11 | Person | Trust 11 | Trust | Percent Based | 1/1/00 | 1 | | | | | |
| 21 | Holding Account 11 | Holding Account | Custom Asset 11 | Custom Asset | Value Based | 1/1/00 | 1 | 10 | | | | |
| 22 | Holding Company 11 | Holding Company | Custom Asset 21 | Custom Asset | Value Based | 1/1/00 | 1 | 10 | | | | |
| 23 | Person 11 | Person | Custom Asset 31 | Custom Asset | Value Based | 1/1/00 | 1 | 10 | | | | |
| 24 | Trust 11 | Trust | Custom Asset 41 | Custom Asset | Value Based | 1/1/00 | 1 | 10 | | | | |
| 25 | Person 11 | Person | Bond 11 | Bond | Share Based | 1/1/00 | 1 | 1000 | | | | |
| 26 | Person 11 | Person | Stock 111 | Stock | Share Based | 1/1/00 | 1 | 10 | | | | |

Ownership Mapping - All | Transactions post subaccounts b | Allocated LP Transactions - All | Transactio ...

SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES INCLUDING SUMMARY DATA SUCH AS TIME SERIES DATA

CROSS-REFERENCE TO RELATED APPLICATIONS

This application claims benefit of U.S. Provisional Patent Application No. 62/252,335, filed Nov. 6, 2015, and titled "SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES INCLUDING SUMMARY DATA SUCH AS TIME SERIES DATA." The entire disclosure of each of the above items is hereby made part of this specification as if set forth fully herein and incorporated by reference for all purposes, for all that it contains.

Any and all applications for which a foreign or domestic priority claim is identified in the Application Data Sheet as filed with the present application are hereby incorporated by reference under 37 CFR 1.57.

TECHNICAL FIELD

Embodiments of present disclosure relate to systems and techniques for accessing one or more databases in substantially real-time to provide information in an interactive user interface. More specifically, embodiments of the present disclosure relate to user interfaces for dynamically generating and displaying time varying complex data based on electronic collections of data.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A report (such as a report including tables and/or charts of complex data) is a way of presenting and conveying information, and is useful in many fields (for example, scientific fields, financial fields, political fields, and/or the like). In many fields, computer programs may be written to programmatically generate reports or documents from electronic collections of data, such as databases. This approach requires a computer programmer to write a program to access the electronic collections of data and output the desired report or document. Typically, a computer programmer must determine the proper format for the report from users or analysts that are familiar with the requirements of the report. Some man-machine interfaces for generating reports in this manner are software development tools that allow a computer programmer to write and test computer programs. Following development and testing of the computer program, the computer program must be released into a production environment for use. Thus, this approach for generating reports may be inefficient because an entire software development life cycle (for example, requirements gathering, development, testing, and release) may be required even if only one element or graphic of the report requires changing. Furthermore, this software development life cycle may be inefficient and consume significant processing and/or memory resources.

SUMMARY

The systems, methods, and devices described herein each have several aspects, no single one of which is solely responsible for its desirable attributes. Without limiting the scope of this disclosure, several non-limiting features will now be discussed briefly.

Embodiments of the present disclosure relate to a computer system designed to provide interactive, graphical user interfaces (also referred to herein as "user interfaces") for enabling non-technical users to quickly and dynamically generate, edit, and update complex reports including tables and charts of data. The user interfaces are interactive such that a user may make selections, provide inputs, and/or manipulate outputs. In response to various user inputs, the system automatically accesses and traverses complex data structures (including, for example, a mathematical graph having nodes and edges), calculates complex data based on the traversals, and/or displays the calculated complex data to the user. The displayed data may be rapidly manipulated and automatically updated based on a context selected by the user, and the system may automatically publish generated data in multiple contexts.

The computer system (also referred to herein simply as the "system") may be useful to, for example, financial advisors, such as registered investment advisors (RIAs) and their firms. Such RIA's often need to view data relating to investment holdings of clients for purposes of analysis, reporting, sharing, or recommendations. Client investments may be held by individuals, partnerships, trusts, companies, and other legal entities having complex legal or ownership relationships. RIAs and other users may use the system to view complex holdings in a flexible way, for example, by selecting different metrics and/or defining their own views and reports on-the-fly.

Current wealth management technology does not offer the capability to generate views, reports, or other displays of data from complex investment holding structures in an interactive, dynamic, flexible, shareable, efficient way. Some existing wealth management systems are custom-built and therefore relatively static in their viewing capabilities, requiring programmers to make customized versions (as described above). Other systems lack scalability and are time-consuming to use. Yet other systems consist of MICROSOFT VISUAL BASIC scripts written for use with MICROSOFT EXCEL spreadsheets. This type of system is an awkward attempt to add some measure of flexibility to an otherwise static foundation.

Current wealth management technology also does not offer users the flexibility of associating imported historical data with various aspects of the complex data structures or generated tables, such that the user can quickly and dynamically generate complex reports with values calculated from the historical data over custom timeframes.

Various embodiments of the present disclosure enable data generation and display in fewer steps, result in faster creation of outputs (such as tables and reports), consume less processing and/or memory resources than previous technology, permit users to have less knowledge of programming languages and/or software development techniques, and/or allow less technical users or developers to create outputs (such as tables and/or reports) than the user interfaces described above. Thus, the user interfaces described herein are more efficient as compared to previous user interfaces, and enable the user to cause the system to automatically access and initiate calculation of complex data automatically. Further, by storing the data as a complex mathematical graph, outputs (for example, a table) need not be stored separately and thereby take additional memory. Rather, the system may render outputs (for example, tables) in real time and in response to user interactions, such that the system may reduce memory and/or storage requirements.

Further, various embodiments of the system further reduce memory requirements and/or processing needs and time via a complex graph data structure. For example, as described below, common data nodes may be used in multiple graphs of various users and/or clients of a firm operating the system. Utilization of common data nodes reduces memory requirements and/or processing requirements of the system.

Accordingly, in various embodiments the system may calculate data (via complex graph traversal described herein) and provide a unique and compact display of calculated data based on time varying attributes associated with the calculated data. In an embodiment, the data may be displayed in a table in which data is organized based on the time varying attributes and dates associated with particular metrics specified by the user and/or determined by the system. In some embodiments, when no metric values are associated with a particular item of data, a portion of the table is left blank and/or omitted.

In various embodiments the system may calculate time intervals applicable to calculations of various metrics. For example, the system may calculate asset value metrics for which a single date or time is applicable. In other examples, the system may calculate metrics that span periods of time such as a rate of return of an asset over a number of years. Accordingly, the system may determine a set of time intervals associated with the metric, a set of time intervals associated with applicable time varying attributes of graph data, and determine in intersection of the two sets of time intervals. The calculated intersection of the sets of time intervals may then be inputted into the complex graph traversal process to calculate metric values for display in compact and efficient user interfaces of the system.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Additionally, in various embodiments the system may include a data import tool used to import into the system different types of data for populating the complex graph data structure. The various data types may include summary data, transaction data, contact data, historical performance data, position data, and/or the like. The data import tool may assist in converting the imported data into one or more formats recognizable and useable by the system. For example, the data may be converted to a format that is compatible with graph, and which may be associated with the graph, as described herein.

The data import tool can be used to import and validate the format of the data. Advantageously, the data import tool may enable a user to quickly and efficiently import, validate, and/or convert large amounts of data for use in the system, as described herein. The data import tool may enable a user to manage the import of hundreds, thousands, and even millions of data items in a fraction of the time that manual entry of such data items may take.

The data import tool may also allow a user to specify a set of model attributes to associate with the data. These model attributes may be used by the system in order to quickly and efficiently locate the corresponding data associated with the model attributes of a specific row of the generated table when that data is needed for a calculation in the row, based on the user's specifications. Some examples of model attributes may include perspective, filters, and/or bucketing factors.

Accordingly, various embodiments of the present disclosure may provide interactive user interfaces for enabling non-technical users to quickly and dynamically generate and edit complex reports including tables and charts of data. The complex reports may be generated through automatic calculation of applicable time intervals, access and traversal of complex data structures, and calculation of output data based on property/attribute values of multiple nodes and/or edges within such complex data structures, all in substantially real-time. The system may eliminate the need for a skilled programmer to generate a customized data and/or a report. Rather, the system may enable an end-user to customize, generate, and interact with complex data in multiple contexts automatically. Accordingly, embodiments of the present disclosure enable data generation and interaction in fewer steps, result in faster generation of complex data, consume less processing and/or memory resources than previous technology, permit users to have less knowledge of programming languages and/or software development techniques, and/or allow less technical users or developers to create outputs (such as tables and/or reports) than the previous user interfaces. Thus, in some embodiments, the systems and user interfaces described herein may be more efficient as compared to previous systems and user interfaces.

According to an embodiment, a computer system is disclosed that is configured to access one or more electronic data sources in response to inputs received via an interactive user interface in order to automatically calculate metrics based on a complex mathematical graph and insert the metrics into a dynamically generated table of the interactive user interface, the computing system comprising: a computer processor; and a computer readable storage medium configured to: store a complex mathematical graph comprising nodes and edges, each of the nodes storing information associated with at least one of an account, an individual, a legal entity, or a financial asset, each of the edges storing a relationship between two of the nodes, wherein a plurality of attributes is associated with each of the nodes and each of the edges, wherein at least one of the nodes is associated with a time varying attribute; and store program instructions configured for execution by the computer processor in order to cause the computing system to: generate user interface data for rendering an interactive user interface on a computing device, the interactive user interface including: a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and a context selection element including a listing of a plurality of perspectives from which the dynamically generated table may be automatically updated, each of the plurality of perspectives associated with a node of the complex mathematical graph; receive, via the interactive user interface, a selection of one of one of the plurality of perspectives; determine a node of the complex mathematical graph associated with the selected perspective; automatically traverse the complex mathematical graph from the determined node so as to enumerate paths within the complex mathematical graph that are associated with the determined node; for each enumerated path, determine any rows of the dynamically generated table associated with the enumerated path based on nodes commonly associated with the enumerated path and a row of the dynamically generated table; generate a bucketing tree comprising value nodes corresponding to the rows of the dynamically generated table and associated with the respective enumerated paths determined to be associated with the rows; for each value node of the bucketing tree and each metric of the dynamically generated table: determine one or more time intervals associated with each of the enumerated paths associated with the value node, the one or more time intervals determined based on attributes associated with nodes of each of the enumerated paths including any time varying attributes; determine one or more time intervals associated with the metric; calculate, for each of the enumerated paths associated with the value node, one or more calculation intervals based on an intersection between the time intervals associated with the metric and the time intervals associated with the respective enumerated path; for each of the enumerated paths and each of the calculation intervals associated with the respective enumerated paths: calculate an interval value corresponding to each calculation interval based on the metric; and aggregate the calculated interval values associated with each of the enumerated paths to calculate a path value associated with each of the enumerated paths; and aggregate the path values associated with each of the value nodes to calculate a metric value corresponding to each combination of value node and metric; and automatically update the dynamically generated table with the calculated metric values, wherein each of the calculated metric values is inserted into a cell of the table corresponding to the row associated with the value node associated with the calculated metric value and the column associated with the metric associated with the calculated metric value.

According to yet another embodiment, the interactive user interface further includes an input element wherein the user inputs time varying attribute information for association with a node via the input element, wherein the time varying attribute information includes at least two attribute values and time intervals associated with each of the at least two attribute values.

According to yet another embodiment, the rows of the dynamically generated table are arranged hierarchically according to a user defined categorization of one or more attributes associated with nodes of the complex mathematical graph.

According to yet another embodiment, the interactive user interface further includes an input element wherein the user inputs the categorization of the one or more attributes associated with nodes of the complex mathematical graph via the input element.

According to yet another embodiment, the interactive user interface further includes a second input element wherein the user inputs one or more metrics to be associated with the dynamically generated table via the second input element.

According to yet another embodiment, the one or more metrics include at least one of asset value, TWR, IRR, rate of return, cash flow, or average balance.

According to yet another embodiment, the interactive user interface further includes a second context selection element wherein the user selects select a particular date, wherein the determined one or more time intervals associated with the metric are based on the particular date.

According to yet another embodiment, automatically traversing the complex mathematical graph comprises: traversing, from the determined node, any edges and/or other nodes connected directly or indirectly with the determined node; determining, based on the traversal, any non-circular paths in the complex mathematical graph connected to the determined node; and designating the determined non-circular paths as the enumerated paths associated with the designated node.

According to yet another embodiment, at least two edges of the complex mathematical graph are part of a circular reference from the designated node back to the designated node, and wherein automatically traversing the complex mathematical graph further comprises: determining whether two sequences of two or more traversed nodes are identical, and if so, backtracking the traversal and moving to the next adjacent node or edge.

According to yet another embodiment, each of the enumerated paths includes at least one node and at least one edge of the complex mathematical graph.

According to yet another embodiment, at least one column of the dynamically generated table corresponds to an asset value metric, and wherein calculating an interval value corresponding to each calculation interval based on the asset value metric comprises determining a monetary value associated with the edges and/or nodes of the enumerated path for each calculation interval.

According to yet another embodiment, aggregating the calculated interval values associated with each of the enumerated paths to calculate a path value associated with each of the enumerated paths comprises summing each of the calculated interval values.

According to yet another embodiment, the program instructions are further configured for execution by the computer processor in order to cause the computing system to, for each value node of the bucketing tree and each metric of the dynamically generated table: determine that no calculation intervals are associated with a given enumerated path associated with the value node and a given metric; and automatically update the dynamically generated table so as to insert a blank space into a cell of the table corresponding to the row associated with the value node and the column associated with the given metric. Additional embodiments of the disclosure are described below in reference to the appended claims, which may serve as an additional summary of the disclosure.

Additional embodiments of the disclosure are described below in reference to the appended claims, which may serve as an additional summary of the disclosure.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIGS. 26A-26C illustrate an example traversal of a simplified graph that involves a date context.

FIG. 29A illustrates a table containing model IDs corresponding to varying model attributes.

FIG. 29B illustrates a database containing summary data.

FIG. 29C illustrates how summary data in key-value pairs may be stored as a time series.

FIG. 47 illustrates an example of data that may be imported via the data import tool, in accordance with some embodiments.

DETAILED DESCRIPTION

Figure 1A:
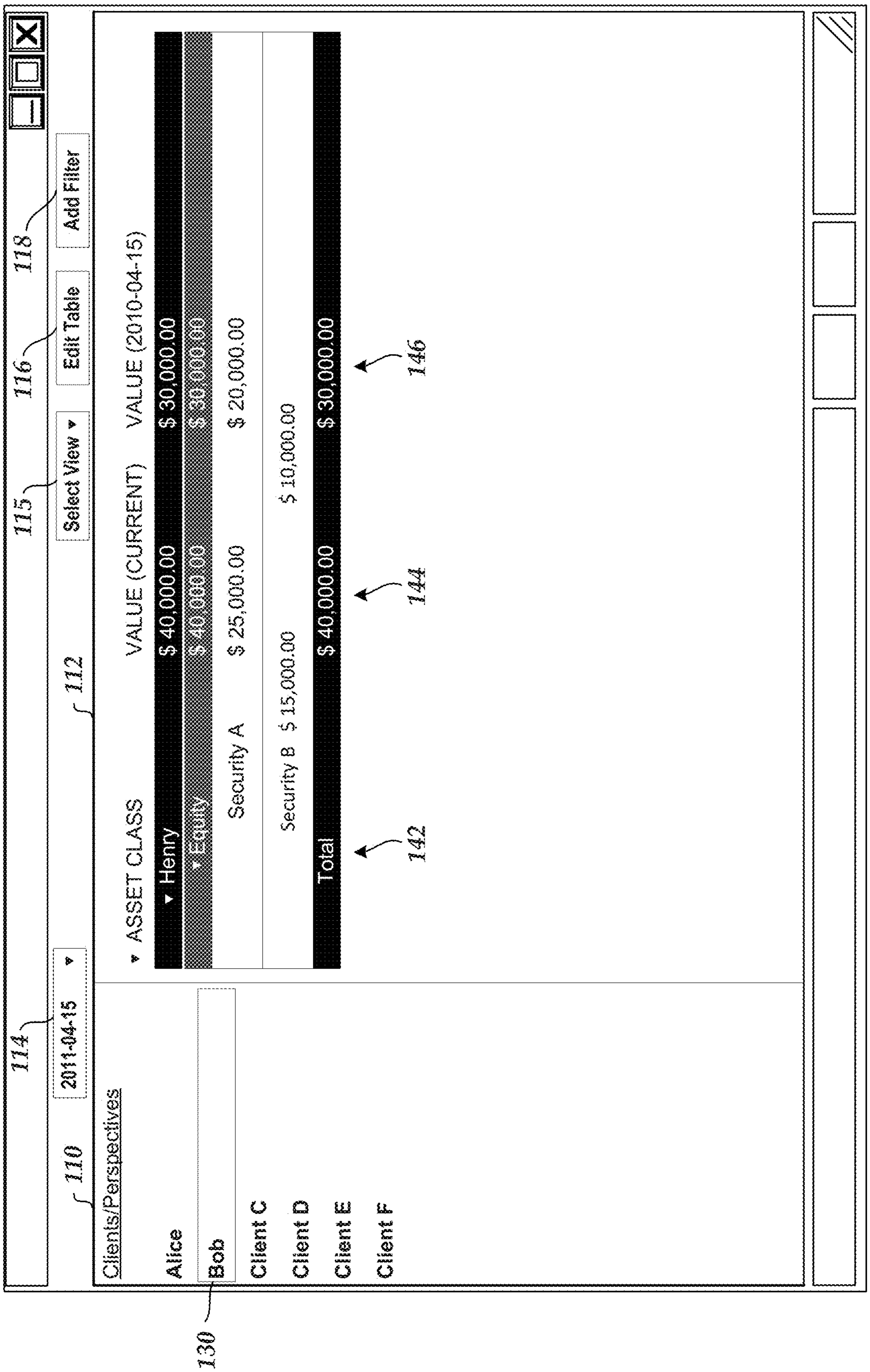
FIGS. 1A-1B illustrate example user interfaces of the system in which data is presented to the user in a table format.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

1.0 General Overview

As described above, embodiments of the present disclosure relate to a computer system designed to provide interactive user interfaces for enabling non-technical users to quickly and dynamically generate, edit, and update complex reports including tables and charts of data. The user interfaces are interactive such that a user may make selections, provide inputs, and/or manipulate outputs. In response to various user inputs, the system automatically accesses and traverses complex data structures (including, for example, a mathematical graph having nodes and edges, described below), calculates complex data based on the traversals, and displays the calculated complex data to the user. The displayed data may be rapidly manipulated and automatically updated based on a context selected by the user, and the system may automatically publish generate data in multiple contexts.

The system described herein may be designed to perform various data processing methods related to complex data structures, including creating and storing, in memory of the system (or another computer system), a mathematical graph (also referred to herein simply as a "graph") having nodes and edges. In some embodiments each of the nodes of the graph may represent any of (but not limited to) the following: financial assets, accounts in which one or more of the assets are held, individuals who own one or more of the assets, and/or legal entities who own one or more of the assets. Further, the various data processing methods, including traversals of the graph and calculation of complex data, may include, for example: receiving and storing one or more bucketing factors and one or more column factors, traversing the graph and creating a list of a plurality of paths of nodes and edges in the graph, applying the bucketing factors to the paths to result in associating each set among a plurality of sets of the nodes with a different value node among a plurality of value nodes, and/or applying the column factors to the paths and the value nodes to result in associating column result values with the value nodes. The system may also be designed to generate various user interface data useable for rendering interactive user interfaces, as described herein. For example, the system may generate user interface data for displaying of a table view by forming rows based on the value nodes and forming columns based on the column result values. Column result values may also be referred to herein as metrics.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces may be displayed on, for example, electronic displays (including, for example, touch-enabled displays).

The terms "database," "data structure," and/or "data source" may be used interchangeably and synonymously herein. As used herein, these terms are broad terms including their ordinary and customary meanings, and further include, but are not limited to, any data structure (and/or combinations of multiple data structures) for storing and/or organizing data, including, but not limited to, relational databases (e.g., Oracle databases, MySQL databases, etc.), non-relational databases (e.g., NoSQL databases, etc.), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. The term "data store", as used herein, is a broad term including its ordinary and customary meaning, and further includes, but is not limited to, any computer readable storage medium and/or device (or collection of data storage mediums and/or devices). Examples of data stores include, but are not limited to, optical disks (e.g., CD-ROM, DVD-ROM, etc.), magnetic disks (e.g., hard disks, floppy disks, etc.), memory circuits (e.g., solid state drives, random-access memory (RAM), etc.), and/or the like. Another example of a data store is a hosted storage environment that includes a collection of physical data storage devices that may be remotely accessible and may be rapidly provisioned as needed (commonly referred to as "cloud" storage).

The terms "mathematical graph" and/or "graph" may be used interchangeably and synonymously herein. As used herein, these terms are broad terms including their ordinary and customary meanings, and further include, but are not limited to, representations of sets of objects or data items in which the data items are represented as nodes in the graph, and edges connect pairs of nodes so as to indicate relationships between the connected nodes. A graph may be stored in any suitable database and/or in any suitable format. In general, the terms "mathematical graph" and "graph," as used herein do not refer to a visual representation of the graph, but rather the graph as stored in a database, including the data items of the graph. However, in some implementations the graph may be represented visually.

Figure 1B:
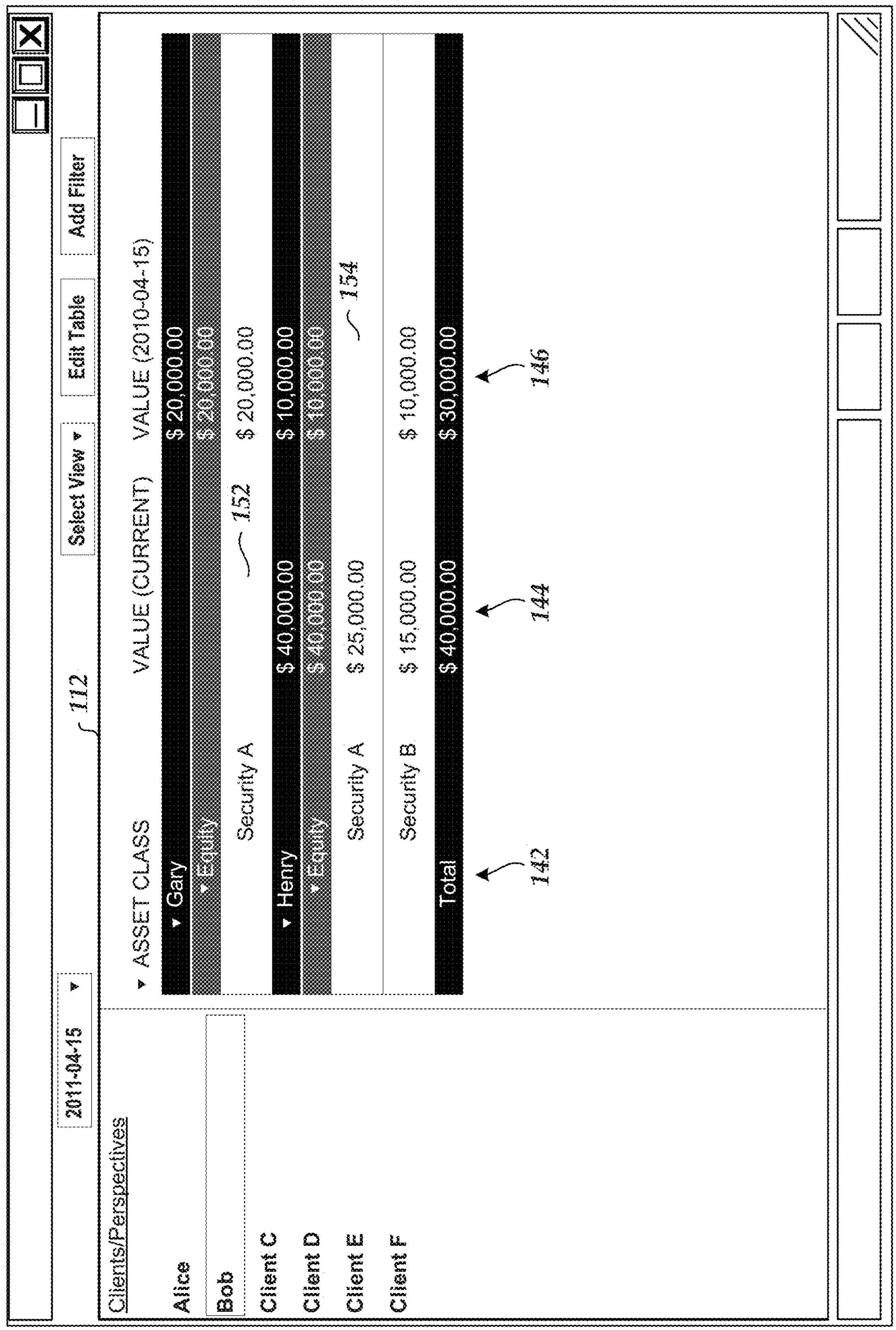

FIGS. 1A-1B illustrate example user interfaces of the system in which data is presented to the user in a table format following a graph traversal as described herein. Referring to FIG. 1A, the example user interface includes two primary display portions 110 and 112. Within a right display portion 112 the user interface displays a table of financial data associated with a particular individual, a group, or a legal entity. Specifically, the table displays a listing of financial assets associated with the particular individual, group, or legal entity, organized in a hierarchical fashion, as well as various metrics associated with the listing. A left display portion 110 includes a listing of various clients and/or perspectives. As described in detail below, user interfaces of the system are, accordingly to some embodiments, generated with respect to a particular context. A context may include a perspective and/or a date. In some embodiments, the perspective identifies any of an individual, a group, and/or a legal entity, each of which may, in some embodiments, correspond to clients of a user of the system. Accordingly, the display portion 110 includes a listing of various selectable perspectives (or clients), with a particular client "Bob" 130 being selected (as indicated by a box outline).

The example user interface of FIG. 1A further includes a date selection box 114. As described, the context of the user interface may include a date which may be specified by the user via the date selection box 114 (by, for example, direct input of a desired date and/or selection of a date in a dropdown list or calendar widget). The user interface may further include a select view button 115, an edit table button 116, and/or an add filter button 118. In various embodiments, and as described in further detail below, the user may select the select view button 115 to specify particular types of tables, charts, or other information to be displayed in the display portion 112; the user may select the edit table button 116 to specify an arrangement of data to be displayed in the table (or other chart and/or other information displayed), types of data to be displayed in the table (or other chart and/or other information displayed), particular metrics to be displayed in the table (or other chart and/or other information displayed), and/or the like; and the user may select the add filter button 118 to apply information filters to the table (or other chart and/or other information displayed).

In various embodiments, any input from the user changing the perspective, changing the date, applying a filter, editing displayed information, and/or the like causes the system to automatically and dynamically re-traverse the graph and re-generate data to be displayed according to the user's inputs.

In the example user interface of FIG. 1A, the table displays various information associated with the selected context (including the perspective, Bob, and the date, 2011-04-15), and based on other inputs from the user including a specification of two metrics (including a current value in column 144 and a value as of 2010-04-15 in column 146) and a particular hierarchical organization of information (as shown in column 142). Specifically, the table shows financial assets associated with Bob as of 2011-04-15, organized according to first, a manager of the financial assets, and second, a type of the financial assets. Further, metrics associated with the assets (and various groups of the assets) are displayed including a current value (for example, as of the date of the current context 2011-04-15) and a value as of a specified date 2010-04-15. Column 142 shows each asset, including Security A and Security B, organized by a manager of the asset (in the example, both Security A and Security B are managed by Henry) and a type of the asset (in the example, both Security A and Security B are of the type Equity). Columns 144 and 146 show metric values as of the current date (for example, the date associated with the current context, 2011-04-15) and 2010-04-15, respectively. As shown, between 2010-04-15 and 2011-04-15, the value of Security A owned by (or otherwise associated with) Bob increased from $20,000 to $25,000, the value of Security B owned by (or otherwise associated with) Bob increased from $10,000 to $15,000, the value of all equities owned by (or otherwise associated with) Bob increased from $30,000 to $40,000, the value of all assets managed by Henry that are owned by (or otherwise associated with) Bob increased from $30,000 to $40,000, and the total value of all assets owned by (or otherwise associated with) Bob increased from $30,000 to $40,000.

According to some embodiments, the system may generate user interfaces the provide the user with insights into data having time varying attributes. For example, suppose that in the table of FIG. 1A, Security A is managed by Henry on the currently selected date, but was managed by a different manager at some earlier time. This fact is not represented in the table of FIG. 1A. Accordingly, the system provides, in some embodiments, that the user may specify that data is to be displayed taking into account any associated time varying attributes (also referred to herein as "historical values"). FIG. 1B shows, in the display portion 112, an updated table of Bob's assets in which time varying attributes are accounted for. In particular, in the table of FIG. 1B, it is assumed that Security A was managed by Henry from 2011-01-01 to 2011-12-31, and managed by Gary during all other times. Thus, the table of FIG. 1B includes rows corresponding to Security A as managed by Gary, and Security A as managed by Henry. Because Security A was not managed by Gary during the current date (2011-04-15), no value is displayed at location 152 of column 144. Likewise, because Security A was not managed by Henry during the date associated with the metric of column 146 (2010-04-15), no value is displayed at location 154. However, values of metrics are displayed in the respective columns when the dates are applicable to the respective managers. For example, Security A had a value of $20,000 on 2010-04-15, at which time it was managed by Gary, and a value of $25,000 on 2011-04-15, at which time it was managed by Henry. Note that Security B only appears under the Henry category as Security B was managed by Henry during both of the applicable dates (although it may have been managed by Gary or another manager during to other time period).

Additional examples of using the system with data having time varying attributes is provided in U.S. patent application Ser. No. 14/643,999, filed Mar. 10, 2015, and titled "SYSTEMS AND USER INTERFACES FOR DYNAMIC AND INTERACTIVE TABLE GENERATION AND EDITING BASED ON AUTOMATIC TRAVERSAL OF COMPLEX DATA STRUCTURES INCLUDING TIME VARYING ATTRIBUTES," the entire disclosure of which is hereby made part of this specification as if set forth fully herein and incorporated by reference for all purposes, for all that it contains.

Accordingly, in various embodiments the system may calculate data (via complex graph traversal described herein) and provide a unique and compact display of calculated data based on time varying attributes associated with the calculated data. In an embodiment, the data may be displayed in a table, such as the example table of FIG. 1B, in which data is organized based on the time varying attributes and dates associated with particular metrics specified by the user and/or determined by the system. In some embodiments, when no metric values are associated with a particular item of data, a portion of the table is left blank (as with the locations 152 and 154 of FIG. 1B) and/or omitted (for example, no row is shown for Security B under Gary in the table of FIG. 1B as Security B is not associated with Gary during any time period applicable to the table).

In various embodiments the system may calculate time intervals applicable to calculations of various metrics. For example, in the user interfaces of FIGS. 1A and 1B, the system calculates asset value metrics for which a single date or time is applicable. In other examples, the system may calculate metrics that span periods of time such as a rate of return of an asset over a number of years. Accordingly, the system may determine a set of time intervals associated with the metric, a set of time intervals associated with applicable time varying attributes of graph data, and determine in intersection of the two sets of time intervals. The calculated intersection of the sets of time intervals may then be inputted into the complex graph traversal process to calculate metric values for display in compact and efficient user interfaces of the system.

Advantageously, accordingly to various embodiments, the system may calculate and provide, for example, any set of metrics with respect to graph having time varying attributes. The user may therefore easily find insights that are not otherwise easily attainable. For example, the non-technical user may easily compare asset returns by manager, while the managers of the assets change over time.

Accordingly, in various embodiments, large amounts of data are automatically and dynamically calculated interactively in response to user inputs, and the calculated data is efficiently and compactly presented to a user by the system. Thus, in some embodiments, the user interfaces described herein are more efficient as compared to previous user interfaces in which data is not dynamically updated and compactly and efficiently presented to the user in response to interactive inputs.

In an embodiment, a method comprises creating and storing, in memory of a computer, a graph having nodes and edges, wherein the nodes represent financial assets and any one or more of: accounts in which one or more of the assets are held, individuals who own one or more of the assets, or legal entities who own one or more of the assets; receiving, such as from a user of the computer, one or more bucketing factors and one or more column factors; the computer traversing the graph and creating a list of a plurality of paths of nodes and edges in the graph; the computer applying the bucketing factors to the paths to result in associating each set among a plurality of sets of the nodes with a different value node among a plurality of value nodes; the computer applying the column factors to the paths and the value nodes to result in associating column result values with the value nodes; creating and causing display of a table view by forming rows based on the value nodes and forming columns based on the column result values.

In an embodiment, the method further comprises, for the bucketing factors, selecting a particular bucketing factor; applying the particular bucketing factor to the paths and receiving a bucketing result value; creating a value node for the result value; associating, with the value node, all child nodes of the paths having bucketing result values that match the value node.

In an embodiment, the method further comprises, for the column factors, for the value nodes, and for paths associated with a particular value node, applying a particular column factor to a particular path and receiving a column result value; associating the column result value with the particular value node. In one feature, the edges represent any one or more of: ownership; containment; or data flow. In another feature at least two of the edges comprise a circular reference from a particular node to that particular node; further comprising determining, during the traversing, whether two sequences of two or more traversed nodes are identical, and if so, backtracking the traversal and moving to a next adjacency. In yet another feature one or more of the bucketing factors or column factors comprises an executable code segment configured to perform one or more mathematical calculations using one or more attributes of nodes in a path.

In still another feature one or more of the bucketing factors or column factors comprises an executable code segment configured to invoke a function of a network resource using one or more attributes of nodes in a path.

In an embodiment, the method further comprises generating and causing display of a graphical user interface comprising the table view and one or more info-graphics, wherein each of the info-graphics is programmatically coupled to the table view using one or more data relationships, and further comprising receiving user input selecting one or more rows of the table view and, in response, automatically updating the info-graphics to display only graphical representations of the one or more rows of the table view that are in the user input.

In an embodiment, the method further comprises generating and causing display of a graphical user interface comprising the table view; causing displaying a bucketing factor menu identifying one or more available bucketing factors; receiving a selection of a particular bucketing factor; re-traversing the graph and applying the particular bucketing factor to the paths to result in associating second sets of the nodes with second value nodes among the plurality of value nodes; re-creating and causing re-displaying an updated table view based on the second value nodes and the column result values.

In an embodiment, the method further comprises generating and causing display of a graphical user interface comprising the table view; causing displaying a column factor menu identifying one or more available column factors; receiving a selection of a particular column factor; re-traversing the graph and applying the particular column factor to the paths and the value nodes to result in associating second column result values with the value nodes; re-creating and causing re-displaying an updated table view based on the value nodes and the second column result values.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a particular one of the graphical elements; creating and storing a filter that is configured to pass only data in the table view that corresponds to the particular one of the graphical elements; applying the filter to the table view and causing re-displaying the table view using only data in the table view that corresponds to the particular one of the graphical elements.

In an embodiment, the method further comprises generating and causing display of a graphical user interface comprising the table view and one or more info-graphics, wherein each of the one or more info-graphics comprises one or more graphical elements that relate to one or more associated rows of the table view; receiving a selection of a one or more particular rows in the table view; updating the info-graphics by causing displaying graphical elements corresponding only to the particular rows in the table view.

In an embodiment, the method further comprises generating and causing display of a graphical user interface comprising the table view and one or more info-graphics; receiving a selection of one row associated with an asset; updating the graphical user interface to display a summary of attributes of the asset, based on stored asset data or based on retrieving, at the time of the selection, the attributes of the asset from one or more global data sources.

In an embodiment, the method further comprises displaying, with the summary of attributes of the asset, a transaction reference identifying a number of transactions previously completed by a particular perspective.

In an embodiment, the method further comprises receiving and storing a context comprising a perspective and/or a date, wherein the perspective identifies any of an individual, a group, and a legal entity; beginning the traversing at a first node associated with the perspective; receiving user input specifying a different perspective; repeating the traversing beginning at a second node associated with the different perspective and repeating the creating and causing displaying the table view, based on updated value nodes and updated column result values yielded from the different perspective.

In an embodiment, the method further comprises receiving an updated context comprising a changed date value; repeating the traversing, creating and causing displaying the table view based on updated value nodes and updated column result values yielded from re-applying the column factors using the changed date value.

2.0 Structural and Functional Overview

The computer system provides wealth management capabilities that enable non-technical users to create new views, reports, and other manipulations of a dataset without the need for custom programming. Custom views can be created in any user session by selecting particular columns, factors or metrics, ordering, filters providing groupings, graphics and other aspects of a desired view. The resulting views can be saved and reused in later sessions. However, a view that is needed only on a one-time basis also may be constructed rapidly using atomic components without specialized programming knowledge. Further, views may be shared with others such as team members, clients, or other applications. Sharing may include exporting to an application such as a spreadsheet, transferring to a report generator, or other mechanisms as further described herein.

Figure 2A:
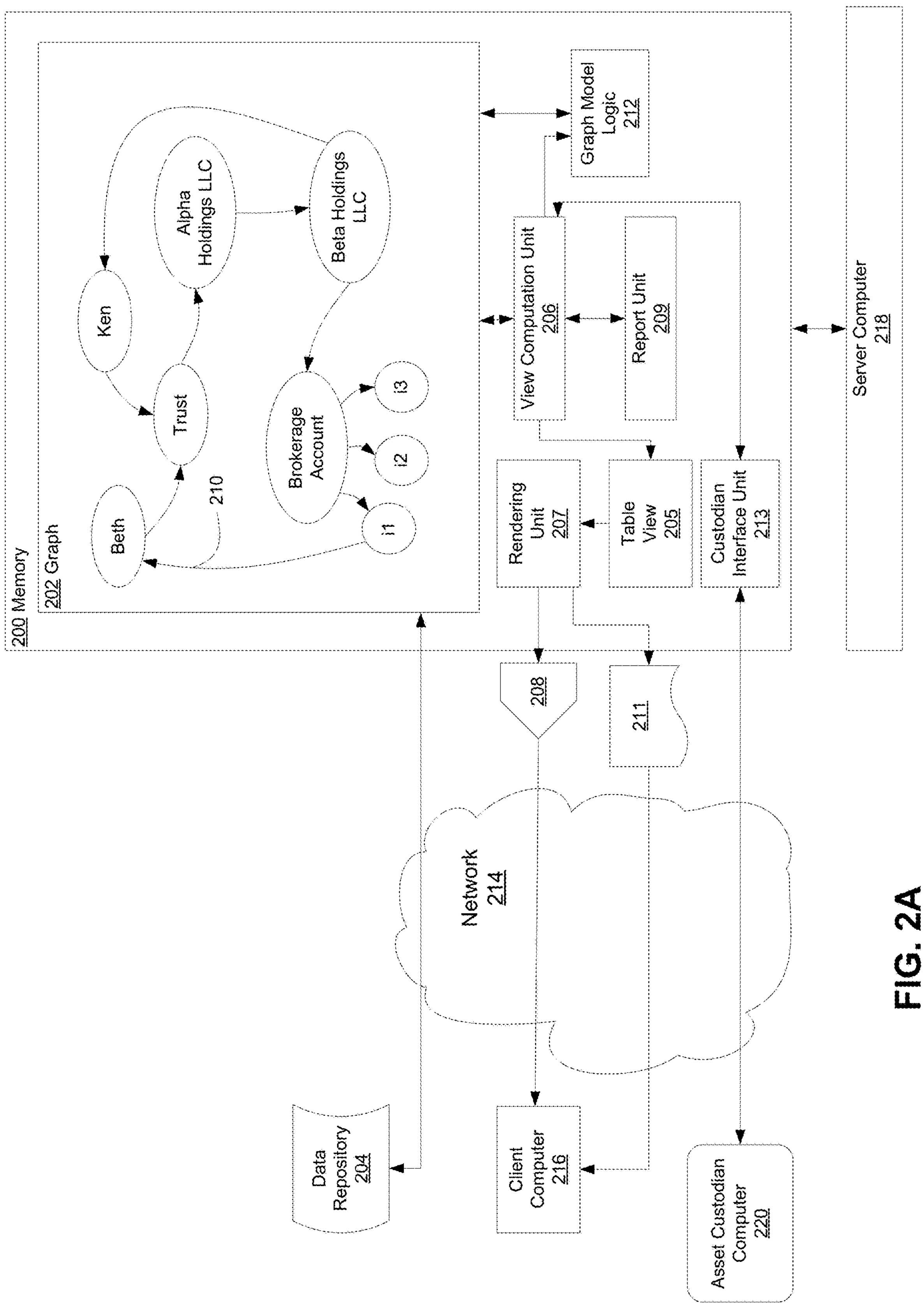
FIG. 2A illustrates a computer system that may be used to implement an embodiment.

FIG. 2A illustrates a computer system that may be used to implement an embodiment. The computer memory 200 stores a graph 202 that represents a set of investment holdings. In an embodiment, client or customer investment data is received from one or more sources, such as brokerages, and transformed into position data prior to storage into a data repository for use by the system. Positions, in an embodiment, are considered the most fine-grained or atomic element of data manipulated in the system rather than, for example, an account.

Memory 200 forms part of a computer system having a processor, mass storage, input-output devices, and other elements that are omitted in FIG. 2A for purposes of clarity. A view computation unit 206 can access the graph 202 for purposes of traversing the graph in response to different configuration data and generating output one or more table views 205 in the manner described further herein. View computation unit 206 may be coupled to a rendering unit 207 for rendering and communicating table views 205 to any of a computer display unit 208 or an electronic document 211 of any form such as a report, spreadsheet file, etc. In an embodiment, report unit 209 is configured to receive view data from view computation unit 206, facilitate transfer of view data to pages of reports, and receive user input specifying metadata for report formatting controls, as further described herein.

View computation unit 206 and graph 202 are implemented using object-oriented programming techniques in which nodes of the graph are represented using programmatic objects. For example, JAVA® may be used.

The foregoing elements of FIG. 2A may form part of a server computer 218 that is coupled directly or indirectly through one or more computer networks, represented by network 214, to a client computer 216. Network 214 may comprise one or more LAN, WAN, or internetwork links and may comprise the public internet through the use of appropriate protocols for ensuring data security, user authentication and user authorization. Client computer 216 may comprise an individual client computing device such as personal computer, workstation, laptop, netbook, tablet computer, or smartphone that is coupled through a computer network to the other elements of FIG. 2A. Client computer 216 hosts an internet browser program which, may be configured with virtual machine program execution capability. For example, client computer 216 may host a JAVA virtual machine and may receive and execute one or more JAVA files that cause the browser to display a graphical user interface that receives data (for example, user interface data) from and facilitates interaction with the server computer 218 and view computation unit 206.

View computation unit 206 also may be coupled to a custodian interface unit 213 that is coupled directly or indirectly through network 214 to an asset custodian computer 220. Asset custodian computer 220 serves as an authoritative source of data about accounts and asset positions associated with individuals or other entities represented in data repository 204 and graph 202. Custodian interface unit 213 is configured to obtain account and position snapshot data periodically or through live data feeds from asset custodian computer 220. Inbound data may be transformed from account-level data into position-level data and stored in data repository 204 or represented in graph 202 in memory for further reference and manipulation.

Embodiments may also interface in a similar manner to global data sources such as market data feeds that are independent of particular accounts or positions but report current or historic market value of assets or instruments. Examples of sources of global data include Thomson Reuters, New York Stock Exchange, NASDAQ, etc. In such an embodiment, global data sources may or may not override asset values that are stored in the graph, based on configuration data. For example, a particular node of graph 202 representing an asset may store an asset value attribute that was obtained from positions data derived from account data obtained from an asset custodian. However, if the asset is, for example, a market traded security, then a current intraday value for the asset may be available from the global data source. Configuration data may indicate whether global data source values for assets should override position data obtained from a custodian or other sources.

A set of investment holdings may be associated with an individual, a legal entity, or a group of individuals and/or legal entities such as one or more clients of an RIA firm. Graph 202 may be formed in memory 200 based on data records obtained from data repository 204. Graph 202 may comprise any number of nodes and edges, and the particular graph shown in FIG. 2A is provided solely to illustrate one example and not as a requirement or limitation.

Graph 202 may comprise nodes and edges having any level of complexity, and there is no requirement that nodes are organized in a hierarchical arrangement; circular references may be represented. As an example, graph 202 comprises nodes for individuals named Beth and Ken who have an ownership or trusteeship relationship to a Trust. The Trust is related to a company, Alpha Holdings LLC, which is also related to a second company, Beta Holdings LLC that may own a Brokerage Account having instruments i1, i2, i3. Instruments i1, i2, i3 may represent stocks, bonds, options, or any other financial instrument that may be traded or receive an investment; for purposes of illustrating an example, three (3) instruments are shown in FIG. 2A but practical embodiments may use any number of instruments. Beta Holdings LLC further has a relationship to Ken and instrument i1 has a relationship to Beth; these relationships circle back within the graph and provide examples of non-hierarchical node-edge relationships. For example, one circular reference is the path Ken→Trust→Alpha Holdings LLC→Beta Holdings LLC→Ken.

The edges of the graph 202 may represent any type of relationship among the nodes connected by the edge. For example, the edges may represent asset ownership relationships, liability relationships, equity ownership relationships, data flow relationships, and/or the like. Thus, for example, one node may represent a security, another node may represent a brokerage account, and an edge connecting the two node may represent that the first node owns a particular number of shares of the second node.

As a further example, edge 210 may represent a flow of instrument data from a third party data source such as a brokerage data feed. For example, edge 210 could represent a brokerage data feed for instrument i1 indicating that Beth owns 200 units, such as shares, having a value of 25 per unit. Edge 210 may also represent an ownership relationship separate from value attributes. Edge 210 or other edges may represent other concepts such as issuance of an asset; thus, one node may represent an issuer of an asset, another node may represent the asset, and an edge connecting the two nodes may represent that the first node issued the second node.

Graph nodes may receive data for attributes of the nodes from a custodian, from a global data source, or from other data in the data repository. For example, processing a particular client's custodial account may enable populating the graph 202 with some, but not all, values of attributes that are defined in the graph model. In an embodiment, view computation unit 206 is configured to investigate alternative data sources to supply missing node attribute values when all attribute values are not available from a custodian. For example, a particular global data source may have a sector attribute value that the custodian does not have, and if so, the substitute value indicating sector may be added to a node attribute. As another example, if data previously received from a custodian is determined to be stale, then updated data could be requested from one of the global data sources.

Further, overriding prior values is made straightforward through the representation of ownership relationships in graph edges, whereas nodes represent assets per se, possibly with value attributes. Consequently, modifying a value attribute of an asset node, based on received market-based values, enables the received values to affect all calculations that reference the asset node. Other asset node attributes may propagate in a similar manner. For example, if a particular RIA user modifies an asset node representing ALPHA COMPANY to add an earnings report document as an attribute, all clients of that particular user who own positions in ALPHA COMPANY obtain access to the earnings report through principles of object inheritance.

Figure 4:
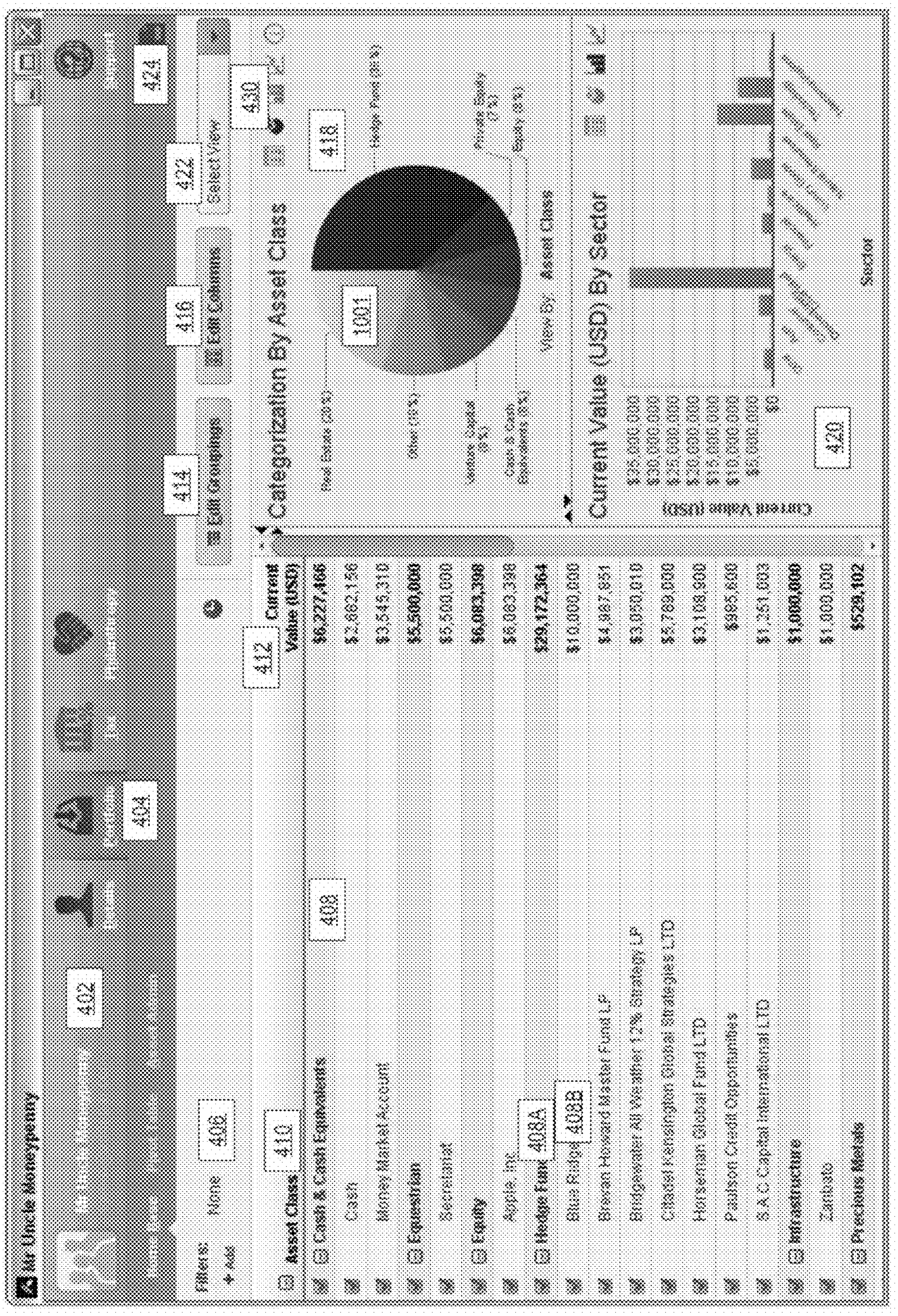
FIG. 4 illustrates an example of a graphical user interface for a computer display unit.

View computation unit 206 is configured to transform graph 202 into one or more table views, graphs, charts, and other output. Tables, charts, graphs, and other components that may be inserted into user interfaces and/or reports of the present disclosure may be referred to herein as elements, report elements, or in some instances widgets. For purposes of illustrating the example embodiments which follow, FIG. 4 illustrates an example of a graphical user interface for a computer display unit. In an embodiment, the elements of FIG. 2A and the output of FIG. 4 are implemented using the ADDEPAR computer software system commercially available from Addepar, Inc., Mountain View, Calif.

FIG. 4 illustrates a view of holdings from the perspective of an individual named Uncle Moneypenny as indicated by Perspective label 402. A Portfolio tab 404 indicates that the user is viewing a portfolio of holdings of Moneypenny. A Filters region 406 indicates that no data display filters are presently applied to change a view of the data in the GUI. Selecting an Add link in the Filters region causes view computation unit 206 to display a GUI widget that may receive definitions of filters, as further described herein.

FIG. 4 comprises a table view 408 which, for purposes of illustrating an example, comprises rows organized by asset class as indicated by an Asset Class bucketing label 410 and columns showing asset class name and current value as indicated by column label 412. Assets within Asset Class 410 are organized in a hierarchy or tree in which boldface labels 408A indicate an asset class bucket and non-bold labels 408B indicate individual assets within the associated asset class bucket.

Selecting an Edit Groupings widget 414 causes view computation unit 206 to display a GUI dialog that may receive reconfiguration of data values that determine the identity and order of buckets and therefore the particular manner of displays of rows of the table view 408.

Figure 6:
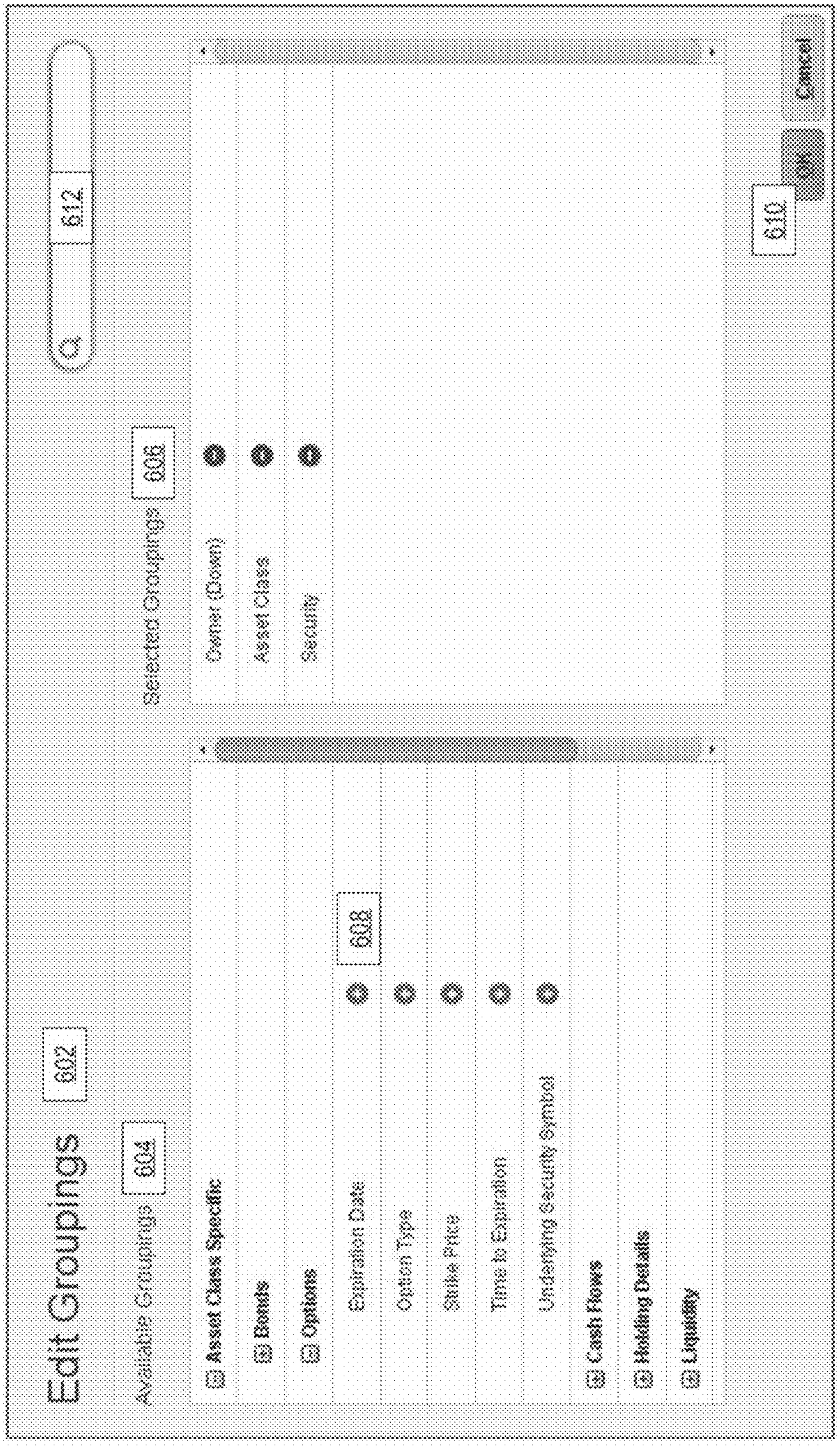
FIG. 6 illustrates an example Edit Groupings dialog that displays a list of currently selected groupings and a tree representation of available groupings.

FIG. 6 illustrates an example Edit Groupings dialog 602 that displays a list of currently selected groupings 606 and a tree representation of available groupings 604. A comparison of selected groupings 606 to FIG. 4 will show that the selected groupings of FIG. 6 are represented in FIG. 4. User selection of a remove (–) icon in the selected groupings 606 causes the view computation unit 206 to remove the selected grouping from selected groupings 606; subsequent selection of OK widget 610 in dialog 602 causes view computation unit 206 to close the dialog and re-display the table view 408 without the removed grouping. User selection of open (+) and close (–) icons in the tree display of available groupings 604 causes categories of groupings to open until leaf nodes of the tree are shown. For example, in FIG. 6 the user has selected open icons for Asset Class Specific and Options, yielding a list of available option groupings 608.

Figure 8:
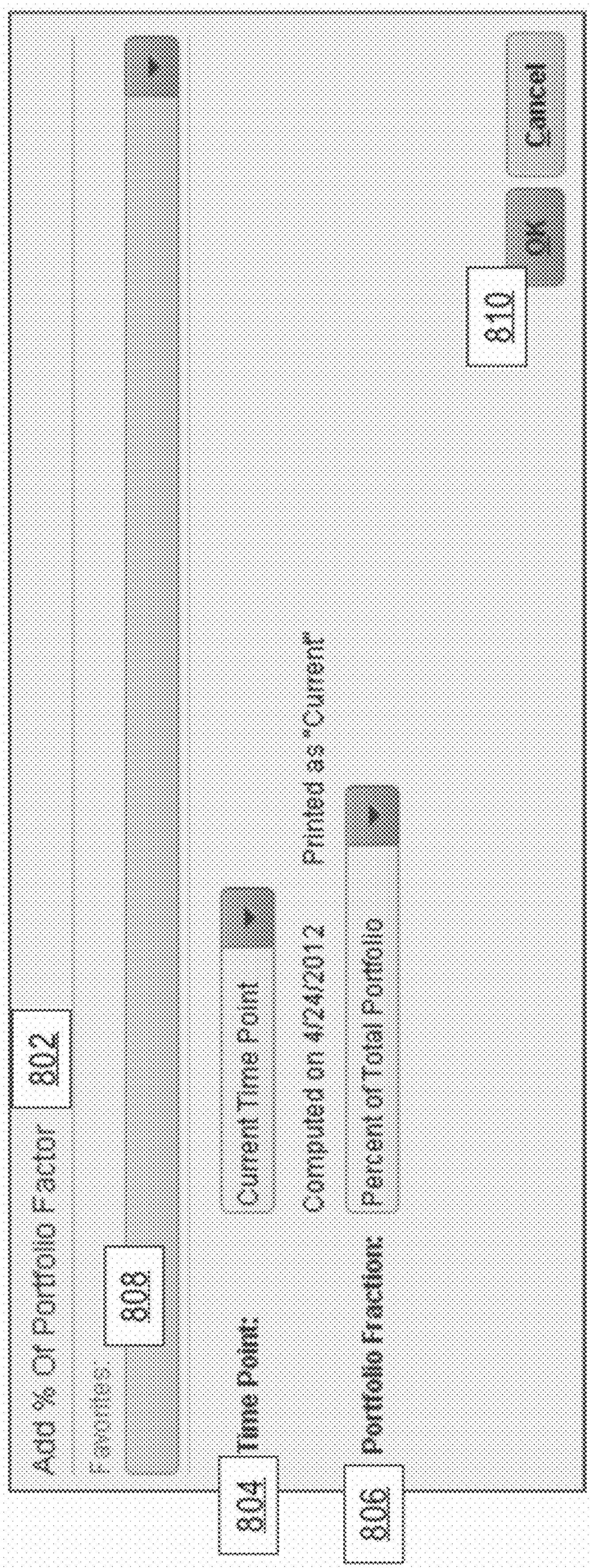
FIG. 8 illustrates an example configuration dialog for a Factor.

Selecting an add (+) icon associated with any of the available option groupings 608 causes view computation unit 206 to add the selected option grouping to selected groupings 606; subsequent selection of OK in dialog 602 causes view computation unit 206 to close the dialog and re-display the table view 408 with the added grouping. For some groupings, selecting the add (+) icon causes view computation unit 206 to display a Factor details dialog that prompts the user to enter or confirm one or more configuration values associated with a Factor that drives the grouping. FIG. 8 illustrates an example configuration dialog for a Factor. For example, assume that a user selects, from Available Groupings, Holding Details and then % of Portfolio. In response, view computation unit 206 causes displaying dialog 802, which comprises a Time Point widget 804 and Portfolio Fraction widget 806 that prompt the user to select one of several available values using drop-down menus. Alternatively, the user may select Favorites drop-down menu 808, which associates labeled menu items with stored values for Time Point and Portfolio Fraction. Selecting the OK widget 810 causes view computation unit 206 to close the dialog and store the specified values for Time Point and Portfolio Fraction in association with the % of Portfolio Factor, for use in subsequent computations. Thus, the system provides extensive opportunities for flexible customization by specifying the desired basis for computation, without requiring custom programming of algorithms or methods for particular factor computations.

Referring again to FIG. 6, a search box 612 may receive user input of keywords associated with groupings and causes view computation unit 206 to update available option groupings 608 with values that match the keywords.

Figure 7:
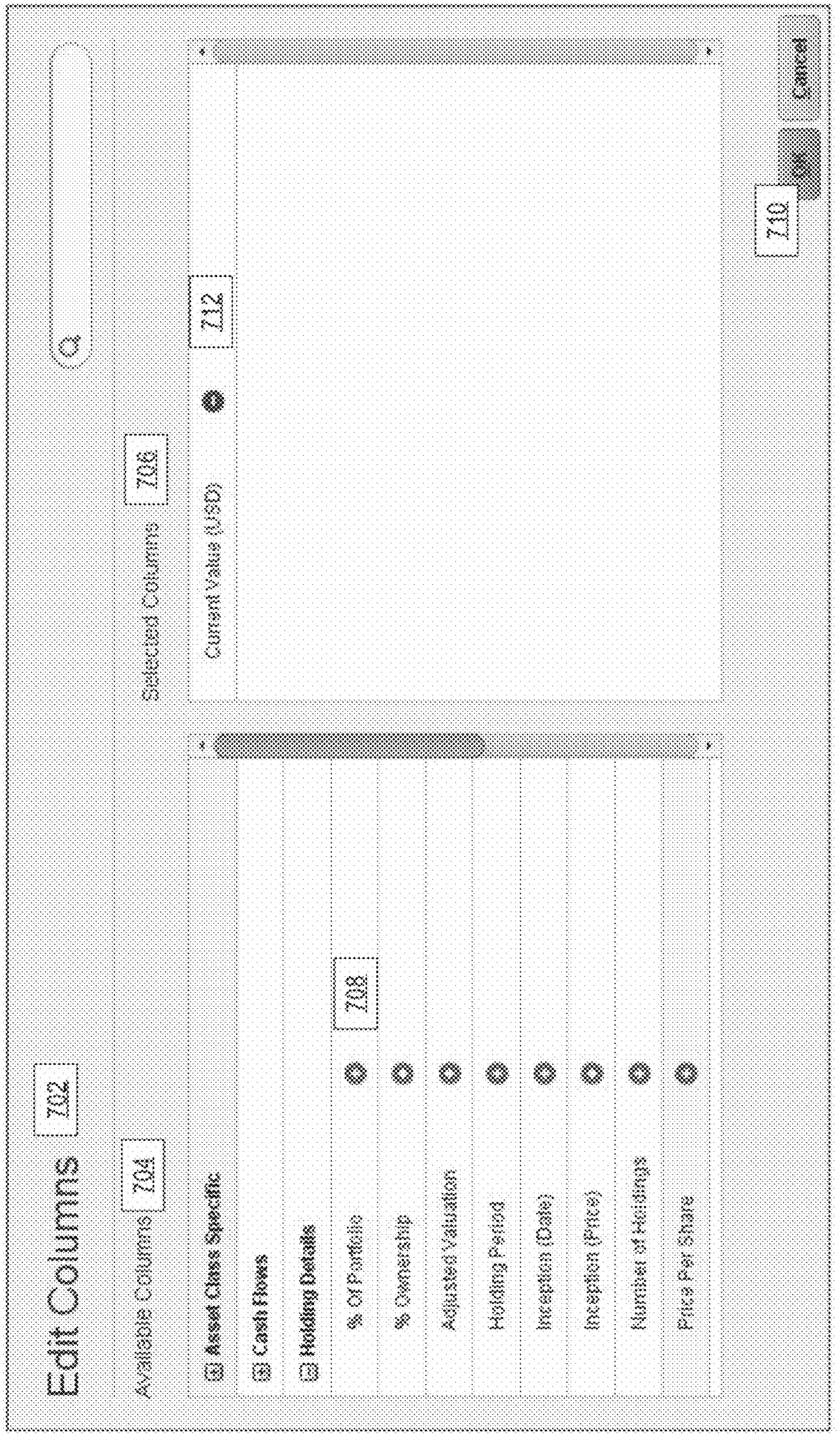
FIG. 7 illustrates an example Edit Columns dialog that displays a list of currently selected columns and a tree representation of available columns.

Referring again to FIG. 4, selecting an Edit Columns widget 416 causes view computation unit 206 to display a GUI widget that may receive reconfiguration of data values that determine the identity and order of columns of the table view 408. FIG. 7 illustrates an example Edit Columns dialog 702 that displays a list of currently selected columns 706 and a tree representation of available columns 704. A comparison of selected columns 706 to FIG. 4 will show that the selected columns of FIG. 7 are represented in FIG. 4. User selection of a remove (–) icon in the selected columns 706 causes the view computation unit 206 to remove the selected column from selected columns 706; subsequent selection of OK widget 710 in dialog 702 causes view computation unit 206 to close the dialog and re-display the table view 408 without the removed column. User selection of open (+) and close (–) icons in the tree display of available columns 704 causes categories of columns to open until leaf nodes of the tree are shown. For example, in FIG. 7 the user has selected open icons for Holding Details, yielding a list of available option columns 708.

Selecting an add (+) icon associated with any of the available option columns 708 causes view computation unit 206 to add the selected option column to selected columns 706; subsequent selection of OK in dialog 702 causes view computation unit 206 to close the dialog and re-display the table view 408 with the added grouping. In some cases, selecting the add icon may cause the view computation unit 206 to display a dialog of the kind shown in FIG. 8 for groupings, with configuration parameter values applicable to the particular selected column. A search box 712 may receive user input of keywords associated with columns and causes view computation unit 206 to update available option columns 708 with values that match the keywords.

The GUI of FIG. 4 further comprises a Select View dropdown menu 422 that may be used to select and apply different views that have been previously created and saved by others. For example, in FIG. 4 the GUI comprises a table view 408 and one or more info-graphics such as categorization pie chart 418, and bar chart 420. As an example, table view 408 reflects an ownership breakdown by asset class and value; other view selections may cause view computation unit 206 to display different combinations of buckets and columns, tables, charts and graphs. In FIG. 4 and other drawing figures herein, the info-graphics comprise a pie chart and a bar chart, solely to illustrate examples; however, in an embodiment, the GUI of FIG. 4 comprises two or more info-graphic option icons 430 indicating the availability of a table view, pie chart, bar chart, or line graph. Other embodiments may support info-graphics of other types. View computation unit 206 is configured to receive user input selecting one of the info-graphic option icons 430 and, in response, to change the info-graphic panel adjacent to the selected option icon to a different form of info-graphic. For example when pie chart 418 is displayed, selecting a line graph icon from among option icons 430 causes view computation unit to display a line graph in place of the pie chart and using the same underlying data as a basis for the line graph.

Figure 13:
FIG. 13 illustrates the display of FIG. 4 showing asset details.

In an embodiment, icons 430 include an asset details icon that may trigger display of detailed information about a particular asset that has been selected in the table view 408. FIG. 13 illustrates the display of FIG. 4 showing asset details. In the example of FIG. 13, in table view 408 one asset 1302 is selected as indicated by a checkbox in the row of the selected asset, and asset details icon 1301 has been selected. View computation unit 206 is configured, in response to a selection of the asset details icon 1301, to cause displaying in the info-graphics area of the display, an asset details panel 1304 comprising a summary sub-panel 1306, owner sub-panel 1308, and attachments sub-panel 1310. In an embodiment, summary sub-panel 1306 lists attributes pertaining to the selected asset, which view computation unit 206 may obtain by retrieving from data repository 204. Owner sub-panel 1308 specifies one or more owners of the selected asset; the owners are those individuals, clients or legal entities that are associated with the current logged in user of the system. For example, when the user is an RIA, the Owner sub-panel 1308 may identify all clients of that user who have a position in the selected asset. Owner sub-panel 1308 further comprises a selectable hyperlink label indicating the number of transactions that each owner has completed for the selected asset; in the example of FIG. 13, "1 Transaction" is indicated. View computation unit 206 is configured, in response to selection of the hyperlink label, to retrieve information describing the transactions of that owner and display transaction detail in a pop-up menu. Consequently, a user is able to rapidly obtain transaction data for assets of clients or legal whose holdings are represented in the system, from within a display that has extensive viewing capabilities.

Figure 5:
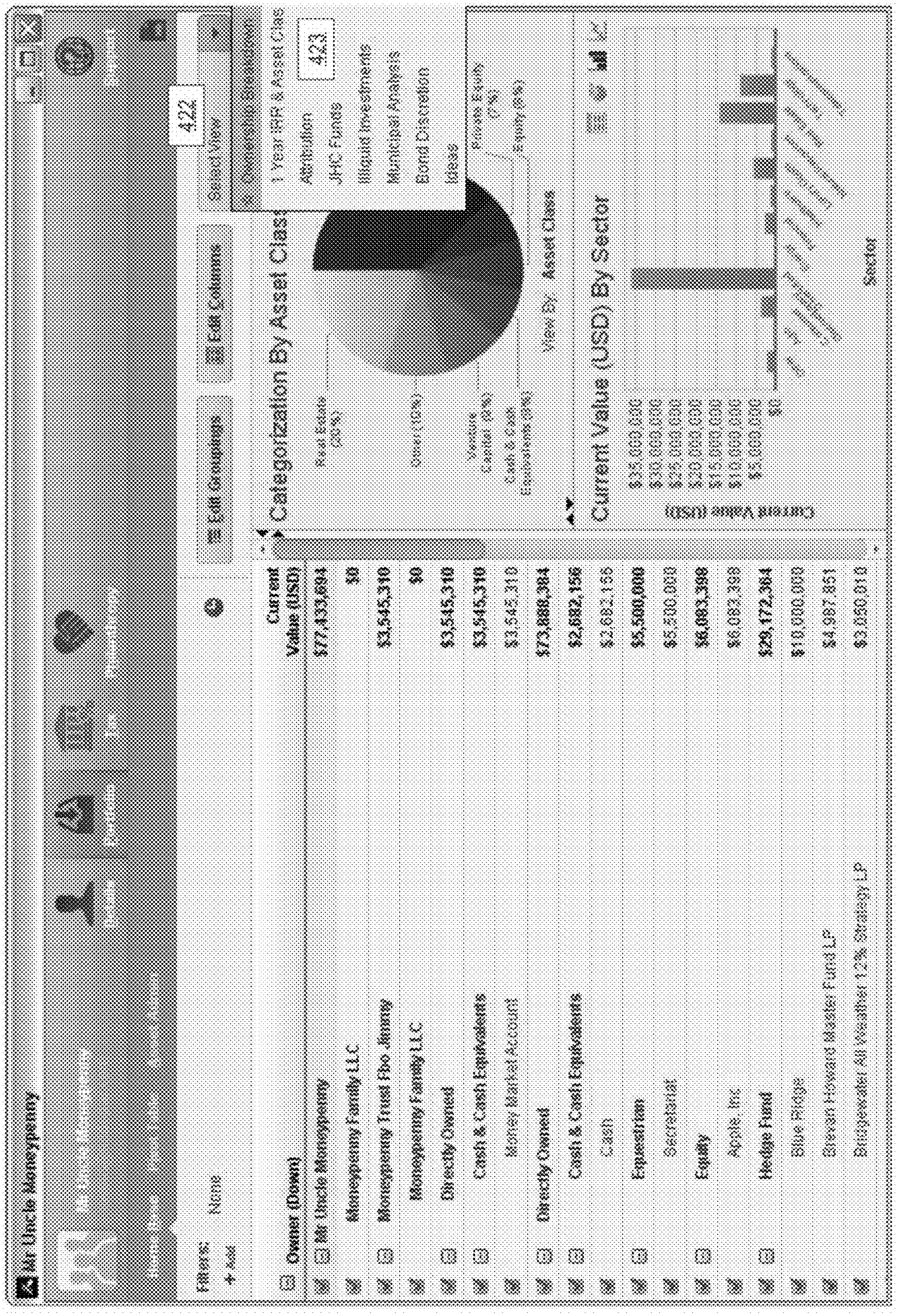
FIG. 5 illustrates the display of FIG. 4 in which dropdown menu has been selected and shows a plurality of named previously created views in a list.

FIG. 5 illustrates the display of FIG. 4 in which dropdown menu 422 has been selected and shows a plurality of named previously created views in a list 423. Selecting any particular view from list 423 causes view computation unit 206 to replace table view 408 with a new view based on the bucket Factors and column Factors that were defined for the selected view, and to update pie chart 418 and bar chart 420 based on the data in the new view. Replacement of the view involves re-computing the view based on the bucket Factors, column Factors and current Perspective of Moneypenny, in the manner described further herein. In some embodiments, pie chart 418 and bar chart 420 are replaced with different graphical views of data or removed completely.

In an embodiment, each of the info-graphics such as pie chart 418 and bar chart 420, by default, display charts and graphs based on the data that is then currently shown in table view 408. However, in an embodiment, view computation unit 206 is configured to respond to a selection of any of the info-graphics by updating the table view 408.

In an embodiment, the GUI of FIG. 4 further comprises an Export widget 424 which, when selected, begins operation of a report and data export function, as further described herein.

Embodiments operate in part based upon stored data representing a Context of a particular view of the graph 202. In an embodiment, a Context comprises a Perspective and/or a Date (or date range, also referred to herein as a time period). A Perspective indicates an individual, legal entity, or group and a Date indicates a time point at present or in the past. For example, a view of graph 202 from the Perspective of Ken may be different than a view generated from the Perspective of Beth. In an embodiment, a Perspective may comprise two or more individuals, such as a husband and wife, groups, or multiple legal entities. A change in Perspective results in a change in calculations of values of assets, in many cases. For example, the value of an asset from a particular Perspective typically depends upon the percentage of ownership of a particular person or legal entity. As an example based upon graph 202, the percentage of ownership in Beta Holdings LLC may be quite different for Beth and for Alpha Holdings LLC because of the presence or lack of intervening individuals or legal entities with different ownership arrangements, shares or percentages.

Graph 202 may be represented in a backing store such as a relational database system, represented in FIG. 2A by data repository 204. In an embodiment, each node in graph 202 is a row in a table in the database. An Edges table identifies edges in graph 202 in terms of identifiers of nodes from which an edge begins and to which an edge connects (FromID, ToID). In an embodiment, during operation all rows from the database are loaded into main memory and organized in a graph representation in memory for use during a user session. In an embodiment, view computation unit 206 interacts with graph model logic 212 to implement a graph model and perform graph manipulation operations; in various embodiments, the graph model logic may comprise custom code or may be based on an open-source project such as Tinkerbell.

Embodiments also apply one or more Factors as part of generating views. In an embodiment, a Factor may be any recognized financial metric. A Factor, for example, may be internal rate of return (IRR). A Factor is a computational unit that receives, as input, a path from a graph such as graph 202 and a Context.

For a table view, each Factor may be used as either a bucketing Factor or a column Factor. An example of a bucketing Factor is asset class, and an example of a column Factor is value. Based on such a configuration, an output table view would comprise rows identifying asset classes and a value for each asset class. The configuration of asset class as a bucketing Factor and value as a column Factor causes the view computation unit 206 to compute values by traversing graph 202 and consolidating values in terms of asset classes. In an embodiment, configuring a column Factor may be accomplished by selecting a user interface widget and selecting a Factor from a drop-down list. Selecting an additional column Factor causes view computation unit 206 to re-compute the table view by again traversing graph 202. For example, if IRR is configured as a column Factor, and rows in the table view represent Instruments, then the table view will comprise a column that shows an IRR value for each Instrument.

Further, selecting a second bucketing Factor causes the view computation unit 206 to re-compute the table view by consolidating values in terms of the second bucketing Factor; the resulting table view is displayed hierarchically so that multiple bucketing Factors are nested. For example, these techniques allow generating a table view that displays assets by asset class, then by owner, etc. In an embodiment, a user may re-order the bucketing Factors within a graphical list of all selected bucketing Factors, and the re-ordering causes the view computation unit 206 to re-compute and re-display the table view using a different hierarchy of bucketing Factors based on the re-ordered list of bucketing Factors.

3.0 Generating Table Views from Graphs

Figure 2B:
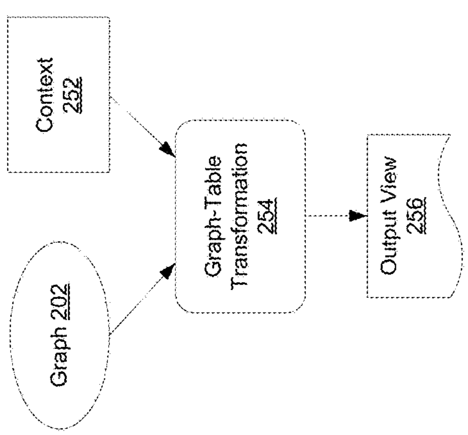
FIG. 2B illustrates a high-level view of a graph transformation.

To display a view of the data in graph 202 in a form that is familiar to the typical user, the graph is transformed into a table view consisting of rows and columns for display in a graphical display of a computer display unit. FIG. 2B illustrates a high-level view of a transformation. In general, a graph 202 and a Context 252 are received as input to a graph-table transformation 254, which generates an output view 256. The output view 256 may comprise a table, chart, or other output that is visually perceivable at a graphical display unit.

Figure 3A:
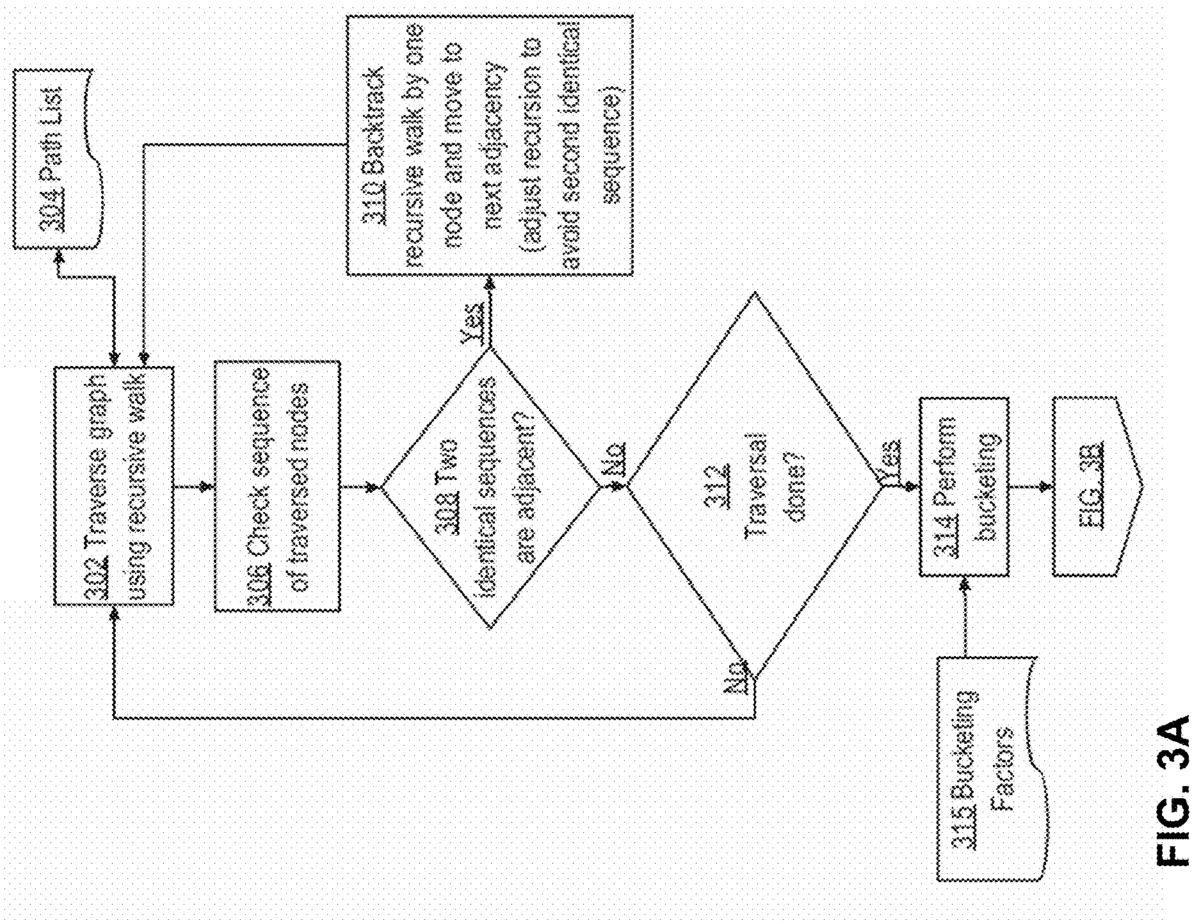
FIG. 3A illustrates a process of generating a table view based on a graph representing a set of financial asset holdings.

FIG. 3A illustrates a process of generating a table view based on a graph representing a set of financial asset holdings. In an embodiment, a view of data in a particular Context is created by computer-implemented processes that walk graph 202, creating and storing a plurality of paths within the graph. In block 302, the graph is traversed and a plurality of paths through the graph are stored in a path list 304. Traversal may use recursive transition techniques and either depth-first or width-first traversal is workable. In an embodiment, the graph is traversed starting at a source node as specified by the Perspective of the Context. For example, assume that the Perspective is Ken; graph traversal begins at the Ken node and the path list 304 would contain:

[Ken]

[Ken, Trust]

[Ken, Trust, Alpha Holdings LLC]

[Ken, Trust, Alpha Holdings LLC, Beta Holdings LLC]

[Ken, Trust, Alpha Holdings LLC, Beta Holdings LLC, Brokerage Account]

and so forth.

Changing the Context causes the view computation unit 206 to re-compute a set of paths from the changed Perspective or Date represented in the changed Context. For example, if a user during a single session changes from Ken to Beth, any and all displayed table views would re-compute and would be re-displayed, illustrating holdings from the Perspective of Beth. The Perspective also could be for Trust, causing the view computation unit 206 to re-display a table view illustrating values from the point of view of the Trust without regard to what percentages are owned by particular human individuals.

Because the same processes described herein are re-performed based on a different root node as indicated by the Perspective, the processes herein offer the benefit of rapid generation of completely different asset value and holdings displays even when the newly selected Perspective is unrelated to a prior Perspective. Further, users have complete flexibility in how to display asset holdings and custom programming is not required to obtain displays that reflect different roll-ups or different user ownership regimes.

Figure 9A:
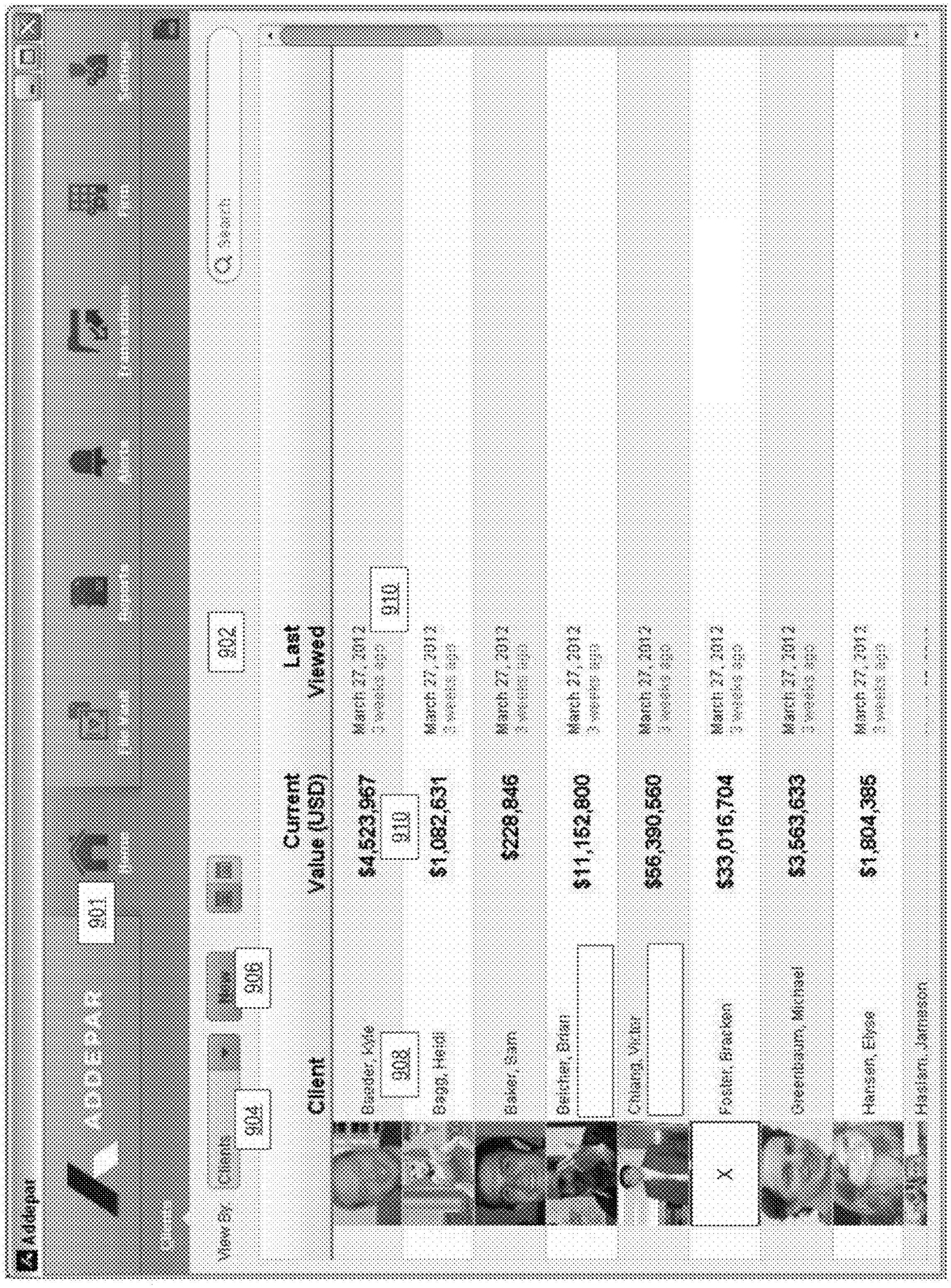
FIG. 9A illustrates a home screen display illustrating a portfolio summary view from the Perspective of Clients.

For example, FIG. 9A illustrates a home screen display 902 illustrating a portfolio summary view from the Perspective of Clients. In an embodiment, display 902 comprises a view type pull-down widget 904 which, when selected, displays a list of available views. Selecting a New widget 906 opens a dialog in which a user may specify configuration values for a new Person or Group, which then can be referenced in views. In the case of a Clients view, screen display 902 comprises a Client column 908 that identifies a person, a Current Value column that identifies aggregate current value of all holdings of that client, and a Last Viewed column that indicates the last time that the current user viewed the data.

Figure 9B:
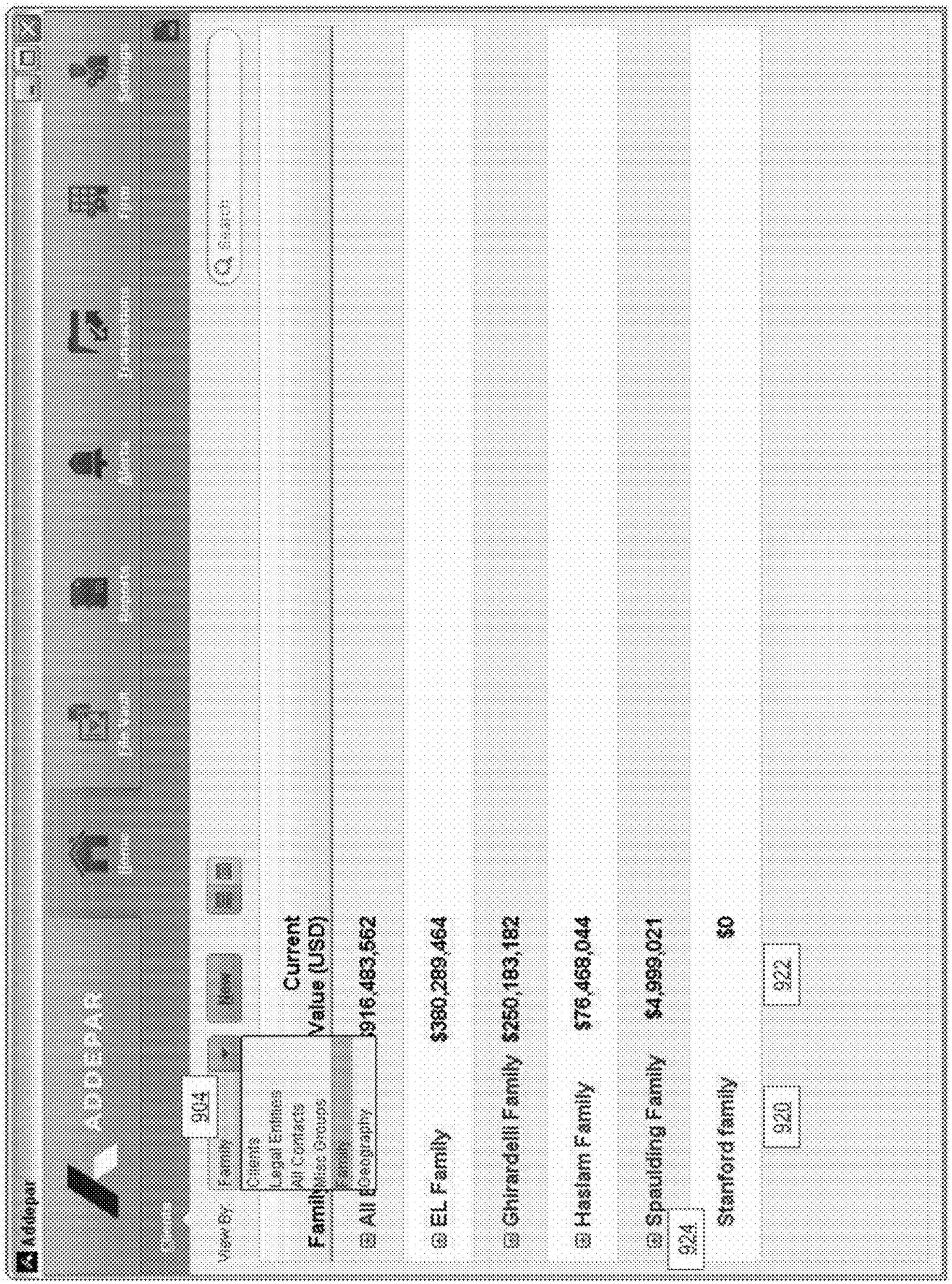
FIG. 9B illustrates another example in which widget and a Family option has been selected.

FIG. 9B illustrates another example in which widget 904 and a Family option has been selected. In response, view computation unit 206 has re-traversed the graph 202 and consolidated values based on family membership; to support such a view, family relationships are represented in graph 202, for example using edges labeled as family relationships to connect nodes of various individuals. In the example of FIG. 9B, the view comprises a Family column 920 and Current Value column 922, which are the only columns defined for the Family view. Selecting an open (+) widget for a particular Family causes the view computation unit 206 to display child nodes of the named family and Current Value totals for the child nodes. Similar views may be generated for legal entities such as trusts. A view of Current Value for a legal entity such as a trust is given from the trust's perspective and will indicate total value of all known assets, even if the current user (for example, a particular financial advisor) only works with one individual who owns a minority stake in the trust.

The example of FIG. 2A includes circular references, and FIG. 3A implements logic to prevent block 302 from causing an infinite loop, while permitting accurate representation of the value of assets by permitting edges to loop back once. In particular, FIG. 3A incorporates logic that permits a cycle to occur only once. In an embodiment, at block 306, a sequence of already traversed nodes is periodically checked and in block 308 the process tests whether two identical sequences are adjacent. For example, if nodes are labeled with alphabetic character labels, then the traversal sequence ABCAB is considered valid, but the sequence ABCABC is invalid. Although the first sequence includes two instances of path Aft the instances are not adjacent; however, in the second sequence, two instances of path ABC are adjacent and therefore invalid. Referring again to FIG. 2A, the sequence [Ken, Trust, Alpha Holdings LLC, Beta Holdings LLC, Ken, Alpha Holdings LLC] is valid, but [Ken, Trust, Alpha Holdings LLC, Beta Holdings LLC, Ken, Trust, Alpha Holdings LLC, Beta Holdings LLC] is invalid.

In block 310, upon detecting an invalid identical adjacent sequence, the process backtracks the recursive walk of the graph by one node and moves to the next adjacency. In effect the process adjusts internal recursion steps to avoid re-traversing a second identical sequence. Traversal continues until all nodes, edges and adjacencies have been traversed, as represented in the test of block 312. Upon completion, path list 304 is fully populated with all valid paths through the graph.

Figure 3B:
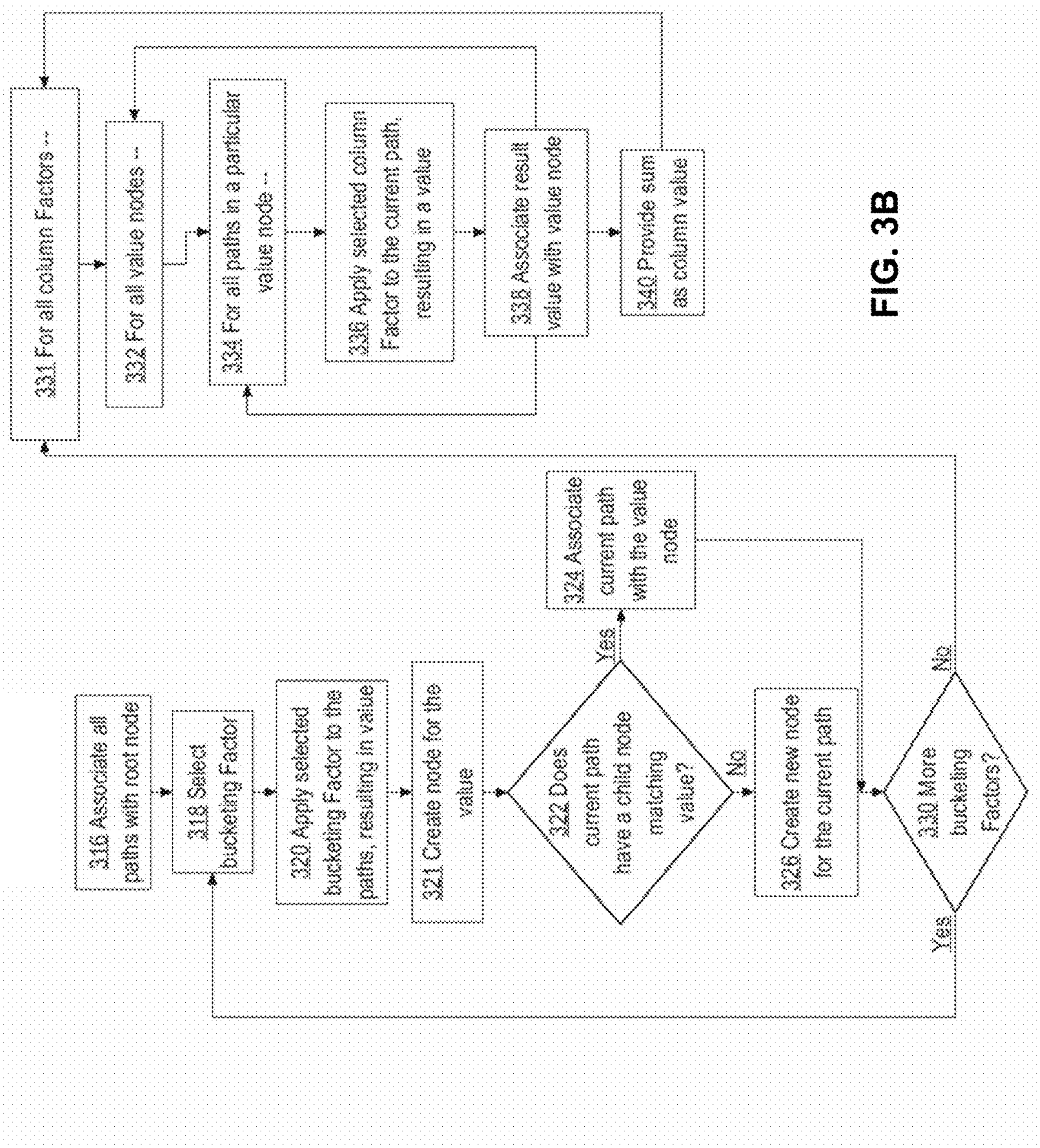
FIG. 3B illustrates other steps in the process of FIG. 3A.

At block 314, a bucketing process is performed to form nodes in the paths into a tree (also referred to herein as a "bucketing tree") or other hierarchy of buckets as specified by the then-current configuration of bucketing Factors 315. Referring now to FIG. 3B, at block 316, a root node (also referred to herein as a "root value node" and/or a "root node" of the bucketing tree) for the tree is created in memory and initially all paths in the path list 304 are associated with the root node. At block 318, a bucketing Factor is selected, and block 318 forms a loop with block 330 that iterates through all configured bucketing Factors. For example the first selected bucketing Factor could be asset class.

At block 320, the selected bucketing Factor is applied to all the paths in the path list 304, resulting in generating a value for the bucketing Factor. The following pseudocode represents applying a factor in an embodiment:

```
for (path: paths) {
val=factor.apply (path)}
factor <T>
T apply (list <Path>, Context)
```

If the first selected bucketing Factor is asset class, then the resulting value val might be Stock, Bond, etc. At block 321, a node in the tree hierarchy is created for the value; for example, a Stock node is created. At block 322, the process tests whether the current node (initially the root node) has a child node that matches the value. Thus, one test would be whether the root node has a Stock node as a child node. If the result is YES, then the current path is associated with the value node that was created at block 321. For example, if the current node has an ALPHA COMPANY Stock node as a child, then the ALPHA COMPANY Stock child node is associated with the Stock value node as shown at block 324. If the result of the test at block 322 is NO, then at block 326 a new node is created for the current path. Another example of the bucketing process is described below in reference to FIGS. 15A-15C.

In various embodiments, various filtering or correction processes may be applied to improve the appearance or analytical value of the result of bucketing. For example, certain bucketing Factors may return values that are too granular to justify creating a new value node, so the return values could be aggregated into a larger bucket. As a particular example, if IRR is a bucketing Factor and returns a value of 1.2, the process could elect to associate that result with a "1.0 to 5.0" IRR bucket, and associated value node, rather than creating a new value node just for IRR results of 1.2.

In an embodiment, configuration data may define the range of values that are included in a particular bucket, so that the nature of buckets may be customized on a per-user or per-session basis. For example, assume that a user wishes to classify stock assets as Large Cap, Mid Cap, Small Cap; different users may wish to define ranges of market capitalization differently for each of the three (3) classifications. In an embodiment, graphical user interface widgets may be selected to identify particular bucketing Factor values and the ranges of result values that each bucketing Factor should yield. Further, in an embodiment, any user may create any other desired new bucketing Factor by configuring a generic bucketing Factor to trigger on the presence of a particular metadata value in a particular asset or node. For example, a user could create a Hedge Fund Strategy (Quant) bucketing Factor that will classify assets into a node, ultimately causing reporting them as a row in a table view, when the value of a Hedge Fund Strategy metadata attribute of an asset is Quant.

Iterating to another bucketing Factor by transferring control from block 330 to block 318 results in re-processing path list 304 for a different bucketing Factor, for example, Country.

When all paths have been processed in the steps preceding block 330 for all configured bucketing Factors, the result is a set of nodes, representing each bucketing Factor, each having associated therewith all paths to nodes that match the value yielded by applying the bucketing Factor to a path. The effect is that each node representing a bucketing Factor has associated with it all matching paths and nodes in the graph 202. For example, if path list 304 comprises 100 paths, then a first bucketing Factor node for Stocks might have 50 paths, a Bonds node might have 40 paths, and a Commodities node might have 10 paths.

The association of paths with a bucketing Factor node, as opposed to individual assets or terminal nodes that represent assets provides a distinct difference as compared to other systems and provides special benefits for various other features of the systems as further described. For example, a particular Perspective, such as Ken or Beth, may have multiple paths to the same ultimate asset. The present system provides ways to consolidate or roll-up multiple different paths into a single value for a particular asset, regardless of the number, complexity or direction of the paths. For other features and reasons, the paths also matter, as subsequent description will make clear.

At block 331, the process of FIG. 3B performs column processing using each value node in the tree that was created and associated with paths in preceding steps. As shown at block 331, all configured column Factors are processed and block 331 represents starting an iteration of subsequent block for all such configured column Factors.

As indicated in block 332, for a particular column Factor, all value nodes are considered iteratively; further, block 334 represents iterating through all paths in a particular value node. For each such path, at block 336, a particular column Factor is applied to the current path, resulting in a value; as noted above, a Factor receives one or more paths and a Context as input, both of which are known and available at block 336. The same pseudocode as provided above may be used.

The resulting value is associated with the current value node at block 338. As shown in block 340, when all paths for a particular value node have been processed, the sum of all values that have been associated with the value node may be returned as a column value (also referred to herein as a "column result value" and/or a metric) for display or inclusion in a table view for a row associated with the value node. Processing continues iteratively until all column Factors have resulted in generating values for all columns of that row or value node.

Each column Factor may define a complex calculation by overriding a method in a class definition for a generic column Factor. For example, a Factor may call an ownership determination method to determine a percentage of ownership represented in a path as a precursor to computing a value of an asset. A Factor may call another Factor to perform such a computation. For example, a value Factor may call a percent-ownership Factor, which in turn could perform a matrix multiplication to determine percent ownership, and the value Factor may multiple the resulting percentage value by a current value of an asset to determine a particular Perspective's value for the asset.

Factors may implement complex logic for concepts such as internal rate of return. For example, a Factor may compute a date on which Beth became a trustee of the Trust, determine values of all transactions that occurred on or after that date, separately call a value Factor to determine a current-day value of each asset involved in each such transaction, etc.

In various embodiments, control steps may be performed in the processes of FIG. 3A, FIG. 3B to improve the quality of display. For example, if a Factor returns a result of "unknown value," the resulting column value may need to be modified or removed for a particular value node, since the user cannot gain any added information from an unknown column. The result would be that a particular section of a table view or tree represented in the table view would have blank column values.

Embodiments facilitate the ability to perform multi-currency displays and calculations so that values in multiple currencies are concurrently displayed in the same table view. For example, the Edit Columns dialog may be used to select a Value factor, and add it as a column to a table view, that is expressed in any of a plurality of currencies or in a Native Currency, which is the currency in which the underlying asset is actually held or tracked by a custodian. Any number of such columns may be added to a particular table view by repeatedly selecting the Edit Columns dialog, adding the Value factor with different currency values, and applying the selection to the view.

Figure 9C:
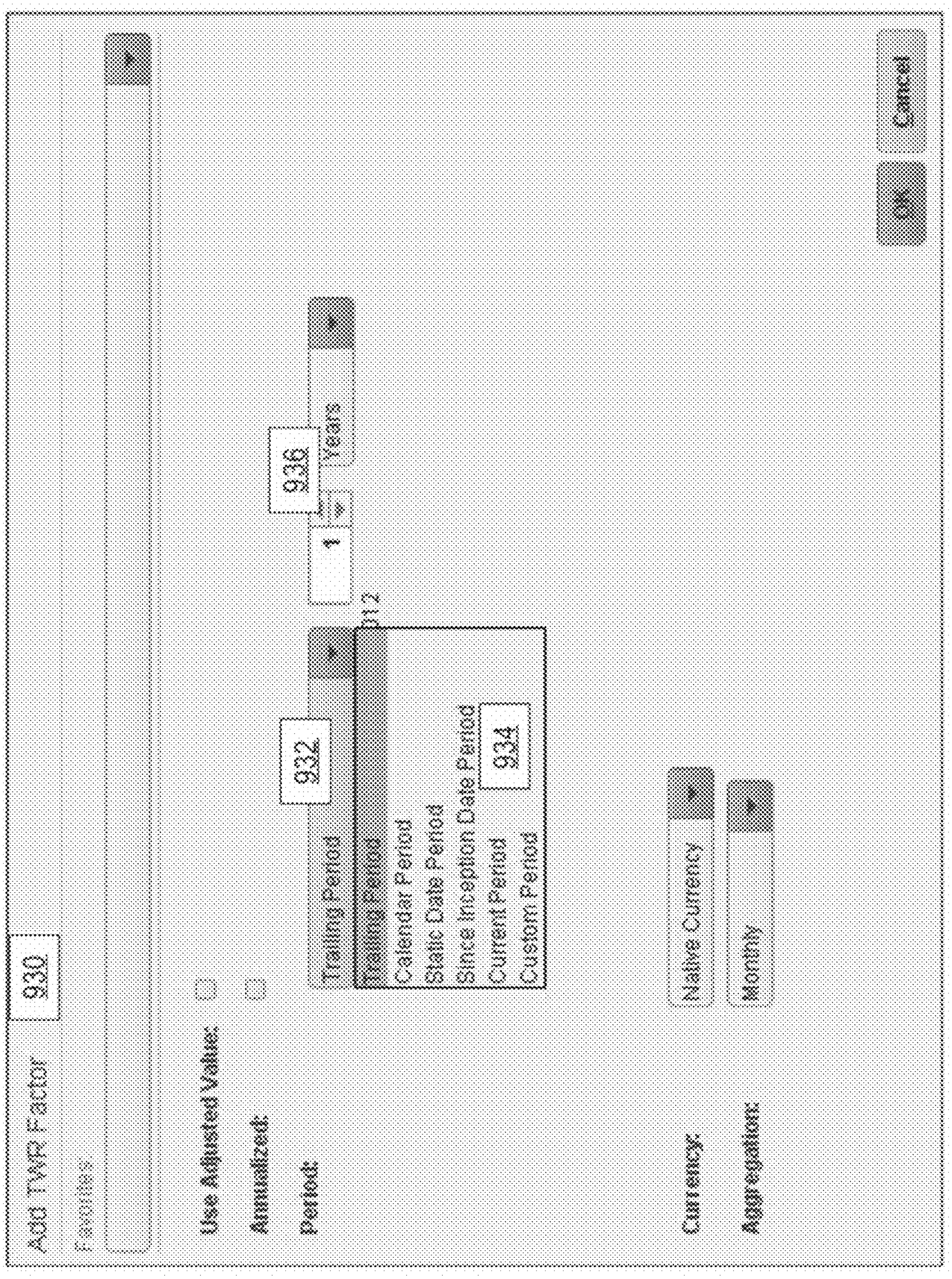
FIG. 9C illustrates an example of an Add TWR Factor dialog resulting from selecting the Edit Column dialog, selecting Performance Metrics from among the Available Columns, and adding TWR Factor as a column.

Embodiments provide the ability to display views of asset values for multiple different time periods in different columns within the same view. FIG. 9C illustrates an example of an Add TWR Factor dialog 930 resulting from selecting the Edit Column dialog, selecting Performance Metrics from among the Available Columns, and adding TWR Factor as a column. (TWR refers to Time Weighted Rate of Return.) In response, the view computation unit 206 causes displaying an Add TWR Factor comprising a Period drop-down menu 932 having a list 934 presenting a plurality of time period options. For example, for a particular view a user may add a column for TWR based on a Trailing Period, Calendar Period, Static Date Period, Since Inception Date, Current Period, or Custom Period. For some options the user is expected to enter time quantity and term values using time widgets 936. When the configuration values of dialog 930 are applied to a view, applying the TWR Factor to a traversal of the graph 202 will result in performing calculations based on available historical asset data for the time periods as specified. A user may add multiple TWR Factor columns to a particular view, each column having a different Period configuration, for example, to permit comparison of asset performance to benchmarks using different metrics of interest.

Changing the Date associated with the Context does not necessarily affect all date periods for the TWR Factor or other factors in the same manner. For example assume that the foregoing TWR Factor columns have been configured, that the current date is March 30, and then the user changes the Date associated with the Context to be March 1. The TWR Factor that is based upon a 1-year trailing date would then compute values based on March 1 and 1 year earlier. A TWR Factor that is based on a Start Date and End Date would use March 1 as the new Start Date but the End Date would be unchanged. A Factor that is based on a static date would be unaffected. Thus, the system offers the capability to independently control each column of a table view based on configuration data. Further, modification of date values in this manner enables a user to preview the impact of the change on output data that may be used later in a report.

Filters may be used to further customize the appearance or content of a table. A filter is a computational unit, such as a programmatic object, that determines whether edges and nodes in one or more paths should be reflected in output data in a table view. Filters are applied to paths using the processes described above, on a per-path basis. Thus, creating and applying a filter causes view computation unit 206 to re-traverse all paths of the current view and to apply the filter during path traversal; this approach contrasts sharply with approaches of others in which filtering is merely applied to an output table or to a dataset that has been retrieved from a database. Further, filters may be applied to entities that are not visualized in a particular table view. For example, a view may be filtered to show the top 10 holdings based on IRR, even though IRR is not present in the table view.

Figure 10:
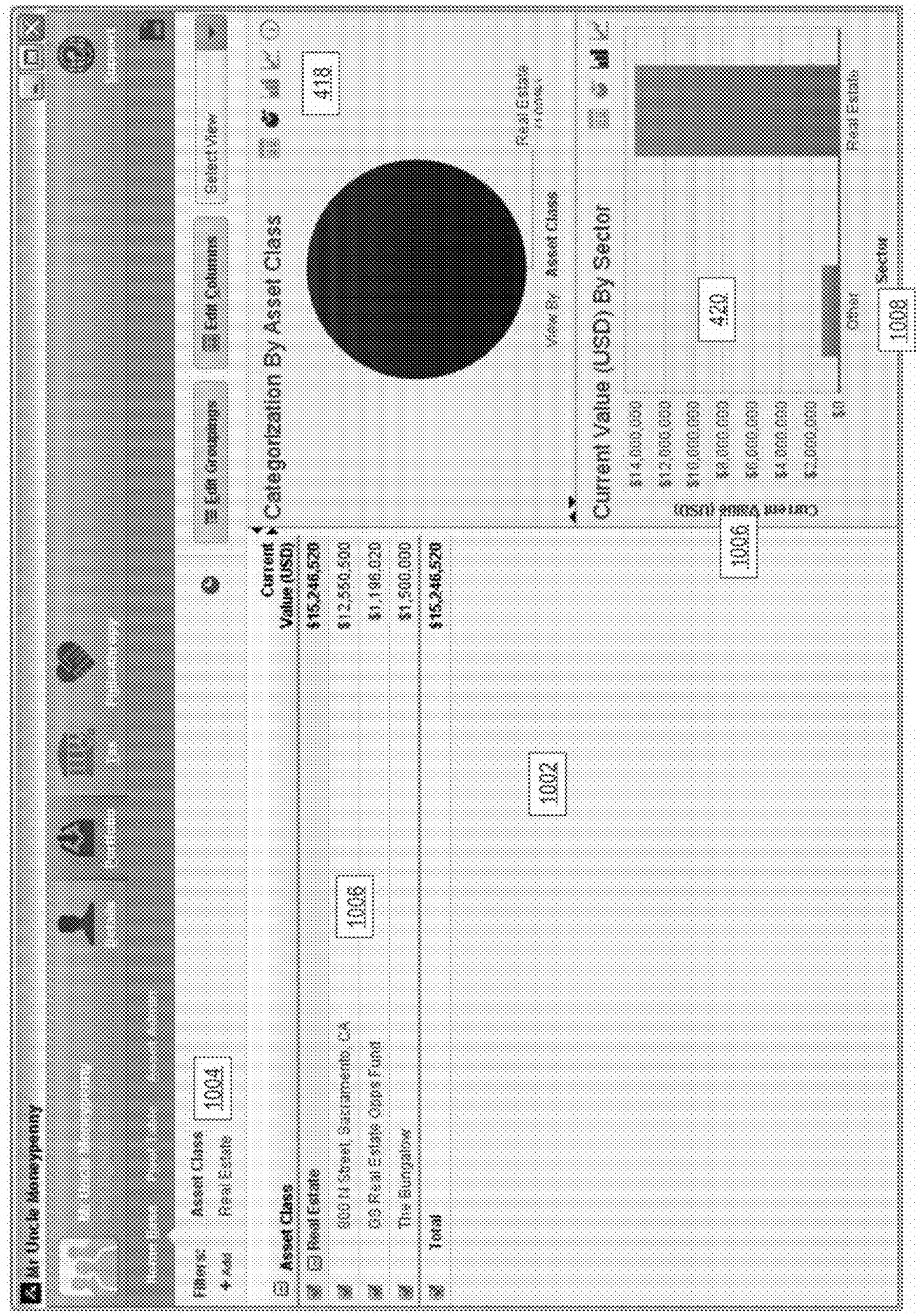
FIG. 10 illustrates the GUI of FIG. 4 after applying a Real Estate filter.

Filters may be created through manual user selection and action by selecting the Filters Add (+) icon and responding to a filter creation dialog, or semi-automatically by selecting elements of info-graphics. In an embodiment, info-graphics such as charts 418, 420 are configured with hyperlinks that cause the view computation unit 206 to create a filter and apply the filter to the table view 408. FIG. 10 illustrates the GUI of FIG. 4 after applying a Real Estate filter. In an embodiment, a user may select any pie wedge in the pie chart 418, or any bar in the bar chart 420, to cause creating a filter. In the example of FIG. 10, the user selected the Real Estate wedge 1001 of the pie chart 418 in the display of FIG. 4; in response, view computation unit created a filter 1004 as seen in the filter region and applied the filter to the table view to result in displaying only real estate assets. Further, the filter is concurrently applied to both the info-graphics with the result that the pie chart displays a single solid circle since 100% of the assets listed in the table view are real estate assets. The filter 1004 may be removed by hovering a cursor over the filter and selecting a remove (X) icon. The same form of filter control may be activated by selecting a bar of the bar chart 420.

Conversely, if the filter region of the table view is used to define one or more filters, then the info-graphics automatically update to reflect the filters that have been newly applied.

In an embodiment, the same basic processes described above for generating table views may be applied to generating the pie chart 418 and bar chart 420. For example, the X axis of the bar chart 420 may be defined using a bucket Factor and the Y axis may be defined using a column Factor. For example, a bar chart may be defined by bucketing IRR on the X axis while particular values are determined using column Factor value generating techniques as described above for table views.

Figure 11:
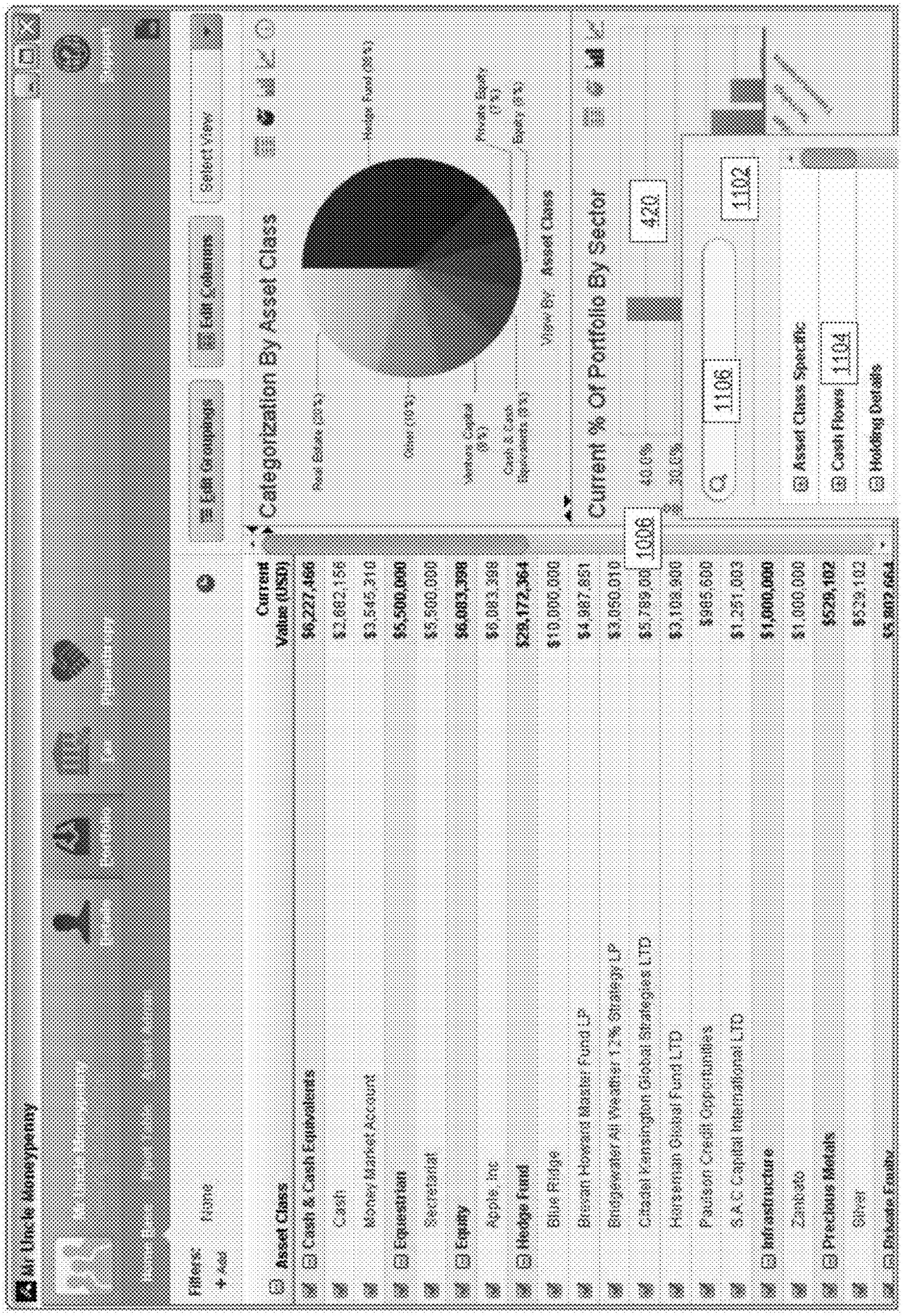
FIG. 11 illustrates the GUI of FIG. 4, FIG. 10 in which vertical axis label has been selected.

In an embodiment, bar graph 420 comprises a vertical axis label 1006 and horizontal axis label 1008 that are configured as selectable hyperlinks. View computation unit 206 is configured to cause displaying, in response to user selection of an axis label 1006, 1008, a pop-up menu listing available Factors that may be selected for use as axes. FIG. 11 illustrates the GUI of FIG. 4, FIG. 10 in which vertical axis label 1006 has been selected. View computation unit 206 is configured to cause displaying pop-up menu 1102 comprising a list 1104 of available Factors that may be selected as the basis of computing a new vertical axis for the bar graph 420. A user may scroll through list 1104 and select any Factor of interest, or type keywords for a Factor name in search box 1106 to receive a list of matching Factors. Selecting a Factor from list 1104 causes view computation unit 206 to cause closing the menu 1102 and recomputed the chart 420 using the newly selected Factor. A different Factor for the X-axis may be applied in a similar manner by selecting horizontal axis label 1008 and selecting a new Factor from a pop-up menu.

In an embodiment, Factors include value by any of a large plurality of currencies. Consequently, a user or analyst may view values by currency according to currency rates and conversions of the present day, with immediate recalculation by re-traversing the graph.

Figure 12:
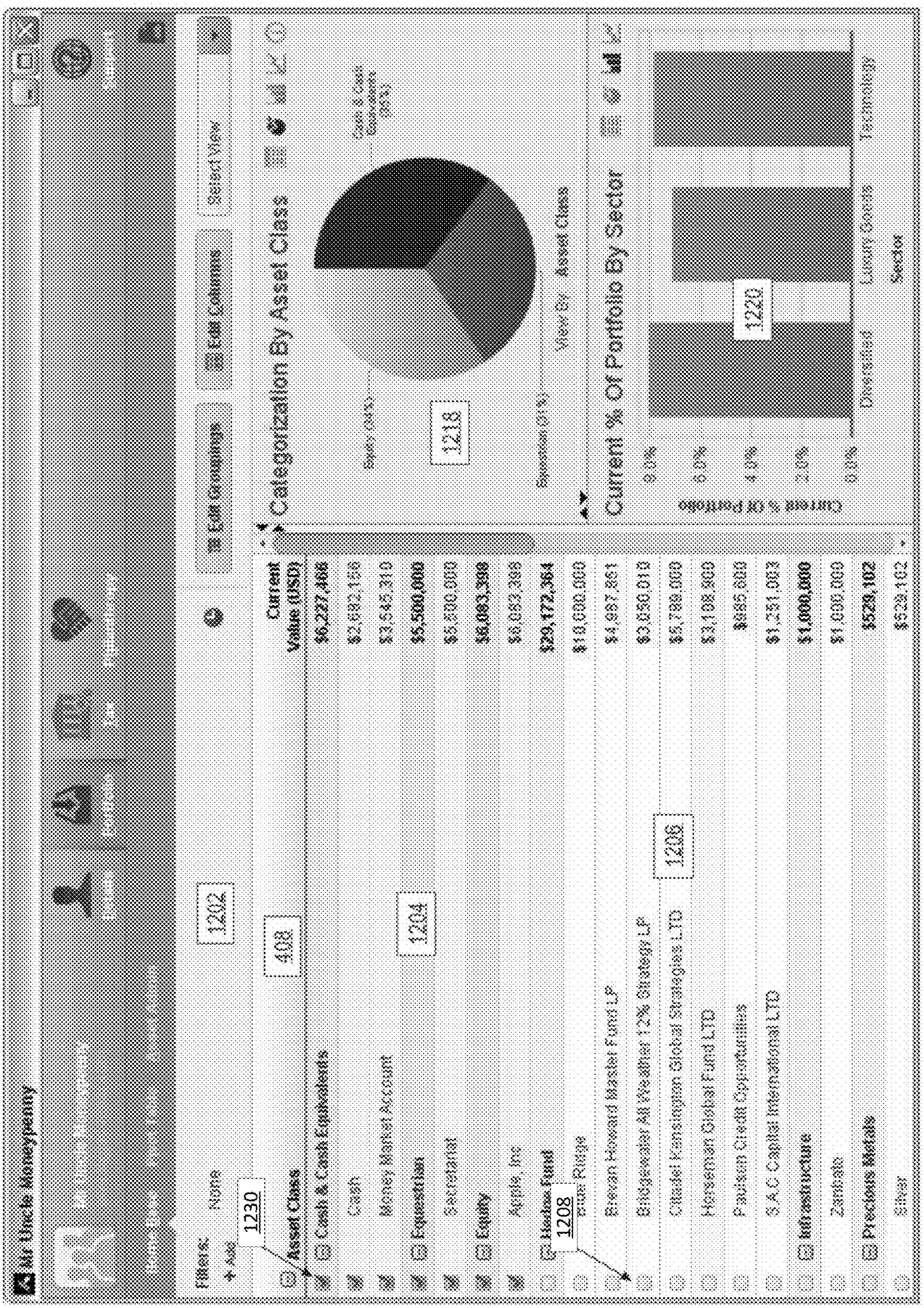
FIG. 12 illustrates an example in which some of the data in the table view is selected.

In an embodiment, view computation unit 206 is configured to re-compute and cause re-displaying info-graphics such as pie chart 418 and bar chart 420 based on changes in selections to data in table view 408. FIG. 12 illustrates an example in which some of the data in the table view is selected. In screen display 1202 of FIG. 12, table view 408 comprises a first set of rows 1204 and a second set of rows 1206 indicating assets organized by asset class. The first set of rows 1204 has been selected as indicated by checks in selection checkboxes 1230 while the second set 1206 is not selected as indicated by non-checked selection checkboxes 1208. In an embodiment, a range of rows may be selected by individually checking checkboxes 1230, 1208 or by selecting one row and then using keyboard control combinations such as SHIFT-click or CTRL-click to select a range of rows or multiple discrete rows. View computation unit 206 is configured to re-compute and cause re-displaying pie chart 1218 and bar chart 1220 to reflect only the selected rows and omit data associated with non-selected rows. For example in FIG. 12 it will be seen that pie chart 1218 comprises only three (3) wedges for Cash & Cash Equivalents, Equity, and Equestrian assets because the first set 1204 of rows comprises only assets in those asset classes. The sum of assets represented in the pie chart 1218 is the sum of only the first set 1204 of selected rows. Similarly, bar chart 1220 has been re-computed and redisplayed to reflect only the Sectors represented in the first set 1204 of selected rows.

In an embodiment, view computation unit 206 is configured to save a view of the type shown in FIG. 4, FIG. 5, FIG. 10, FIG. 11, FIG. 12 in response to user input requesting to save a view. In one embodiment, referring again to FIG. 4, a user may select the Select View menu 422 to cause displaying a list of named, previously saved views; one menu option is Save As. In response to receiving a selection of Save As in menu 422, view computation unit 206 is configured to cause displaying a dialog that prompts the user to enter a name for the current view. In response to receiving user input specifying a name, the view is saved in data repository 204 in the form of a named set of metadata defining the view. Example metadata that define a view include the Context, the Filters applicable to the view, the grouping and column Factors defining table view 408, and the Factors defining axes of the chart 420.

After a view is saved, a user may retrieve and use the view with any other Context. For example, the same user could change the Context to a different client or legal entity, and the view computation unit 206 is configured to apply, in response, the metadata defining the view to portions of the graph that relate to the newly selected client or legal entity. As a result, table view 408 and related info-graphics are re-computed and redisplayed to reflect holdings of the newly selected client or legal entity.

In an embodiment, when a user logs out and logs back in again in a later user session, the last saved view from the prior user session is used as the first view that is displayed in the new user session.

4.0 Exporting Views and Generating Reports and Publications

In an embodiment, view computation unit 206 is configured to export data shown in views to other applications or to other document formats such as MICROSOFT EXCEL or ADOBE PDF. In an embodiment, view computation unit 206 is configured to perform export operations based on the current view. For example, in one embodiment, exporting is initiated by a user selecting the Export widget 424. In response, view computation unit 206 causes highlighting all of the table view 408 and current info-graphics such as pie chart 418 and bar chart 420, and causes displaying, in each of the table view and info-graphics, a selectable icon representing an available export format for that area of the display. For example, view computation unit 206 may cause displaying an EXCEL icon and a PDF icon over the table view 408, but may display only a PDF icon over pie chart 418 and bar chart 420 since info-graphics of those forms cannot be exported in the form of an EXCEL table.

In an embodiment, view computation unit 206 is configured, in response to selection of one of the ADOBE PDF icons, to facilitate exporting data shown in views to a report center system that is configured to facilitate generating reports in the form of electronic documents. Embodiments facilitate creating reports in which the organization of pages is controlled and source data from a table view is gracefully fitted into the report pages rather than appearing as a direct cut-and-paste without appropriate fitting or formatting. In one embodiment, selecting the Export widget 424 and an ADOBE PDF icon causes displaying a report selection dialog. In an embodiment, the report selection dialog comprises a list of previously created and saved reports. View computation unit 206 is configured, in response to selection of a particular report in the list of previously created and saved reports, to display a page list identifying all pages that have been previously defined in the selected report.

Selecting a particular page in the page list may cause view computation unit 206 to trigger execution of report unit 209 (FIG. 2A). In response, report unit 209 causes displaying a report creation user interface (also referred to herein as a "report editor user interface"). Examples of report generation and/or editing user interfaces are described in U.S. patent application Ser. No. 14/644,038, filed Mar. 10, 2015, and titled "SYSTEMS AND USER INTERFACES FOR DYNAMIC AND INTERACTIVE REPORT GENERATION AND EDITING BASED ON AUTOMATIC TRAVERSAL OF COMPLEX DATA STRUCTURES," the entire disclosure of which is hereby made part of this specification as if set forth fully herein and incorporated by reference for all purposes, for all that it contains.

In various embodiments, the report editor user interface may include a Context link that may be used to specify a context for the report in terms of a named individual or legal entity (for example, the Context link may be similar to portion 1610 of FIG. 16 described below, in that the Context link may enable the user to select a particular perspective).

As noted above, a Context may include a Perspective (an individual, legal entity, and/or group) and/or a date or date range. The report editor user interface may further include a link by which the user may specify a particular date and/or date range. The report unit 209 is configured to receive user input selecting the Context link and to display a list of other individuals or legal entities that are associated with the current logged in user and/or Perspectives that may be selected for the Context. In response to receiving a selection of a different individual or legal entity, the report view is re-computed and re-rendered from the perspective of the next Context. Re-computation involves re-traversing the graph 202 in the manner described above for generating table view 408 of FIG. 4. As described further below, a report view may comprise a plurality of independent widgets for text, tables, and graphics, and in an embodiment changing the Context causes each widget to perform an independent traversal of graph 202 to re-compute values for display in that widget. Thus, working on a report involves creating and storing metadata that defines the components of the report and certain formatting attributes of the report, but not particular values in the report; instead, the current Context drives a traversal of the graph 202 to generate values for substitution into a view of the report based on the metadata. Moreover, the techniques herein have the benefit of separating the construction and format of a particular widget from the underlying data, so that programmatic changes in a widget will result in displaying the widget in updated form while rendering in correct and timely underlying data based on traversing the graph 202.

Accordingly, as described above, the interactive user interfaces of the system enable non-technical users to quickly and dynamically generate and edit complex reports including tables and charts of data. The complex reports may be automatically and efficiently generated through access and traversal of complex data structures, and calculation of output data based on property values of multiple nodes within the complex data structures, all in substantially real-time. By storing the data as a complex mathematical graph, outputs (for example, a table) need not be stored separately and thereby take additional memory. Rather, the system may render outputs (for example, tables) in real time and in response to user interactions, such that the system may reduce memory and/or storage requirements. Thus, in some embodiments, the systems and user interfaces described herein may be more efficient as compared to previous systems and user interfaces.

5.0 Example Graph Traversal and Table Generation

Figure 14:
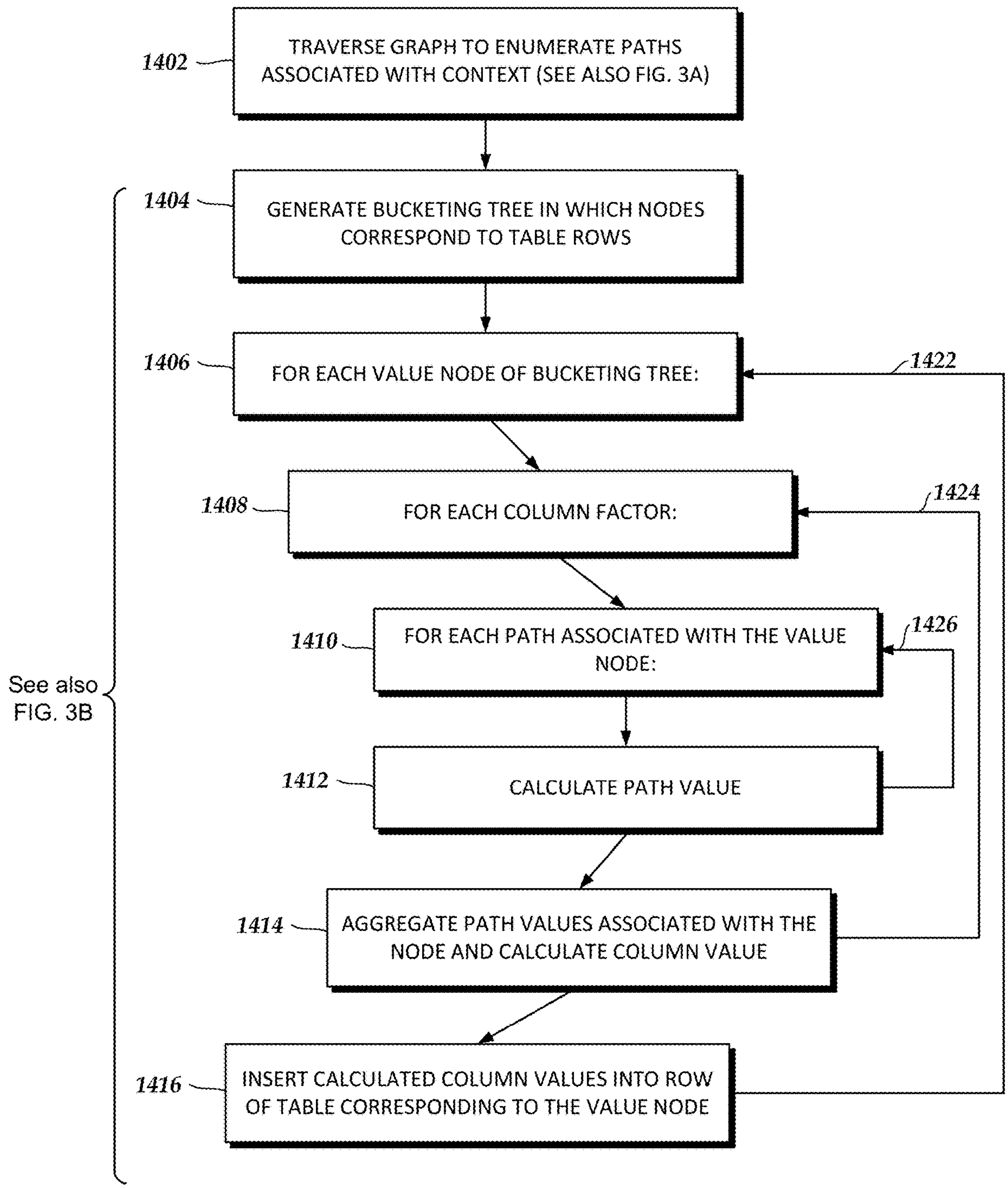
FIG. 14 is a flowchart showing an example method of the system in which a table is generated.

FIG. 14 is a flowchart showing an example method of the system in which a table is generated via graph traversal and column factor calculations. In various embodiments, fewer blocks or additional blocks may be included in the process of FIG. 14, or various blocks may be performed in an order different from that shown in the figure. Further, one or more blocks in the figure may be performed by various components of the system as described above and below, for example, one or more of view computation unit 106 and/or report unit 109.

Figure 15A:
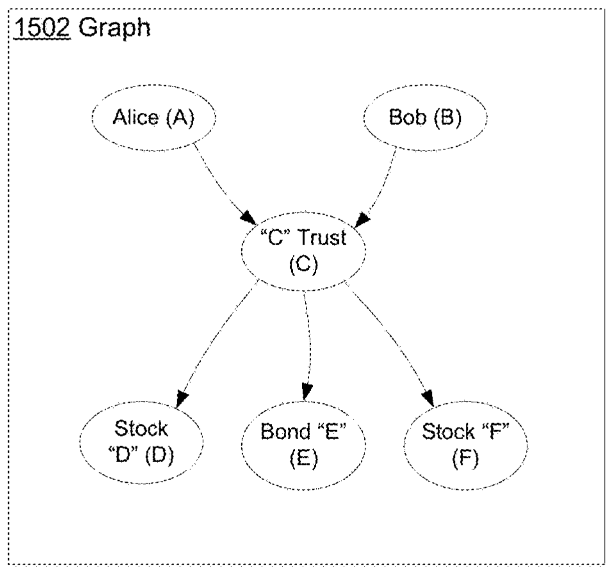
FIGS. 15A-15C illustrate an example traversal of a simplified graph.
Figure 15B:
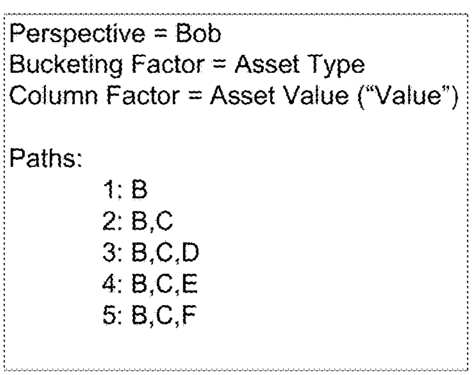
Figure 15C:
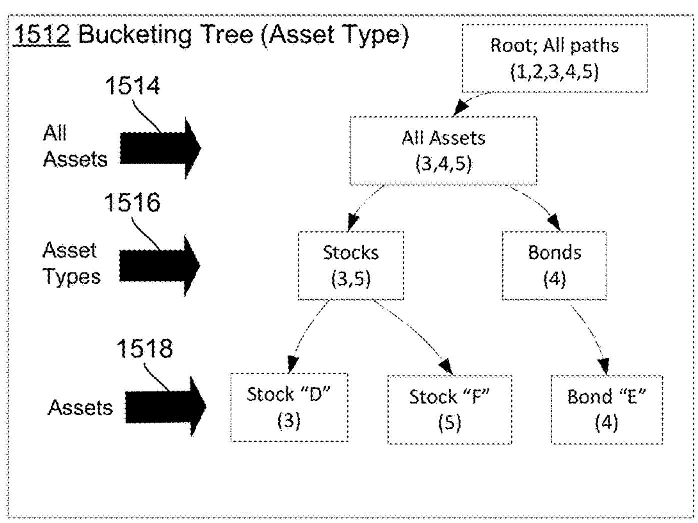

Beginning at block 1402, the graph, for example graph 202, is traversed and all the paths associated with the selected context are enumerated. This block is described in further detail above in reference to FIG. 3A. Graph traversal and enumeration of paths may be dependent on a particular context. For example, a given perspective (for example, an individual, legal entity, and/or the like) may indicate the locations from which the graph is traversed. An example is described above, and another example is illustrated in FIGS. 15A-15C. In particular, FIGS. 15A-15C illustrate an example traversal of a simplified graph 1502, according to an embodiment of the present disclosure. Referring to FIG. 15A, the graph 1502 includes six nodes: Alice (representing an individual, and which may be referred to as node A), Bob (representing an individual, and which may be referred to as node B), "C" Trust (representing an trust instrument, and which may be referred to as node C), Stock "D" (representing a stock instrument, and which may be referred to as node D), Bond "E" (representing a bond instrument, and which may be referred to as node E), and Stock "F" (representing a stock instrument, and which may be referred to as node F). The relationships among the various nodes of the graph are indicated by the edges. Further, as described above, various attributes and/or properties may be associated with each of the nodes and/or edges of the graph. For example, as described above and below, each of the edges of the graph may indicate a relationship between the two nodes connected by the edge. In one example, an edge may indicate a value and/or percentage of an asset (for example, a stock, bond, and/or the like) owned by an individual.

For simplicity of explanation, graph 1502 illustrates a simple graph with a small number of nodes and no complex relationships among the nodes. However, in various embodiments, and depending on actual data stored in the system, the graph may include hundreds, thousands, millions, or more nodes and/or edges. Further, the graph may include complex relationships including loops, and/or the like. Accordingly, identifying paths through a typical graph having thousands or more nodes and edges would not be practical to perform manually, at least for the reasons that it would take an impractical amount of time to perform (e.g., days, weeks, or longer to traverse a large graph) and the process would be error-prone (e.g., manual traversal of thousands or more nodes would have a nonzero error rate). Accordingly such processes are necessarily performed by computing processors and systems, using the various methods discussed herein.

According to an embodiment, FIG. 15B illustrates an aspect of traversal of the graph 1502. As described above (and as further described in reference to FIG. 2B), a graph and a context are provided in the process of graph-to-table transformation. In the embodiment of FIG. 15B, the context includes the perspective "Bob." Accordingly, in the example the graph is traversed from the perspective of Bob so as to generate a table of information derived from the graph. As further shown in FIG. 15B, an "Asset Type" bucketing factor has been selected by a user (or automatically by the view computation unit 106 and/or report unit 109, for example). Accordingly, the generated table will include rows corresponding to assets associated with Bob, and organized according to asset types (as described above). Additionally, an "asset value" column factor (also referred to herein as an "asset" column factor) has been selected. Accordingly, the generated table will include at least one column showing values corresponding to the various rows of the table.

As described above in reference to FIG. 3A, the graph 1502 is traversed so as to enumerate all the paths associated with node B (as node B represents Bob). FIG. 15B illustrates all five paths associated with node B as determined by the system. In various embodiments, each path may include nodes and/or edges of the graph that comprise the path in the graph, as well as any attributes associated with the nodes and/or edges of the path.

Returning now to FIG. 14, each of blocks 1404-1416 describe additional aspects of the graph-to-table transformation, which is also described above in reference to FIG. 3B. Specifically, at block 1404 (roughly corresponding to blocks 316-330 of FIG. 3B), the various enumerated paths are processed based on a selected bucketing factor to create a tree (also referred to herein as a "bucketing tree") of various values associated with the bucketing factor, and paths associated with those values. In an embodiment, the values represented in the bucketing tree may be represented by nodes (also referred to herein as "value nodes"). In the example of graph 1502 (of FIG. 15A), this step is illustrated in FIG. 15C in which the bucketing factor is asset type. As shown, a bucketing tree 1512 associated with graph 1502 includes a root node 1514 (also referred to herein as a "root value node") corresponding to all paths associated with an asset (3, 4, and 5), child nodes 1516 (also referred to herein as child "value nodes") corresponding to types of assets (for example, stocks and bonds), and further child nodes 1518 corresponding to actual individual assets (for example, Stock "D", Stock "F", and Bond "E"). Further, paths associated with each of the nodes are shown. These include, for example, path 4 for Bond "E", path 3 for Stock "D", path 5 for Stock "F", paths 3 and 5 for "Stocks", path 4 for "Bonds", and paths 3, 4, and 5 for "All Assets".

In reference again to FIG. 14, in blocks 1406-1416 each node of the bucketing tree is processed so as to calculate column values to be displayed in the table. Some aspects of this process, according to an embodiment, are described above in reference to blocks 331-340 of FIG. 3B.

At block 1406, each node (as indicated by loop arrow 1422) of the bucketing tree, including its associated path, is processed. Processing of each node includes, at block 1408, evaluation of the node with respect to each column factor (as indicated by loop arrow 1424) (for example, each metric selected by the user including, for example, asset value, rate of return, IRR, and/or the like). For each of the column factors, at block 1410, each path associated with the node is processed (as indicated by loop arrow 1426) so as to determine, at block 1412, a path value. For example, if the column factor is "asset value," each path associated with the node is processed so as to calculate the asset value associated with the path. Then, at block 1414, the path values calculated with respect to each of the path associated with the node are aggregated so as to determine a column value. This calculated column value indicates a value of the given column factor with respect to the node being processed.

For example, in the instance of a bucketing tree node representing an asset class such as "Stocks," multiple paths may be associated with the node, each of the paths associated with different stocks. In calculating a bucketing factor "Asset Value" associated with the node, each of the paths may be traversed and values of each of the particular stocks are calculated. Then, all of the calculated values may be aggregated by summation so as to calculate a total value of all stocks.

In various embodiments, calculation of path values may be accomplished by referencing data (for example, attributes and/or metadata) associated with one or more nodes and/or edges associated with the path. Examples are given above and below. In some embodiments, attributes and/or metadata associated with nodes and/or edges of a path may be stored as transaction effects object. Examples of such transaction effects objects, including creation of the transaction effects objects and calculations based on the transaction effects objects are described in detail in U.S. patent application Ser. No. 13/714,319, filed Dec. 13, 2012, and titled "Transaction Effects," the entire disclosure of which is hereby made part of this specification as if set forth fully herein and incorporated by reference for all purposes, for all that it contains.

At block 1416, the each of the calculated column values is inserted into the table in respective columns associated with the column factors, and a row associated with the processed node of the bucketing tree.

This process is further illustrated with reference to bucketing tree 1512 and FIG. 15C. In FIG. 15C, the "value" column factor has been selected, and the "Stock" node is associated with paths 3 and 5. Accordingly, each of paths 3 and 5 may be individually processed by the system so as to determine a value of stocks associated with Bob. For example, edges in path 3 may indicate that Bob owns 50% of Trust "C", and further, Trust "C" has $1000 of Stock "D". Thus the system may determine that Bob owns $500 of Stock "D". Similarly, the system will determine an ownership of Stock "F" with respect to Bob. Next, the system aggregates the determined values and the aggregated data is displayed in a row and column of the table corresponding to Stocks and value.

Figure 16:
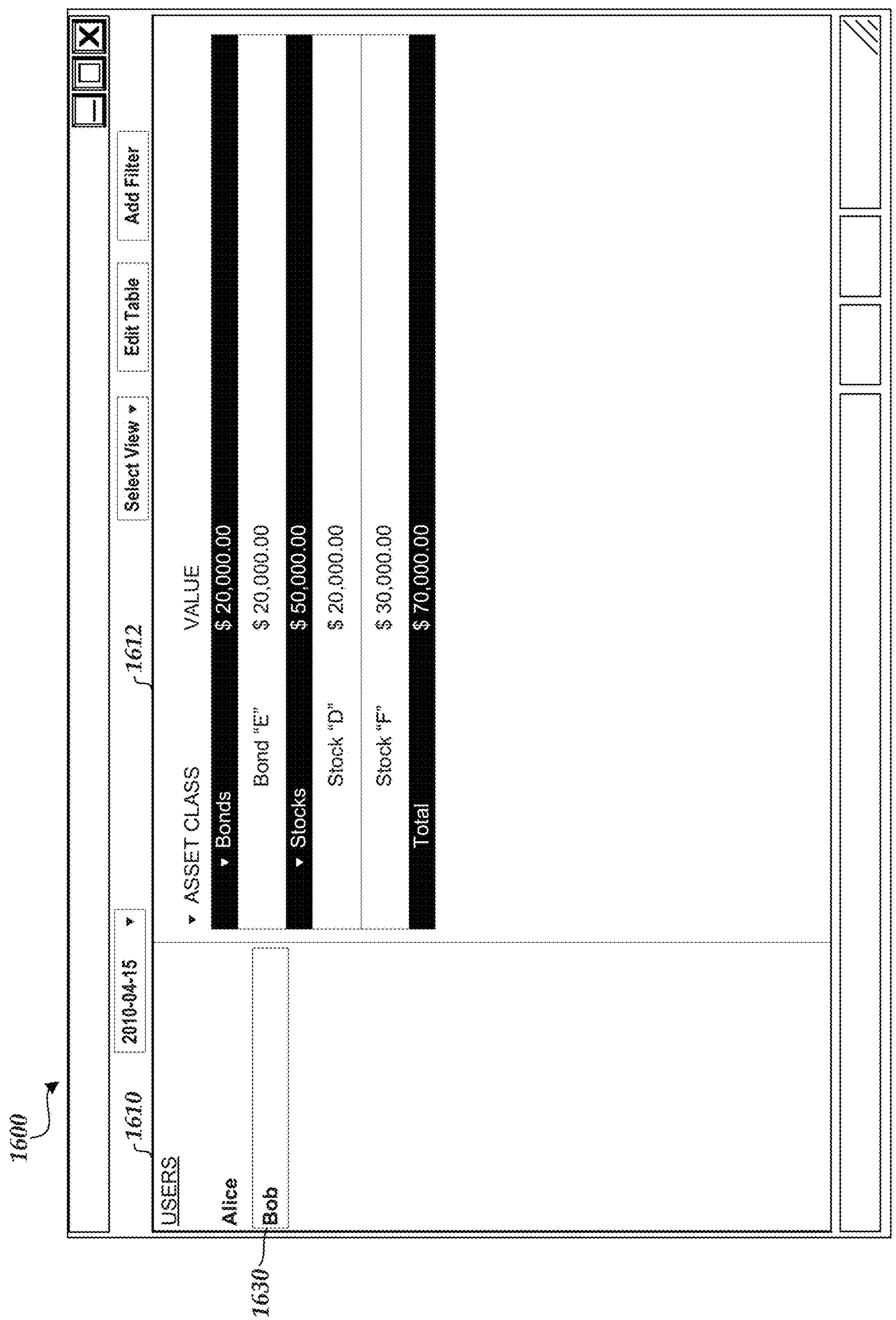
FIG. 16 illustrates an example user interface including a table generated as a result of the graph traversal of FIGS. 15A-15C.

An example of a table generated by the graph traversal of FIGS. 15A-15C is shown in FIG. 16. FIG. 16 shows an example user interface 1600 including two portions 1610 and 1612. The portion 1610 shows that currently selected perspective 1630 (in this example, Bob), while the portion 1612 shows the table generated based on the traversal described above in reference to FIGS. 15A-15C. As shown, the table includes six rows corresponding to each of the nodes of the bucketing tree 1512 (for example, Bonds, Stocks, Bond "E", Stock "D", Stock "F", and Total). The numbers in the column "Value" are displayed with respect to each of the rows, and are determined based on processing of the associated paths, as described above.

Accordingly, in various embodiments the system may automatically generate a table of data associated with a context via rapid traversal of complex graphs of related data items.

As described above, selection of a different context, application of filters, selection of different bucketing factors (for example, changing the type and/or hierarchical arrangement of rows of the table), selection of different column factors (for example, changing the calculated information displayed with respect to each row) causes the system to automatically re-traverse the graph and regenerate the table. For example, the user may change the context to Alice, may choose to organize the rows of the table according to geographical location of assets, and/or may choose to include a column showing Internal Rate of Return (IIR) (and/or any other metric). In response, the system automatically re-traverses the graph 1502 from the perspective of node A to determine associated paths, applies the geographical location bucketing factor to generate a bucketing tree associated with the determined paths, and calculate for each of the nodes (and associated paths) of the bucketing tree an IIR and/or a value. The system may then generate a table including the calculated data.

Figure 17A:
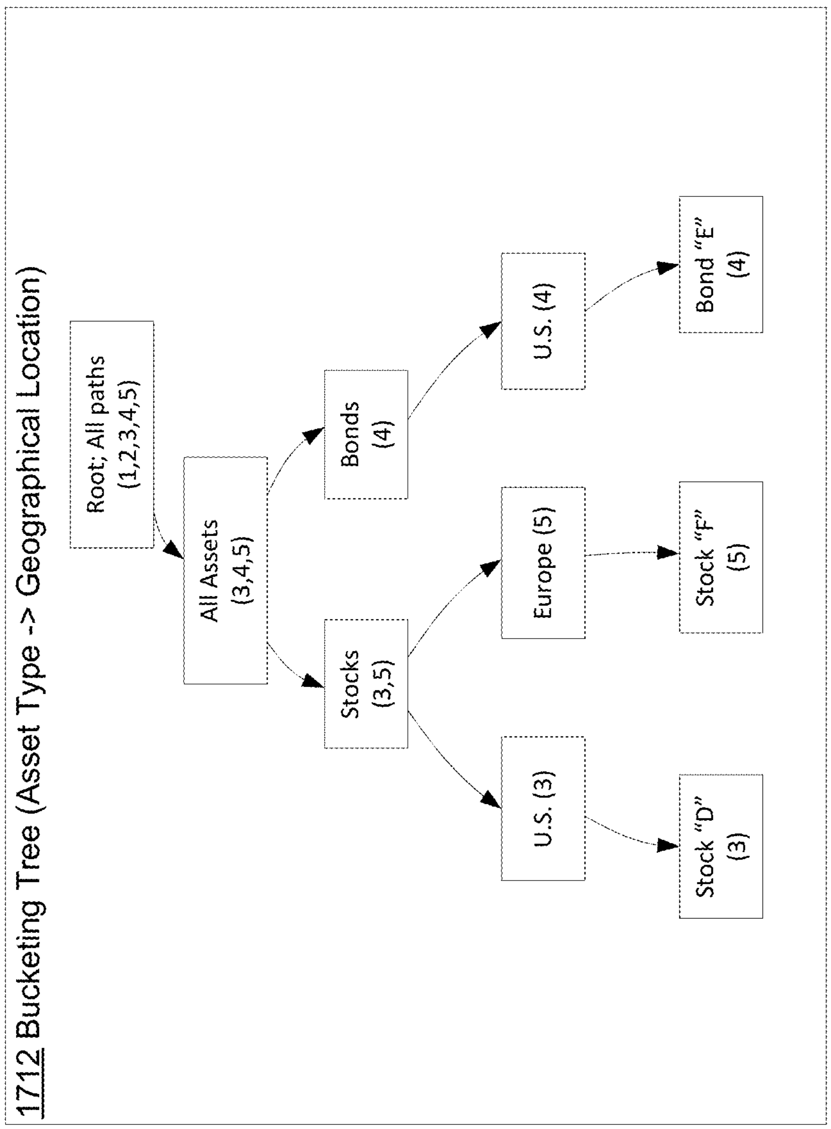
FIG. 17A-17B illustrate an example bucketing tree and user interface of the system.
Figure 17B:
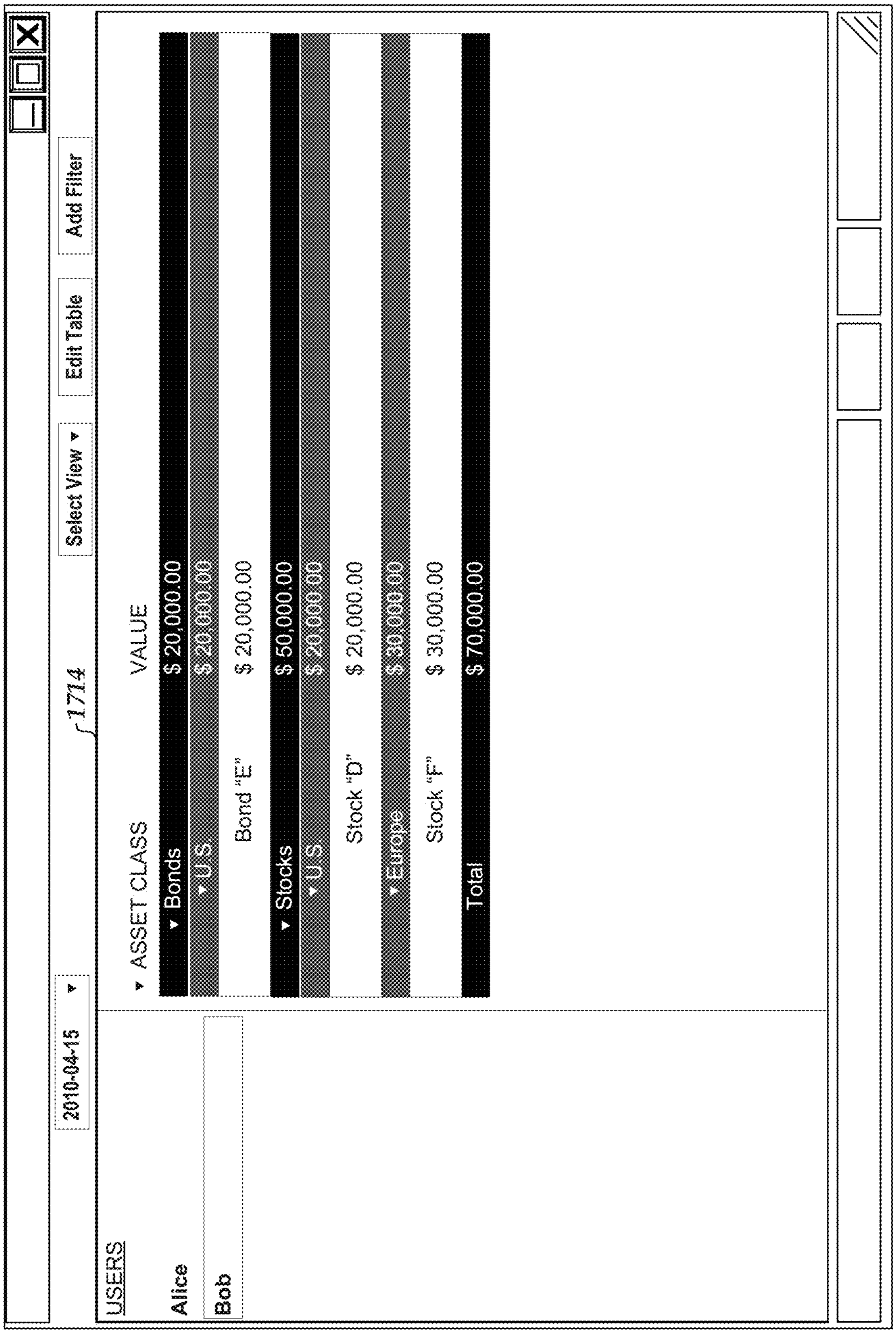

In various embodiments, the user may select multiple bucketing factors and may specify a hierarchical relationship among them, as described above in reference to FIG. 6, for example. FIG. 17A illustrates and example bucketing tree 1712 in which a user has specified two bucketing factors, Asset Type and Geographical Location. Further, the user has indicated that Geographical Location is to be a sub-categorization of Asset Type. As shown, the bucketing tree accordingly includes nodes corresponding to the Geographical Location associated with each of the asset types. Further, FIG. 17B illustrates an example user interface similar to the user interface of FIG. 16. The example user interface of FIG. 17B includes table 1714 showing results of the new categorization illustrated in FIG. 17A.

In some embodiments, calculation of values associated with each path, and aggregation of multiple path values, varies depending on a column factor. For example, when calculating a simple current value of a given asset or asset type, calculation of path values may comprise multiplication of a current value of the asset with a number of shares held. Further, aggregation of multiple path values in this example may comprise a summation of all path values to determine a total value of the asset or asset type. However, in another example, the calculation and aggregation may differ. Examples of other column factors that may each have different path calculation and aggregation include % of portfolio, active return, alpha, beta, average daily balance, internal rate of return, and/or the like.

6.0 Authentication and Permissioning

As described above, in some embodiments the system may include user authentication and permissioning. For example, a user of the system may be required to provide authentication information (for example, a username and password, a fingerprint scan, and/or the like) when accessing the system. Such authentication information may be required by the system before the user may view one or more of the user interfaces described herein, and/or may generate tables based on particular data stored by the system. In some embodiments, the user's identity may be used to determine particular data of the system which is accessible to the user. For example, the system may include data associated with many clients, only some of which are associated with the user. Accordingly, only data related to the clients associated with the user may be available via the various user interfaces. Thus, the user's identity may, in some embodiments, be authenticated before any data is shown to the user. Permissions data may be associated with the various data stored by the system such that the system may make available to a particular user only data that is permissioned such that it should be made available to that particular user.

For example, in reference to FIG. 15A, in some instances a first user may have permission to view Stock "D" (or particular attributes or other metadata associated with node D), while a second user may not have permission to view Stock "D". Accordingly, while Stock "D" may exist in graph 1502 no matter whether the first user or the second user is logged in to the system, when traversing the graph and/or generating tables, Stock "D" may be effectively invisible to the second user. Thus, in this example, a table generated for the second user would not include any data associated with Stock "D".

Additional examples of permissioning and permissions implementations that may be used in conjunction with the present disclosure are described in U.S. patent application Ser. No. 14/644,118, filed Mar. 10, 2015, and titled "SYSTEM AND ARCHITECTURE FOR ELECTRONIC PERMISSIONS AND SECURITY POLICIES FOR RESOURCES IN A DATA SYSTEM," the entire disclosure of which is hereby made part of this specification as if set forth fully herein and incorporated by reference for all purposes, for all that it contains.

In some embodiments, the system stores separate graphs associated with various clients of a firm (e.g., a wealth management, financial advisor, or investment firm). For example, a firm may have multiple clients, each of whom may manage one or more portfolios. In order to segregate data associated with each of the clients to as to prevent disclosure of confidential information, the system may maintain a separate graph for each of the clients. Such a segregation of graphs may advantageously enable protection of each client's data. In some examples, however, multiple clients' graphs may include common data entities/nodes. For example, a first client's graph may include Stock A, while a second client's graph may similarly include Stock A. In an embodiment, Stock A in each of the first and second client's graphs may indirectly reference a common Stock A node. Alternatively, the Stock A node in each of the first and second client's graphs may reference a common source of metadata and/or attributes associated with the Stock (for example, publicly available data such as a stock price). Such indirect referencing of a common node, and/or referencing a common source of attributes may advantageously reduce memory requirements of the system while maintaining privacy of each client's graphs.

In some embodiments, the system may include a single graph for multiple clients and/or for all clients of a firm. In these embodiments, the system may advantageously prevent disclosure of confidential information (for example, the graph may include data pertaining to a single client, or a subset of the clients on the system) via permissioning (as described above). Further, in these embodiments the system may advantageously further reduce memory requirements as redundant data may further be eliminated (for example, a single instance of all assets (for example, Stock A, etc.) may be maintained by the system).

Additionally, the specialized graph data structure utilized by the system enables data security (for example, protection and partitioning of client data) while simultaneously taking advantage of redundant data to reduce memory needs and computation needs. For example, as described above, in some embodiments particular data nodes may be shared among multiple clients in a common graph, and computations (for example, graph traversal) for all of the multiple clients may be run on the common graph, while at the same time permissioning of the common nodes of the graph for particular clients provides data security.

7.0 Generating Table Views with Time Varying Attributes

Figure 18A:
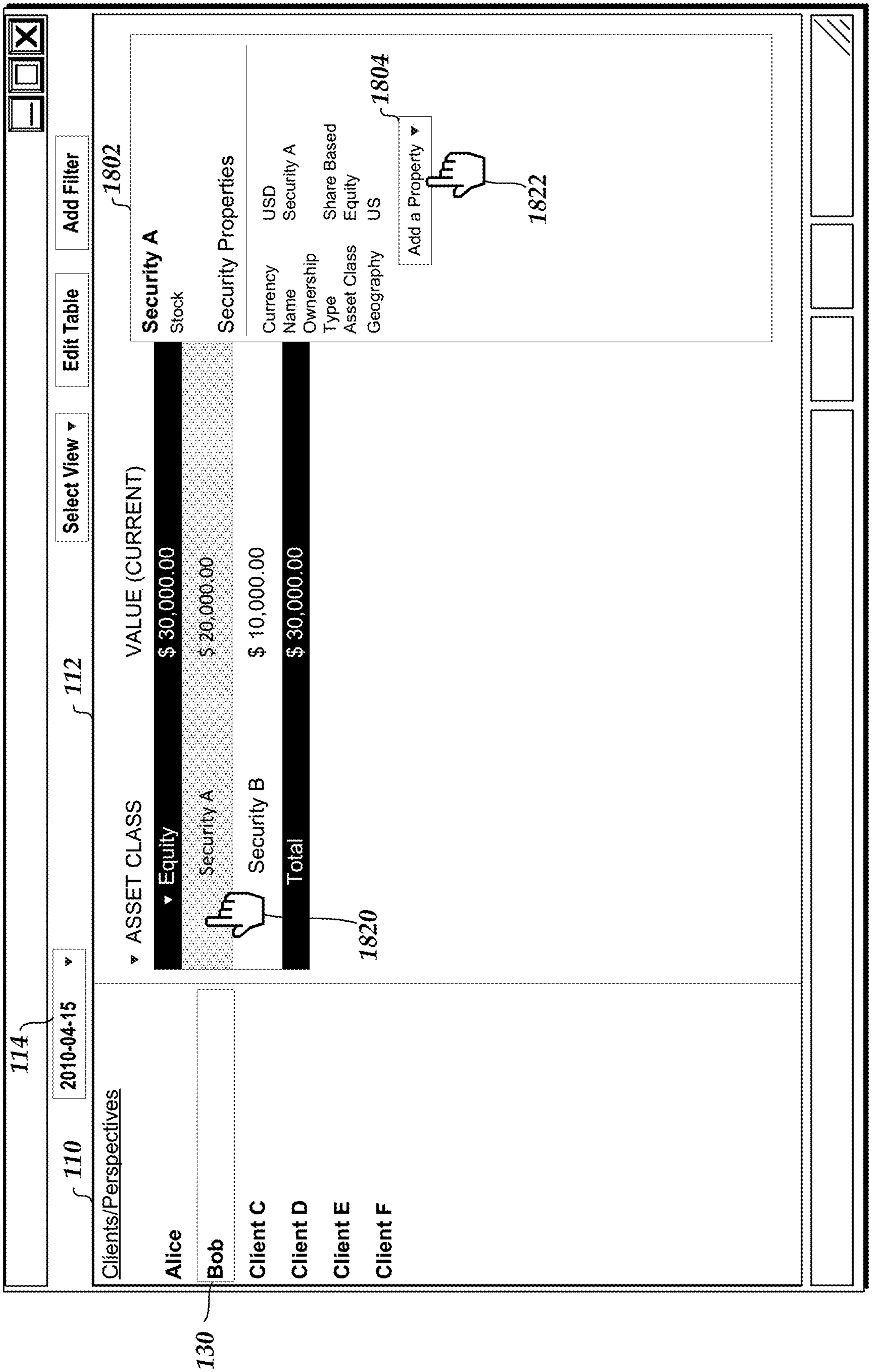
FIGS. 18A-18C illustrate example user interfaces of the system in which the user may associate a custom attribute with an asset.
Figure 18B:
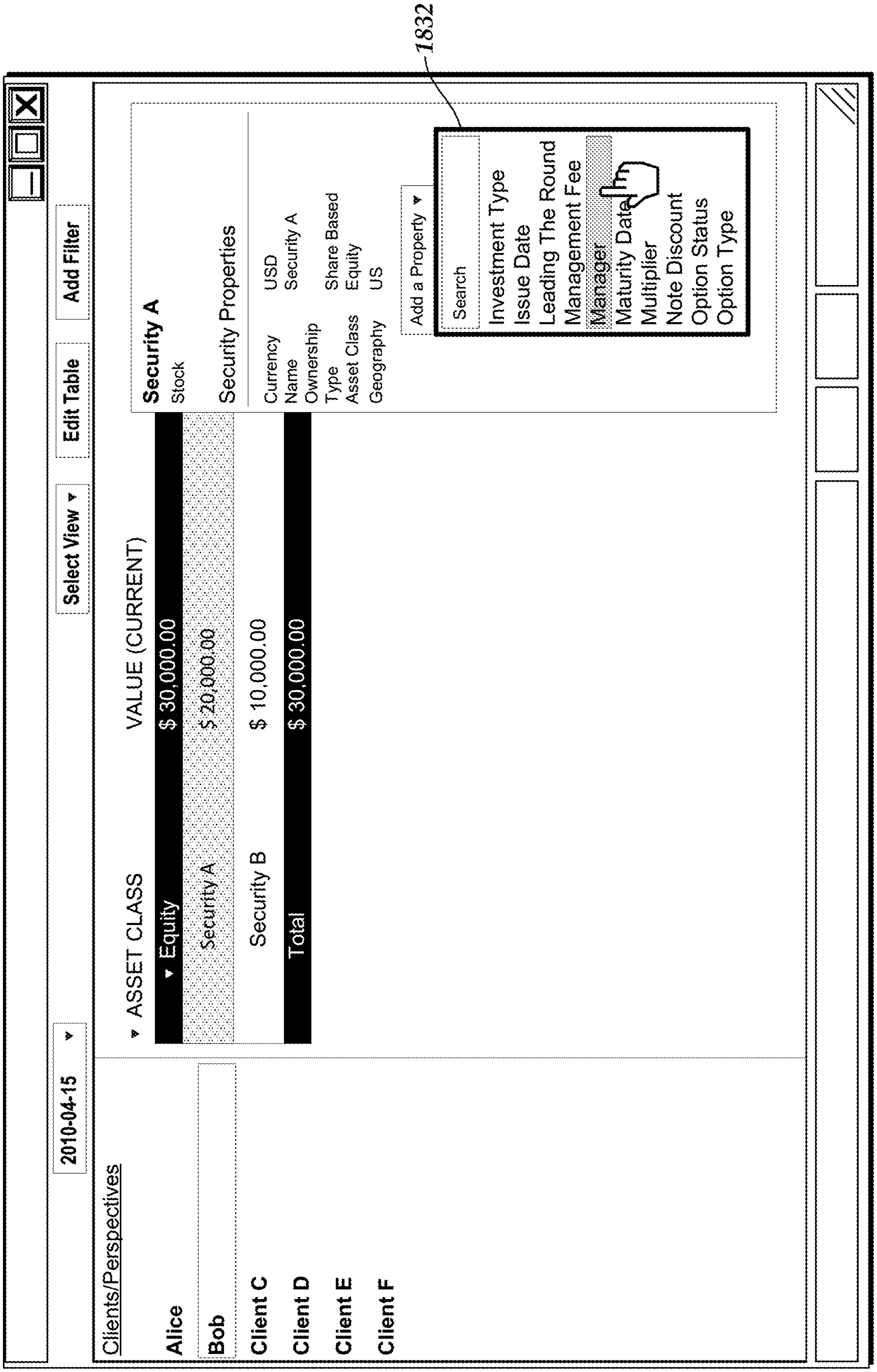
Figure 18C:
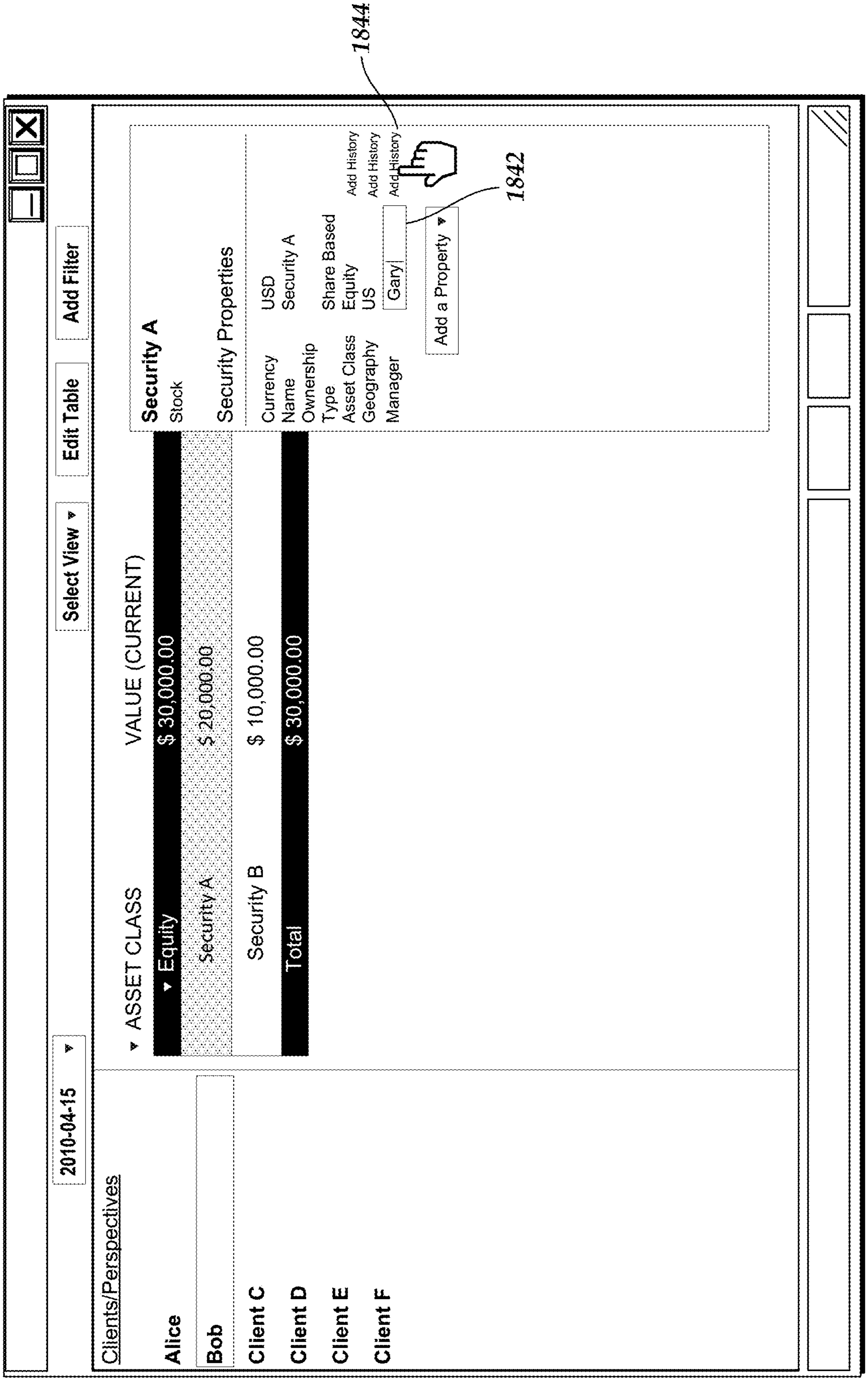

FIGS. 18A-18C illustrate example user interfaces of the system in which the user may associate a custom attribute with an asset. Referring to FIG. 18A, according to an embodiment, a user interface is shown that is similar to the user interface of FIGS. 1A, 1B, 16, and/or 17B, however various attributes (also referred to herein as properties and/or metadata) associated with a selected asset are displayed and editable by the user in a sidebar 1802. As shown in FIG. 18A, the user may interactively select one or more assets and other items shown in the user interface so as to view and edit attributes associated with the selected assets and other items via the sidebar 1802. In the example shown, the user, via cursor 1802, has selected Security A. Accordingly, the system has displayed various attributes associated with Security A in the sidebar 1802. Various attributes may be displayed in the sidebar including those shown (for example, currency, name, ownership type, asset class, geography, and/or the like), those described above and in reference to FIG. 13, and/or various other attributes including those that may be arbitrarily defined by the user (as described below).

As shown in the example user interface of FIG. 18A, the user may select an Add a Property button 1804 via, for example, cursor 1822 so as to add a new attribute to the selected Security A. FIG. 18B illustrates the example user interface after the user as selected the Add a Property button 1804. As shown, a dropdown menu 1832 may be displayed listing a scrollable list of various common attributes that may be added to the selected security. The user may additionally search for a described attribute, and/or arbitrarily specify a custom attribute. FIG. 18C illustrates the example user interface after the user has selected to add a "manager" attribute. In response, the system updates the sidebar to include the selected attribute and a field 1842 in which the user may specify a value of the added attribute. As shown, the user has specified a value of "Gary" for the manager attribute.

Figure 19A:
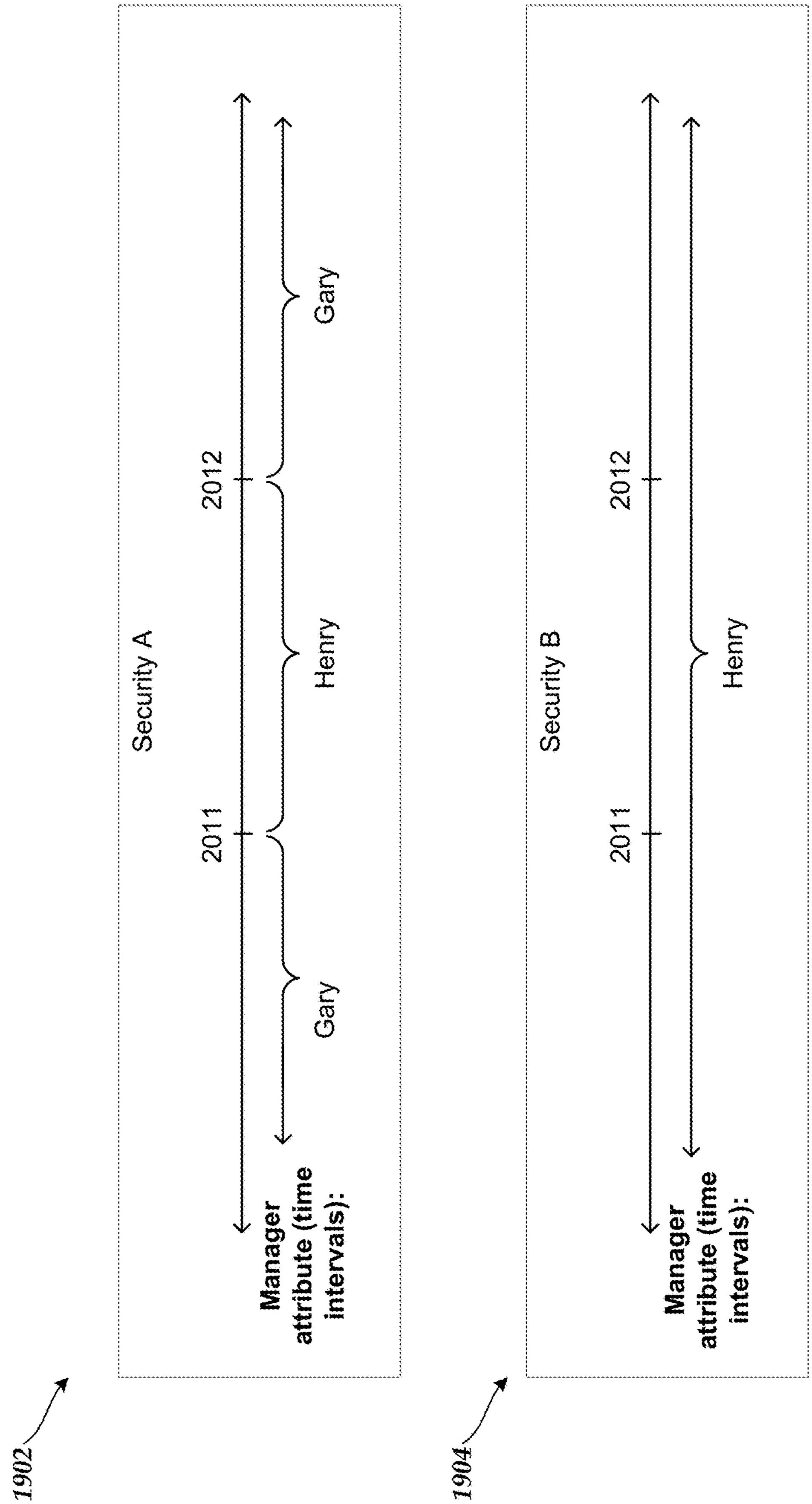
FIGS. 19A-19B illustrate example manager attribute information that may be associated with assets.

When a single value is provided for an attribute, the attribute is applied to the security (or other data item) for all time periods. However, in some embodiments the user may specify multiple values corresponding to various time periods for a given attribute. Such varying attributes are referred to herein as time varying attributes. Time varying attributes may change at various points in time, and may be specified by the user and/or determined automatically by the system based on data received from external data sources. FIG. 19A illustrates example time varying manager attribute information that may be applied to the Securities A and B. The example time varying manager attribute applied to Security A is illustrated via timeline 1902. As shown, the value of the attribute from any time in the past up until 2011 is Gary, from 2011 to 2012 is Henry, and from 2012 until anytime in the future is Henry again. The example time varying manager attribute applied to Security B is illustrated via timeline 1904. As shown, the value of the attribute for all time is Henry. A single value specified for the attribute may be equivalent to setting a single value for an attribute that is not time varying. The example time varying attributes shown in FIG. 19A are simply for illustrative purposes. Any attributes may be stored by the system, with any number of values for any number of time periods. Additionally, as described above, attributes may be stored by the system by association with graph nodes and/or edges corresponding to the particular securities (and/or other data items) for which the attributes are given.

Figure 19B:
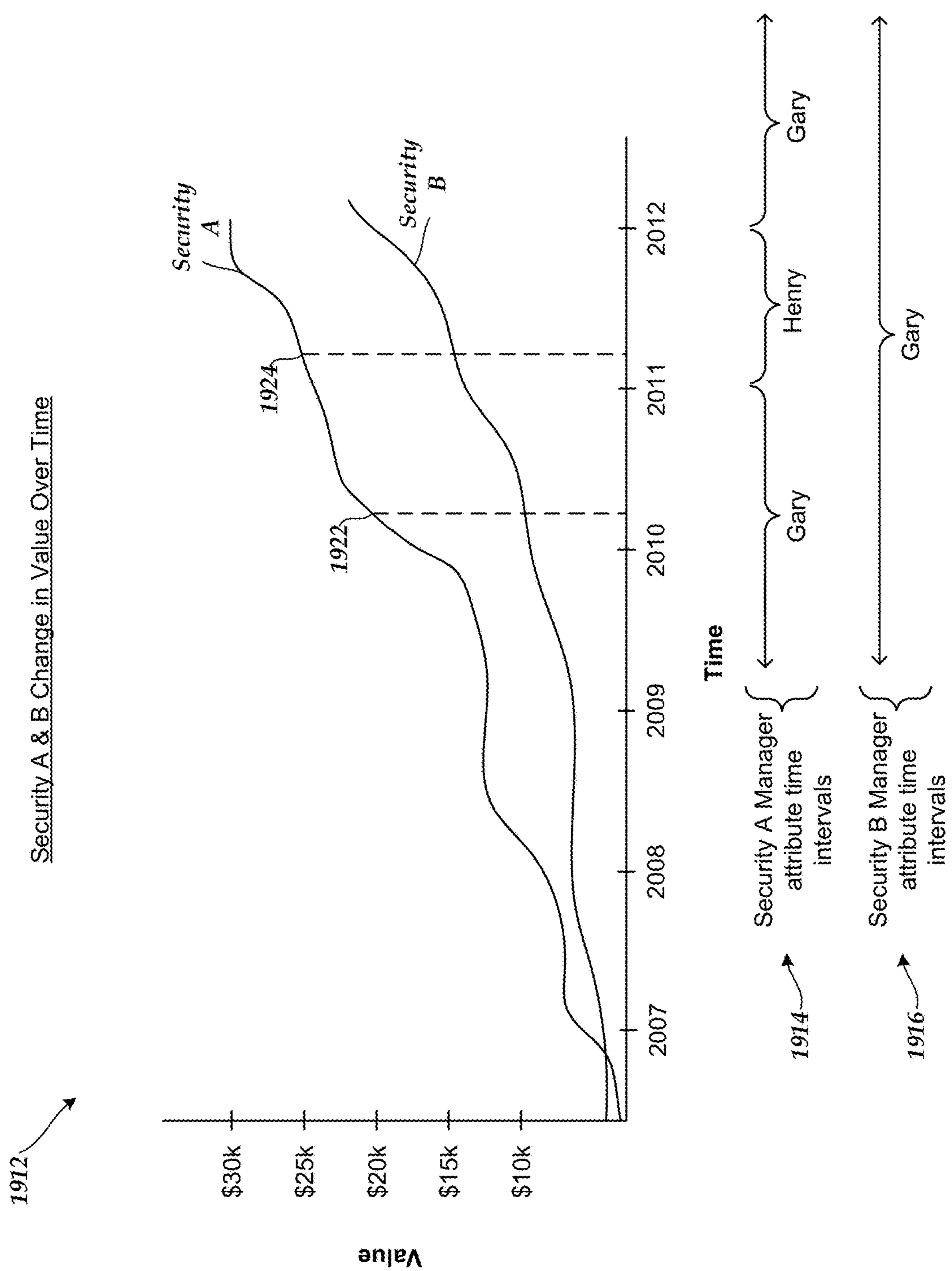

FIG. 19B illustrates an example graph 1912 showing values for each of Security A and Security B (as associated with Bob) over time. As shown, timelines 1914 and 1916 illustrate the time periods during which each security was under management of Gary or Henry with respect to the graph 1912. Dotted line 1922 illustrates an indication of the values of each of Security A and Security B as of 2010-04-15, $20,000 and $10,000 respectively. Similarly, dotted line 1924 illustrates an indication of the values of each of Security A and Security B as of 2011-04-15, $25,000 and $15,000 respectively. These example values are illustrated in the various example user interfaces described above and below.

Figure 20A:
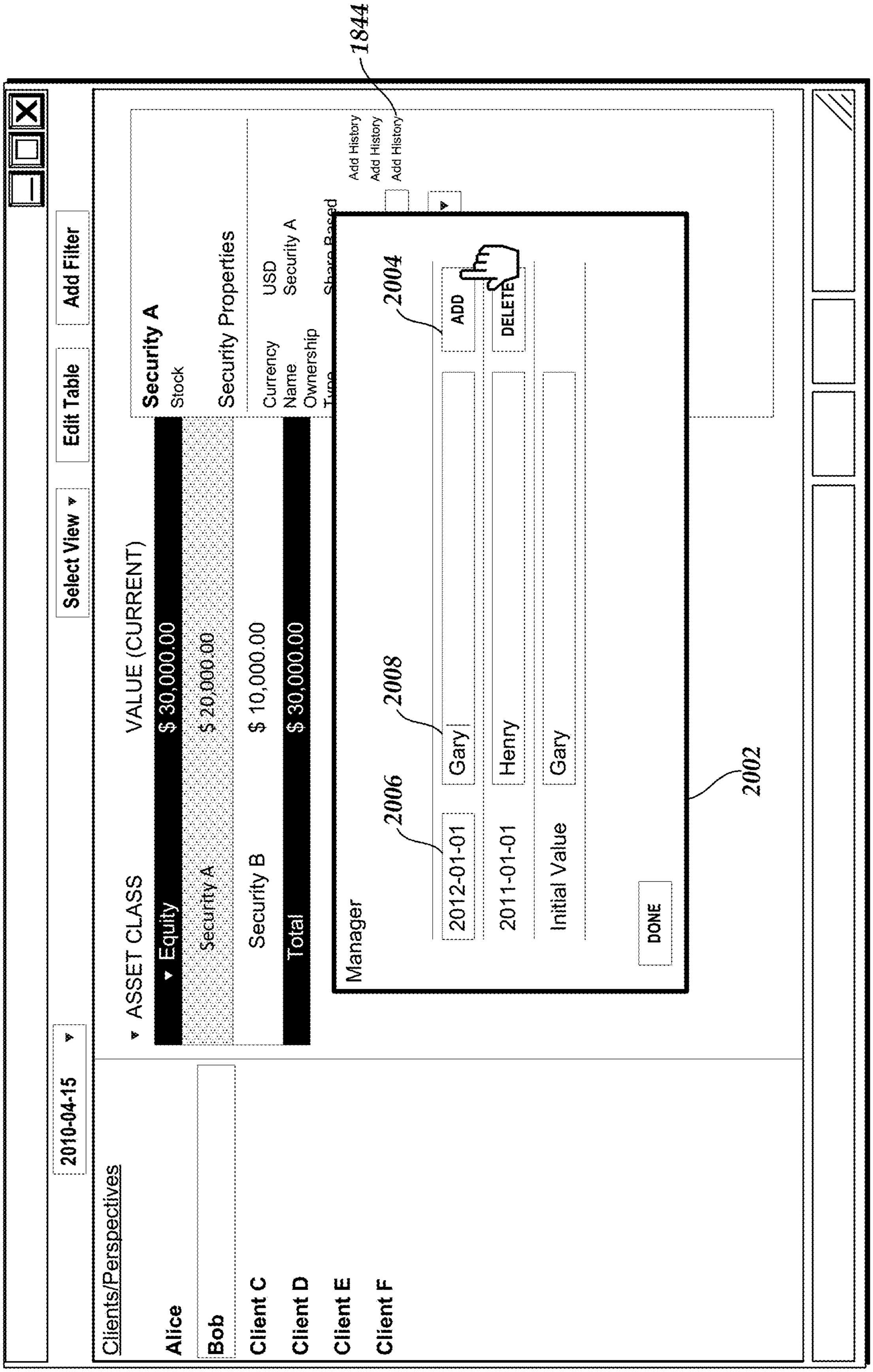
FIGS. 20A-20F illustrate example user interfaces of the system in which data is presented to the user in a table format based on associated manager attribute information.

Returning to FIG. 18C, the user may specify time varying values for a given attribute by selecting, for example, Add History button 1844. FIG. 20A illustrates an example user interface of the system in which an options box 2002 is provided to the user in response to selection of the Add History button 1844. Via the options box 2002, the user may specify time varying values for a selected attribute. As shown, the user may specify a start date via box 2006 and an attribute value via box 2008 for the given start date. The user may add additional values and dates by selecting Add button 2004. Similarly, the user may delete entered values and/or add an arbitrary number of time varying values. It may be observed that the example values entered by the user in the options box 2002 correspond to the values of the example timeline 1902 of FIG. 19A, namely, the manager attribute is specified as Gary until 2011, Henry from 2011 to 2012, and Gary again from 2012 on.

While the present disclosure describes time varying attributes with a time period granularity of days (for example, the options box 2002 allows the user to specify start days for each value), in some embodiments the system may enable specification of time varying values at a finer granularity, for example, hours, minutes, and/or seconds. Similarly, when a finer granularity of time varying values is available, the user may additionally specify contexts with a similar fine time granularity.

Figure 20B:
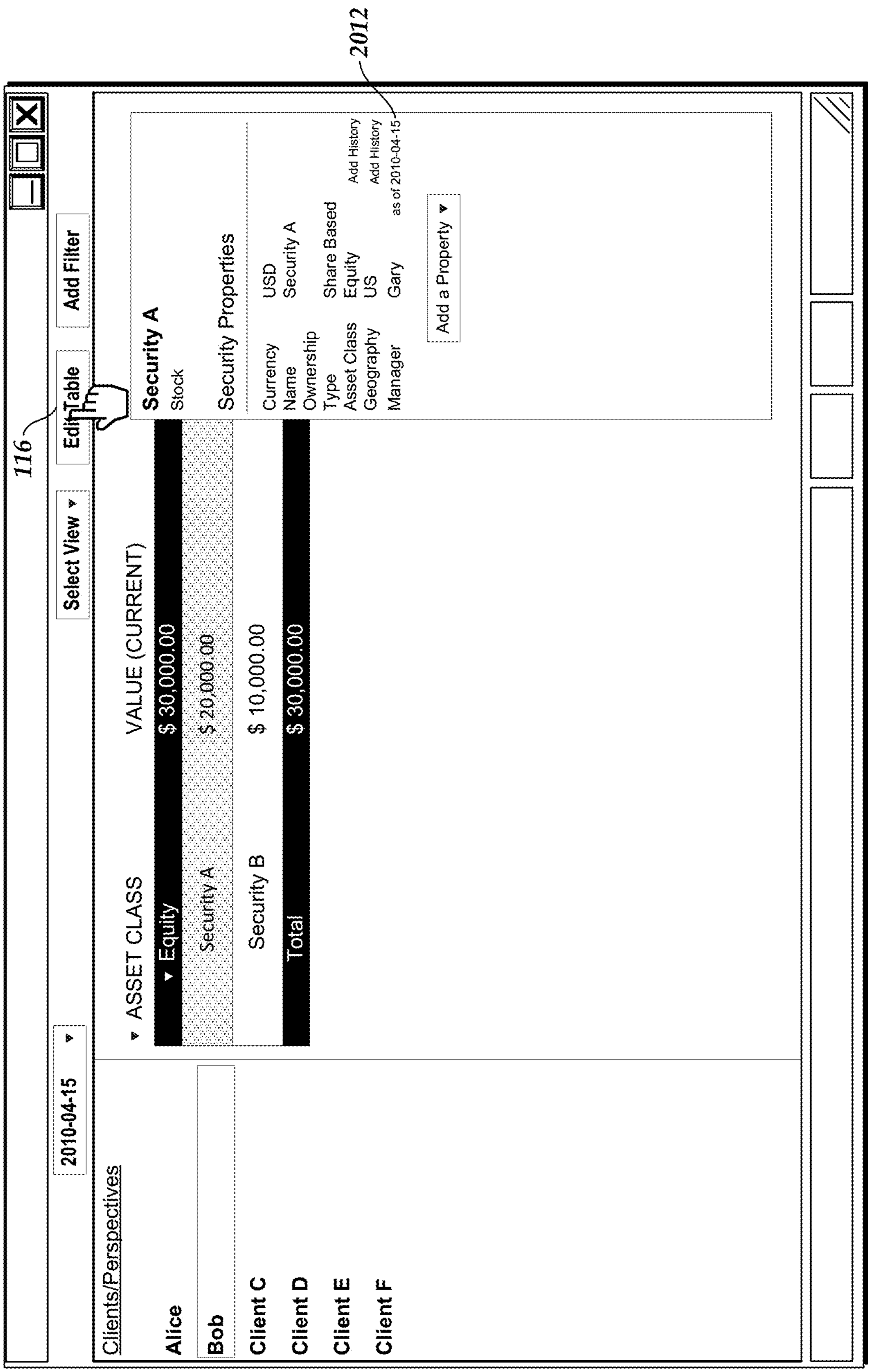

FIGS. 20B-20F illustrate example user interfaces of the system in which data is presented to the user in a table format based on the specified time varying manager attribute information described in reference to FIG. 19A. As shown in FIG. 20B, the value of the Manager attribute 2012 of the selected security (Security A) is indicated in the sidebar for the date specified by the given context. In this example, the date specified is 2010-04-15. Accordingly, the value of the Manager attribute at that time is Gary.

Figure 20C:
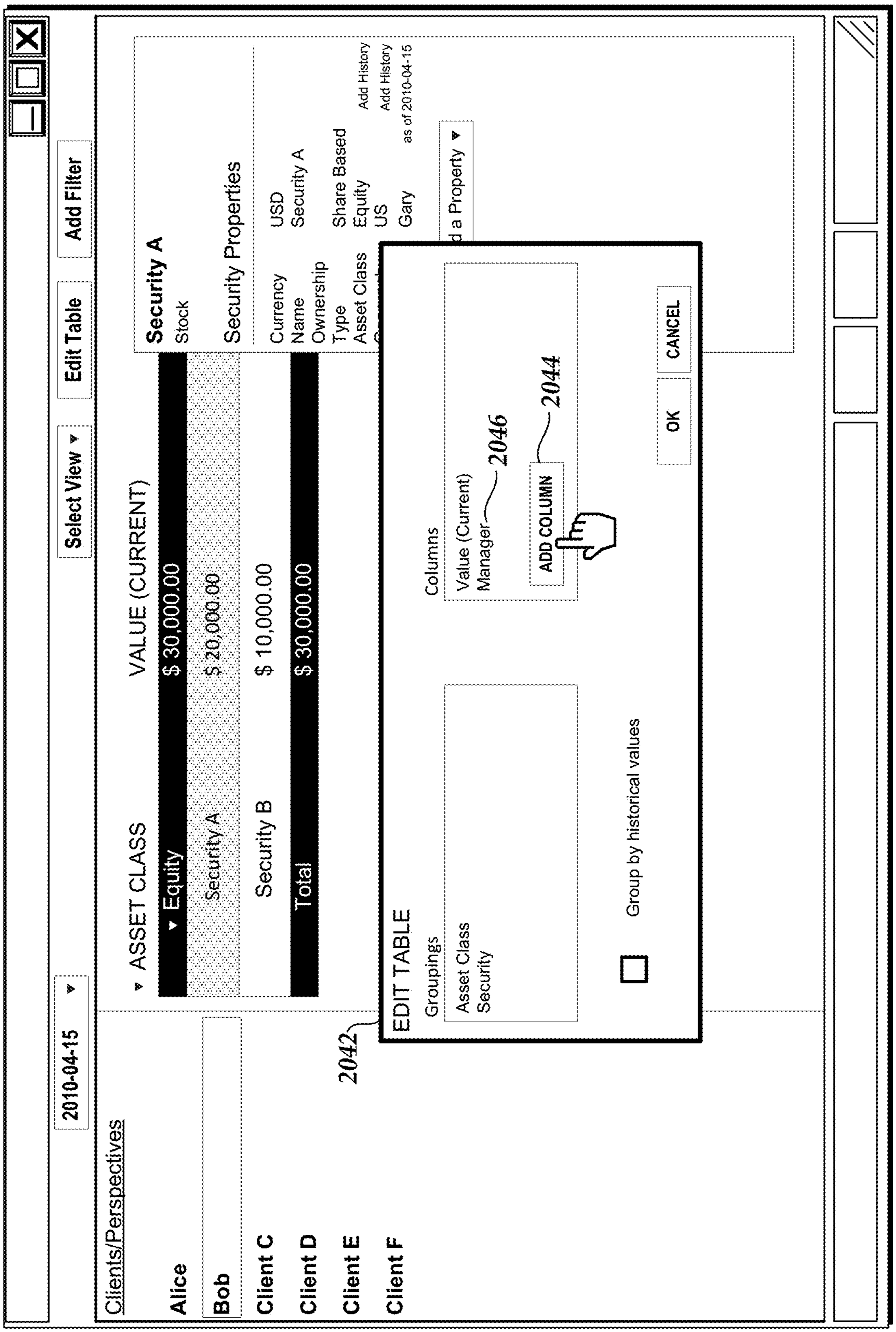
Figure 20D:
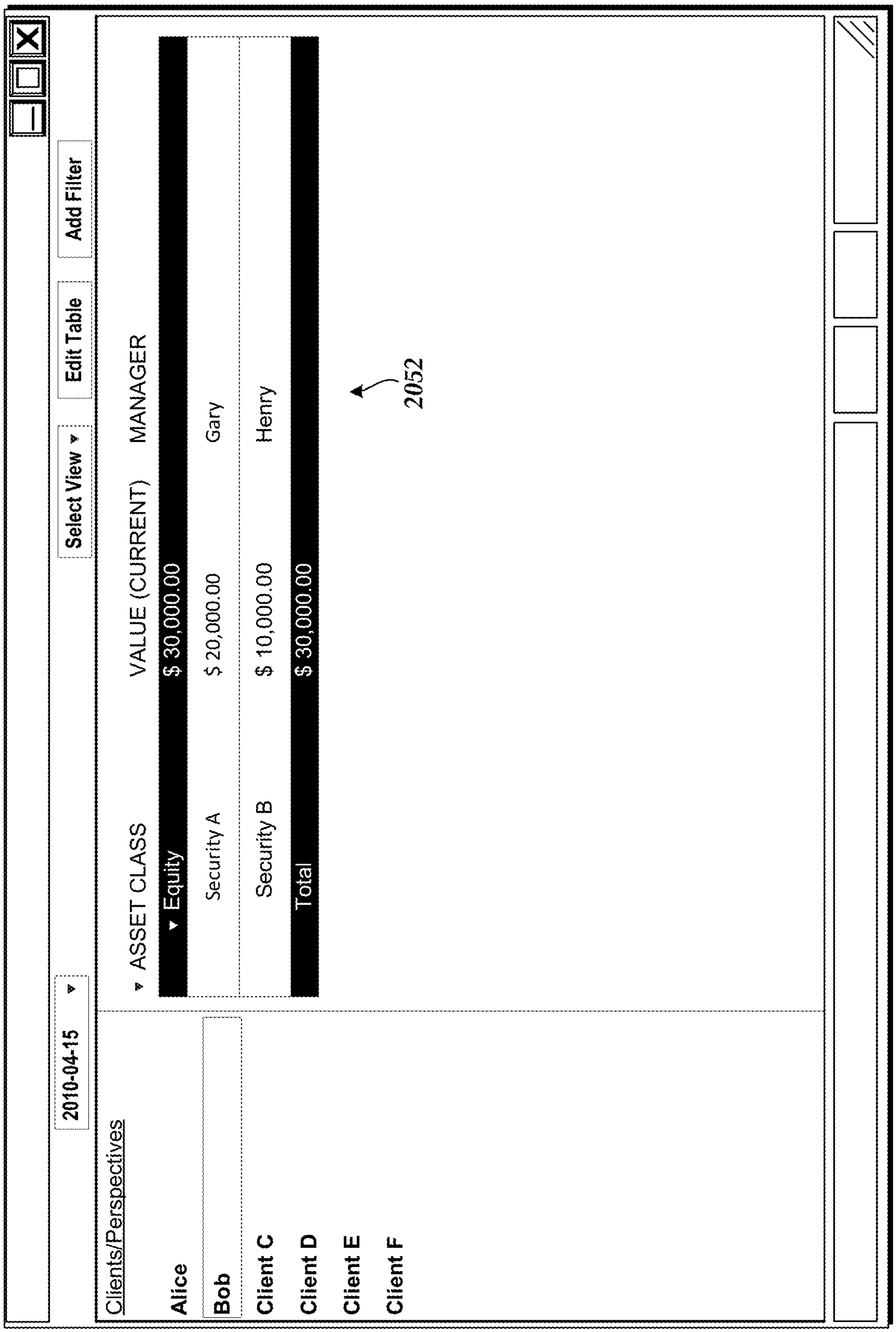

As shown, the user may select the Edit Table button 116 to add information to the table including indications of the Manager attribute. FIG. 20C illustrates an options box 2042 that is displayed by the system in response to selection of the Edit Table button 116. As described above, the user may edit the table via the options box 2042 so as to specify particular groupings of data presented (including a hierarchical arrangement of the groupings) and particular columns to be displayed in the table. As also described above, the specified columns correspond to metrics that are to be automatically calculated by the system (via, for example, graph traversal) and presented in the table. As shown, the user has selected an Add Column button 2044 and selected to add a Manager column 2046. In response to the selection, the system automatically re-traverses the graph and generates an updated user interface and table. FIG. 20D illustrates such an updated table in which Manager column 2052 has been added to the table. As shown, the values of the Manager attribute associated with each of Security A and Security B for the selected date (2010-04-15) are displayed in column 2052.

Figure 20E:
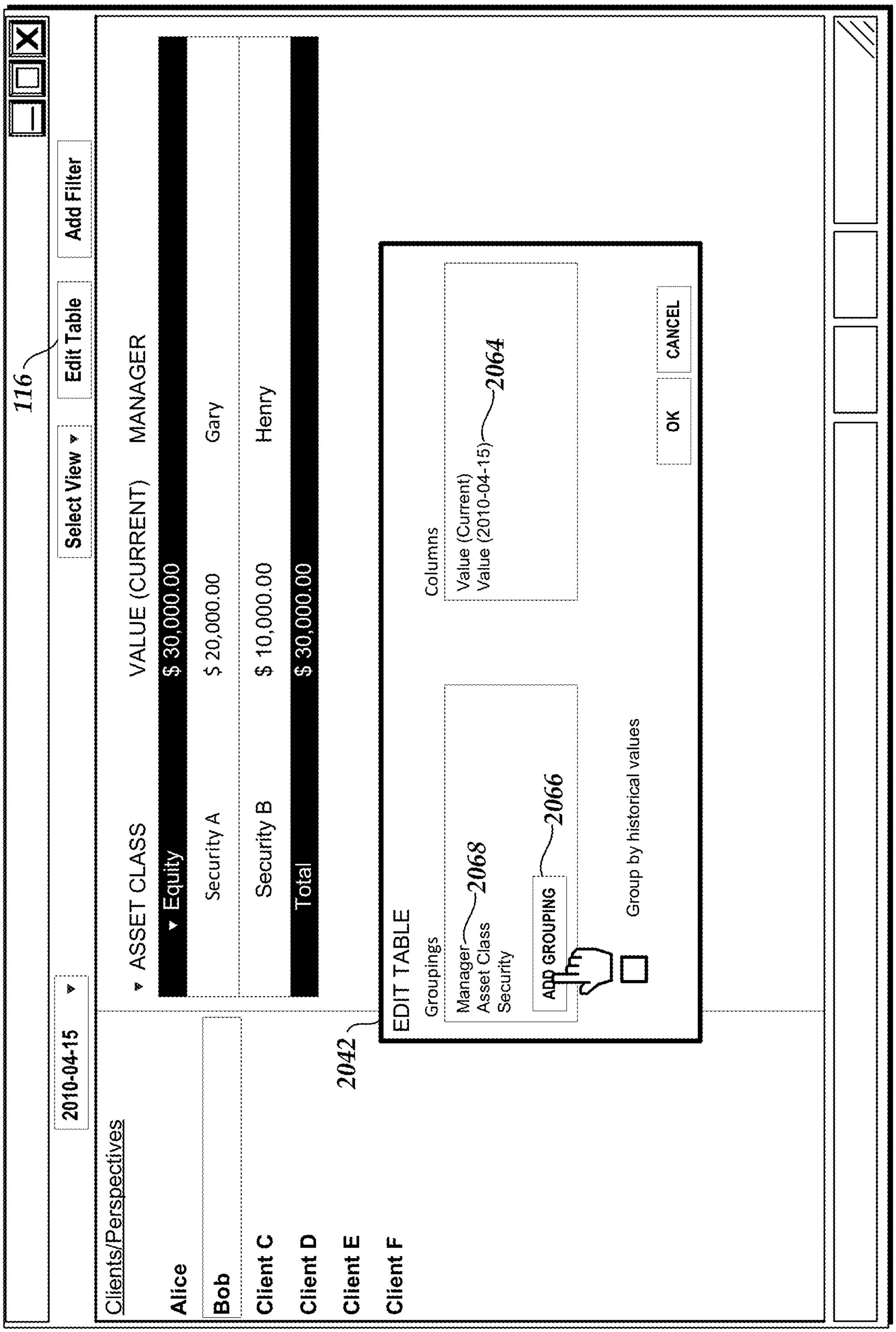

FIG. 20E illustrates an example user interface of the system in which the user is further specifying changes to the table via options box 2042. As shown, the user has, via Add Grouping button 2066, added Manager 2068 to the groupings and placed it at the top of the hierarchy such that the assets shown in the table will be organized first according to Manager, second according to Asset Class (also referred to herein as Asset Type), and third by actual Security. Additionally, the user has edited the displayed columns to remove the Manager column and add a column 2064 corresponding to Asset Value as of a particular date (in this example, 2010-04-15, the same as the date specified in the current context). In response to the user's selections, the system re-traverses the graph and updates the table to display the example user interface of FIG. 20F. As shown in column 2072, the assets (including Security A and Security B) of Bob are now organized in a hierarchical manner according to Manager and then Asset Type. Information is provided for the specified contextual data (in this example 2010-04-15). As the current selected date is the same as the date specified with respect to the metric of column 2076, the metric/ column values displayed in the two columns 2074 and 2076 are the same. It may be observed that as Security A was managed by Gary as of 2010, Security A is categorized under Gary, while Security B is categorized under Henry.

Figure 20F:
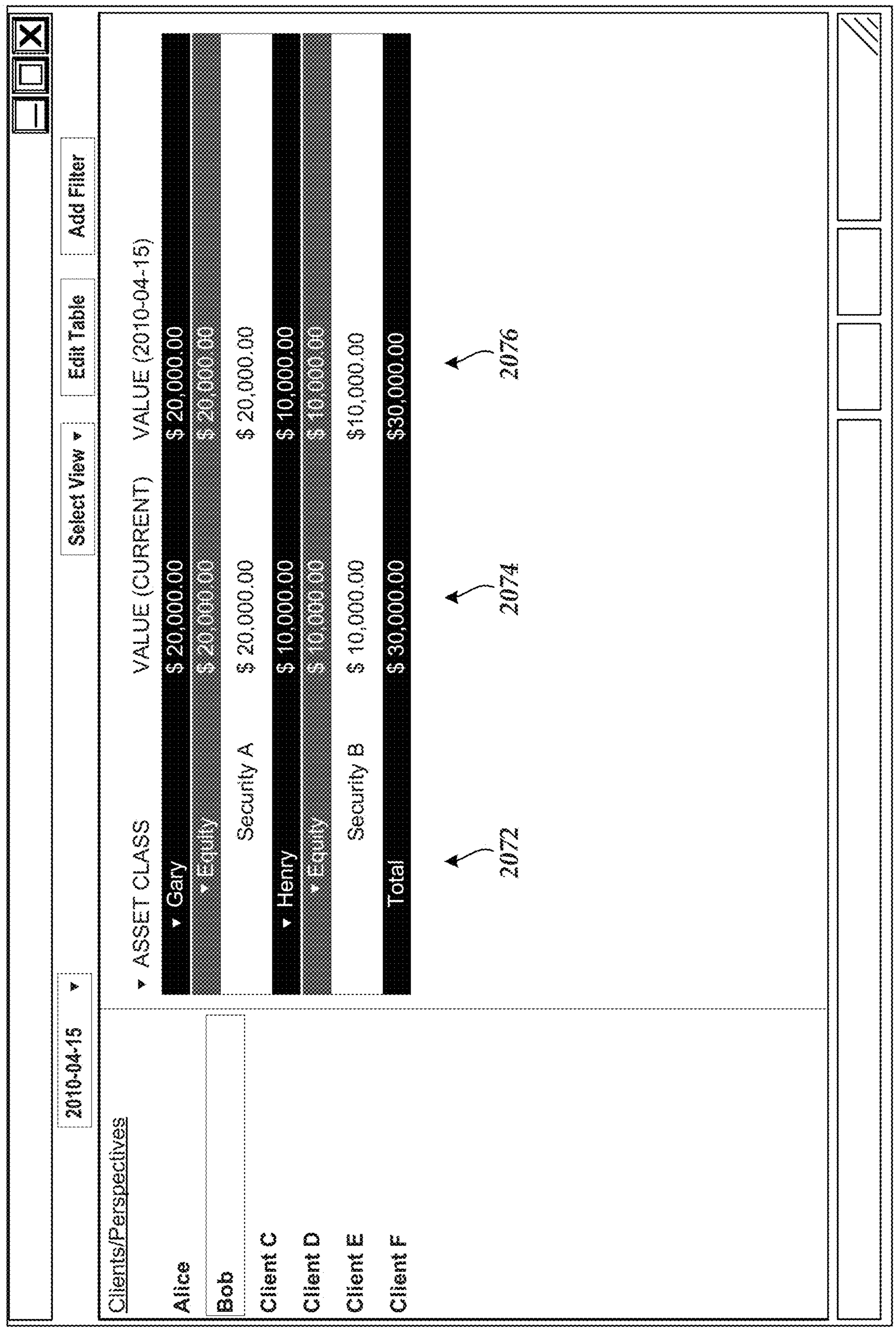
Figure 21A:
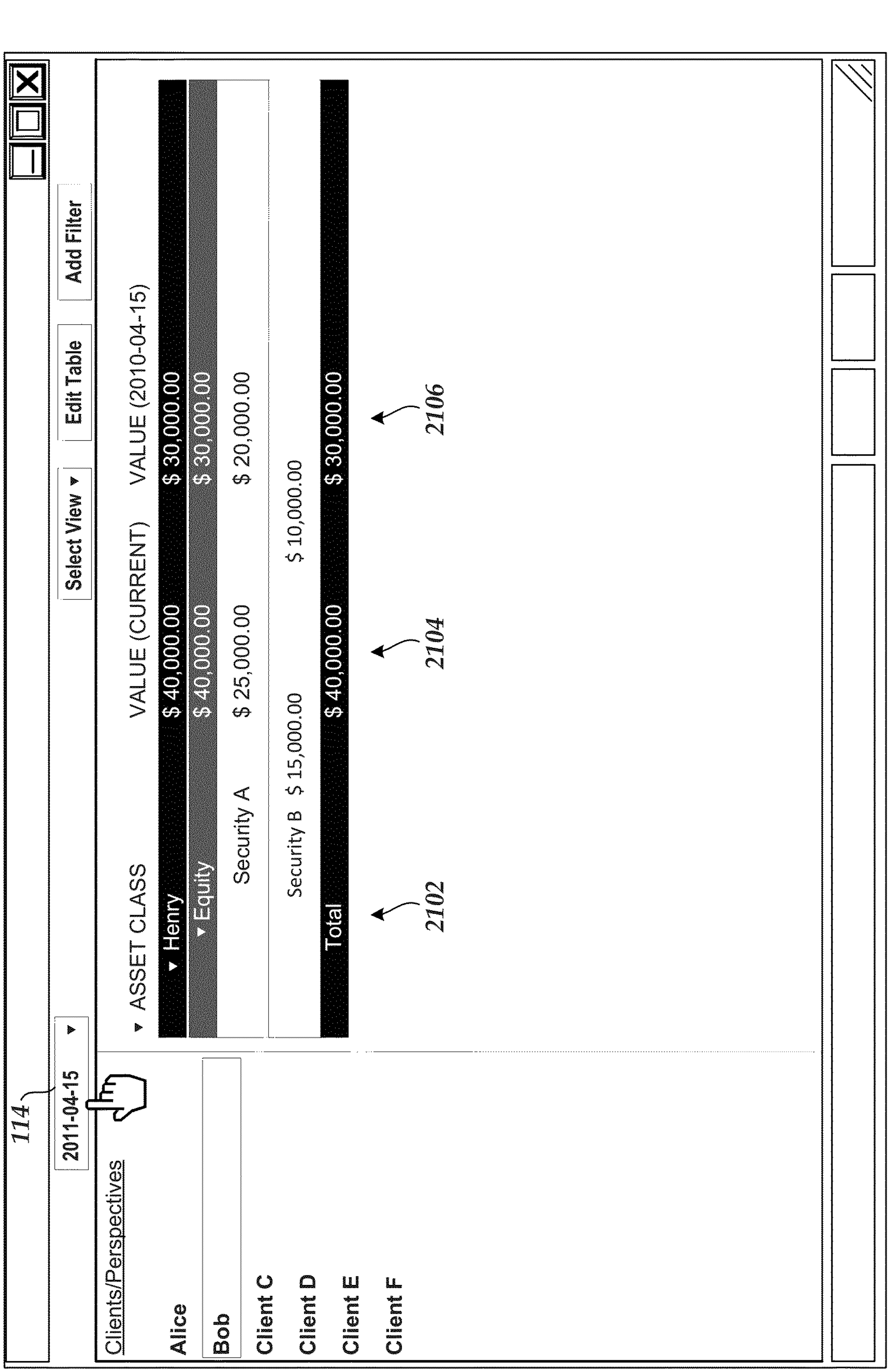
FIGS. 21A-21C illustrate additional example user interfaces of the system in which data is presented to the user in a table format based on associated manager attribute information.
Figure 21B:
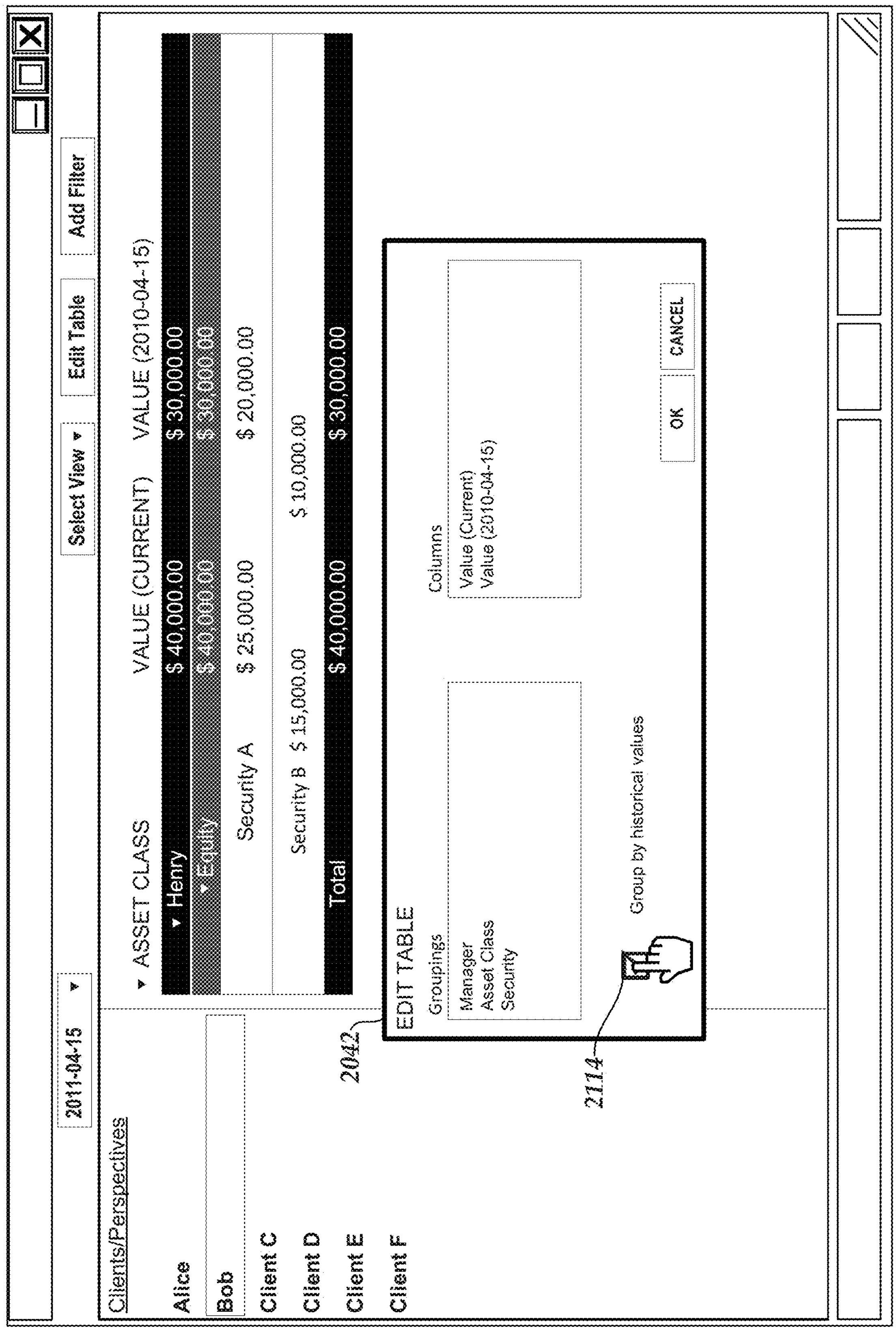
Figure 21C:
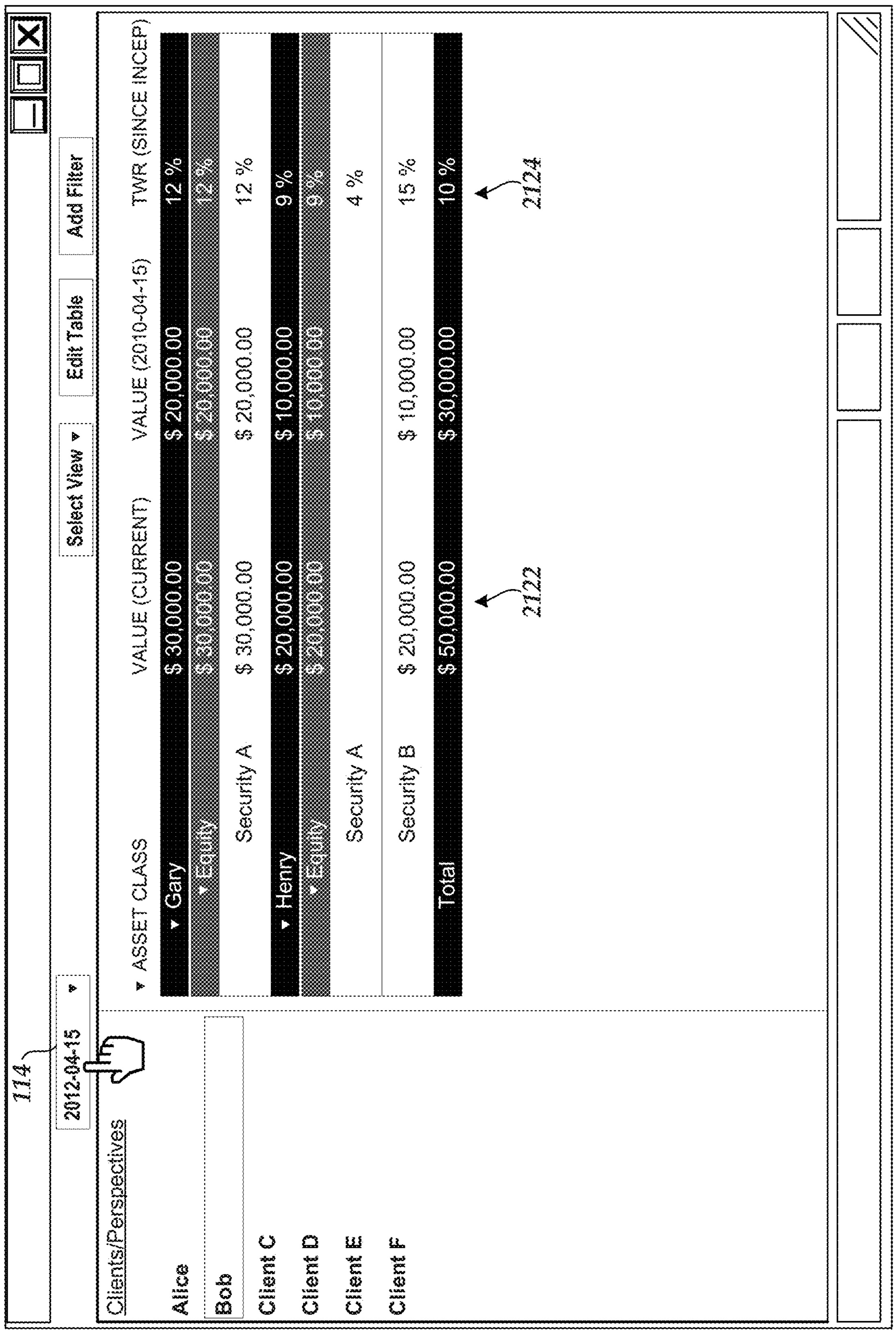

FIGS. 21A-21C illustrate additional example user interfaces of the system in which data is presented to the user in a table format based on the specified time varying manager attribute information described in reference to FIG. 19A. In FIG. 21A, the user may select the date selection box 114 to change the date of the displayed context. As shown, the user has changed the date to 2011-04-15. Accordingly, the system automatically and dynamically re-traverses the graph and updates the user interface including the displayed table. As shown in column 2102, as both Security A and Security B are managed by Henry in 2011, both are categorized under Henry. Additionally, the values displayed in column 2104 are updated based on the currently selected date, while the values displayed in column 2106 remain that same as shown in FIG. 20F. FIG. 21A is similar to FIG. 1A described above.

Turning to FIG. 21B, the user has again selected the Edit Table button 116 to cause the system to display the options box 2042. As shown, options box 2042 additionally includes a Group by historical values checkbox 2114, which the user has selected. In various embodiments, selection of the Group by historical values checkbox 2114 causes the system to automatically update the user interface (including the table for which the option has been selected) via re-traversal of the graph to provide a unique and compact display of time varying attribute information not otherwise shown for a given contextual date. For example, the user interface of FIG. 21A may be updated, upon selection of the Group by historical values checkbox 2114, to the user interface of FIG. 1B (also described above). As described above, although the selected date remains 2011-04-15, the assets shown in the table are organized according to their time varying attribute values (also referred to herein as historical values). Thus, in FIG. 1A, no asset value for Security A as of 2010-04-15 is displayed under Henry (see location 154), as Henry was not the assigned manager of that asset on that date. Similarly, no current asset value for Security A is displayed under Gary (see location 152), as Gary was not the assigned manager of that asset on the currently selected date.

Accordingly, selection of the Group by historical values checkbox 2114 causes the system to traverse the graph and calculate data based on time varying attributes associated with various graph nodes and/or edges, and display the calculated data in the user interface. Advantageously, display of time varying data, according to some embodiments, provides a more accurate representation of information that was previously available. For example, while a given asset may currently be managed by a particular person, particular metrics may not be attributable to that person if the person was not actually the manager for the time period relevant to the metric. This advantage may be more clearly understood by reference to another example, as shown in FIG. 21C.

FIG. 21C illustrates the user interface in which another metric has been added to the table in column 2124 (namely, Time Weighted Return (TWR) since inception), and the contextual date has been updated by the user to 2012-04-15 (as shown in date selection box 114). As shown, column 2122 has been updated to indicate the asset values as of 2012-04-15, at which time Security A was again managed by Gary. However, a Security A row remains under Henry as the new metric of column 2124 (TWR since inception) spans the entire time period from the current contextual date to the beginning available data (which includes 2011-2012, the time period when Henry was managing Security A. It is notable that the values of the calculated TWR in column 2124 are attributable only to the time periods during which the particular assets were managed by each manager. Accordingly, it may easily be observed that the TWR of Security A during the time period it was managed by Henry is 4%, while the TWR of Security A during the time period that it was managed by Gary is 12%.

Figure 22A:
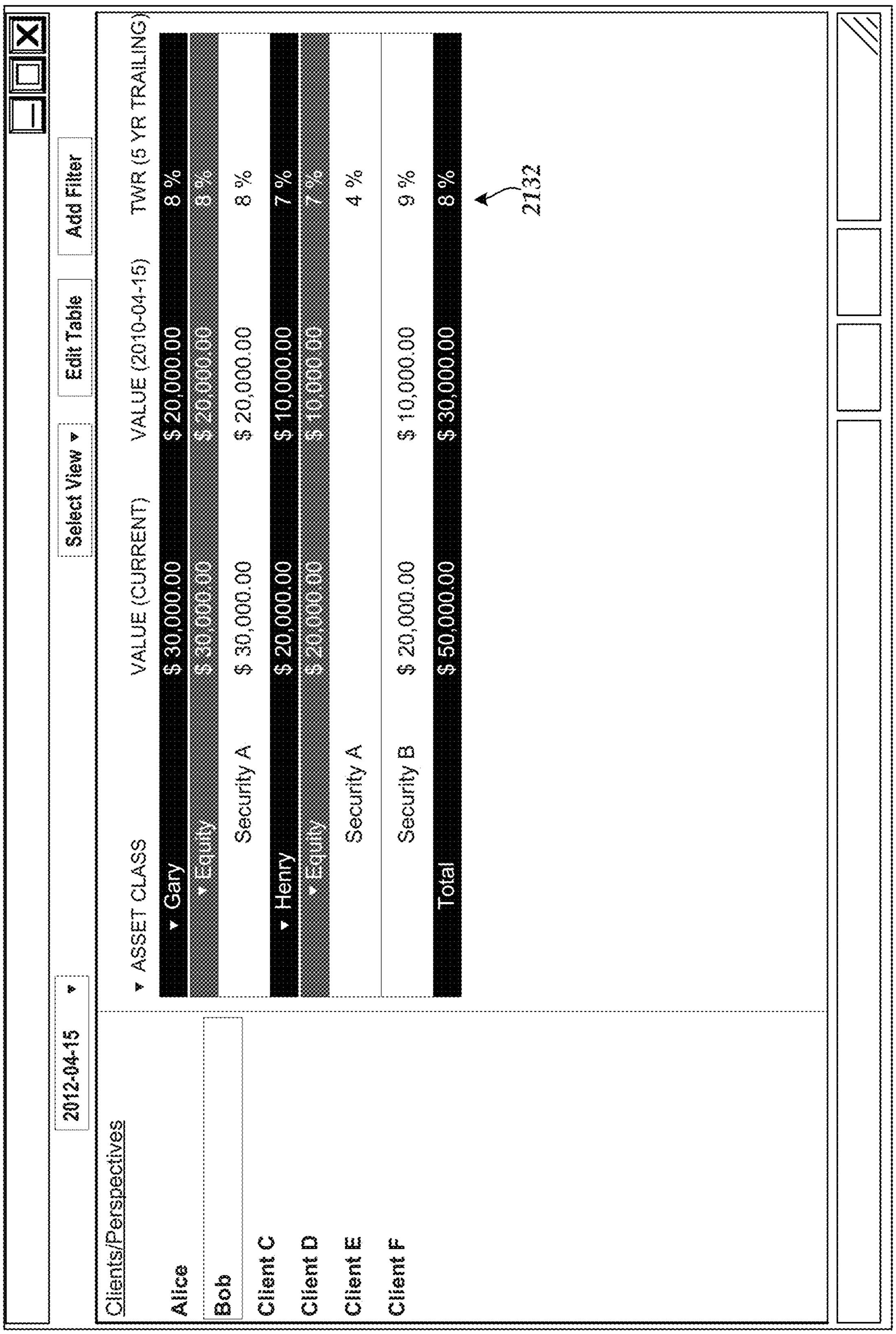
FIG. 22A illustrates yet an additional example user interface of the system in which data is presented to the user in a table format based on associated manager attribute information.

FIG. 22A illustrates another example metric in column 2132, namely TWR 5 year trailing. TWR 5 year trailing differs from TWR since inception in that the metric is only calculated over the five years previous to the currently selected contextual date. Accordingly, it may be seen that the values are generally different from the TWR since inception metric of FIG. 21C. However, it may be noted that the TWR 5 year trailing of Security A when managed by Henry remains the same, as the relevant time period, 2011-2012, remains the same under either metric. This may be better understood with reference to FIG. 22B.

Figure 22B:
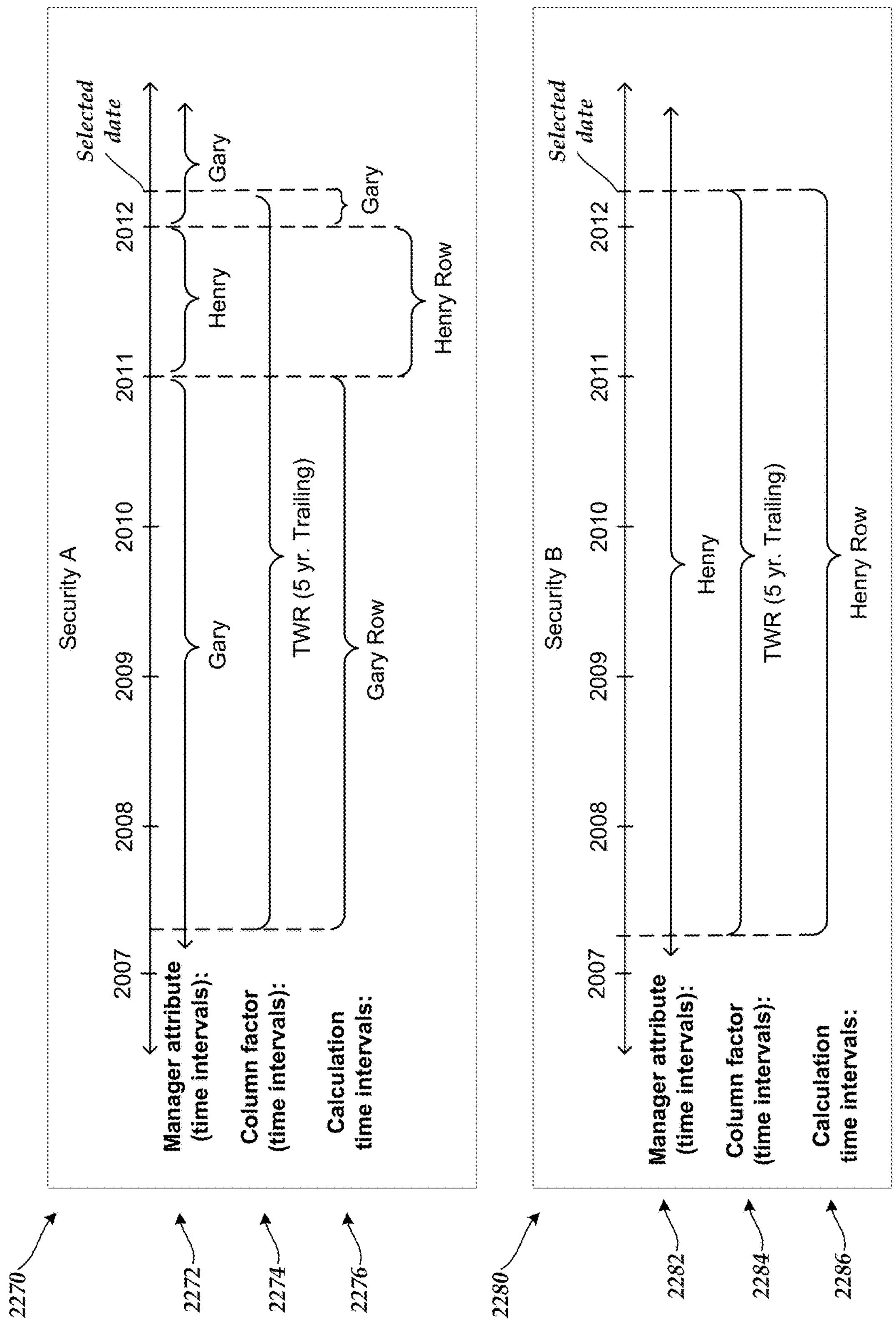
FIG. 22B illustrates calculation of time intervals based on attribute information associated with assets.

FIG. 22B illustrates calculation of time intervals based on attribute information associated with the assets, Security A and Security B. Timeline 2270 illustrates time intervals relevant to Security A when calculating the metric TWR 5 year trailing (as shown in FIG. 22A). Brackets 2272 show the time intervals associated with the time varying Manager attribute of Security A. These were described above in reference to FIG. 19A. It is of note that these time intervals are relevant to the calculation of TWR 5 year trailing for at least two reasons: 1. Because the user has selected to view the time varying information associated with the assets of the table (for example, by selection of the Group by historical values checkbox 2114); and 2. Because the table is grouped by the Manager attribute, which varies with time for at least one of the displayed assets. If either of these two conditions is not true, the calculation of time intervals described with reference to FIG. 22B would not be necessary for calculation of the given metric (TWR 5 year trailing). Brackets 2274 show time intervals associated with the given metric, in this example, the five year time period up to the selected data (in this example, the contextual date, or 2012-04-15). Brackets 2276 show time intervals corresponding to the intersection of the attribute time intervals and the metric (also referred to herein as the column factor) time intervals. These intersected time intervals are referred to herein as "calculation time intervals" or "calculation intervals" and they are used in the graph traversal process and calculation of the column values, as described below. It may be understood that the calculation time intervals correspond to rows of the table. For example, the time intervals 2007-04-15 to 2010-12-31, and 2012-01-01 to 2012-04-15 may be used to calculate the TWR 5 year trailing for Security A as managed by Gary, while the time interval 2011-01-01 to 2011-12-31 may be used to calculate the TWR 5 year trailing for Security A as managed by Henry.

Similar to timeline 2270, timeline 2280 illustrates time intervals relevant to Security B when calculating the metric TWR 5 year trailing. Bracket 2282 shows the time interval associated with the Manager attribute of Security B. Bracket 2284 show time interval associated with the given metric. And bracket 2286 shows the time interval corresponding to the intersection of the attribute time interval and the metric time interval. As described above, the calculation time interval 2286 is used in the calculation of the metric/column factor for Security B when managed by Henry.

Figure 22C:
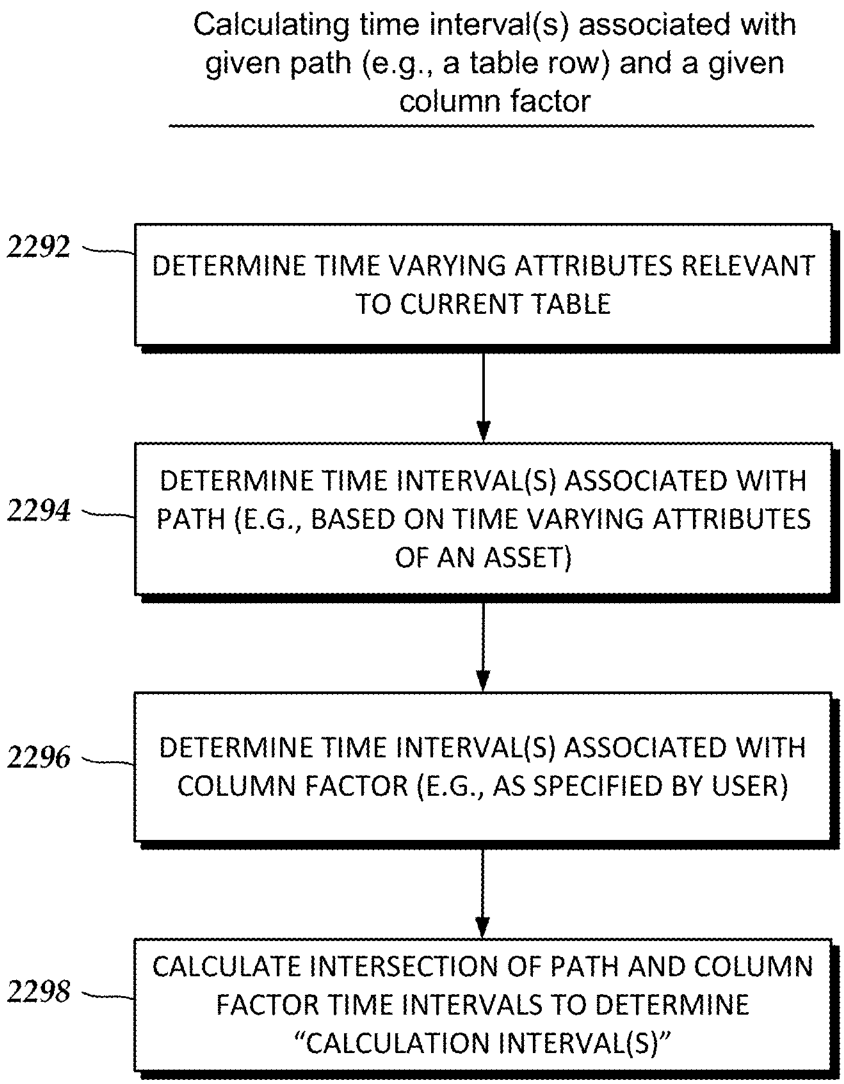
FIG. 22C is a flowchart showing an example method of the system in which time intervals associated with a given path and metric are calculated.

FIG. 22C is a flowchart showing an example method of the system in which time intervals associated with a given path and metric are calculated. In various embodiments, fewer blocks or additional blocks may be included in the process of FIG. 22C, or various blocks may be performed in an order different from that shown in the figure. Further, one or more blocks in the figure may be performed by various components of the system as described above and below, for example, one or more of view computation unit 106 and/or other aspects of the system.

At block 2272, any time varying attributes relevant to the current table are determined. As described above, the calculation of metrics based on time varying attributes is only performed by the system if 1. the user has selected to view the time varying information associated with the assets of the table (for example, by selection of the Group by historical values checkbox 2114); and 2. the table is grouped by an attribute which varies with time for at least one of the displayed assets. Thus, for example, the system determines whether the table is grouped by an attribute that varies with time for at least one of the assets of the table. If so, the process proceeds to block 2294.

At block 2294, the system determines any time intervals associated with the given path for which the metric is being calculated. For example, as described above, paths in the mathematical graph may generally correspond to rows of the table. Accordingly, time intervals associated with the path may be determined such that the given metric may be calculated with respect to the table row. An example is illustrated in FIG. 22B with brackets 2272 in which time intervals are determined for the time varying manager attribute for Security A (Security A corresponding to a row of the table/path in the graph). As is described below in reference to FIG. 22D, block 2294 is performed for each of the enumerated paths in the graph such that metric calculations may be performed with respect to each row of the table. It may be understood that there may be not time intervals associated with a given path. For example, with respect to Security B of FIGS. 22A-22B, there is not time interval associated with a Gary value of the manager attribute (because, for example, Gary never managed Security B). Accordingly, ultimately the calculated metric is going to be void, and the system may, in some embodiments, leave a blank space in the table for the value, or omit the path/row completely (as is the case in FIG. 22A as no relevant calculations pertain to Security B as managed by Gary).

At block 2296, the system determines any time intervals associated with the given metric/column factor. An example is illustrated in FIG. 22B with brackets 2274 in which time intervals are determined for the TWR 5 year trailing metric. As is described below in reference to FIG. 22D, block 2296 is performed for each of the metrics/column values of the table such that metric calculations may be performed with respect to each column of the table.

At block 2298, the system calculates the intersection of the path time intervals and the column factor/metric time intervals to determine the "calculation intervals" for the given path and metric. An example is illustrated in FIG. 22B with brackets 2276 in which calculation time intervals are calculated for TWR 5 year trailing of Security A for each of two paths: Gary (2007-04-15 to 2010-12-31 and 2012-01-01 to 2012-04-15) and Henry (2011-01-01 to 2011-12-31).

Accordingly, as described in reference to FIG. 22C, the system may calculate "calculation intervals" for each combination of path and metric/column factor relevant to the table of the user interface.

Figure 23:
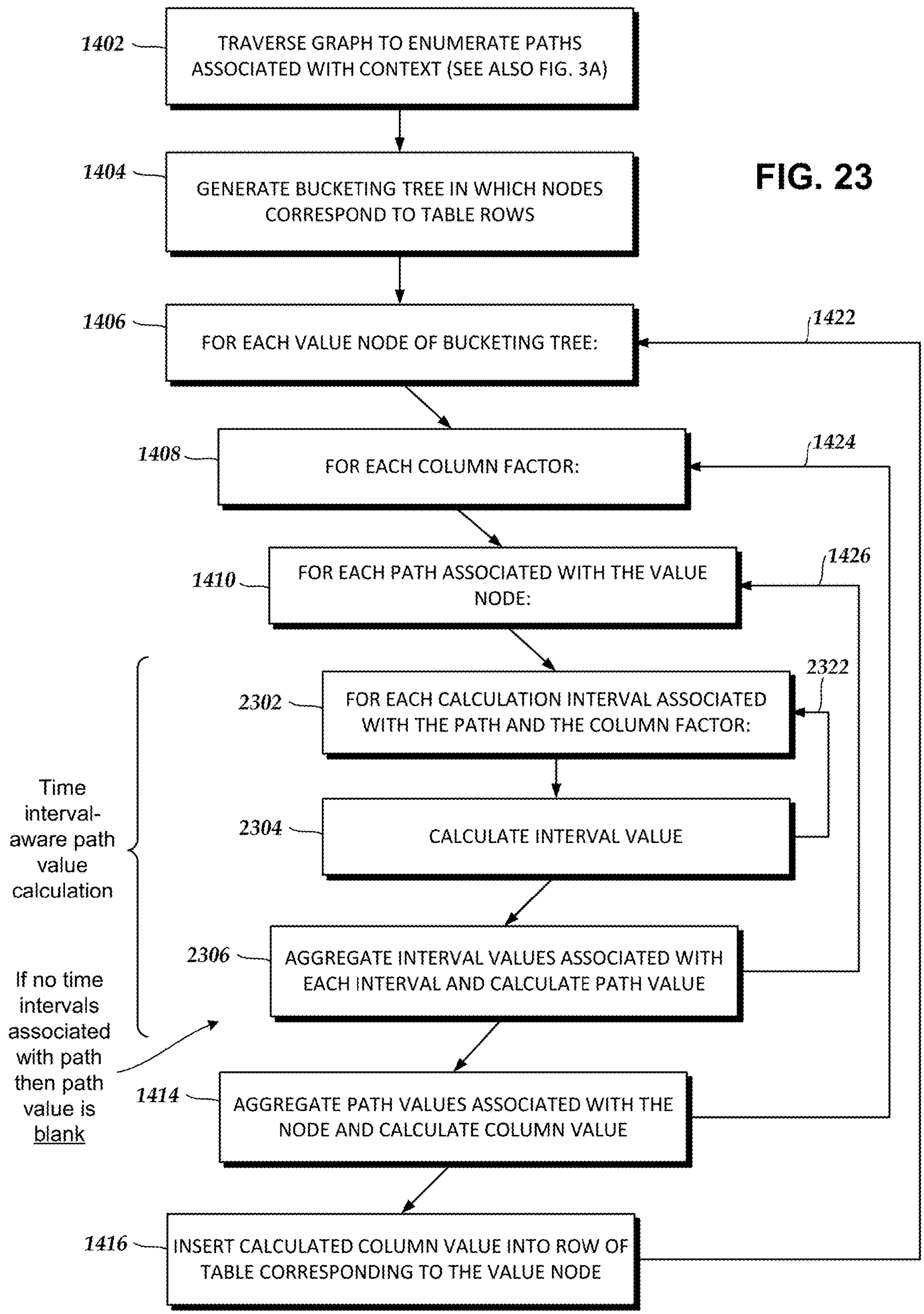
FIG. 23 is a flowchart showing an example method of the system in which a table is generated, including time varying attributes.

FIG. 23 is a flowchart showing an example method of the system in which a table is generated via graph traversal and column factor calculations, including time varying attributes. The flowchart of FIG. 23 includes many blocks similar to the flowchart of FIG. 14. However, additional blocks 2303, 2304, and 2306 of the flowchart of FIG. 23 enable the calculation and display of time varying data (examples of which are described above with respect to FIGS. 1B, 21C, and 22A). In various embodiments, fewer blocks or additional blocks may be included in the process of FIG. 23, or various blocks may be performed in an order different from that shown in the figure. Further, one or more blocks in the figure may be performed by various components of the system as described above and below, for example, one or more of view computation unit 106 and/or other aspects of the system.

Figures 24A, 24B:
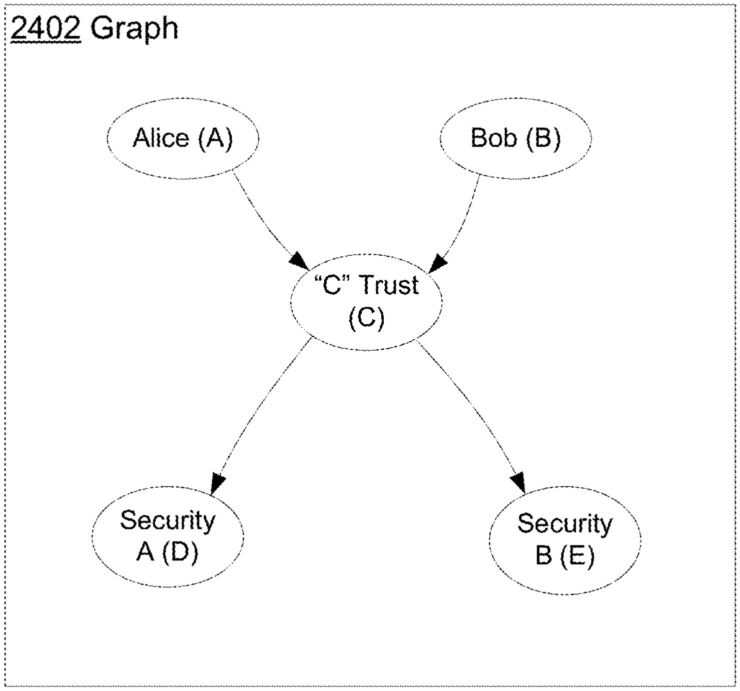
FIGS. 24A-24E illustrate an example traversal of a simplified graph, including time varying attributes.
Figure 24C:
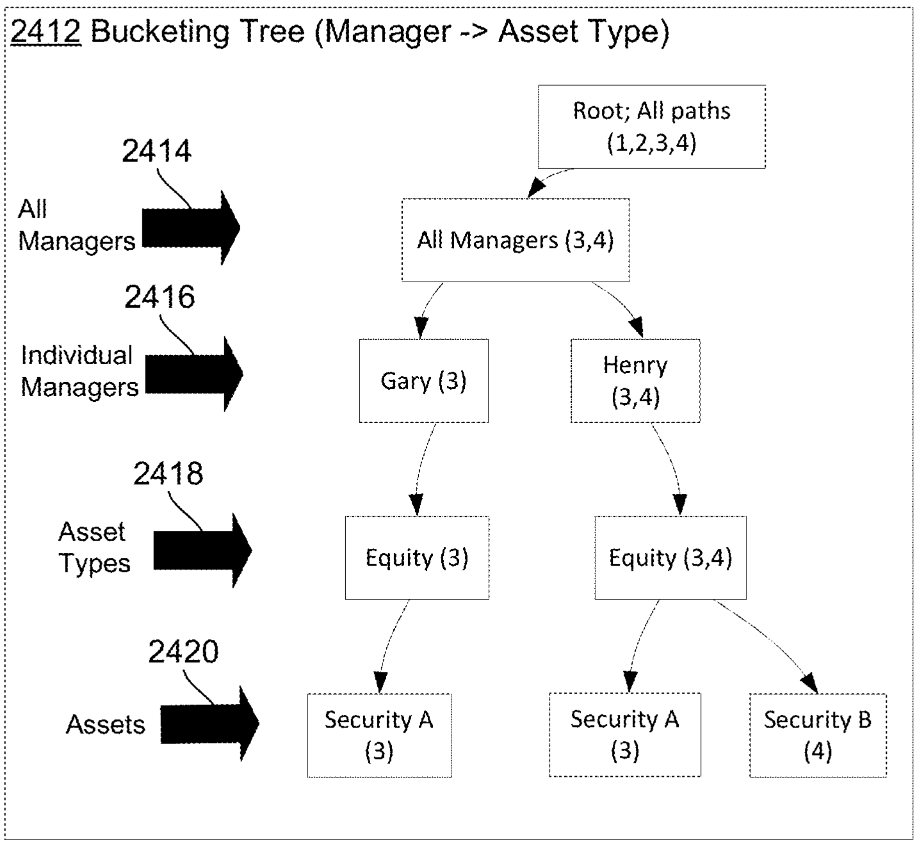

Blocks 1402, 1404, 1406, 1408, 1410, 1414, and 1416 proceed generally as described above with reference to FIG. 16. A simplified example of the process is illustrated by FIGS. 24A-24E with reference to simplified graph 2402 of FIG. 24A (similar to the simplified example of FIGS. 15A-15C). Briefly, at block 1402, the graph is traversed so as to enumerate all paths with respect to the selected perspective. In this example, the perspective is Bob, and the graph 2402 is traversed so as to enumerate the paths as shown in FIG. 24B. At block 1404, a bucketing tree is generated (as described above) based on the selected bucketing factors. In this example, the bucketing factors include a hierarchical arrangement of Manager and then Asset Type. Accordingly, an example bucketing tree 2412 is generated as shown in FIG. 24C. As shown, the paths are organized into various value nodes corresponding to rows that will be inserted in the table. Values nodes 2414 include all managers, value nodes 2416 include each value of the manager attribute found in the paths, value nodes 2418 include asset types found in the paths, and value nodes 2420 include each of the individual assets.

As described above, at blocks 1406, 1408, and 1410, each value node of the bucketing tree is processed so as to calculate each of the column values associated with that value node (see block 1416), each column factor associated with a given value node is processed so as to calculate the relevant column value, which relevant column value is calculated as each path associated with a given value node is processed so as to generate a path value (see block 1416) that may be aggregated to calculate the relevant column value (see block 1414).

Figures 24D, 24E:
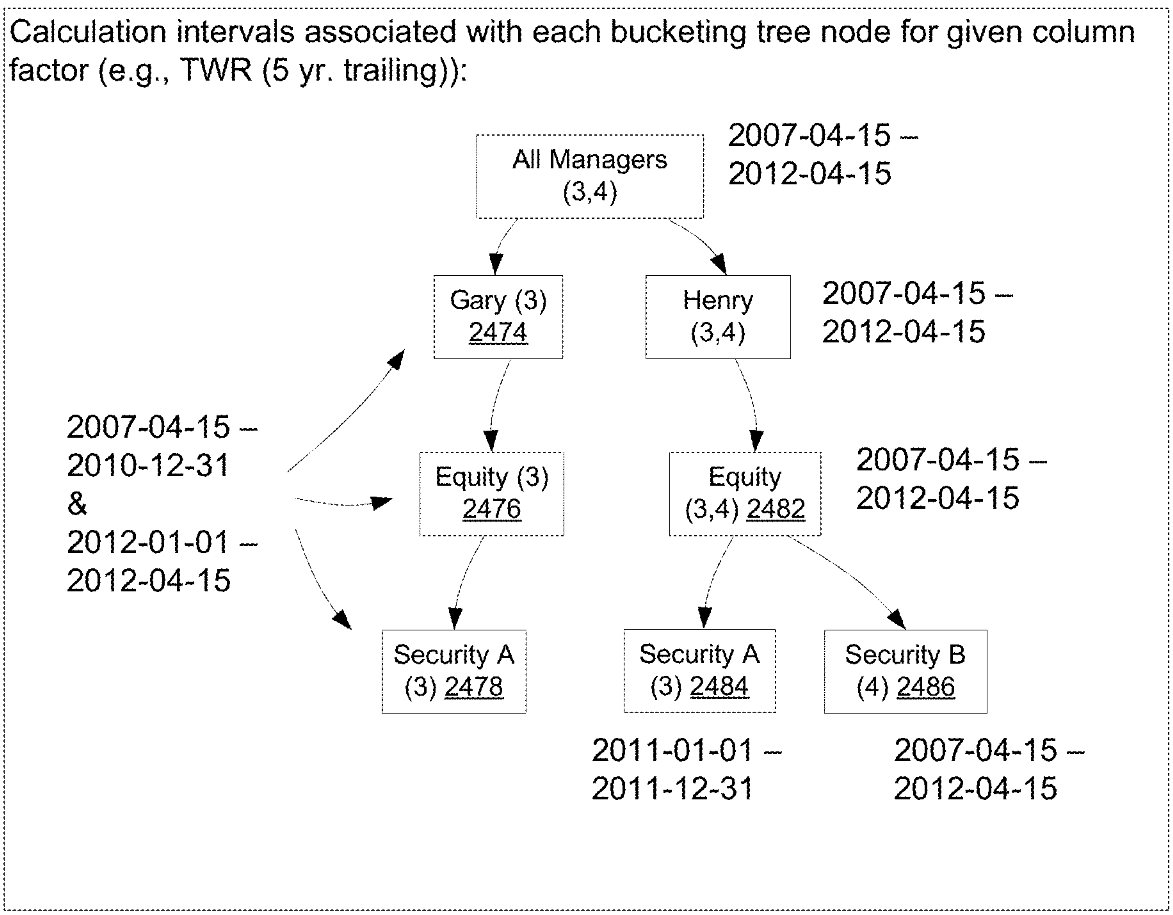

Within the processing of each path associated with a value node as shown in blocks 1410 and the loop arrow 1426, the path values are calculated in blocks 2302, 2304, and 2306 taking into account time varying attributes. In block 2302, first the calculation intervals associated with the given path and column factor are calculated as described in reference to FIG. 22C. This process is illustrated in the simplified example in FIGS. 24D and 24E. In particular, in FIG. 24D the time varying attributes relevant to the current table are determined (as described in reference to block 2292 of FIG. 22C). In this example, the only time varying attribute that is relevant is the Manager attribute. Then, in FIG. 24E, the calculation intervals are determined for each of the paths for the given column factors (as described in reference to blocks 2294, 2296, and 2298 of FIG. 22C). In the example of FIG. 24E, the given column factor is TWR 5 year trailing, and the calculations of each of the time intervals relevant to each path were described in reference to FIGS. 22B and 22C. For various values nodes of the bucketing tree associated with multiple paths, the intervals are further intersected. Thus, for example, the Henry value node 2480 is associated with both paths 3 and 4 as calculated with respect to value nodes 2484 and 2486, and thus the relevant calculation interval is 2007-04-15 to 2012-04-15 (as this is the intersection of 2011-01-01 to 2011-12-31 associated with value node 2484 and 2007-04-14 to 2012-04-15 associated with value node 2486). Similarly, each of values nodes 2474, 2476, and 2478 is associated with calculation intervals calculated as described above in reference to FIG. 22B (2007-04-15 to 2010-12-31 and 2012-01-01 to 2012-04-15).

Having calculated the calculation intervals associated with each combination of value node and column factor, in block 2304, for each calculation interval of the relevant value node and column factor being determined, an interval value is calculated. The interval value is calculated similar to the calculation of the path value described above in reference to block 1412 of FIG. 14. In particular, the relevant path of the graph is traversed and a path value is calculated based on attributes associated with relevant nodes and/or edges of the graph in the path, taking into account the calculation intervals. For example, suppose the TWR 5 year trailing of value node 2486 (of FIG. 24E) is to be calculated. The relevant paths include only path 4, and the calculation intervals including only 2007-04-14 to 2012-04-15. Accordingly, path 4 of the graph 2402 is traversed, including nodes B, C, and E, so as to determine, for Bob's investment in Security B, what the TWR is from 2007-04-14 to 2012-04-15. This calculation accounts for, for example, any incremental investments or sales made by Bob within the calculation interval (which are indicated by attributes associated with edges connecting Bob (node B) to "C" Trust (node C) and "C" Trust (node C) to Security B (node E) in graph 2402), and any changes in the value of Security B within the calculation interval (which are indicated by attributes associated with node B). Any other metrics may be calculated by the system as described above in an analogous manner for each applicable calculation interval.

At block 2306, the calculation interval values calculated in block 2304 are aggregated so as to determine a total path value. In the example above in which the path value is calculated for value node 2486, only one calculation interval is represented so no aggregation is needed (for example, the calculation interval value will be equal to the path value). Accordingly, the system determines a TWR 5 year trailing for Security B that is attributable to Henry (for example, 9% as shown in FIG. 22A). However, when multiple calculation intervals are associated with a path (as is the case with, for example, value node 2478) the calculation interval values for each are aggregated so as to determine a total path value. For example, in the case of TWR 5 year trailing for value node 2478, a value is determined for each time interval 2007-04-15 to 2010-12-31 and 2012-01-01 to 2012-04-15. Then the values are aggregated to arrive at a total TWR 5 year trailing for Security A that is attributable to Gary (for example, 8% as shown in FIG. 22A).

As described above, any metrics may be calculated by the system, and TWR and asset value are only provided as examples. Examples of other metrics include rate of return, IRR, cash flow, average daily balance, and/or the like. Various metrics may be associated with particular interval value aggregation techniques and/or path value aggregation techniques. For example, calculation of IRR for disparate time intervals may include calculation of IRR for each individual time interval (accounting for cash flows during those time intervals), followed by a designation of artificial cash flows for the start and end of each time interval such that and IRR across all the time intervals may be calculated. Other similar process may be applied to interval value aggregation and/or path value aggregation for various other metrics.

As mentioned above, when no calculation intervals are determined to be associated with a value node, no entry is provided in the table, and no value node may be represented in the bucketing tree (for example, no value node is included in the bucketing tree of FIG. 24E corresponding to Security A as managed by Gary).

Advantageously, according to some of the embodiments described herein, the same graph traversal process as described with reference to FIG. 14 may be adapted to account for time varying attributes, as described in reference to FIG. 23. In particular, the path value calculation process may be expanded to include consideration of time intervals associated with each path.

In some embodiments, values of time varying attributes associated with a particular data item may overlap. For example, a particular asset may be managed by two managers during a particular period of time, and also by each of the managers individually during other different periods of time. The graph traversal process in such embodiments proceeds as described above, however certain time intervals may overlap calculation interval determination.

Thus, the system advantageously, according to some embodiments, automatically calculates complex data based on time varying attributes via graph traversal. As described above, the user may advantageously edit the table so as to change the categorization, add or remove column factors, apply filters, and/or the like, and in response the system automatically and dynamically re-traverses the graph, calculates new data values, and updates the table of the user interface. No previous systems have been as powerful, flexible, and/or processor and memory efficient. Further, the system compactly presents complex time varying information to the user more efficiently than previous systems and methods.

While the present disclosure has largely described the system with respect to a Manager time varying attribute, it is to be understood that any other attribute may be time varying, and the table may be categorized according to any other attribute. As an example, a geographical time varying attribute may be applied to assets. For example, a particular stock may initially be considered a European stock. However, over time the stock may transition to being a primarily US stock. Accordingly, the geography attribute associated with the stock may vary with time, and the user may organize the table according to geography of assets (and thus metrics will be calculated by the system based on the time varying geography attribute). Numerous other examples may be provided and are intended to fall within the scope of the present disclosure.

8.0 Data Caching

In various embodiments the system may cache data generated by graph traversals so as to speed up computation of data for table generation and/or speed up graph traversals. For example, in various embodiments the system may automatically store enumerated paths, calculated bucketing trees, and/or calculated column values. Accordingly, the system may, in future graph traversals, and when no changes have been made to at least portions of the graph that would invalidate such caches, utilize such caches to speed up computations. Accordingly, in these embodiments the system may reduce computational needs and speed up generation of tables and user interfaces requested by the user.

In another example, the system may cache calculated calculation intervals, calculated calculation interval values, path values, and/or the like. Further, the system may automatically determine that two or more sets of calculation intervals are equal to one another. For example, calculation of the following two metrics have the same associated time intervals: Current IRR (wherein the current date range is 2001-2002) and IRR 1 year trailing (wherein the current date is 2002). The system may automatically determine that the two time intervals are the same, and may therefore cache calculation interval value calculations from one to be used with respect to the other.

9.0 Hardware Overview

According to various embodiments, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 25:
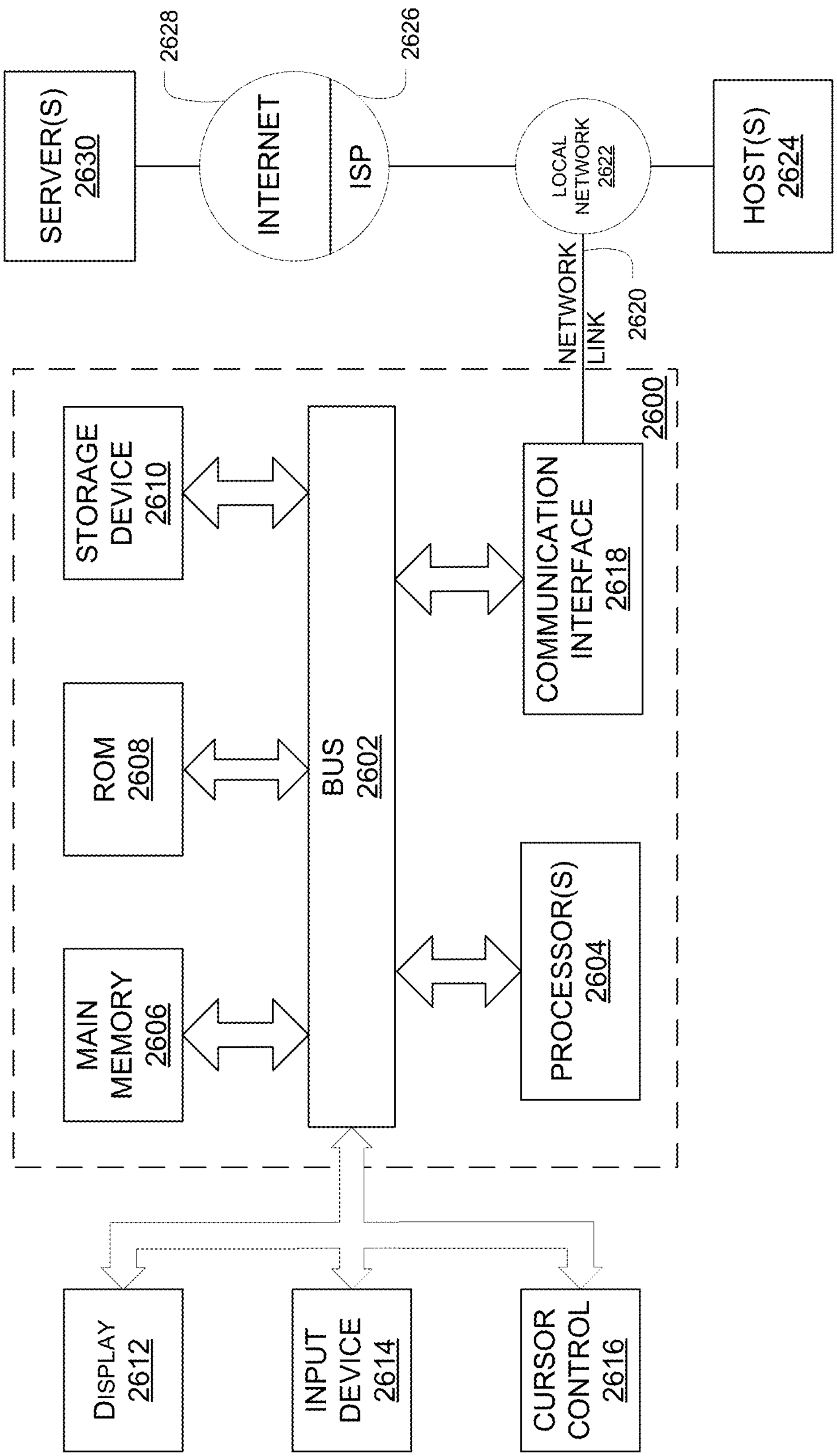
FIG. 25 illustrates a computer system with which various embodiments may be implemented.

For example, FIG. 25 is a block diagram that illustrates a computer system 2600 upon which various embodiments of the invention may be implemented. Computer system 2600 includes a bus 2602 or other communication mechanism for communicating information, and a hardware processor 2604 coupled with bus 2602 for processing information. Hardware processor 2604 may be, for example, a general purpose microprocessor. In various embodiments, one or more of the memory 200, data repository 204, table view 205, view computation unit 206, rendering unit 207, report unit 209, graph model logic 212, custodian interface unit 213, and/or the like, may be implemented on the computer system 2600. For example, the various aspects of the systems described in reference to FIG. 2A may be stored and/or executed by the computer system 2600.

Computer system 2600 also includes a main memory 2606, such as a random access memory (RAM) or other dynamic storage device, coupled to bus 2602 for storing information and instructions to be executed by processor 2604. Main memory 2606 also may be used for storing temporary variables or other intermediate information during execution of instructions to be executed by processor 2604. Such instructions, when stored in non-transitory storage media accessible to processor 2604, render computer system 2600 into a special-purpose machine that is customized to perform the operations specified in the instructions.

Computer system 2600 further includes a read only memory (ROM) 2608 or other static storage device coupled to bus 2602 for storing static information and instructions for processor 2604. A storage device 2610, such as a magnetic disk or optical disk, is provided and coupled to bus 2602 for storing information and instructions.

Computer system 2600 may be coupled via bus 2602 to a display 2612, such as a cathode ray tube (CRT), for displaying information to a computer user. An input device 2614, including alphanumeric and other keys, is coupled to bus 2602 for communicating information and command selections to processor 2604. Another type of user input device is cursor control 2616, such as a mouse, a trackball, or cursor direction keys for communicating direction information and command selections to processor 2604 and for controlling cursor movement on display 2612. This input device typically has two degrees of freedom in two axes, a first axis (e.g., x) and a second axis (e.g., y), that allows the device to specify positions in a plane.

Computer system 2600 may implement the techniques described herein using customized hard-wired logic, one or more ASICs or FPGAs, firmware and/or program logic which in combination with the computer system causes or programs computer system 2600 to be a special-purpose machine. According to one embodiment, the techniques herein are performed by computer system 2600 in response to processor 2604 executing one or more sequences of one or more instructions contained in main memory 2606. Such instructions may be read into main memory 2606 from another storage medium, such as storage device 2610. Execution of the sequences of instructions contained in main memory 2606 causes processor 2604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 2610. Volatile media includes dynamic memory, such as main memory 2606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 2602. Transmission media can also take the form of acoustic or light waves, such as those generated during radio-wave and infra-red data communications.

Various forms of media may be involved in carrying one or more sequences of one or more instructions to processor 2604 for execution. For example, the instructions may initially be carried on a magnetic disk or solid state drive of a remote computer. The remote computer can load the instructions into its dynamic memory and send the instructions over a telephone line using a modem. A modem local to computer system 2600 can receive the data on the telephone line and use an infra-red transmitter to convert the data to an infra-red signal. An infra-red detector can receive the data carried in the infra-red signal and appropriate circuitry can place the data on bus 2602. Bus 2602 carries the data to main memory 2606, from which processor 2604 retrieves and executes the instructions. The instructions received by main memory 2606 may optionally be stored on storage device 2610 either before or after execution by processor 2604.

Computer system 2600 also includes a communication interface 2618 coupled to bus 2602. Communication interface 2618 provides a two-way data communication coupling to a network link 2620 that is connected to a local network 2622. For example, communication interface 2618 may be an integrated services digital network (ISDN) card, cable modem, satellite modem, or a modem to provide a data communication connection to a corresponding type of telephone line. As another example, communication interface 2618 may be a local area network (LAN) card to provide a data communication connection to a compatible LAN. Wireless links may also be implemented. In any such implementation, communication interface 2618 sends and receives electrical, electromagnetic or optical signals that carry digital data streams representing various types of information.

Network link 2620 typically provides data communication through one or more networks to other data devices. For example, network link 2620 may provide a connection through local network 2622 to a host computer 2624 or to data equipment operated by an Internet Service Provider (ISP) 2626. ISP 2626 in turn provides data communication services through the world wide packet data communication network now commonly referred to as the "Internet" 2628. Local network 2622 and Internet 2628 both use electrical, electromagnetic or optical signals that carry digital data streams. The signals through the various networks and the signals on network link 2620 and through communication interface 2618, which carry the digital data to and from computer system 2600, are example forms of transmission media.

Computer system 2600 can send messages and receive data, including program code, through the network(s), network link 2620 and communication interface 2618. In the Internet example, a server 2630 might transmit a requested code for an application program through Internet 2628, ISP 2626, local network 2622 and communication interface 2618.

The received code may be executed by processor 2604 as it is received, and/or stored in storage device 2610, or other non-volatile storage for later execution.

10.0 Summary Data

FIGS. 26A-26C are similar to FIGS. 15A-15C, and illustrate another example traversal of the simplified graph 1502. As described above in reference to FIG. 15A, FIG. 26A depicts simplified graph 1502 with six nodes and relationships between the various nodes indicated by the edges. The simplified examples described below in reference to FIGS. 26A-26C (and other related figures) are provided for illustrative and clarity purposes. The processes and methods described herein may be used with any larger or smaller graph data structures.

According to an embodiment, FIG. 26B illustrates an aspect of traversal of the graph 1502 in which the context provided in the process of graph-to-table transformation further includes optional filters. As shown in FIG. 26B, the user has not selected a filter for the context. The context further includes the perspective "Bob" and the "Asset Type" bucketing factor that has been selected by a user. Additionally, an "Asset Value on 2012 Apr. 15" column factor (e.g., a metric) has been selected for the context. Accordingly, the generated table will include at least one column showing asset values on the date of 2012 Apr. 15 corresponding with each of the various rows of the table, rather than the asset values as of the current date on which the table is being generated (as in the example of FIG. 15B).

As described in regards to FIG. 15C, FIG. 26C also depicts bucketing tree 1512 associated with graph 1502. As with FIG. 15C, FIG. 26C includes the bucketing tree 1512 which includes root node 1514, child nodes 1516 corresponding to types of assets, and further child nodes 1518 corresponding to actual individual assets. The paths associated with each of the nodes are also indicated in respective nodes, as described above. Bucketing tree 1512 is similar in both FIGS. 15C and 26C because the perspective, the bucketing factor(s), and paths from traversing graph 1502 are not changed. However, the selected "Asset Value on 2012 Apr. 15 column factor", and/or any selected filters, in FIG. 26B may adjust or influence the mechanism by which the system determines the column factor value for the corresponding rows of the generated table.

Further, as is described in detail below, column factors may be calculated using multiple types of data. More specifically, the "Asset Value" on the date 2012-04-15 may be determined using "transaction data," "summary data," or a combination of "transaction data" and "summary data."

Much of the discussion above (e.g., in reference to FIGS. 1A-1B, 2A-2B, 3A-3B, 14, 15A-15C, 23, 24A-24E, etc.) has involved performing calculations and generating tables with "transaction data." As used herein, the term "transaction data" is a broad term including its ordinary and customary meaning, and further includes, but is not limited to, highly granular data from individual financial transactions. Transaction data may include, for example, investment holding data, position data, security and/or asset value data (e.g., values of individual stocks), and/or the like, as they relate to individual transactions. Transaction data may be associated with a graph of the system, as described above, and may be accessed in graph traversal and table generation processes, as also described above. Advantageously, transaction data, when it is available, may allow for various metrics (such as an "Asset Value" column factor) to be calculated in real-time or substantially real-time, as described above. Transaction data may also allow for metrics to be calculated with a high degree of control and precision. However, as alluded to, in some instances transaction data may not be available or desired for a certain metrics and/or time periods.

As used herein, the term "summary data" is a broad term including its ordinary and customary meaning, and further includes, but is not limited to, previously calculated metrics. Summary data may include, for example, a previously calculated return (e.g., Internal Rate of Return (IRR)) for an asset or portfolio of assets. In general, while the previously calculated metrics of summary data are based upon some transaction data, that transaction data may not be available to the system. Accordingly, as described below, summary data may be useful in providing additional information to the user (e.g., via tables in user interfaces) where similar metrics may not be calculable due to an absence of necessary transaction data. In other instances, both transaction data and summary data may be available, and the two types of data may be combined, and/or the user may select one or the other based on their preferences. Summary data may also be referred to herein as "historical data." As an example, summary data may be obtained from a previous manager of a financial portfolio. It may be more efficient and advantageous, as described below, to add the summary data to the system (and use the summary data for metric calculations) rather than obtain all transaction data upon which the summary data metrics depend. In some instances, clients may prefer the use of summary data (rather than re-calculation of metrics based on transaction data) in tables and reports as the summary data metrics may match or more closely align with metrics in previous tables and reports.

Summary data is may be stored as a time series, and it may provide a summary or snapshot of metrics values at points in time within the time interval. As described below, summary data may be implemented in the graph traversal and table generation process in various ways. With regards to FIGS. 26A-26C (and the associated description in reference to other figures below), the data being used by the system in order to determine the "Asset Value on 2012 Apr. 15" column factor may be summary data, transaction data, or a combination of both types of data.

For example, the "Stocks" node in FIG. 26C is associated with paths 3 and 5. According to one embodiment, each of paths 3 and 5 may be individually assessed by the system in order to determine a value of both Stock "D" and Stock "F" associated with Bob on the specific date 2012-04-15. Transaction data may be available that shows, on the date of 2012 Apr. 15, Bob owned 50% of Trust "C" when it had only $500 of Stock "D," and that Bob owned 50% of Trust "C" when it had only $1000 of Stock "F". The system may aggregate these determined values and display $1500 in the row and column of the table corresponding to "Stocks" and value (as of 2012-04-15) according to the graph traversal and table generation processes described above.

According to an embodiment, summary data may be available so that metrics may be determined, in whole or in part, based on summary data. For example, in the example of FIG. 26C, values for each of paths 3 and 5 of the "Stocks" node may be determined, in whole or in part, based on such summary data. E.g., summary data may be available that directly shows that, on the specific date 2012-04-15, Bob owned $500 of Stock "D" and $1000 of Stock "F." The system may aggregate these existing values and display $1500 in the row and column of the table corresponding to "Stocks" and value (as of 2012-04-15).

Thus, according to an embodiment, the system may or may not consider paths 3 and 5 in order to determine the asset value for stocks associated with Bob on the specific date 2012-04-15. Rather, in some instances summary data may already be available for the asset value of all stocks associated with Bob on the specific date 2012-04-15. Such summary data may directly show that, on the date of 2012 Apr. 15, Bob owned $1500 in "Stocks." Rather than performing a calculation based on transaction data, the system may thus utilize this summary data as the value for the "Asset Value on 2012 Apr. 15" column factor when generating the row of the table corresponding to "Stocks."

According to an embodiment, the system may determine whether or not summary data is available for certain metric calculations, and/or whether the user prefers that summary data or transaction data be used for metric calculations. Further, the system may combine multiple summary data items and/or transaction data items to calculate certain metrics. For example, in reference to FIG. 26C, for the asset value of all stocks associated with Bob on the specific date 2012-04-15, if summary data providing this value is available, then the system may use that summary data as the value for the "Asset Value on 2012 Apr. 15" column factor when generating the row of the table corresponding to "Stocks." However, if such overall "Stocks" summary data is not available, then the system may be able to determine whether individual summary data is available for the asset value of Stock "D" and the asset value of Stock "F" associated with Bob on the specific date 2014-04-15. If so, the system may then aggregate individual summary data values to use for the "Asset Value on 2012 Apr. 15" column factor when generating the row of the table corresponding to "Stocks." If that individual summary data is not available, then the system may be able to individually process paths 3 and 5 using transaction data in order to calculate asset values for Stock "D" and Stock "F" associated with Bob on the specific date 2012-04-15, and then aggregate these determined values to use for the "Asset Value on 2012 Apr. 15" column factor when generating the row of the table corresponding to "Stocks." Further, as mentioned above, in some embodiments that user may specify a preference that the system use one or more types of summary data and/or transaction data for certain metrics.

Figure 27A:
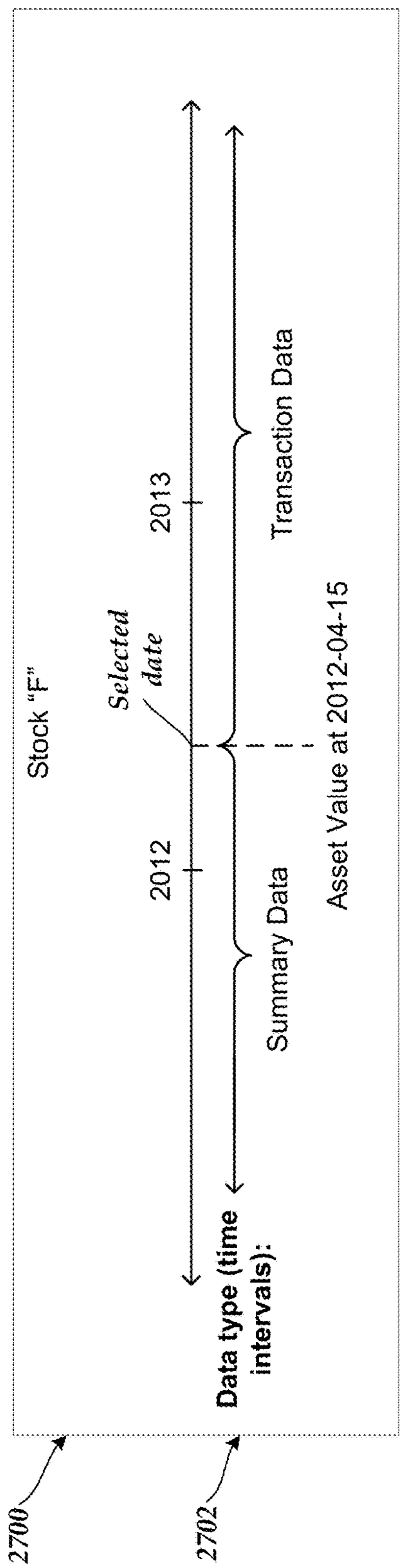
FIGS. 27A-27B illustrate summary data and transaction data that may be associated with assets and may be used to determine asset value on specific dates.
Figure 27B:
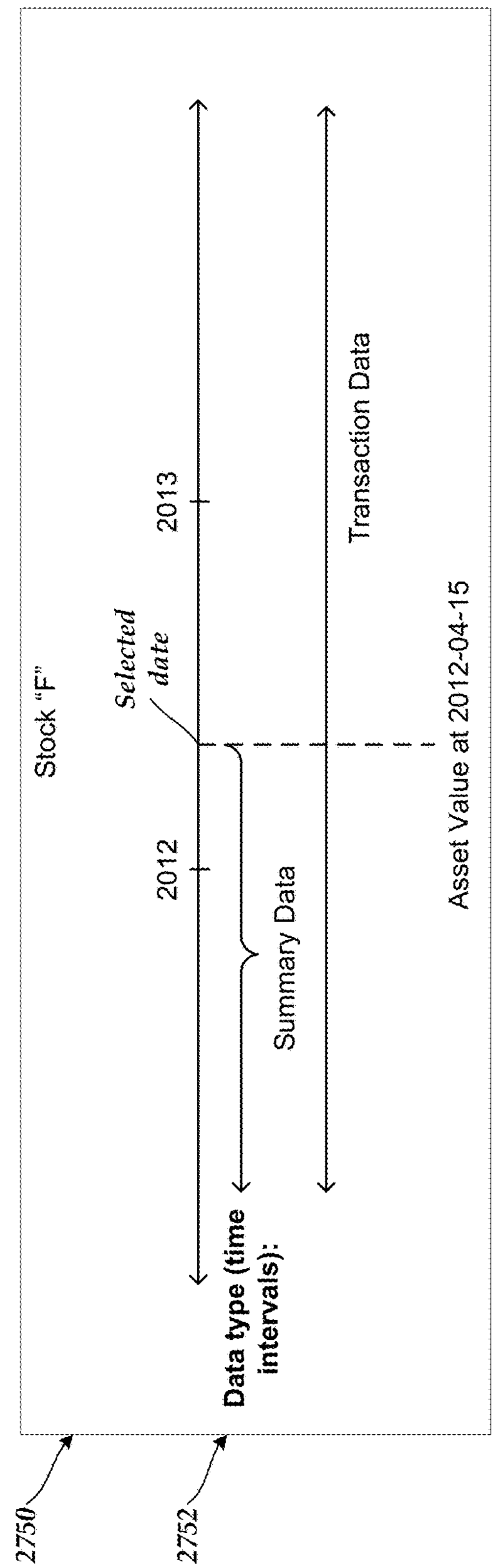

FIGS. 27A and 27B illustrate summary data and transaction data that may be associated with assets and may be used to determine asset value on specific dates. In particular, both figures illustrate the determination of Stock F's "Asset Value on 2012 Apr. 15" by first determining the relevant time intervals associated with available data types associated with Stock F.

FIGS. 27A and 27B illustrate a scenario in which the selected date of 2012 Apr. 15 is within the time interval for available summary data, so that the asset value can be determined solely using summary data. This scenario is not always reflective of how summary data may be implemented or whether summary data may be available, but it is shown here to facilitate the understanding of summary data implementation. More complex scenarios in which the selected column factor is calculated by combining available summary data and transaction data are illustrated in FIGS. 37A and 37B.

Referring to FIG. 27A, a timeline 2700 illustrates one scenario in which summary data may be used to calculate the "Asset Value of Stock F at 2012-04-15" that is under Bob's ownership. Brackets 2702 show complimentary, non-overlapping time intervals for two different data types: transaction data and summary data. In this example, only summary data of Stock F's asset value is available for the time interval that includes times prior to, and including, the date 2012-04-15. No summary data is available after that date. However, transaction data is available that can be used in calculations of Stock F's asset value for selected dates after 2012-04-15.

Since the selected date of 2012 Apr. 15 is within the time interval in which summary data is available, summary data can be used in order to determine the asset value on that date. Using transaction data to determine the "Asset Value of Stock F at 2012-04-15" is not an option because the selected date is not within the time interval that in which transaction data is available. Thus, in one implementation, determining the "Asset Value of Stock F at 2012-04-15" involves directly taking the value from the summary data that is associated with the asset value of Stock F under Bob's ownership on 2012-04-15.

Referring to FIG. 27B, a timeline 2750 is shown that is similar to timeline 2700 in that it illustrates another scenario in which summary data may be used to calculate the "Asset Value of Stock F at 2012-04-15" that is under Bob's ownership. Brackets 2752 show overlapping time intervals for two different data types: summary data and transaction data. In this example, summary data of Stock F's asset value is available for the time interval that includes times prior to, and including, the date 2012-04-15. However, unlike in FIG. 27A, here the transaction data is also available for the time interval that includes times prior to, including, and after the date 2012-04-15.

The summary data and transaction data have an overlap in availability on the selected date of 2012 Apr. 15, in FIG. 27B. Since the selected date of 2012 Apr. 15 is within the time interval in which summary data is available, summary data can be used in order to determine the asset value on that date. Using transaction data is also an option because the selected date is also within the time interval in which transaction data is available. Thus, the "Asset Value of Stock F at 2012-04-15" can be calculated using transaction data through the graph traversal methods as described previously herein, or the calculation can be "overridden" by the use of summary data which would involve directly using the asset value of Stock F under Bob's ownership on 2012-04-15 that is within the summary data.

According to an embodiment, the system may be configured to override a column factor value calculation involving transaction data when there is summary data available. There may be computational benefits to using summary data when the summary data spans a sufficiently large time interval, such that the column factor value can be determined solely using summary data. In some cases, using summary data reduces the amount of computation needed to fill out the corresponding column factor values in the generated table because it does not utilize the graph traversal method previously described herein. There may also be practical benefits to using summary data. Transaction data may come from a different source than summary data, or calculations involving transaction data may produce different column factor values than those populated using strictly summary data. In these circumstances, the summary data values may be preferred. Thus, the system can be configured to use summary data for column factor values whenever summary data is available.

Alternatively, the system may be configured to use transaction data rather than summary data, even with summary data is available. In another alternative, the system may be configured to user some combination of transaction data and summary data, as described in certain examples below. In some implementations, the user may provide a preference for the use of transaction data, summary data, and/or a combination of the two, as described below.

Figure 28:
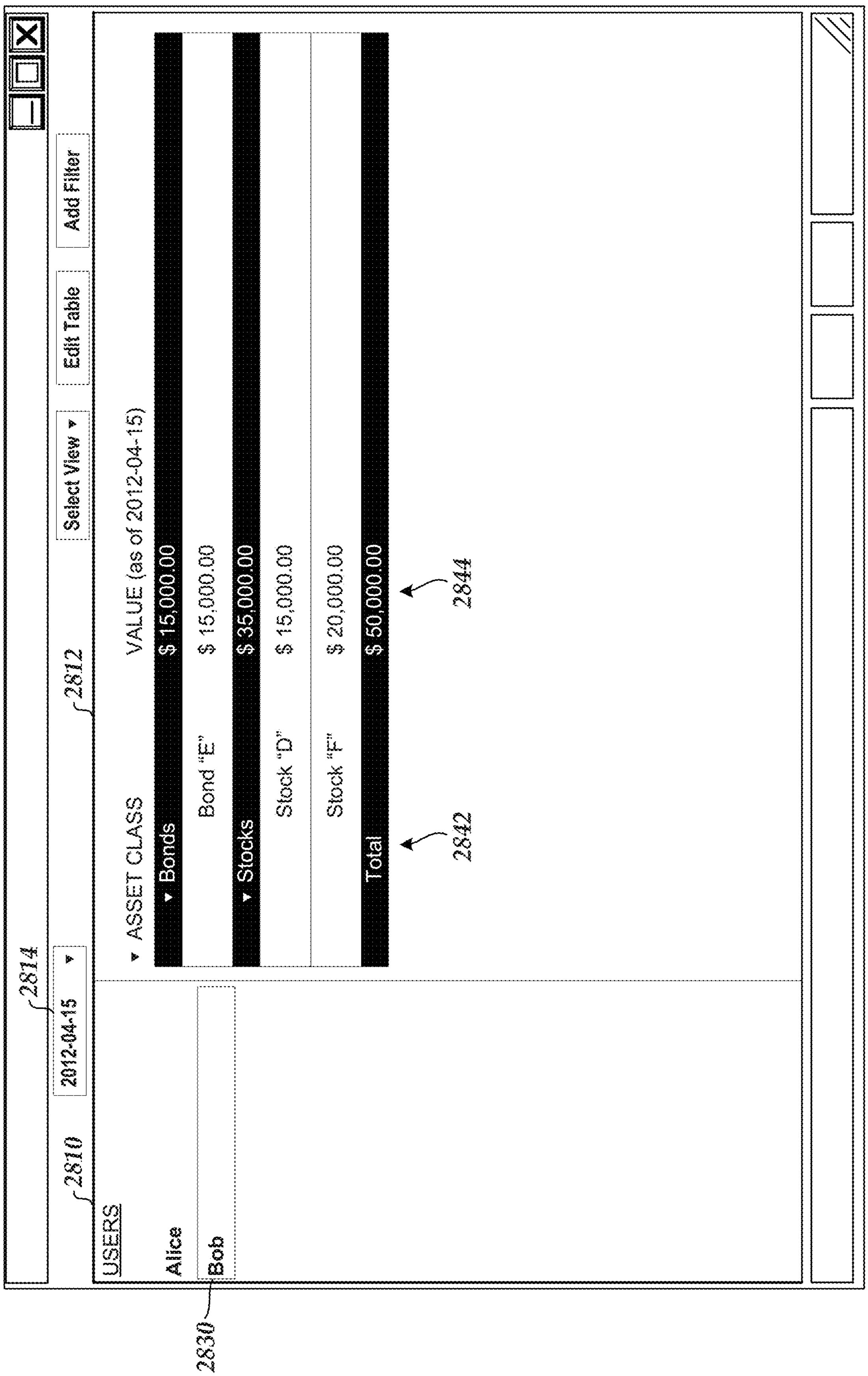
FIG. 28 illustrates an example user interface of the system in which summary data may be presented in a table to the user.

FIG. 28 illustrates an example user interface, similar to the example user interface of FIG. 1A, of the system in which data is presented to the user in a table format that may implement summary data as described in reference to FIGS. 26A-26B and 27A-27B. In particular, the example user interface of FIG. 28 illustrates a generated table with an Asset Value (as of 2012-04-15) column factor, for which the values may be determined through the use of transaction data, summary data, or both. Being similar to the user interface of FIG. 1A, the descriptions of features provided in reference to FIG. 1A may similarly be applied to any features not described in reference to FIG. 28.

The example user interface of FIG. 28 includes two primary display portions 2810 and 2812. Within a right display portion 2812 the user interface displays a table of financial data associated with a particular individual, a group, or a legal entity. Specifically, the table displays a listing of financial assets associated with the particular individual, group, or legal entity, organized in a hierarchical fashion, as well as various metrics associated with the listing. A left display portion 2810 includes a listing of various clients and/or perspectives. As described in detail herein, user interfaces of the system are, accordingly to some embodiments, generated with respect to a particular context.

A context may include a perspective and/or a date. In some embodiments, the perspective identifies any of an individual, a group, and/or a legal entity, each of which may, in some embodiments, correspond to clients of a user of the system. Accordingly, the display portion 2810 includes a listing of various selectable perspectives (or clients), with a particular client "Bob" 2830 being selected (as indicated by a box outline).

The example user interface of FIG. 28 further includes a date selection box 2814. As described, the context of the user interface may include a date which may be specified by the user via the date selection box 2814 (by, for example, direct input of a desired date and/or selection of a date in a dropdown list or calendar widget).

In the example user interface of FIG. 28, the table displays various information associated with the selected context (including the perspective, Bob, and the date, 2012-04-15), and based on other inputs from the user including a specification of a metric (value as of 2012-04-15 in column 2844) and a particular hierarchical organization of information (as shown in column 2842). Specifically, the table shows financial assets associated with Bob as of 2012-04-15, organized according to a type of the financial assets. Further, the metric of value (as of the date of the current context 2012-04-15) associated with the assets (and various groups of the assets) are displayed. Column 2842 shows each asset, including Bond "E", Stock "D", and "Stock "F", organized by a type of the asset (in the example, both Stock "D" and Stock "F" are of the type Stock). Column 2844 shows the metric of each asset's value as of 2012-04-15.

In various embodiments, the system may calculate the values of metrics based on transaction data. This may involve calculating time intervals applicable to the calculations of various metrics. For example, in the user interface of FIG. 28, the system calculates asset value metrics for which a single date or time is applicable (2012-04-15). In other examples, the system may calculate metrics that span periods of time such as a rate of return of an asset over a number of years. Accordingly, the system may determine a set of time intervals associated with the metric, a set of time intervals associated with applicable time varying attributes of graph data, and determine in intersection of the two sets of time intervals. The calculated intersection of the sets of time intervals may then be inputted into the complex graph traversal process to calculate metric values for display in compact and efficient user interfaces of the system.

In some embodiments, the system may determine the values of metrics based on summary data. This may also involve determining a set of time intervals associated with the metric, although for asset value metrics only a single date or time is applicable. The determined set of time intervals, along with the metric, the context (perspective and date), and any filters can all be used in order to determine whether the corresponding summary data exists in a database, a process which is described in more detail in regards to FIGS. 29A-29C and 32-35. If summary data is available, the values of the metrics may be determined from the summary data, without reference to transaction data. For example, if asset value (as of 2012-04-15) metrics for each of the assets of the example user interface of FIG. 28 are available, then the table of FIG. 28 may be generated based on summary data, without graph traversal. The asset value (as of 2012-04-15) metric for the asset groups, Bonds and Stocks, may be available from summary data or compiled by summing the values for the assets in that asset group.

In some embodiments, the system may determine the values of metrics based on transaction data, summary data, or a combination of both. The types of data used to determine the values of metrics may depend on the availability of transaction or summary data, as well as the preferences of the user. Some metrics may be calculated using both transaction data and summary data, and examples of such calculations are described in more detail in regards to FIGS. 37A and 37B. Some users may wish to determine the values of a metric by overriding transaction data if summary data is available. The system may allow a user to specify these options through a user interface, and such user interfaces are described in more detail in regards to FIGS. 38-45. The user interface may also have indicators that notify the user when the values of metrics are being calculated based on transaction data, summary data, or a combination of both. Some examples of such indicators are shown in FIGS. 42 and 45.

FIGS. 29A-29C illustrate how summary data may be stored and looked-up in a database. More specifically, FIGS. 29A-29C illustrate how a chosen perspective, filter, bucketing factor(s), and column factor (see, for example, FIG. 26B) may be used to look up summary data in a database for use in, for example, a table of a user interface (such as the Asset Value (as of 2012-04-15) metric shown in Column 2844 of FIG. 28).

FIG. 29A illustrates a database table 2902 containing unique model identifiers (e.g., model IDs) that correspond to varying model attributes. Database table 2902 is shown for illustrative purposes and in order to facilitate understanding of the summary data implementation process of the current disclosure (according to certain embodiments), however the data represented in the database table 2902 may be stored and/or represented in any other suitable way.

Each model of the database table 2902 represents a specific set of attributes with which a set of summary data may be associated. The set of attributes generally include any and/or all items of information necessary to generate a particular table of metrics, as described herein. For example, the model attributes corresponding to each unique model ID in database table 2902 include a perspective, one or more filters, and one or more bucketing factors. Specifically in the example database table 2902, the model attributes correspond to the selected perspective (Bob), filter (none), and bucketing factor (Asset Type), selected in FIG. 26B. Each set of model attributes is associated with a unique model ID, which can then be used to look up in a database any summary data associated with those specific model attributes. For example, model ID “00001” is associated with a model including the following model attributes: a perspective of “Bob”, no filters, and certain bucketing factors (including, e.g., a “Stocks” node corresponding to an “Asset Type” bucketing factor). Additional bucketing factors may also be associated with models, depending on attributes associated with summary data of the system. In another example, model ID “00002” is associated with a model including the following model attributes: a perspective of “Bob”, no filters, and certain bucketing factors (including, e.g., a “Bonds” node corresponding to an “Asset Type” bucketing factor). While the model IDs of the example database table of FIG. 29A are five digit numerical numbers, any other suitable unique identifier, in any suitable format, may be used by the system.

FIG. 29B illustrates an example database table 2904 containing summary data. Database table 2904 is shown for illustrative purposes and in order to facilitate understanding of the summary data implementation process of the current disclosure (according to certain embodiments), however the data represented in the database table 2904 may be stored and/or represented in any other suitable way.

Within database table 2904, sets of summary data, represented by key-value pairs, are associated with specific model IDs. The model IDs in database table 2904 may correspond to the model IDs of database table 2902. Thus, the model ID links summary data, as stored in the summary data database table, with nodes of a bucketing tree (as indicated by model attributes, e.g., perspective, filters, and/or bucketing factors). Model attributes may be understood as indicating attributes associated with specific individual rows within a generated table of the user interface. Thus, the model attributes can be used as a procedural definition of the summary data that may be associated with calculating user-chosen metrics or column factors. In simpler words, there may be summary data associated with calculating the user-chosen metrics or column factors in a given row of the generated table. The model attributes consisting of perspective, filters, bucketing factors, and/or the like normally specify a row of the generated table but can also be used to define an “address” for which to look up the summary data for that row in the database table 2904 that contains all the summary data.

As seen in database table 2904, for a specific model ID there may be multiple key-value pairs. The key may correspond to a metric or column factor in the generated table, which may also be thought of as the calculation that the summary data is providing an override for. If the key for the metric exists, then the value of the key-value pair in the database table 2904 will contain the summary data for that metric, as shown in FIG. 29C. In some instances, the summary data values may be time series. Thus, for a particular model, the system may check the selected metric or column factor against each key of the associated key-value pairs in order to determine if summary data is available, as described in detail below.

For example, the table may have the “Asset Value at 2012-04-15” metric or column factor. In order to calculate that metric for the row corresponding to the total value of all stocks owned by Bob, the system may determine (e.g., without needing to perform graph traversal) that the row is associated with the following model attributes: a perspective from “Bob”, no filter, and “Asset Type” as a bucketing factor with “Stocks” as the value node. Database table 2902 shows that these model attributes are associated with unique model ID “00001”. The system may use that model ID and check the summary data database table 2904 to see if there is any summary data associated with that model ID. Database table 2904 has two key-value pairs associated with the “00001” model ID, which indicated to the system there are two key-value pairs associated with this specific row of the table. The system would then compare “Asset Value” against each key in the two key-value pairs, to find that the first key-value pair has the matching “Asset Value” key. This means that summary data is available for calculating the asset value of stocks owned by Bob. That key-value pair has a value that may be stored as a time series, and summary data may be taken from that time series in order to override and serve as the asset value of stocks owned by Bob on the date 2012-04-15.

FIG. 29C illustrates how values in the key-value pairs may be stored as time series in the database table 2904. In particular, FIG. 29C illustrates how both an Asset Value Time Series 2906 and a TWR (1 Year Trailing) Time Series 2908 are stored in the summary data database in association with model ID “00001”.

The Asset Value Time Series 2906 shows that using summary data for the asset value on the selected date of 2012 Apr. 15 involves a data point reflecting a single point in time. The asset value on that date for all stocks associated with Bob amounts to $35000. In contrast, the TWR (1 Year Trailing) Time Series 2908 shows that using summary data for TWR (1 Year Trailing) on the selected date of 2012 Apr. 15 may involve combining time series data over periodic time intervals. In this example shown, the TWR for each month is available in the time series. These monthly intervals can be seen in the illustration for TWR (1 Year Trailing) Time Series 2908. In order to determine TWR (1 Year Trailing) as of 2012-04-15, the system requires the TWR for each month of the 12 months immediately prior to 2012-04-15. That TWR data for those 12 months can be combined with monthly compounding in order to obtain a single value for TWR (1 Year Trailing) as of 2012-04-15, which is shown to be 5% in the illustration.

It should be noted that the determination of TWR represents a unique case for summary data implementation. As previously described, summary data typically consists of data in a time series. Calculation of some column factor values may be similar to calculation of the matric "asset value" in that each summary data point is a sum that is reported at a singular point in time. In contrast, time-weighted return is different because the data points are linked geometrically. Each summary data point for time-weighted return actually represents a percentage change over a time period. For example, "Time-weighted Return since Inception" for Stock F on a selected date may be a percentage value that is associated with the time period spanning from inception to the selected date. However, the summary data used for that value calculation may be in a periodic format; the summary data may have Stock F's time-weighted return for each day, or each month, or each year (or any other custom time frame), for example. Calculating Stock F's "Time-weighted Return since Inception" may involve compensating for the periodicity of the summary data by taking the summary data from inception to the selected date, then combining or stitching together that summary data in a way that compensates for the effects of compounding. As a simple example of this, assume that Stock F's "Time-weighted Return since Inception" may be associated with a short time period that includes only two months: January and February. Summary data for Stock F's time-weighted return may be available for that time period, but it may be in a monthly format so that there are two summary data values: one for January and one for February. If this summary data reported Stock F's time-weighted return over January as 10% and the time-weighted return over February as 10%, then Stock F's "Time-weighted Return since Inception" spanning both months can be calculated from the summary data to be 21% through compounding.

In contrast, determining an "asset value" from summary data is more straight forward because no further calculation is needed in order to determine asset value at a singular point in time. For example, summary data may be used to determine Stock F's asset value at the end of February. The summary data on Stock F's asset value may be available every day for a time period spanning from the beginning of January to the end of February. However, only the summary data on Stock F's asset value at the end of February is needed, and that value is directly used to report on Stock F's asset value at the end of February. The summary data on Stock F's asset values at earlier times is irrelevant because the asset value metric is a "snapshot" in time rather than associated with a time period.

Figure 30A:
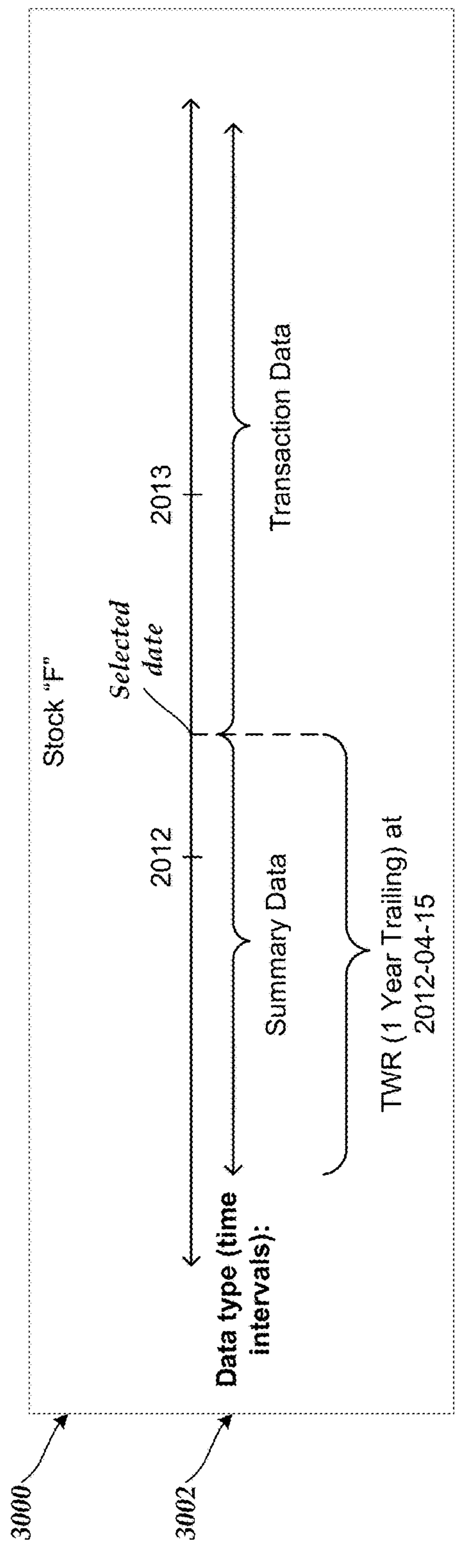
FIGS. 30A-30B illustrate how summary data and/or transaction data may be used to determine TWR (Since Inception) on a specific date.
Figure 30B:
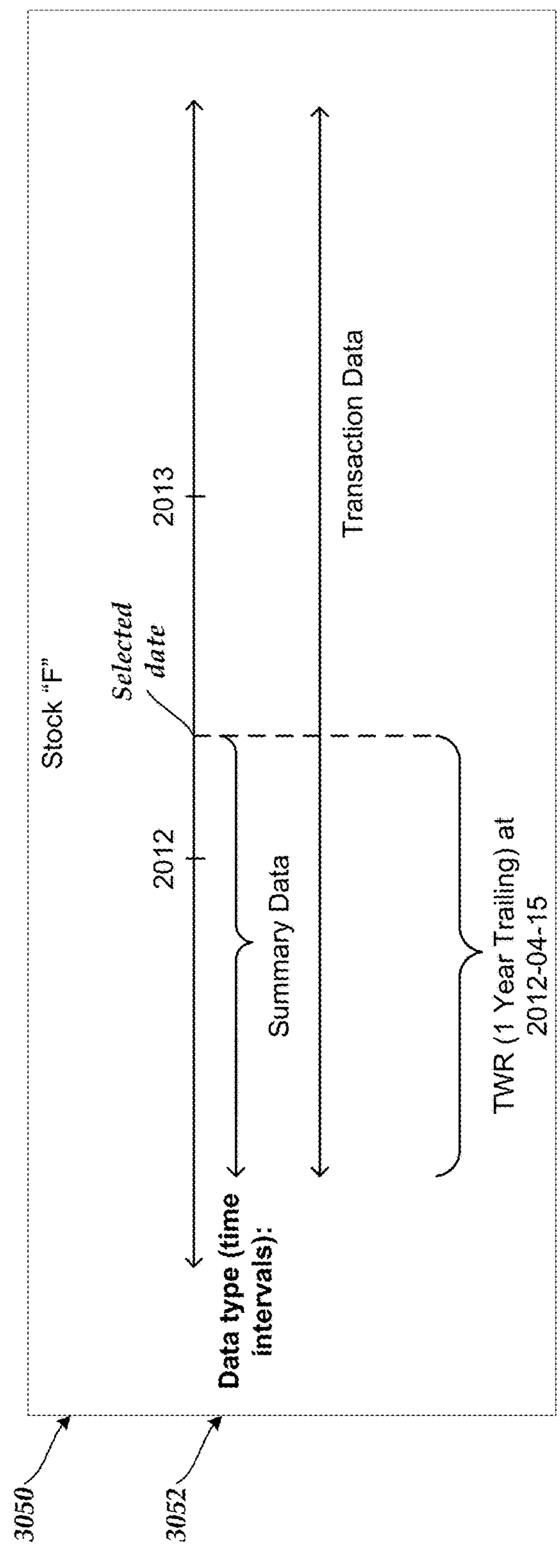

FIGS. 30A and 30B illustrate how summary data and/or transaction data may be used to determine TWR (since inception) on a specific date. In particular, both figures illustrate the determination of Stock F's "TWR at 2012-04-15" by first determining the relevant time intervals associate with available data types associated with Stock F.

It should be noted that FIGS. 30A and 30B illustrate a scenario in which the selected date of 2012 Apr. 15 is within the time interval for available summary data, so that the value for TWR (since inception) can be determined solely using summary data. This scenario is not always reflective of how summary may be implemented, but it is shown here to facilitate the understanding of summary data implementation. More complex scenarios in which the selected column factor is calculated by combining available summary data and transaction data are illustrated in FIGS. 37A and 37B.

FIG. 30A has a timeline 3000 that illustrates one scenario in which summary data may be used to calculate "TWR at 2012-04-15" for the Stock F under Bob's ownership. Brackets 3002 show non-overlapping time intervals for two different data types: summary data and transaction data. In this example, only summary data for Stock F's TWR is available for the time interval that includes times prior to, and including, the selected date 2012-04-15. No summary data is available after that date. However, transaction data is available that can be used in calculations for determining Stock F's TWR for selected dates after 2012-04-15.

Since the selected date of 2012 Apr. 15 is within the time interval in which summary data is available, summary data can be used in order to determine the TWR (since inception) on that date. Using transaction data is not an option because the selected date of 2012 Apr. 15 is not within the time interval that transaction data is available for. Note that the summary data of the earlier time interval may be of a time series over that time interval, as described in regards to FIG. 29B-29C. Thus, calculating the TWR (since inception) at 2012-04-15 may involve combining periodic TWR summary data from inception all the way until the selected date, making sure to account for compounding that occurs. Since the TWR calculation is since inception, the calculation interval range may be from the earliest summary data available all the way until the selected date, which happens to be the entire time interval for available summary data. An example of how periodic TWR summary data may be stitched together to calculate TWR over a longer time interval is described in regards to FIG. 29C.

FIG. 30B has a timeline 3050 that is similar to timeline 3000, in that it illustrates another scenario in which summary data may be used to calculate "TWR at 2012-04-15" for the Stock F under Bob's ownership. Brackets 3052 show overlapping time intervals for two different data types: summary data and transaction data. In this example, summary data of Stock F's TWR is available for the time interval that includes times prior to, and including, the selected date 2012-04-15. Summary data can be used in order to determine the TWR on that date. However, unlike in FIG. 30A, here transaction data is also available for the time interval that includes times prior to, including, and after the date 2012-04-15. The transaction data can be used to calculate Stock F's TWR for any time period within this time interval, which spans from inception to well past the selected date. Thus, the "TWR at 2012-04-15" for Stock F can be calculated using summary data, transaction data, or some combination of both, based on a user's preferences. Calculating "TWR at 2012-04-15" for Stock F using only transaction data can be done through the graph traversal methods as described previously herein, with the transaction data prior to the selected date being the most relevant. Otherwise, that calculation can be overridden instead by the use of summary data, which may involve accessing the TWR Time Series of Stock F in the summary data database and calculating TWR from inception to the selected date. This can be done by combining the periodic TWR values as described previously in regards to FIG. 29C.

Figure 31:
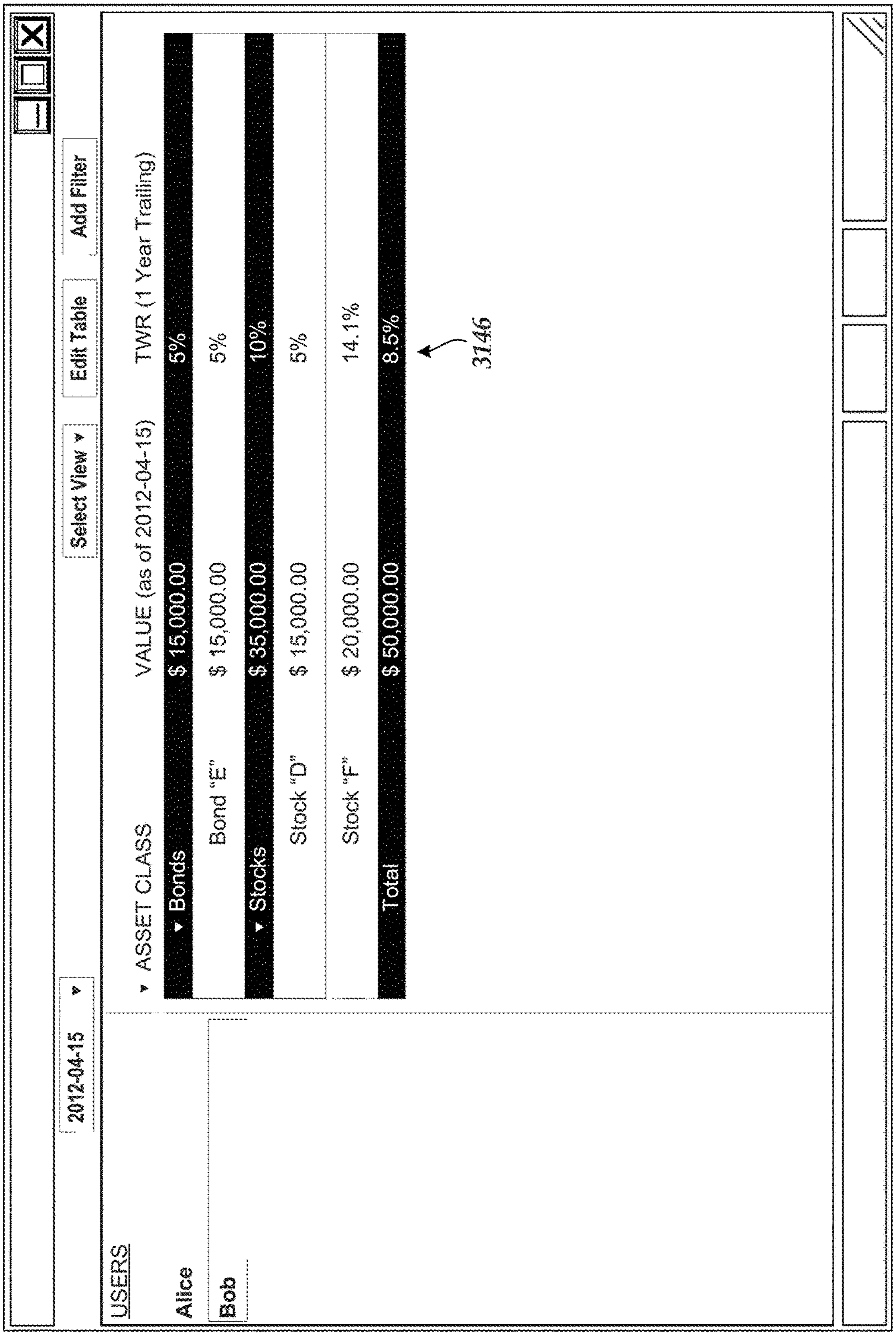
FIG. 31 illustrates an example user interface of the system in which summary data is used to calculate TWR in the table presented to the user.

FIG. 31 illustrates an example user interface of the system in which summary data is used to calculate TWR for presenting to the user in a table format. In particular, the example user interface is similar to FIG. 28, but include the additional metric for TWR (1 Year Trailing) as of the selected date 2012-04-15, which is determined for every row in the generated table and reported in Column 3146. Each of the TWR (1 Year Trailing) values in Column 3146 may have been calculated with summary data as described in FIG. 29C.

FIGS. 32-35 relate to various embodiments of processes by which summary data may be used in generating tables of metrics, as generally described above. Since summary data can be associated with a node in the bucketing tree, in order for the system to determine whether there is summary data available for calculation of a metric, the system may initially determine all the inputs that identify that node in the bucketing tree (i.e., the model attributes consisting of perspective, filters, bucketing factors, and/or the like). Thus, the summary data in the database may be indexed using those same model attributes.

As described below, according to an embodiment, as part of the table generation process, summary data may be looked up in connection with generation of each row of the table, once the model attributes for that row (which indexes the summary data) has been determined.

Alternatively, according to another embodiment, summary data may be looked up a single time in connection with the generation of the table. Such a process in this embodiment may involve determining model attributes consisting of perspective, filters, bucketing factors, and/or the like, for every row of the specified table in advance. There may be computational and practical benefits associated with performing the summary data look-up process only once. For example, it may take a relatively long time to obtain access to the summary data database (e.g., when the summary data database is located remotely), or the summary data database may be remotely distributed over many computers and network connections. Thus, performing the summary data look-up process only once may involve a one-time access of the database in order to simultaneously obtain both the unique model IDs identifying the summary data and the contents of the key-value pairs associated with the model ID. This may reduce computational time, computational resource utilization, and the amount of bandwidth used.

It should be noted that, so far, the summary data described herein is associated with a node in a bucketing tree and its location in a database can be indexed using the inputs defining each node in the bucketing tree. However, summary data can be, in some implementations, additionally or alternatively associated with an edge and/or a node in the complex mathematical graph. That summary data may be indexed in the database using a combination of inputs that uniquely define each edge and/or node in the graph, through a similar technique used on summary data associated with bucketing tree nodes. A more detailed description of this, along with an example user interface displaying an example of summary data associated with edges or nodes of a graph, is described below in reference to FIG. 45.

Figure 32:
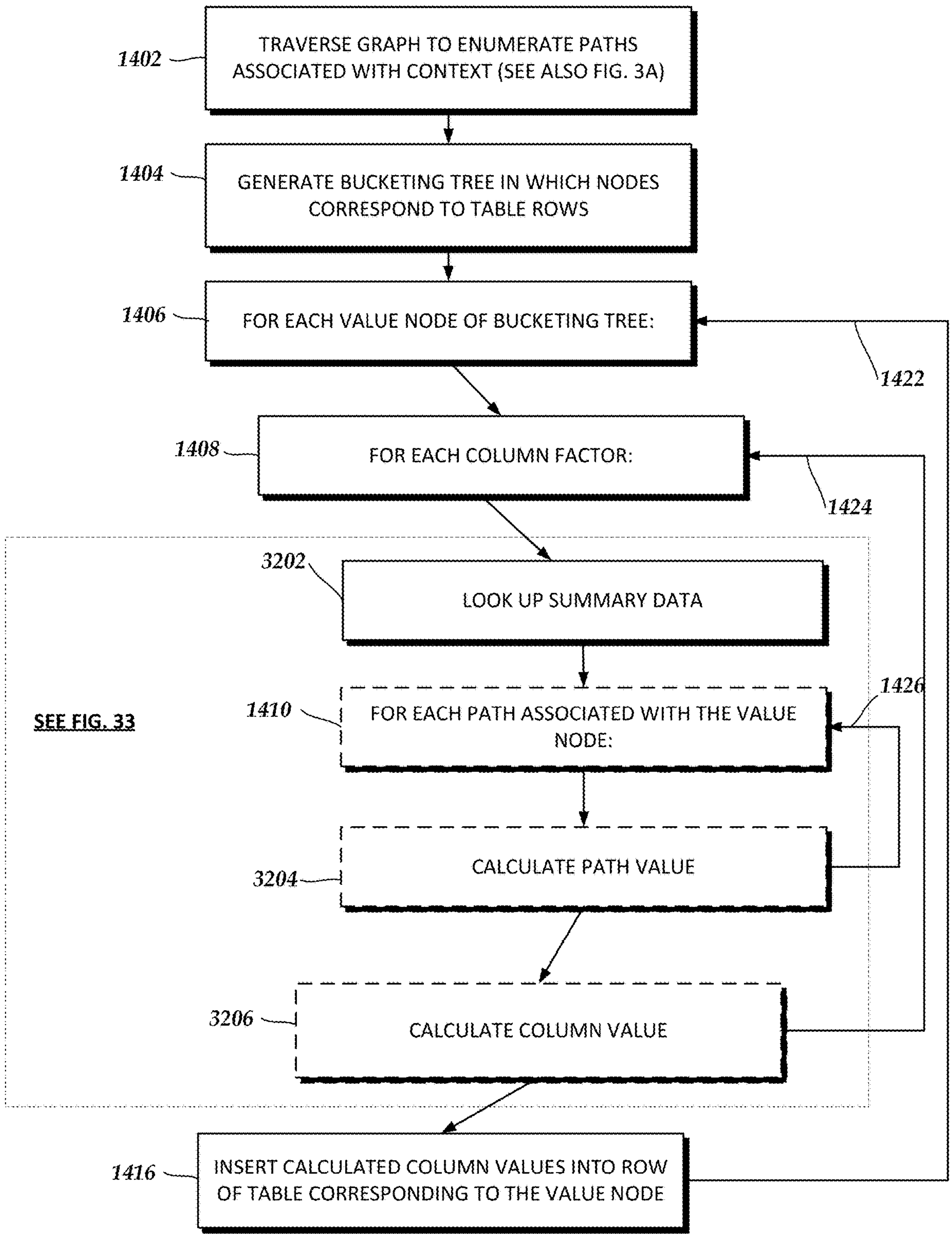
FIG. 32 is a flowchart showing one embodiment of the summary data look-up process in connection with generating a table.

FIG. 32 is a flowchart showing an example method of the system in which rows of a table may be generated either by looking up summary data or using transaction data via graph traversal and column factor calculations. In particular, FIG. 32 describes an embodiment in which the summary data look-up process is used row-by-row in generating the table. The flowchart is similar to the flowchart of FIG. 14. Any blocks of the flowchart that are not described in regards to FIG. 32 will have already been described in regards to FIG. 14.

In the example method of FIG. 32, at block 3202, the system looks up summary data in the summary database for each column factor of each row in that table. If the user has only specified one metric or column factor, then block 3202 is performed only once for each row. However, prior to actually performing the database look-up, the system may check the column factor referenced in block 1408 and check to see if the user has specified that column factor to be calculated using summary data. This is to prevent users from using summary data to override the values of any metric they want (e.g., shares of an asset). Thus, this check can be used to restrict certain column factors from being calculated with summary data and enable pre-defined column factors to be calculated using summary data.

Figure 33:
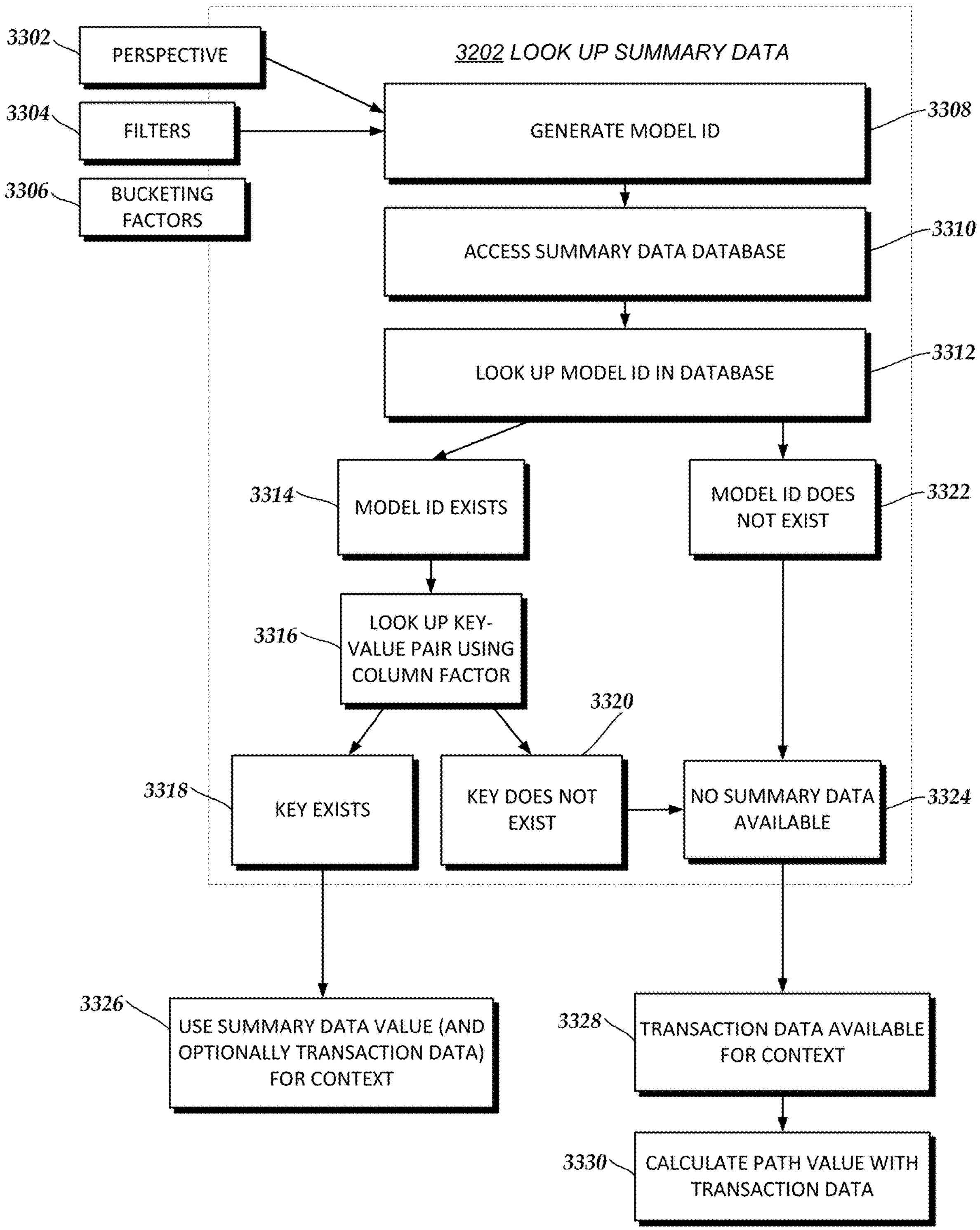
FIG. 33 is a flowchart illustrating additional aspects of the summary data look-up and table generation process of FIG. 32.

The actual look-up process performed at block 3202 is described and illustrated in more detail with regards to FIG. 33, although it should be noted that it involves first generating the model attributes (perspective, filter, and bucketing factor(s)) associated with each row. Those model attributes may be associated with a model ID, which is used to look-up indexed summary data associated with the row in the summary database. This may be performed for each row of the table in order to populate metric values in that row.

In some cases, such as for the determination of asset value, the summary data obtained for that row at block 3202 may be directly inserted into the row of the table at block 1416. In other cases, such as for time-weighted return, the value may be calculated using a summary data time series which is, e.g., linked geometrically. This additional calculation involving summary data may be performed at block 3206.

In other cases, the user may specify a preference that summary data not be used for determining that column factor of the row, or there may be a transaction data component to the calculation. An example of this case is described in regards to FIGS. 36A-36B, and 37. At optional blocks 1410 and 3204, transaction data may be used to calculate path values (e.g., when summary data is not used and/or not available for all or part of a relevant time period) for paths associated with the same node of the bucketing tree, using graph traversal as described previously herein. Those path values can be combined in order to calculate the value of the column factor at block 3206, or used in an additional calculation for determining the column value that combines a summary data component and a transaction data component. An example of this is described in regards to FIGS. 36A-36B and 37.

FIG. 33 is a flowchart illustrating additional aspects of the summary data look-up and table generation process of FIG. 32. In particular, FIG. 33 illustrates in more detail the portion of the flowchart of FIG. 32 generally boxed as indicated in FIG. 32.

For a given table view, each row can be grouped or defined by a set of model attributes that consist of perspective 3302, filters 3304, bucketing factor(s) 3306, and/or the like. Summary data may be stored in a database and indexed using these model attributes, as described above in reference to FIGS. 29A-29C. Thus, these model attributes can be used to identify summary data relevant to each table view.

At block 3308 a unique model ID is determined based on the model attributes associated with the row of the table, e.g., perspective 3302, filter 3304, and bucketing factor(s) 3306 (e.g., the model ID is determined form the database table 2902 of FIG. 29A). The model ID can be anything unique, so long as the same model IDs are being used to index summary data in the database.

At block 3310, the summary data database is accessed for each row of the table. At block 3312, the determined model ID corresponding to that row of the table is looked up in the database (e.g., database table 2904 of FIG. 29B) in order to identify summary data relevant to that row.

At block 3314, if the model ID exists in the database (e.g., database table 2904 of FIG. 29B) a match will be found. There will be key-value pairs associated with the model ID, as described in regards to FIG. 29B. At block 3316, the key-value pairs of the model ID will be looked up by comparing the column factor against each key. At block 3318, if a match is found then the key exists, which means the key-value pair and relevant summary data for determining that column factor value exists. At block 3326, the summary data (typically stored as a time series) of that key value pair will be used to determine the column factor value. Transaction data may also optionally be used as well for calculations that involve both summary data and transaction data, which is described in FIGS. 36A-36B and 37. In one scenario, a time interval of available summary data is overlapping with the time interval of available transaction data. The user may have a choice of which type of data to use. In another scenario, if a calculation spans a time frame that is beyond the time interval of available summary data, then the calculation may be performed using summary data for the available time interval (the summary data portion) as well as transaction data (the transaction data portion), The user may have a choice on whether to combine the types of data for the calculation as well as how the types of data get combined for the calculation.

At block 3320, if no matching key is found then the key does not exist. This means that no relevant summary data is available at block 3324. Similarly, at block 3322 if no matching model ID in the database (e.g., the model ID is not in database table 2904 of FIG. 29B) was found, then no relevant summary data is available at block 3324.

If no summary data exists, then it is possible that the column factor cannot be determined if transaction data is not available to calculate the column factor on the specified date. At block 3328, the system checks to see if transaction data is available for the column factor and the context using the graph traversal process described previously herein. If transaction data is available, at block 3330 the path value for each path associated with the row is calculated using transaction data. Those calculate path values may then be combined in order to determine the value of the column factor.

Figure 34:
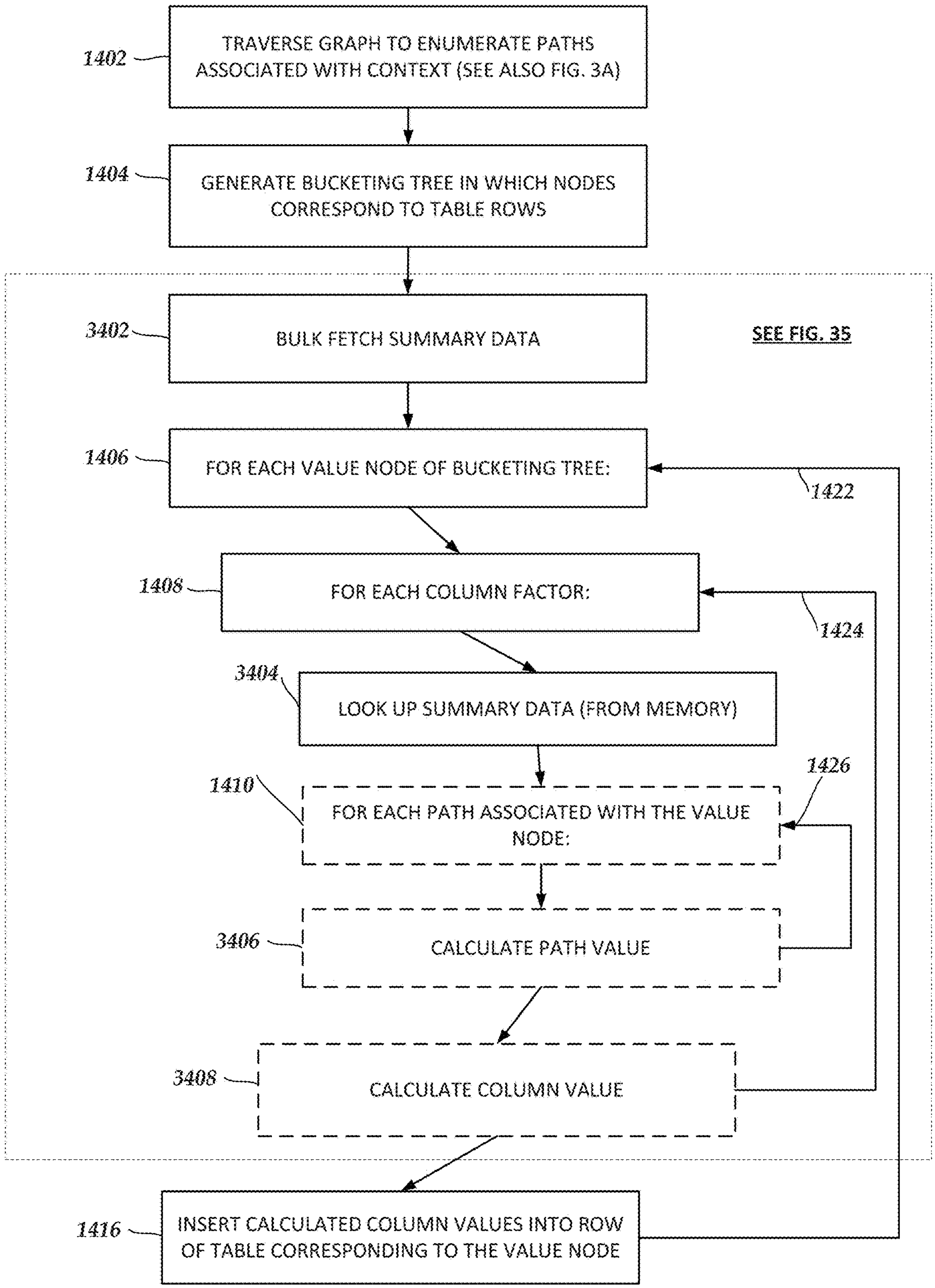
FIG. 34 is a flowchart showing another embodiment of the summary data look-up process in connection with generating a table.

FIG. 34 is a flowchart showing an example method of the system in which rows of a table may be generated either by looking up summary data or using transaction data via graph traversal and column factor calculations. In particular, FIG. 34 describes an embodiment in which the summary data look-up process is used only once in generating the table. The flowchart is similar to the flowchart shown in FIG. 14. Any blocks of the flowchart that are not described in regards to FIG. 34 will have already been described in regards to FIG. 14.

In the example method of FIG. 34, at block 3402, the system determines all possible model IDs for the table after determining the model attributes specified for each row of the table. The summary data is accessed once (rather than for each row, as in the example process of FIG. 32 above) in order to perform a bulk fetch of the summary data, in which all potentially relevant summary data for the table is obtained at once and stored in memory. In some embodiments, all of the potentially relevant summary data encompasses only the summary data needed to generate the table specified. In other words, all of the potentially relevant summary data would only pertain to calculating the values for each column in each row of the specified table. In other embodiments, all of the potentially relevant summary data encompasses the summary data available for all of the model IDs associated with the table. In this scenario, all of the potentially relevant summary data may include summary data available for each row, but not necessarily corresponding to a specified column in that row. Thus, in this scenario, even if the user changes or alters the column factors for each row, the system has already fetched all the summary data available for those rows (which includes the summary for those newly-specified column factors). As the user changes the column factors, the system may calculate new column factors for the same rows without having to perform additional bulk fetching.

At block 3404, the system looks up the summary data for each column factor of the row in that table by accessing the summary data already stored in memory. This may be done using the process as described for block 3316 in regards to FIG. 33. If the user has only specified one metric or column factor, then block 3204 is performed only once for each row. However, prior to performing the memory look-up, the system may check the column factor referenced in block 1408 and check to see if the user has specified that column factor to be calculated using summary data. The system may also check to see if a user is authorized to specify summary data to be used in calculating that column factor. The system may also check to see if summary data is permitted for calculating that column factor. These checks may be important for various reasons. The column factor may be a column factor that is not calculated using summary data. The column factor may be a column factor for which it is undesirable to allow a user to use summary data to override calculated values of the metric. For example, the shares of an asset may be a metric that is determined to be a metric that a user should not be able to change using summary data. If the chosen column factor is shares of an asset, the system may check to make sure that no summary data is being used to determine the value of shares of the asset. Thus, this check can be used to restrict certain column factors from being calculated with summary data and enable only a select group of pre-defined column factors to be calculated using summary data. In other embodiments, the system may review the column factors at block 3402 prior to bulk fetching the summary data and then only key-value pairs containing summary data relevant to those column factors is fetched.

At block 1416, the relevant summary data values may be used as the column factor values. There may be an optional block 3408, at which there may be additional calculation for the relevant summary data values. This may involve calculations for time-weighted return, which requires combining summary data values in the time series. Or it may involve combining the summary data with transaction data.

However, if at block 3404 no relevant summary data for the column factor exists, or the user has chosen not to use summary data, then at blocks 1410 and 3406 transaction data can be used by using the graph traversal process to calculate path values associated with that row of the table.

Figure 35:
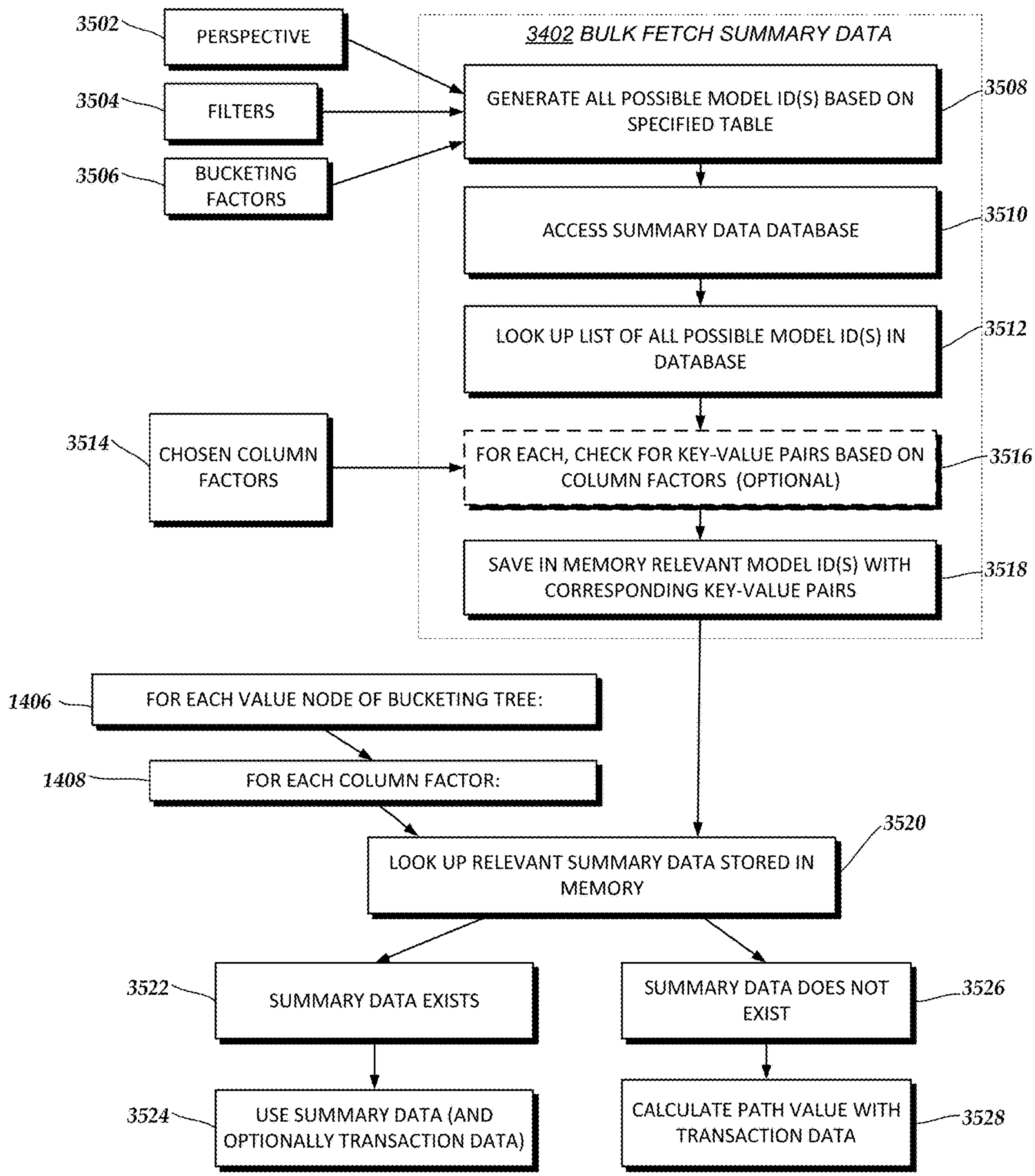
FIG. 35 is a flowchart illustrating additional aspects of the summary data look-up and table generation process of FIG. 34.

FIG. 35 is a flowchart illustrating additional aspects of the summary data look-up and table generation process of FIG. 34. In particular, FIG. 35 illustrates in more detail the portion of the flowchart of FIG. 34 generally boxed as indicated in FIG. 34.

At block 3508, model IDs are determined based on model attributes for all rows in the specified table. Thus, model attributes for each row are determined that that consist of, e.g., perspective 3502, filters 3504, bucketing factor(s) 3506, and/or the like, and then the corresponding model IDs are determined. Having determined the model IDs that index the relevant summary data, at block 3510 the summary data database is accessed once to obtain relevant, or potentially relevant, summary data (as described below).

At block 3512, the list of all possible model IDs is compared to the model IDs in the database in order to find all the database entries with those model IDs. At optional block 3516, the matching entries may be further reduced by checking key-value pairs of the entries against the chosen column factors 3514 of the table. In one embodiment, the system does this check in order to reduce the amount of summary data being stored in memory. In other words, the pre-fetching is based on the specific column factors of the table. However, this approach may require additional summary data fetching from the database if the user later chooses to add additional column factors into the table. In another embodiment, the system does not further reduce the matching entries by only saving matching key-value pairs. All entries in the database with a model ID that matches the list of all possible IDs for the table are saved. In other words, all summary data with the rows are pre-fetched. This approach may utilize more memory, but would not require additional database fetching if additional column factors are added to the table by the user.

At block 3518, the determined entries of the database containing matching model IDs and corresponding key-value pairs are saved into memory. At block 3520, for each column factor of each row, the system queries for availability of relevant summary data stored in memory. This may be done by looking up the key-value pairs that match the column factor. Although this step in looking up relevant summary data is similar whether the summary data is in a database or stored in memory, accessing the summary data in memory may be much more efficient than repeatedly accessing summary data in the database.

At block 3522, if there is a matching key-value pair that means relevant summary data exists in a time series format. At block 3524, that summary data can be used to determine the column factor value. Transaction data may optionally be used if the calculation is configured to use both types of data.

At block 3526, if the system does not find a matching key-value pair that means relevant summary data does not exist. However, sometimes the calculation may be performed using transaction data. At block 3528, the calculation may be performed with transaction data and the graph traversal method described previously herein.

Figure 36A:
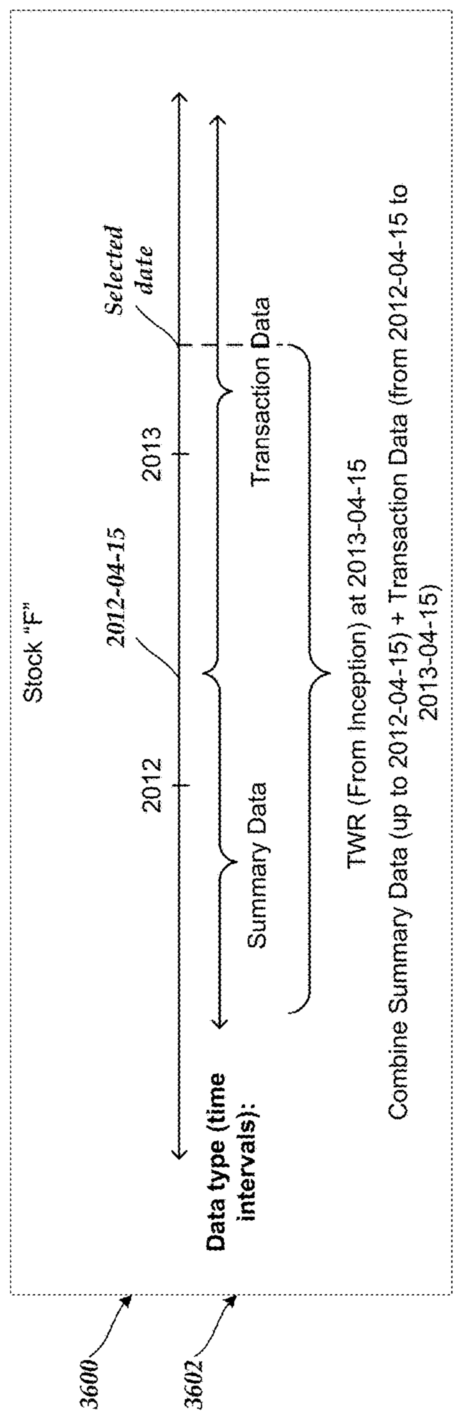
FIGS. 36A-36B illustrate how summary data and/or transaction data may be combined for a calculation.
Figure 36B:
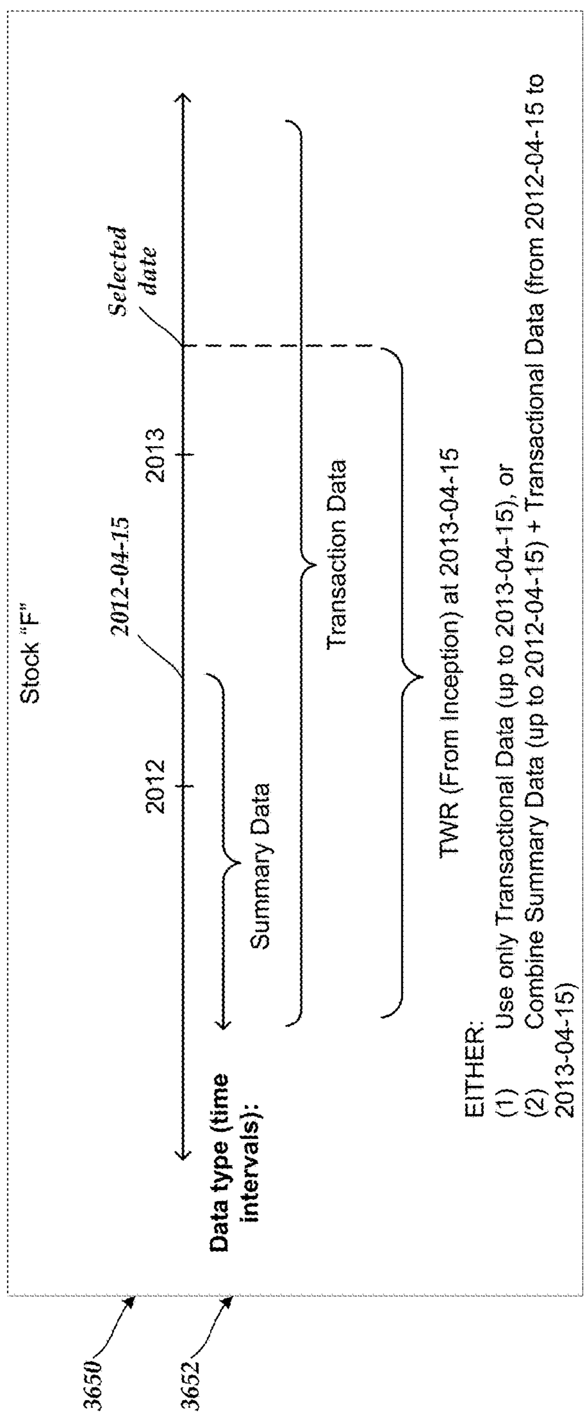
Figure 37:
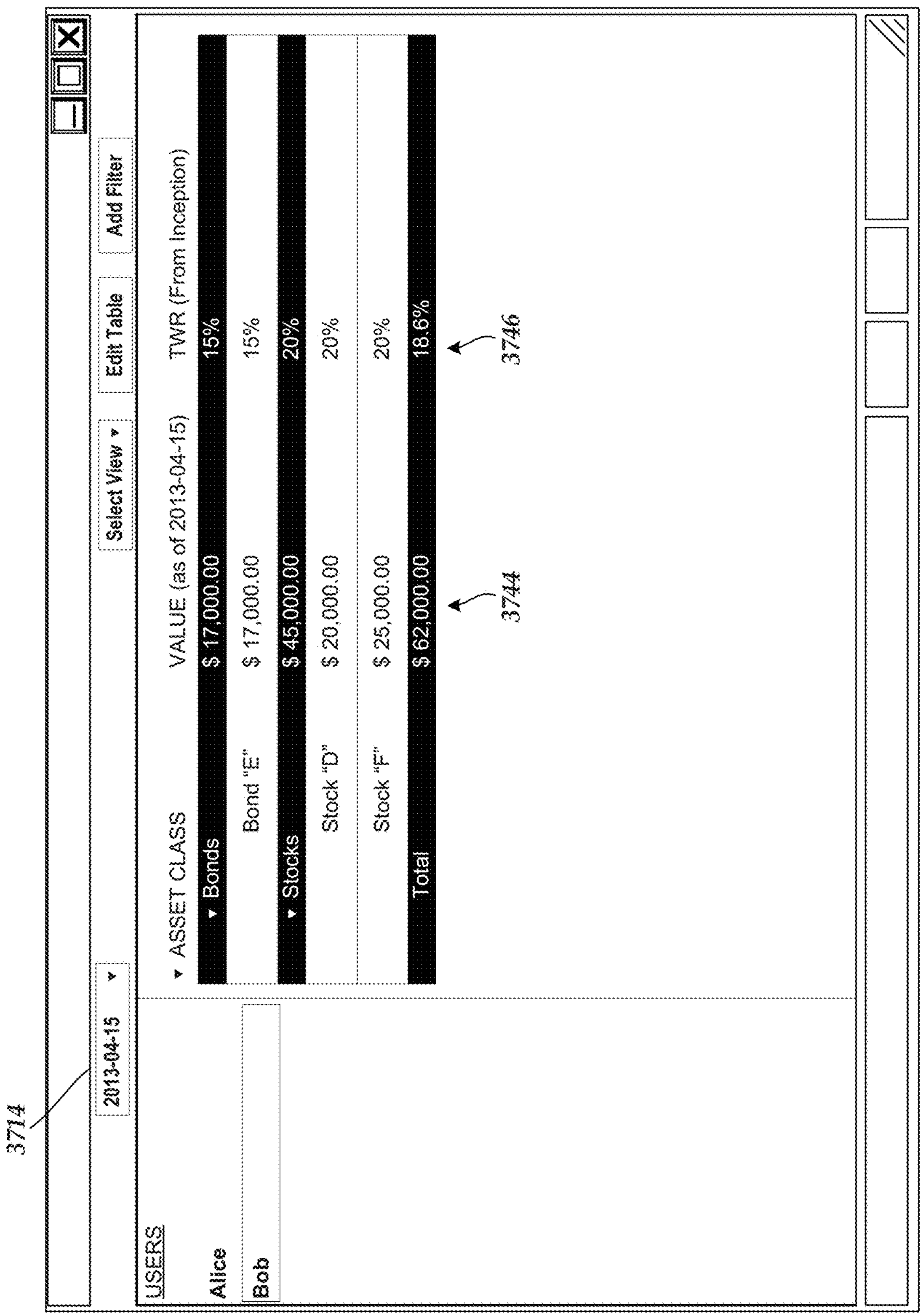
FIG. 37 is an example user interface that shows the TWR column factor in a table when it is calculated using both summary and transaction data.

FIGS. 36A-36B, and 37 relate to column factor calculations that involve both summary data and transaction data. FIGS. 36A and 36B illustrate an example of how summary data and transaction data may be combined for a calculation that requires data outside the time interval for the available summary data.

FIG. 36A includes a timeline 3600 that illustrates a scenario in which both summary and transaction data types are used to calculate "TWR (From Inception) at 2013-04-15" of Stock F. This calculation is different from the similar calculations shown in FIGS. 30A and 30B in that the selected date is now a year later. Brackets 3602 show the time intervals for both transaction data and summary data. Summary data for Stock F's TWR is available for the time interval that includes times prior to, and including, the date 2012-04-15. Transaction data is available that can be used in calculations for Stock F's TWR for selected dates after 2012-04-15.

Here, the selected date is well outside the time interval for available summary data. The calculation of TWR (From Inception) at 2013-04-15 can be performed by combining summary data with transaction data. The summary data time series can be used from inception up to the date 2012-04-15. Transaction data is then used to calculate the portion of the TWR from 2012-04-15 to the selected date 2013-04-15. Thus, TWR (From Inception) at 2013-04-15 can be calculated as the summary data seamlessly switches over to transaction data. The date, 2012-04-15, on which the data type switches over is referred to herein as the "cutover date." This cutover date may be specified by the user, and it is described in more detail with regards to FIG. 36B.

FIG. 36B includes a timeline 3650 that illustrates a different scenario in which both summary and transaction data types are used to calculate "TWR (From Inception) at 2013-04-15" of Stock F. Brackets 3652 show the time intervals for both transaction data and summary data. Summary data is available for the time interval that includes times prior to, and including, the date 2012-04-15. Transaction data is available since inception until the current date, so its time interval spans the timeline 3650. Thus, for the entire time interval in which summary data is available, there is also transaction data available.

For the selected date of 2013 Apr. 15, calculating TWR (From Inception) can be done purely using transaction data. Another option would be to use summary data over the entire time interval that it is available. In this option, summary data from inception up to 2012-04-15 would be used. This summary data can be combined with transaction data spanning from 2012-04-15 until the selected date of 2013 Apr. 15. This would make the cutover date 2012-04-15, when the calculation transitions over from summary data to transaction data.

However, in some embodiments the user may be able to specify the desired cutover date for transitioning from summary data to transaction data. The cutover date in this example could be any date within the time interval of available summary data because transaction data is available at any point in time. Thus, a user may specify that summary data be used from inception up until the cutover date of 2011 Apr. 15. Transaction data can be used for the remaining two years of 2011-04-15 to 2013-04-15.

FIG. 37 is an example user interface that shows how the TWR (From Inception) at 2013-04-15 column factor, calculated in FIGS. 36A-36B using both types of data, can be presented on a table. This example user interface is similar to the user interface in FIG. 31, although there some differences.

One difference is that the date selection box 3714 has been changed so that the selected date is 2013-04-15, a year later. This date context is reflected in both of the column factors. Column 3744 is associated with the asset value column factor, now calculated with 2013-04-15 as the date context (although it could be calculated for a different date). In FIG. 31, the value for bonds was $15000 and the value for stocks was $35000. Now, Column 3744 shows that a year later the value of bonds has gone up to $17000 and the value of stocks has gone up to $45000. In that span of a year, Bob's assets have appreciated by $12000.

Another difference is the addition of column 3746 which is associated with the TWR (From Inception) column factor. This column factor may be the same metric as the one shown in FIGS. 36A and 36B. Thus, column 3746 may consist of values for TWR (From Inception) at the selected date 2013-04-15. The values may have been calculated with a combination of summary data and transaction data if the availability of those two data types mirror the ones shown in FIGS. 36A and 36B.

FIGS. 38-45 are example user interfaces that show how a user may add summary data to be used for a row of the table.

Figure 38:
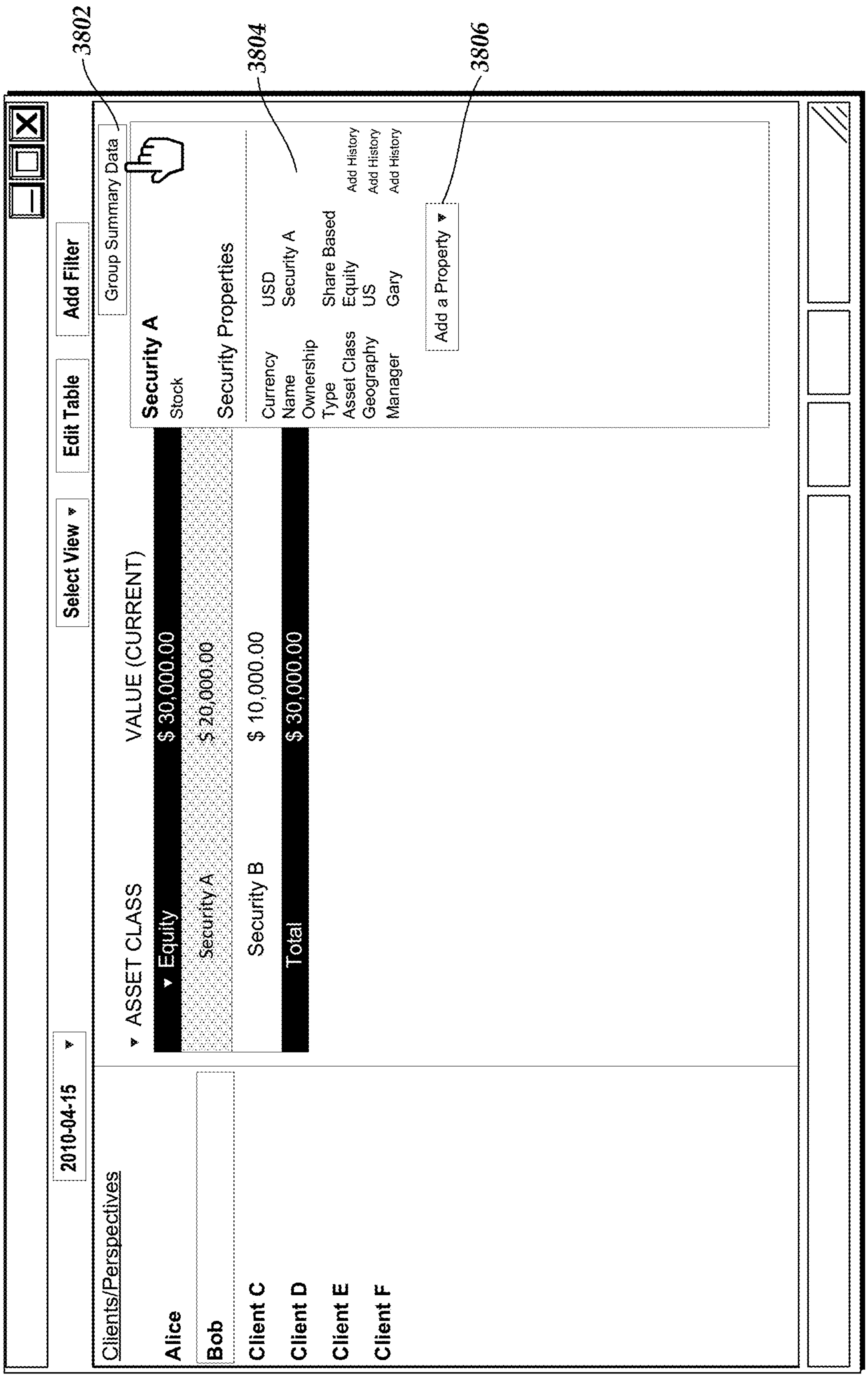
FIGS. 38-43, 44A and 44B are example user interfaces illustrating processes and interactions to add and configure summary data to be used in generating the table.

FIG. 38 illustrates a Properties Window 3804 that shows the properties of a selected security. Such properties may include, for example, a currency that values are reported in, an ownership, an asset class of the security, and so forth. The user interface may include an Add a Property Dropdown 3806 that allows a user to add additional properties to be listed in Properties Window 3804. Additionally, a user may click the Group Summary Data Button 3802 in order to specify custom summary data values to fit into rows of the table.

Figure 39:
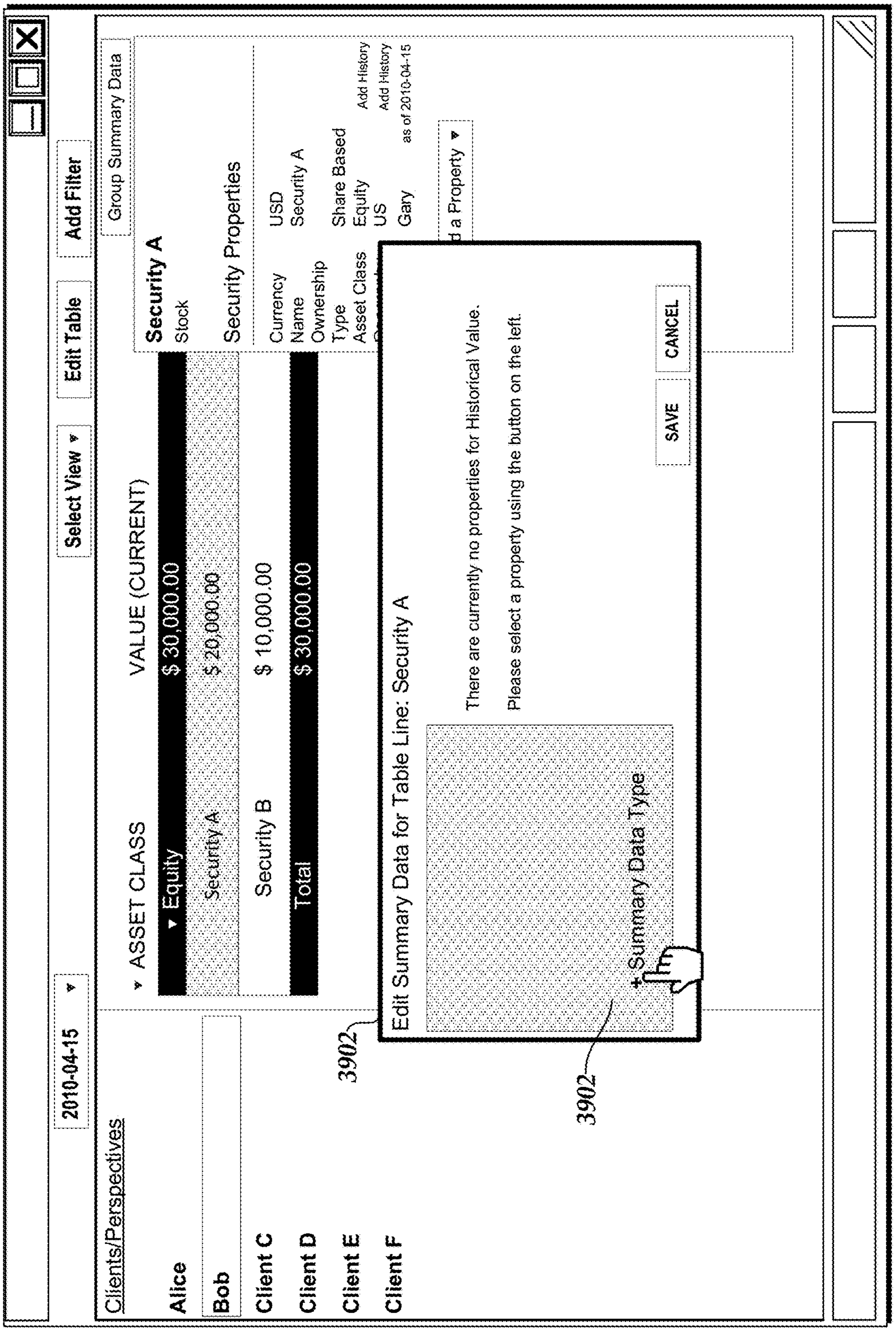

In FIG. 39, in response to the user's selection of the Group Summary Data Button 3802, an Edit Summary Data Window 3902 is opened up for the row. This can be seen from the title at the top of the window, which states "Edit Summary Data for Table Line: Security A". A user may click the Add Summary Data Type Button 3902 in order to open a dropdown menu specifying the types of metrics that may be added to the table that can utilize summary data.

Figure 40:
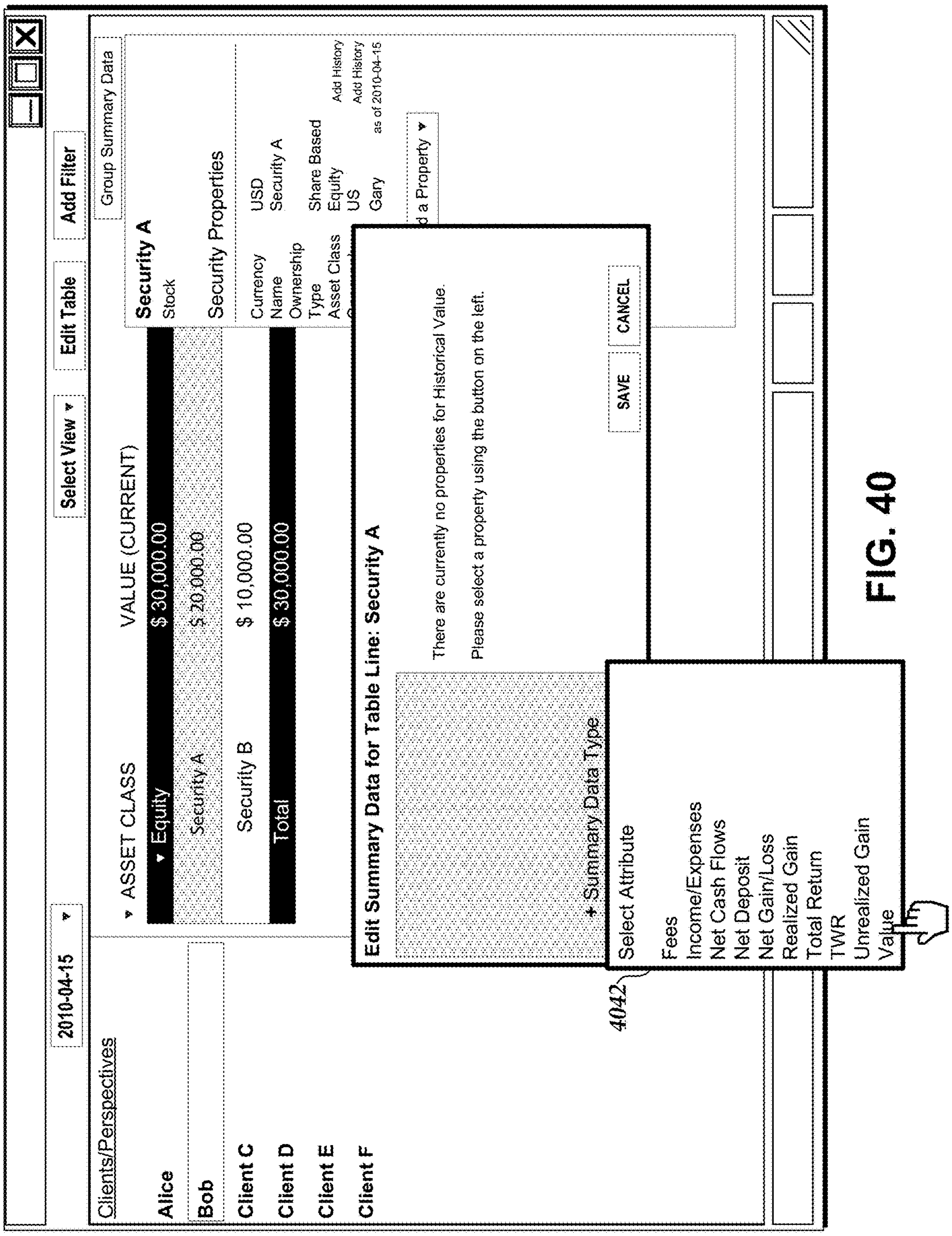

In FIG. 40, the Dropdown Menu 4042 has been opened up after the Add Summary Data Type Button has been clicked. The menu includes Fees, Incomes/Expenses, Net Cash Flows, Net Deposit, Net Gain/Loss, Realized Gain, Total Return, TWR, Unrealized Gain, and Value as metrics calculated using summary data that may be added as column factors into the table. Other metrics may be available in other implementations and not just the metrics shown in the figure.

Figure 41:
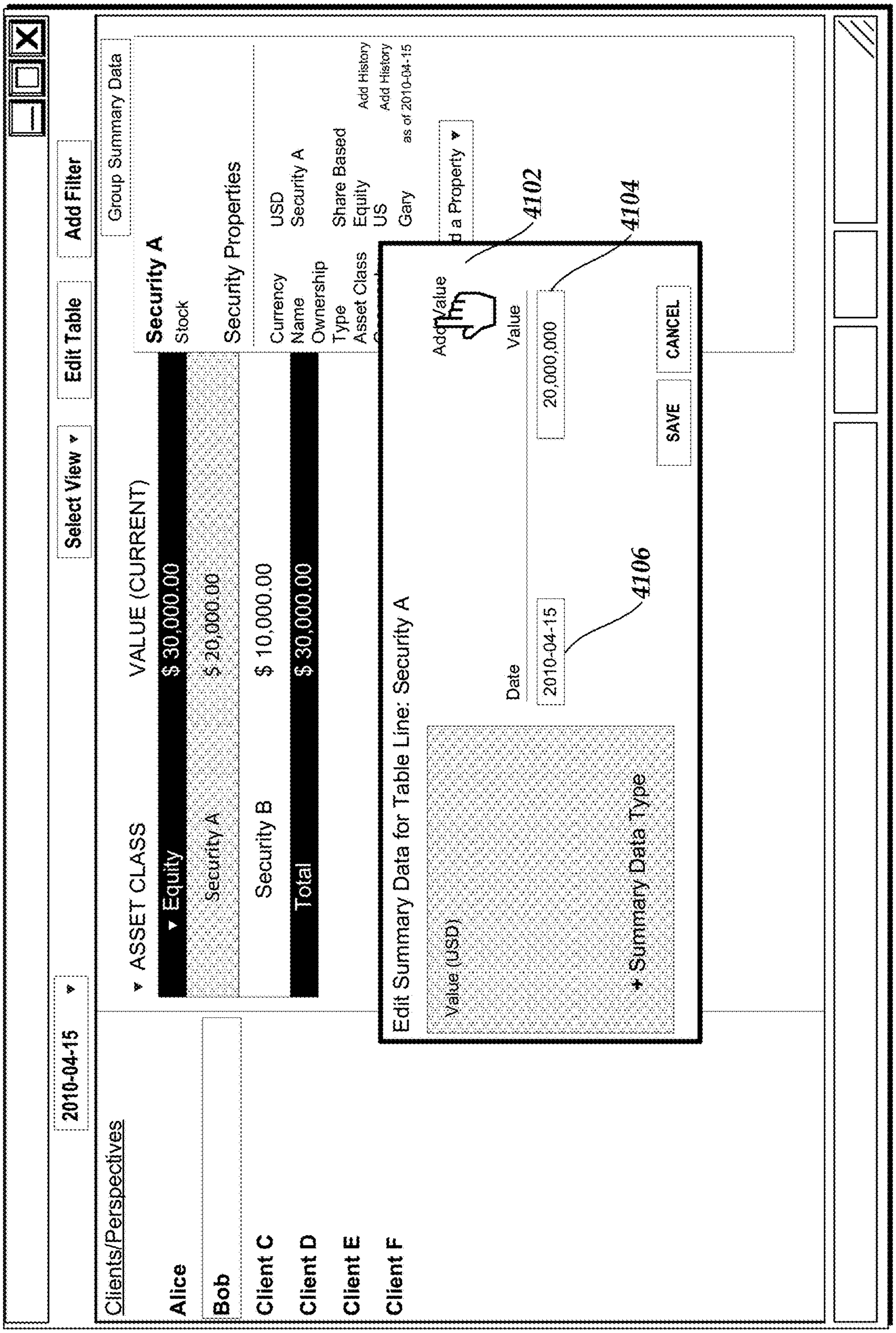
Figure 42:
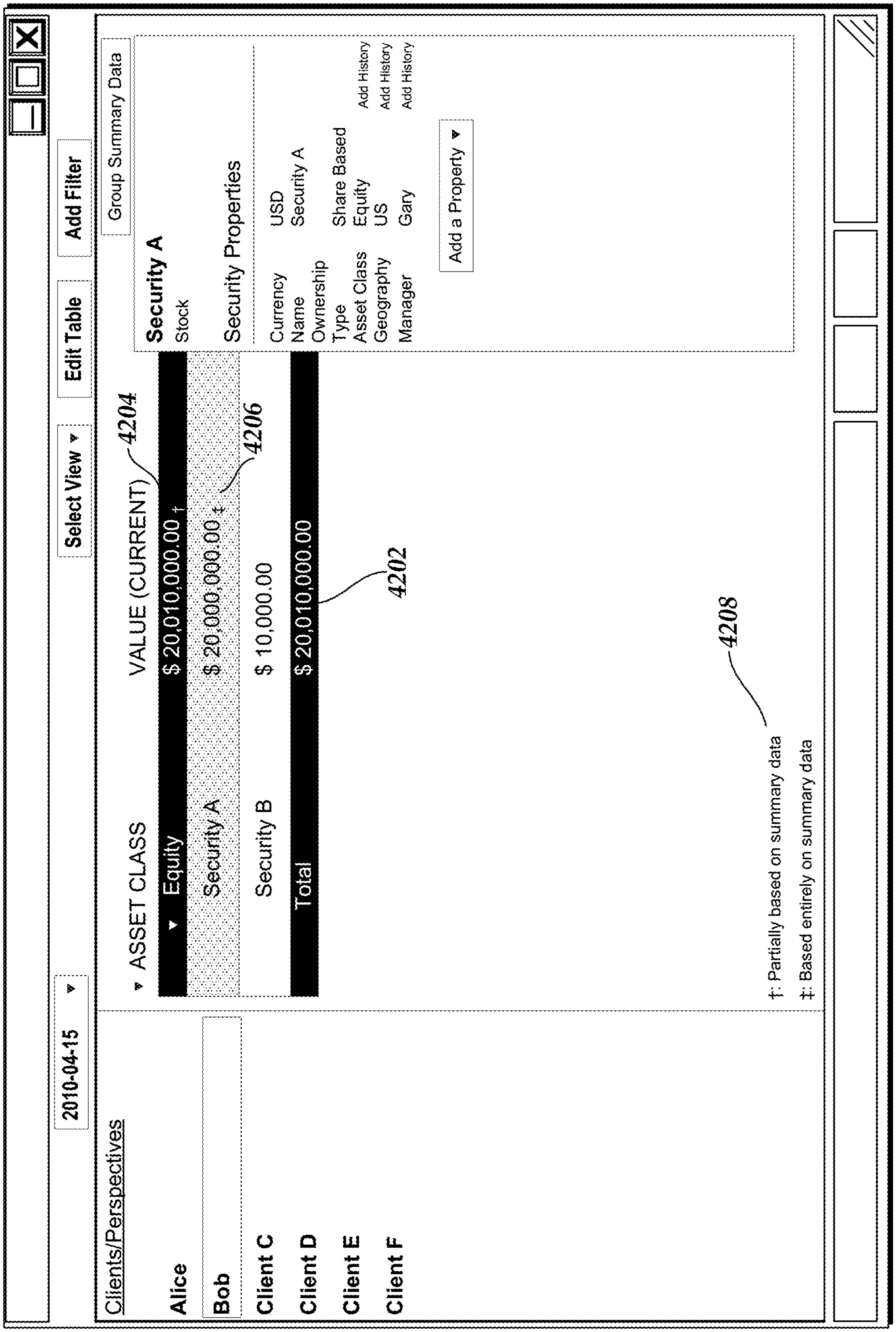

In FIG. 41, the user has selected "Value" in the dropdown menu. The user may click the Add Value Button 4102 in order to specify custom summary data values. Here, the user has specified a Custom Value 4104 of $20,000,000 for Security A associated with a Custom Date 4106 of 2010-04-15.

Since the user has specified as summary data a custom asset value for Security A on a date that is the same as the current date in the table, that custom asset value gets reflected in the table as shown in FIG. 42. In FIG. 42, column 4202 shows that the value for Security A on 2010-04-15 is now $20,000,000. Column 4202 may also show that the asset type of equity, which includes Security A, now also has been adjusted upwards to reflect the custom value for Security A. Column 4202 may also show that the total value of all asset types, which includes Security A, now also has been adjusted upwards to reflect the custom value for Security A.

The displayed value for the Security A row of the table may have an Indicator 4206 next to it that identifies that the displayed value was calculated entirely based on summary data. The displayed value for the Equity asset class row of the table may have an Indicator 4204 next to it that identifies that the displayed value was calculated partially based on summary data, because the value of the Equity asset class depends on the value of Security A. There may also be a Legend 4208 or custom key that explains to the user what any indicators on the table mean. In other embodiments, different kinds of indicators may be used other than the indicators displayed in the figure (Indicators 4206 and 4208). Some indicators may include adding other symbols, for example, characters such as "$", "^", "k", and so forth, to be displayed next to the displayed value. Some indicators may involve adding indicators such as brackets or parentheses to the sides of the displayed value. For example, a value of 15% calculated entirely using summary data may be displayed as [15%] or {15%}, a value of 15% calculated partially using summary data may be displayed as (15%), and a value calculated using no summary data may not have any surrounding characters. Some indicators may involve changing the text color of the displayed value to be different. For example, a value calculated entirely using summary data may be in blue, gray, or bright-red text, whereas a value calculated partially based on summary data may be green, and a value calculated using no summary data may be displayed in black text. Some indicators may involve changing the cell border color or cell shading color of the table cell containing the displayed value. For example, a value calculated entirely using summary data may be displayed in a table cell with a blue border, a value calculated partially based on summary data may be displayed in a table cell with a green border, and a value calculated using no summary data may be displayed in a table cell with a black border. In an alternative example, a value calculated entirely using summary data may be displayed in a table cell with a blue shading, a value calculated partially based on summary data may be displayed in a table cell with a green shading, and a value calculated using no summary data may be displayed in a table cell with no shading.

Figure 43:
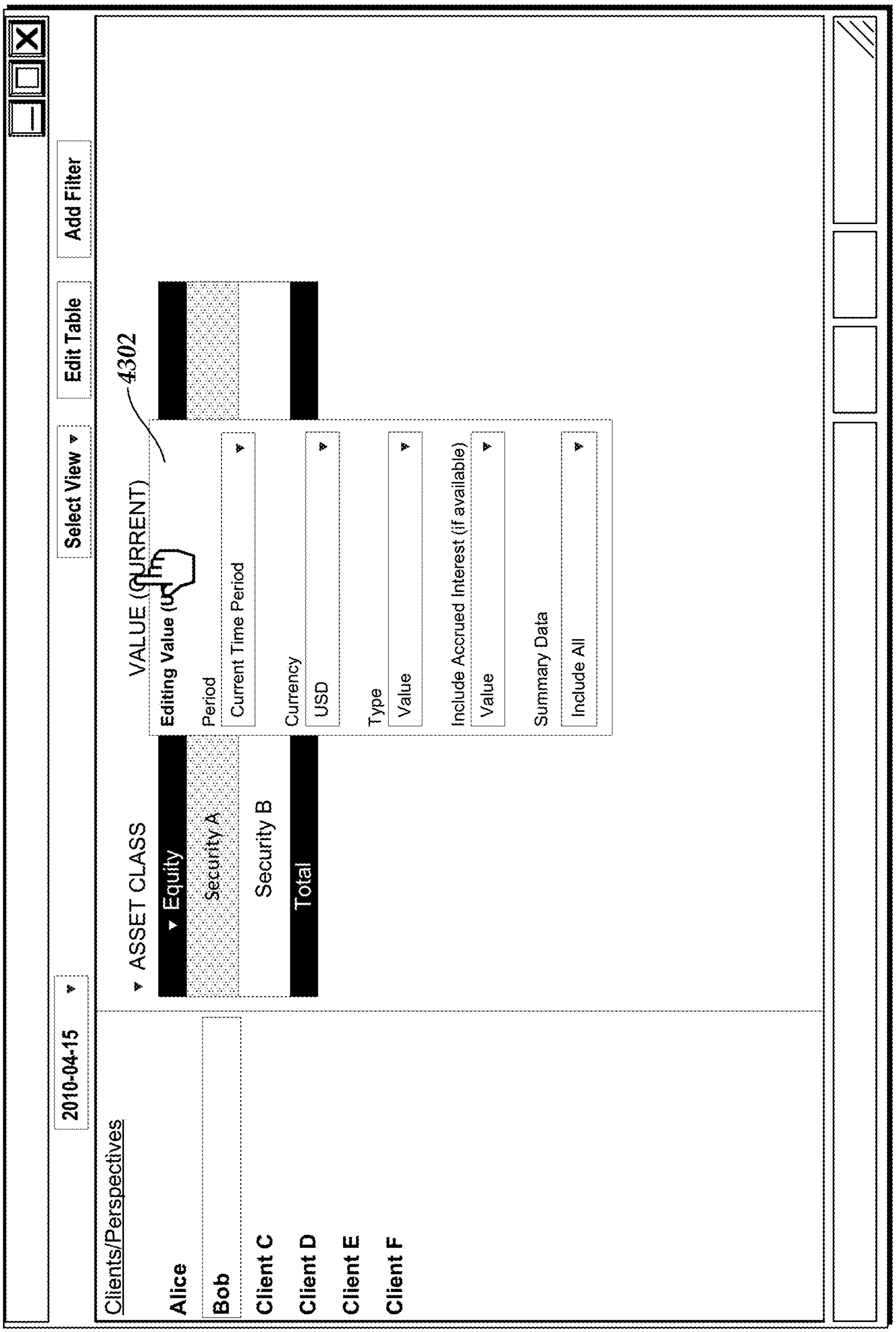

In FIG. 43, the user has clicked the Asset Value column factor at the top of the table in order to reveal Column Factor Menu 4302. Column Factor Menu 4302 has additional dropdown menus that allow the user to further configure the column factor. For example, the user may be able to change the time period or context of the column factor, the currency that the column factor is reported in, the type of the column factor, whether to include accrued interest in the reported value, and whether to use summary data for calculating that column factor. These changes may be reflected for this column factor in all rows of the table, and not just a selected row.

Figure 44A:
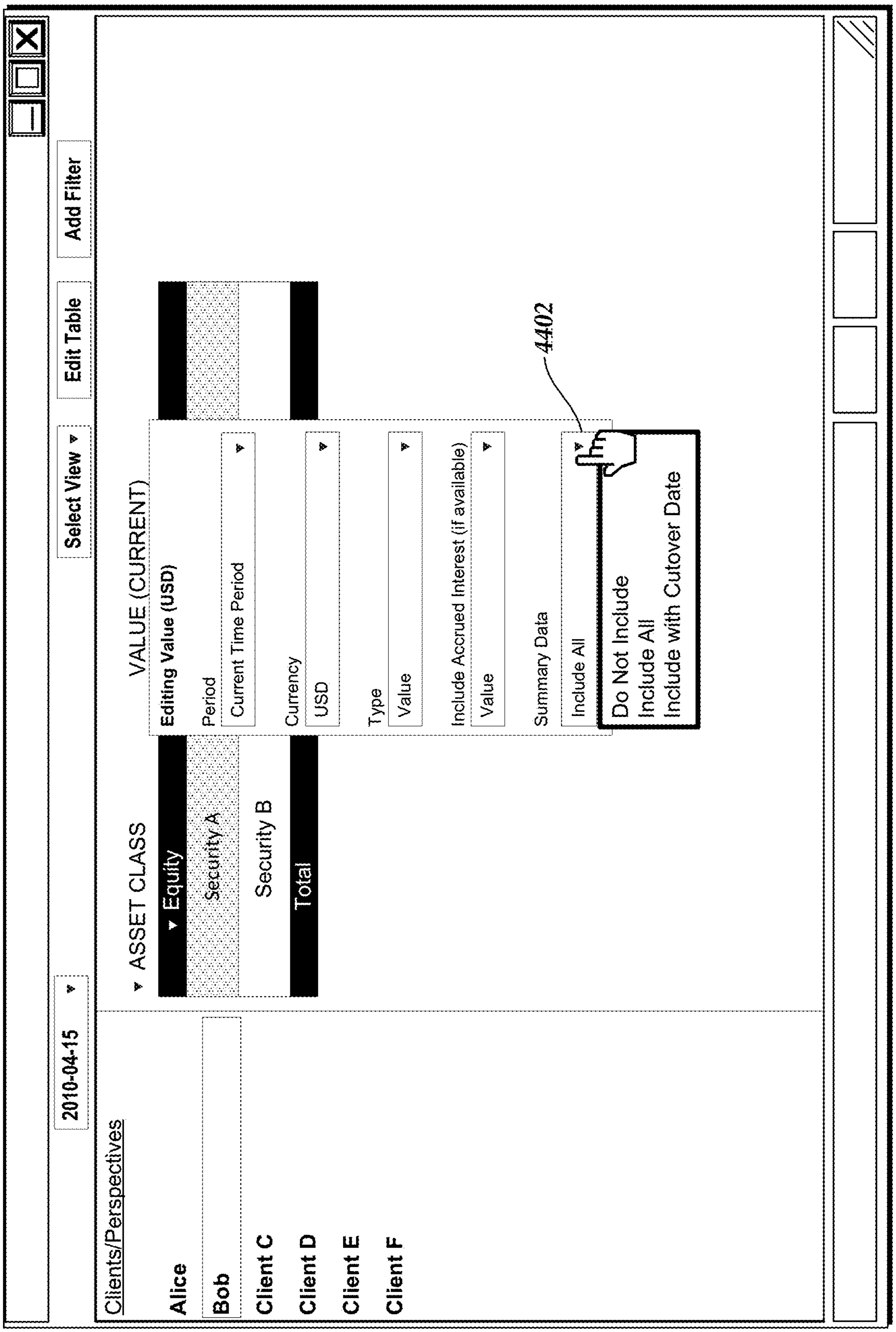

In FIG. 44A, the user has further clicked the Summary Data Dropdown Menu 4402 in the column factor menu in order to show three available options: Do Not Include, Include All, and Include with Cutover Date. If the user selects "Do Not Include", then no summary data will be used in determining the Asset Values for the table. If the user selects "Include All", then all summary data will be used in determining the Asset Values for the table, if available (in some implementations, the user may be notified whether or not summary data is available). In this case, if summary data is not available, transaction data may be used. In some embodiments, if the user selects "Include with Cutover Date", summary data will be used to calculate the Asset Value up to the chosen cutover date (if available), and then transaction data will be used to calculate the Asset Value after the chosen cutover date. In some embodiments, the user may be able to specify that if no summary data is available, then no value should be displayed at all for that calculation in the generated table. Alternatively, rather than nothing being displayed at all for a specific value, a symbol or indicator may be displayed in the generated table to inform the user that no summary data is available for calculating that specific value.

Figure 44B:
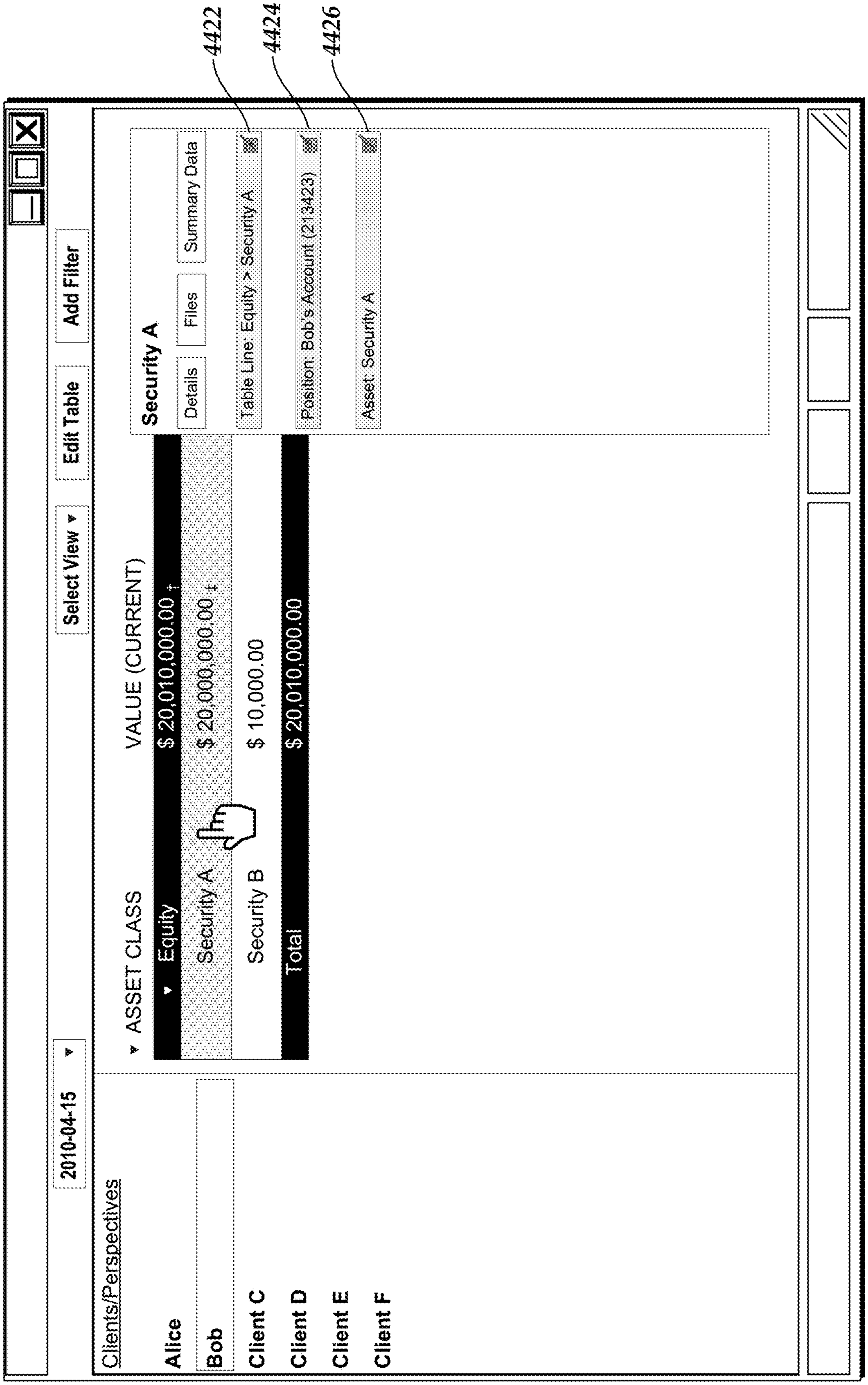

In FIG. 44B, the user is looking at all the summary data available for Security A. The window on the right includes a Table Line Summary Data Edit Button 4422, an Edge Summary Data Edit Button 4424, and a Node Summary Data Edit Button 4426. Thus far, the disclosure has mainly discussed summary data that is associated with a node in a bucketing tree since it corresponds to each row of the generated table. Another way to describe this is that the summary data has been associated with a Table Line (e.g., a row of the table). Summary data of this kind can be edited by clicking on Table Line Summary Data Edit Button 4422.

However, summary data from the actual ownership structure may be used instead. That summary data may be associated with nodes or edges in the mathematical graph. As described above, an edge in the graph represents a relationship between two nodes, which may indicate a position relationship between the nodes. Summary data that is associated with, e.g., a position, may be edited by clicking on Edge Summary Data Edit Button 4424. A node in the graph may represent, e.g., an asset. Summary data that is associated with an asset may be edited by clicking on the Node Summary Data Edit Button 4426.

Position or asset summary data may be used when a row contains a position or asset. In these cases, the summary data may be associated with a node or edge of the graph rather than the model attributes of a row in the table. The summary data look-up process is similar to the description above in reference to FIGS. 32-35, with the summary data indexed based on Node ID or Edge ID rather than a model ID based off the model attributes.

When calculating the value of the column factor, the system may prioritize summary data from the top-down as shown in FIG. 44B. That is to say, the lowest level of priority may be transaction data. If summary data is needed, summary data associated with the edge may take precedence over summary data associated with the node. Further, summary data associated with the table line may take precedence over everything and have the highest priority. The same cutover date specified by the user may be applied to all types of summary data. In other implementations, other priorities of data may be implemented in the system and/or specified by the user.

Figure 45A:
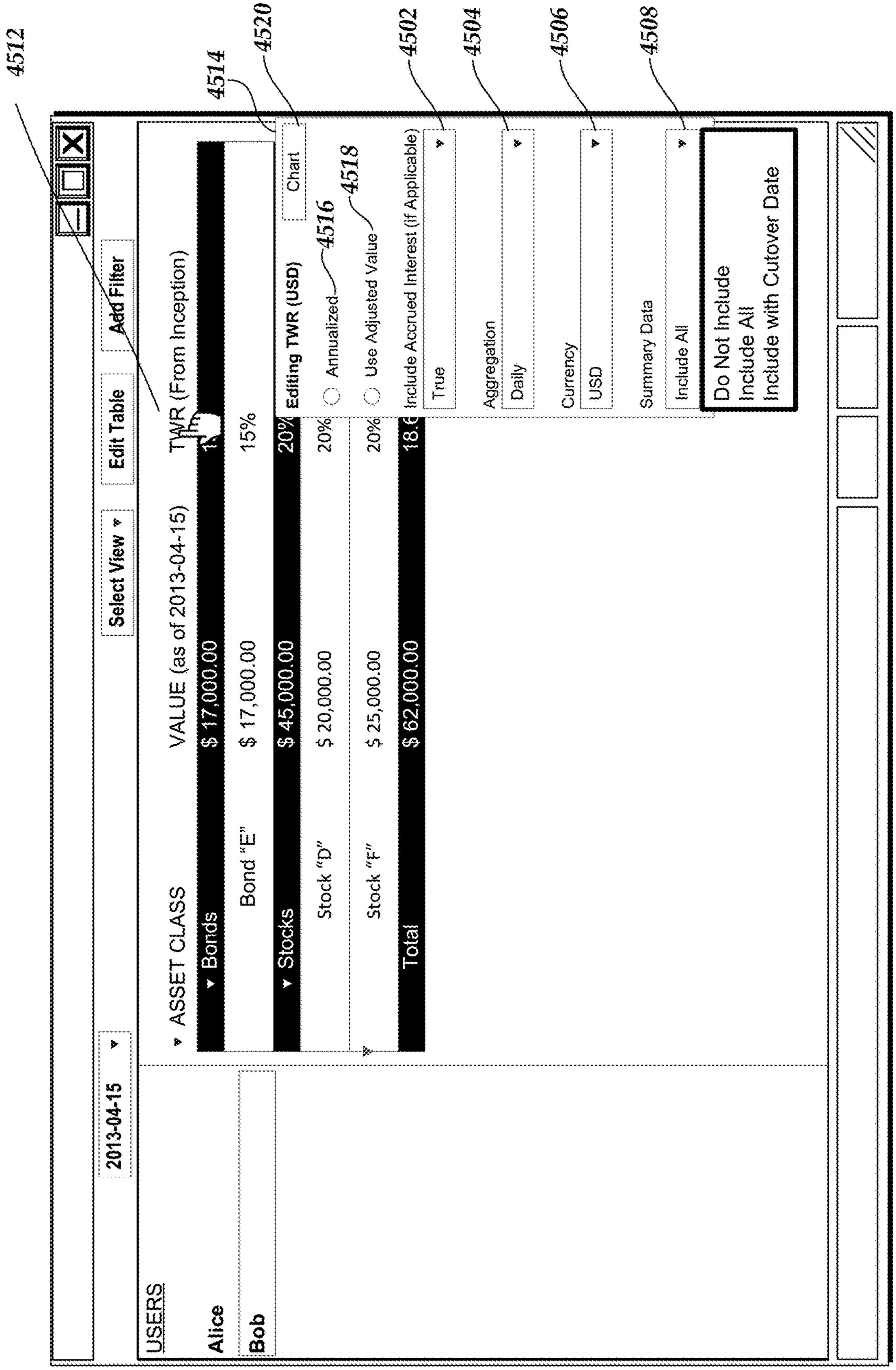
FIGS. 45A-45E are example user interfaces illustrating additional processes and interactions related to summary and transaction data.

FIG. 45A shows an example user interface of the system in which another metric, TWR (From Inception), calculated by the system is displayed. As described below and above in reference to, for example, FIGS. 36A-36B, various metrics such as TWR may be calculated by the system summary data, transaction data, and/or any combination of the two. Some aspects of the example user interface of FIG. 45A are similar to aspects of the user interface shown and described above in reference to FIG. 37. Additional related features of the system are described here in reference to FIGS. 45A-45E.

As shown in FIG. 45A, the system may provide a window 4514 (e.g., a popup, sidebar, pane, or any other suitable user interface element) for editing one or more properties of a metric displayed in a table (or chart or other user interface element) of the user interface. In the example user interface of FIG. 45A, the user is editing properties associated with the TWR (From Inception) metric 4512 via window 4514. By clicking the column related to TWR (From Inception), for example, the user can properties related to that metric via the window 4514, which may pop up in the user interface. Via the various user interface controls of window 4514 (as described below), the user may cause the system to calculate the TWR (From Inception) metric in various ways. For example, the user may instruct the system to calculate an annualized TWR by checking a checkbox 4516. The user can also instruct the system to calculate the TWR using adjusted value by checking a checkbox 4518. The TWR calculation can also include accrued interest if the user selects a "true" value in dropdown box 4502. The user can specify the aggregation period in dropdown box 4504, which can be daily, weekly, monthly or yearly. The user can also specify the currency type in dropdown box 4506. In an example of implementation, the user interface can select default values for "include accrued interest" value, "aggregation" period, or currency type. After the user's input, the system can automatically calculate the TWR and update it in the user interface (e.g., in the table).

In the example of FIG. 45A, the user can also have the choice to select the type of data the user wants the system to use to calculate TWR in dropdown box 4508, as discussed in reference to FIG. 36B. For example, the user can instruct the system to calculate TWR based only on transaction data in Summary Data dropdown box 4508 by selecting "Do Not Include." The system can then update the TWR based solely on transaction data. By contrast, the user can instruct the system to include all the summary data available in the system by selecting "Include All." Or, the user can instruct the system to calculate the TWR based on summary data up to a cutover date and transaction data after the cutover date by selecting "Include with Cutover Date."

Figure 45B:
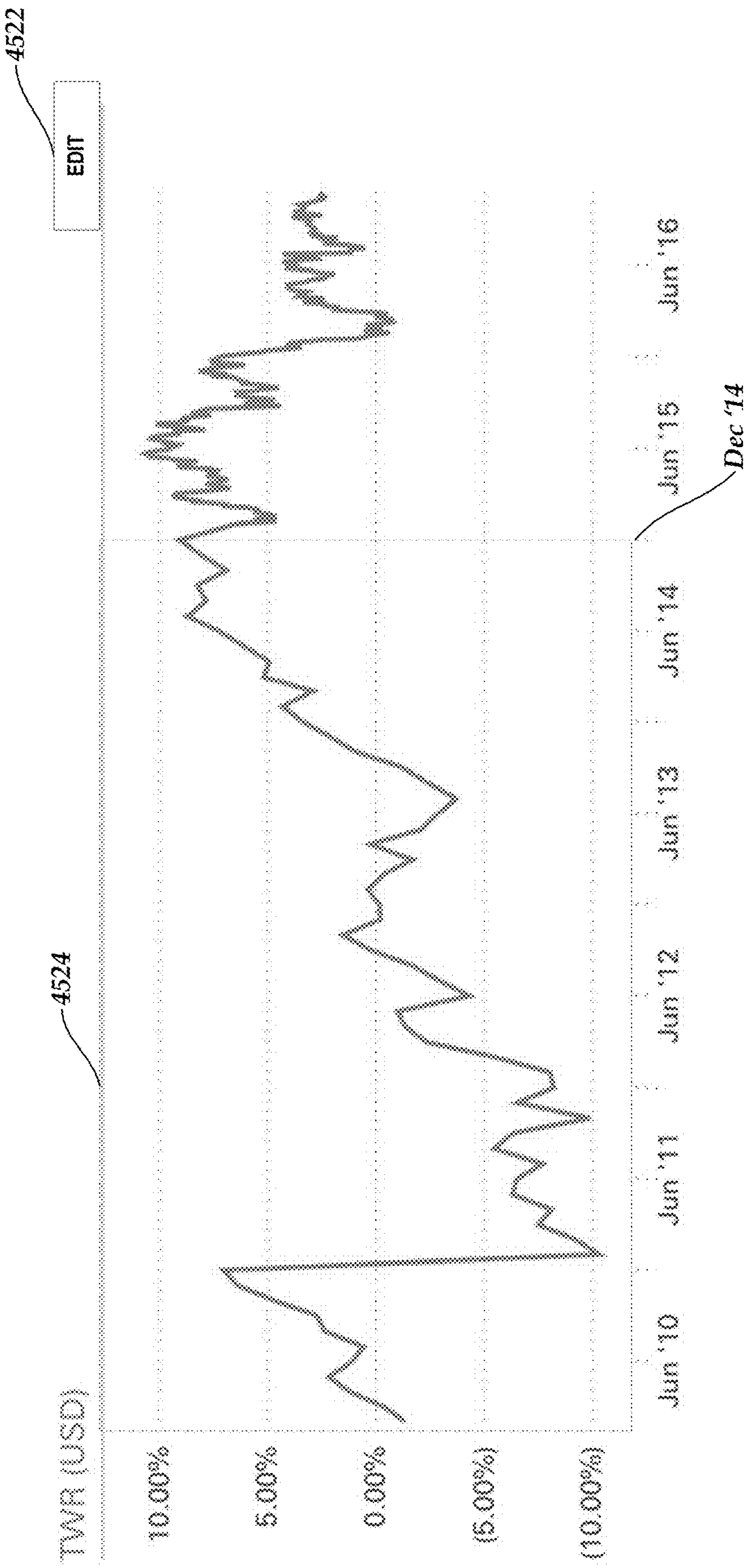

In an implementation, the user may have the option to view TWR data in a chart (or other suitable user interface element) view. For example, the user may click the "chart" button 4520 in the Editing TWR window 4514. The system may then generate a TWR chart in the user interface as illustrated in the example of FIG. 45B. For example, in the chart 4524 the X axis of the chart may be defined as dates, and the Y axis of the chart may be defined as TWR value. In an implementation, before December 2014 the system may only have monthly or quarterly summary data and after December 2014 the system has weekly summary data as illustrated in FIG. 45B. When the user instructs the system to generate a TWR chart to be shown in a weekly manner, the system can calculate the TWR before December 2014 based on the monthly or quarterly summary data as shown in the box 4524. The system can show the rest of the chart based on the calculation using transactional data after December 2014. In this way, the system can advantageously calculate and generate a TWR (or any other metric) chart based on different types of data, including summary data, transaction data, and some combination of the two.

In various implementations, the values of a metric plotted in a chart using summary data (e.g., the values plotted in the example chart of FIG. 45B up to December 2014) may be determined in various ways. For example, the values of the metric may be determined based on any combination of the type of metric, the granularity of the chart, and the available summary data. In one example, the summary data may include monthly indications of TWR, while the chart may be configured to display TWR on a weekly basis. Accordingly, the system may determine TWR values based on the monthly summary data by, for example, determining a closest matching time for which a value is available (e.g., for a value on January $20^{th}$, the system may use a known TWR as of February $1^{st}$), determining a most recent matching value (e.g., for a value on January $20^{th}$, the system may use a known TWR as of January $1^{st}$), determining an average (or running average or weighted average, etc.) of known values, and/or the like. In some implementations, only known values are plotted, and thus a chart may have less granularity of values during periods in which summary data is used, and more granularity of values during periods in which transactional data is used (as in the example chart of FIG. 45B).

In an implementation, the user may select edit button 4522 to edit properties associated with the chart, similar to the editing of properties described herein in reference to various tables.

Figure 45C:
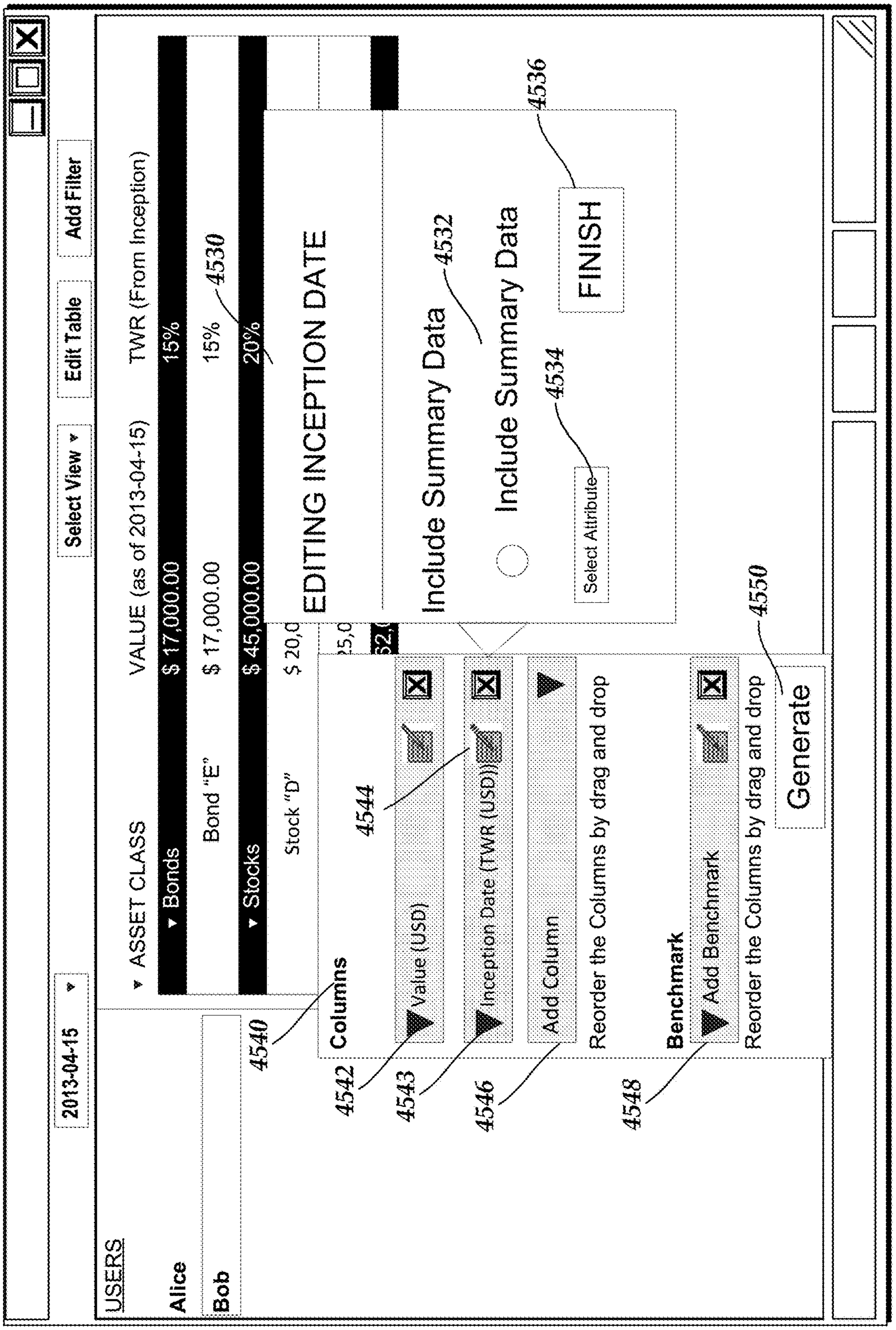
Figure 45D:
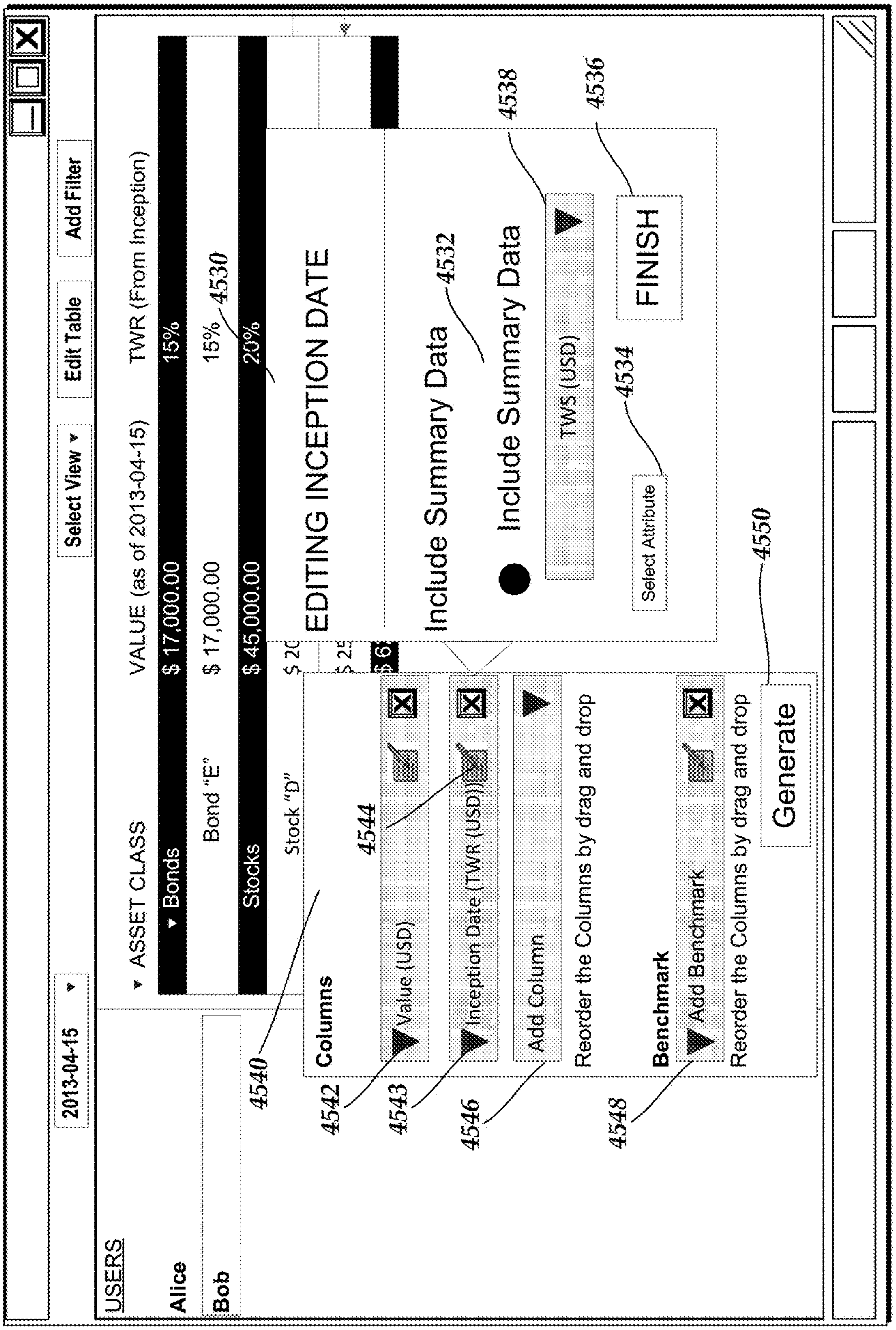

FIGS. 45C and 45D are two example user interfaces by which a user can view and edit properties associated with an Inception Date metric. For example, via the Columns window 4540, the user can edit the table shown in the user interface of FIG. 45C. Via dropdown 4542 the user may edit the Value column, via dropdown 4546 the user may add a column to the table, via dropdown 4548 the user may add a benchmark to the table, via Generate button 4550 the user may apply the changes to the table.

In the example of FIG. 45C, the user has deleted the TWR (From Inception) metric, and added, via the dropdown 4543, a new Inception Date metric. When the Inception Date metric is chosen, the system determines an inception date associated with each metric or category of metrics, and displays that date in the table. The user may, for example, use button 4544 to edit properties associated with the Inception Date metric via an "Editing inception date" window 4530 that may pop up in the user interface next to the "Columns" window 4540. In the "Editing inception date" window 4530, if the user unchecks the "Include Summary Data" checkbox 4532, the system will not use summary data in determining the Inception Date Metric. On the other hand, if the user checks the "Include Summary Data" checkbox 4532, the system will use available summary data to determine an inception date for the Inception Date metric. However, in order to determine an inception date using summary data, the system allowed the user to select an attribute/metric from which summary data may be analyzed to determine an inception date. As illustrated in FIG. 45D, the user may use the Select Attribute button 4534 and/or the dropdown 4538 to select a particular metric and/or attribute which the system may use to determine an inception date. The user can finish editing the inception date column by click a "Finish" button 4536.

Figure 45E:
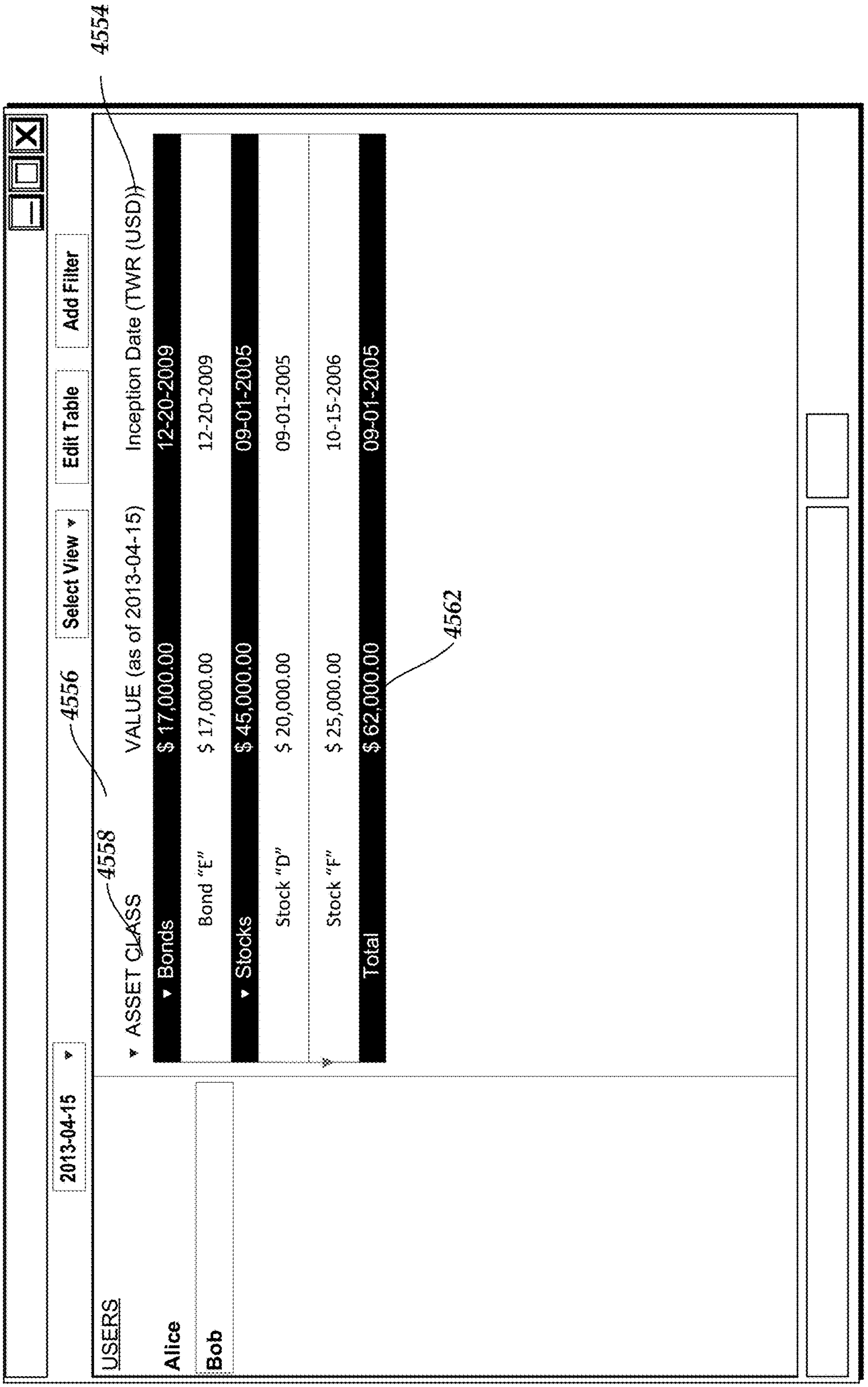

Once the user clicks a "Generate" button 4550, the system updates (as described above) to generate an asset table 4556 in the user interface as illustrated in FIG. 45E. As shown, the types and categories of of assets can be viewed in column 4558, the asset values may be viewed in column 4562, and the inception date (based on TWR summary data) can be viewed in column 4554. The user can edit the table and apply filters in a similar way shown in FIG. 37.

In an example implementation, when a user closes his or her account, the system may keep track of the data with regard to his or her assets in summary data. The system may also ignore such a user in the summary data.

Thus far, the example embodiments described in regards to FIGS. 26A-26C, 27A-27B, 28, 29A-29C, 30A-30B, 31-35, 36A-36B, 37-43, 44A-4B, and 45A-45E have illustrated in various aspects how summary data may be implemented by the system in order to make calculations specified by the user. The examples may be based on the assumption that the summary data had already been imported or recognized by the system and made available to the user. However in some embodiments, in order for the summary data to be available to the user it may first need to be pre-processed and imported into the system. The system may have a predefined format or structure used to interpret summary data. In such cases, an additional data import tool may be used to pre-process summary data into a recognizable format and import it into the system. A data import tool may also be used to import data of other types than summary data. A more in-depth discussion of data import tools is provided below.

11.0 Data Import Tool

Different types of data may be imported into the system to populate the financial mathematical graph (e.g., graph 202). The data may include summary data, transaction data, contact data, historical performance data, position data, and/or the like. In order to be usable by the system via the graph, the imported data may need to conform to one or more recognized formats. In some embodiments, the data to be imported may be in a table, spreadsheet, Comma Separated Value (CSV), or other similar format. For example, the data may viewable using a spreadsheet program, such as Microsoft Excel.

In order to import data into the system, a data import tool can be used to import and validate the format of the data. In some embodiments, the data import tool can comprise a software application embedded in a spreadsheet software application, such as Microsoft Excel. In other embodiments, the data import tool can be embedded in other types of software applications, or may comprise a standalone software application. Advantageously, the data import tool may enable a user to quickly and efficiently import, validate, and/or convert large amounts of data for use in the system, as described herein. The data import tool may enable a user to manage the import of hundreds, thousands, and even millions of data items in a fraction of the time that manual entry of such data items would take.

Figure 46:
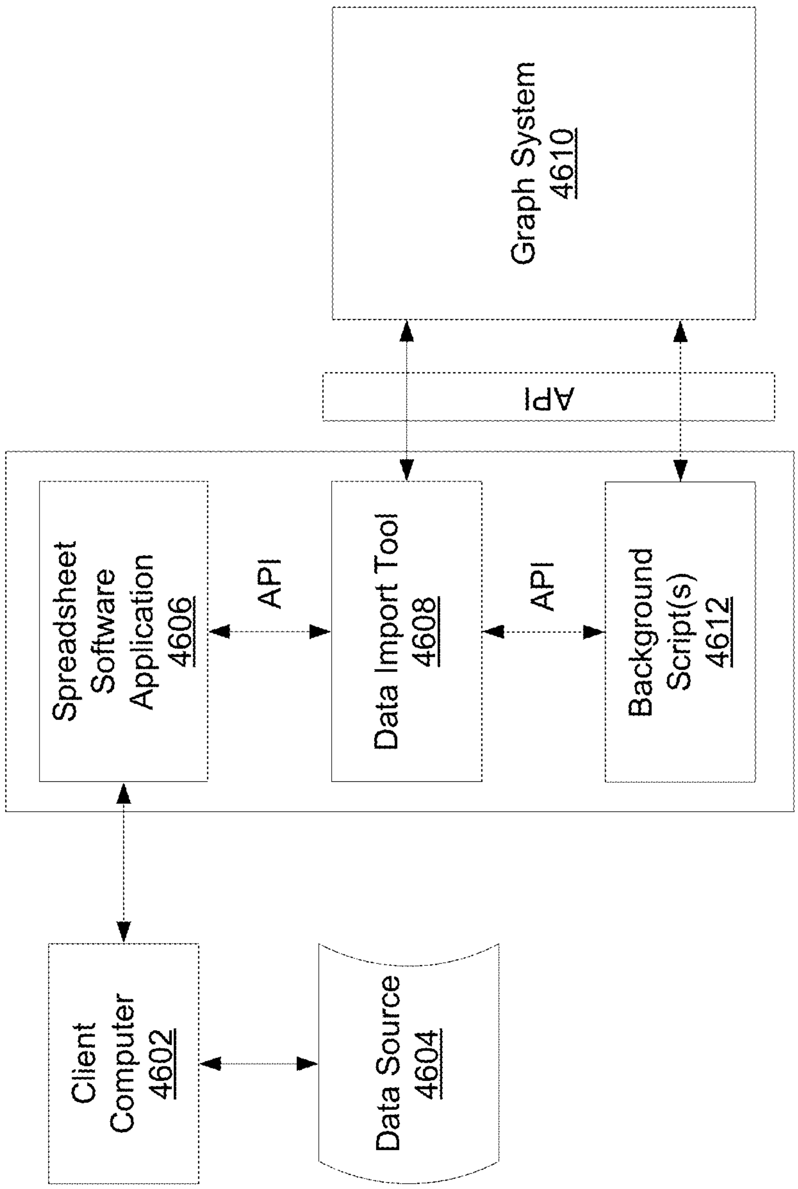
FIG. 46 illustrates an example system for importing data into the graph via a data import tool.

FIG. 46 illustrates an example system for importing data into the graph. A user at a client computer 4602 accesses a data source 4604 containing data to be imported to a graph system 4610. Data source 4604 may comprise memory associated with client computer 4602, a remote data source, and/or the like. Graph system 4610 may correspond to a system implementing graph 202, as illustrated in FIG. 2A. Client computer 4602 may correspond to a client computer 216 as illustrated in FIG. 2A.

To import the data from data source 4604 to graph system 4610, the user at client computer 4602 accesses a data import tool 4608. In some embodiments, data import tool 4608 is implemented as a plug-in of a spreadsheet software application 4606 capable of displaying the data from data source 4604. The spreadsheet software application 4606 and/or data import tool 4608 can be implemented on client computing device 4602, or on a separate application server or computing device. For example, in some embodiments the spreadsheet software application 4606 and/or data import tool 4608 are implemented in a hosted computing environment, such as a cloud computing environment, that may be accessible over a network, such as the Internet. In such an embodiment, a user interface of the spreadsheet software application 4606 and/or data import tool 4608 may be rendered on the client computer 4602 via, for example, a web browser or similar software application (e.g., which in some implementations may operate as a plug-in of the spreadsheet software application 4606). The spreadsheet software application 4606 and the data import tool 4608 may communicate with one another (including transferring data, instructions, etc.) via one or more application programming interfaces (APIs) and/or communication frameworks. Further, the data import tool 4608 and the graph system 4610 may communicate with one another (including transferring data, instructions, etc.) via one or more application programming interfaces (APIs) and/or communication frameworks.

Similarly, data source 4604, client computer 4602, graph system 4610, spreadsheet software application 4606, and/or data import tool 4608 may be in communication with one another via any suitable wired or wireless network or combination of networks, including by not limited to the Internet.

The data import tool 4608 accesses the data to be imported from data source 4604. For example, in some embodiments, data from data source 4604 may be loaded by spreadsheet software application 4606 and displayed to the user at client computer 4602. The data import tool 4608 may then be launched as a plug-in of spreadsheet software application 4606 and used to import the data to graph system 4610. In other embodiments, data import tool 4608 may correspond to a standalone application that is able to access the data from data source 4604 without a spreadsheet software application 4606.

Additional aspects of the example system for importing data as shown in FIG. 46 (including background scripts 4612) are described below.

FIG. 47 illustrates an example of data that may be imported via the data import tool, in accordance with some embodiments. Data 4702 may comprise position data indicating ownership relationships between entities. Each position may correspond to a single row in a table or spreadsheet, and may specify an owner name, an owner type (e.g., a person, holding company, trust, and/or the like), an owned entity name, an owned entity type (e.g., account, holding company, stock, bond, trust, and/or the like), an ownership type, an ownership date, an ownership amount, an ownership value, and/or the like. In a complex graph data structure (e.g., as illustrated in graph 202), a position can be represented as an edge between two nodes (e.g., entities) of the graph. In other embodiments, other types of data can be imported, such as transaction data, historical performance data (e.g., summary data), entity attribute data, and/or the like. In some embodiments, the data may be accessed and displayed by a spreadsheet software application (e.g., as illustrated in FIG. 46), such as Microsoft Excel.

Figure 48:
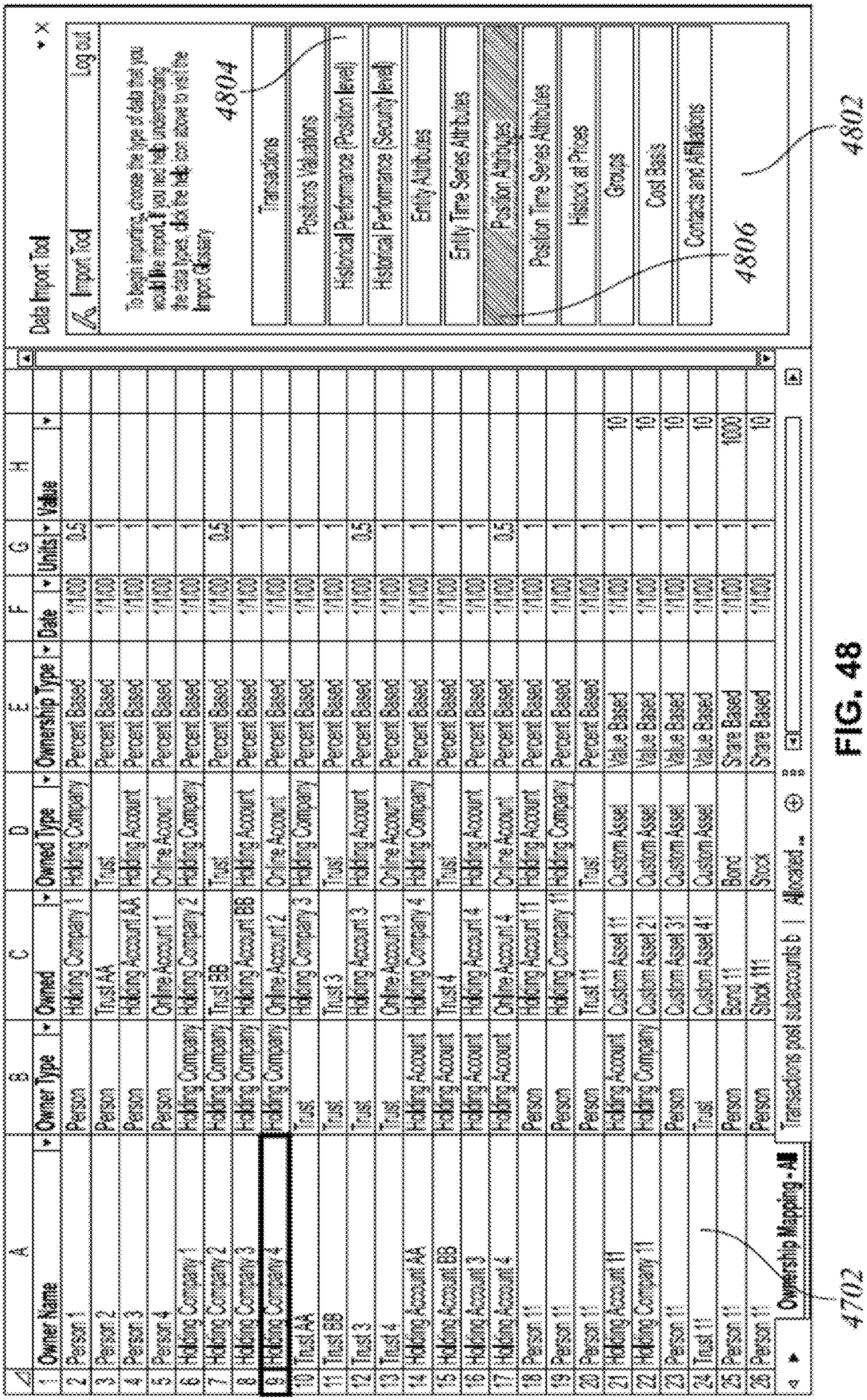
FIG. 48 illustrates an example user interface of a data import tool.

FIG. 48 illustrates an example user interface of a data import tool. In some embodiments, the data import tool is implemented as an embedded application or plug-in, such as within a spreadsheet application. As described herein, in some embodiments the data import tool may act as a "wizard" or "assistant" that guides the user efficiently through a series of steps by which the data may be quickly imported into the graph. When a user launches the data import tool, a user interface is displayed that prompts the user to select a type of data to be imported. For example, the user may be presented with a list 4802 of importable data categories (e.g., types of data that may be imported to the graph), such as transactions, position valuations, historical performance 4804 (e.g., summary data, which may be organized by position level, security level, and/or the like), entity attributes, entity time series attributes, position attributes, position time series attributes, historical prices, groups, cost basis, contacts and affiliations, and/or the like. The user may select a particular data category (e.g., the "position attributes" category 4806) to specify the type of data they wish to import.

Figure 49:
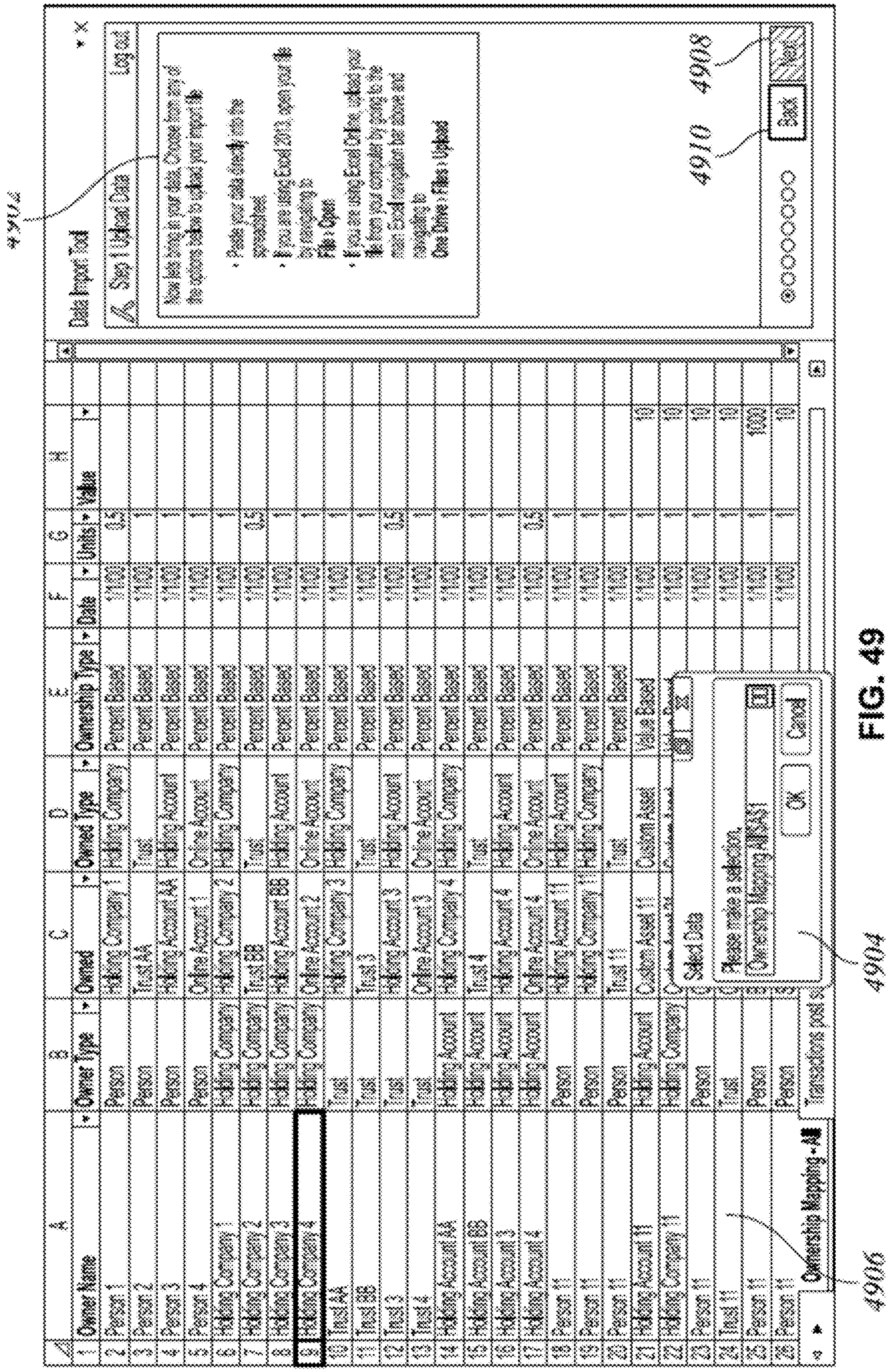
FIG. 49 illustrates an example user interface of the data import tool in which the user may select data items to be imported into the system.

Once the user has selected a data type to be imported, the data items to be imported are identified by the system. FIG. 49 illustrates an example user interface in which the user may select data items to be imported into the system. The data import tool may instruct the user on different ways to identify the data items at sidebar 4902. For example, where the data import tool is associated with a spreadsheet application, the user may select a number of cells in a displayed spreadsheet by entering the coordinates of the desired cells in a dialog box at 4904, and/or by selecting (e.g., clicking and dragging) the desired cells in the spreadsheet 4906. In some embodiments, the user may specify a file containing the data items to be imported.

In some embodiments, data items to be imported may be selected automatically. For example, where the data import tool is embedded in a spreadsheet application, the data of a currently open spreadsheet may be automatically selected as the data to be imported.

Once the data items are selected, the user may press next button 4908 to proceed to a next step of the data import tool. At any time the user may similarly press back button 4910 to return to a previous step of the data import tool.

Once the desired data items are selected, one or more validations are performed to ensure that the data is in a valid format that will be recognized by the system and can be appropriately associated with the graph and/or other aspects of the system. Errors detected during validation may be corrected automatically and/or presented to the user for correction. In some embodiments, errors can be organized and/or grouped, allowing the user to perform a batch fix on multiple detected errors.

Figure 50A:
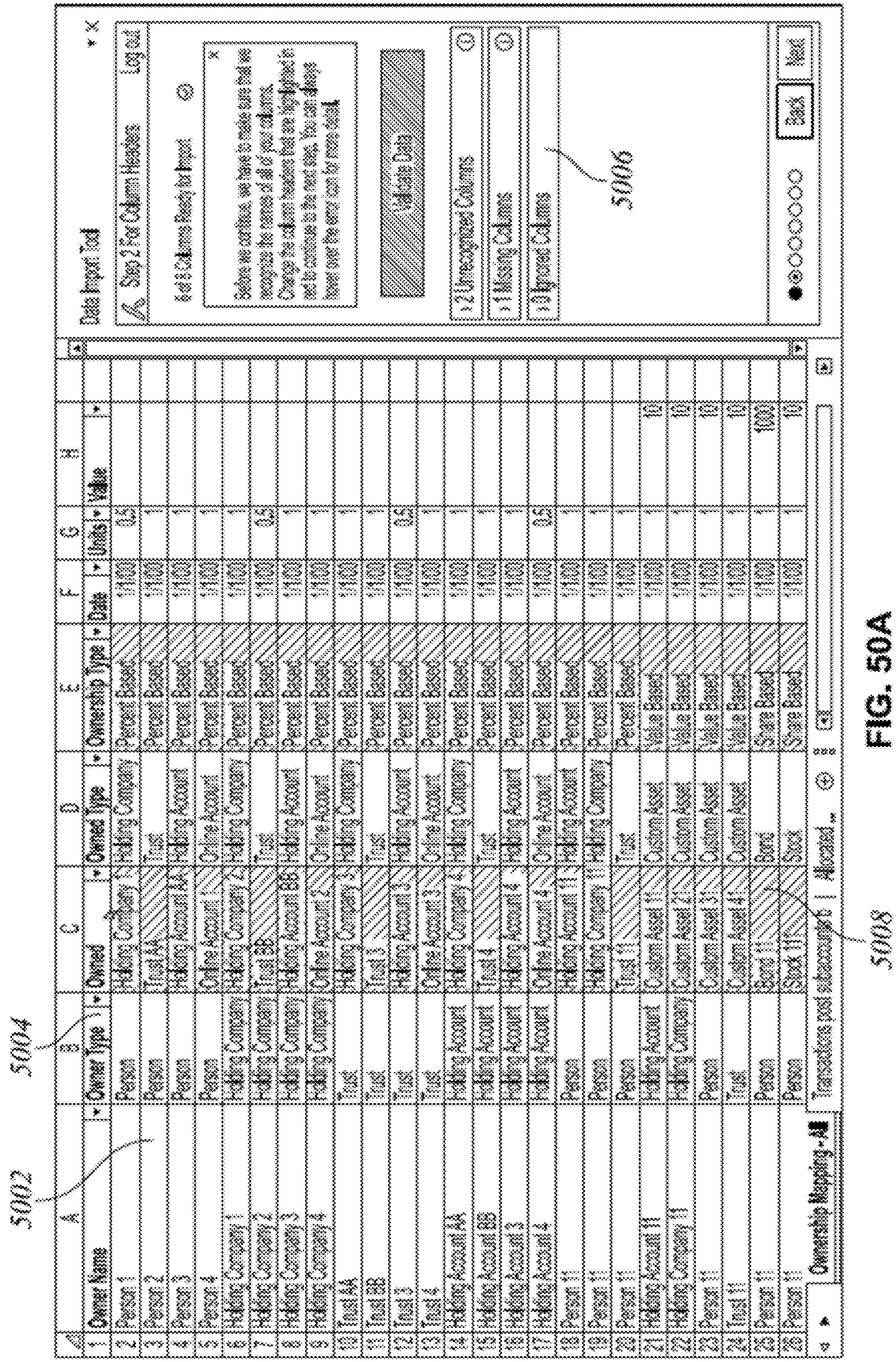
FIGS. 50A and 50B illustrate example user interfaces for performing column validation using the data import tool, in accordance with some embodiments.
Figure 50B:
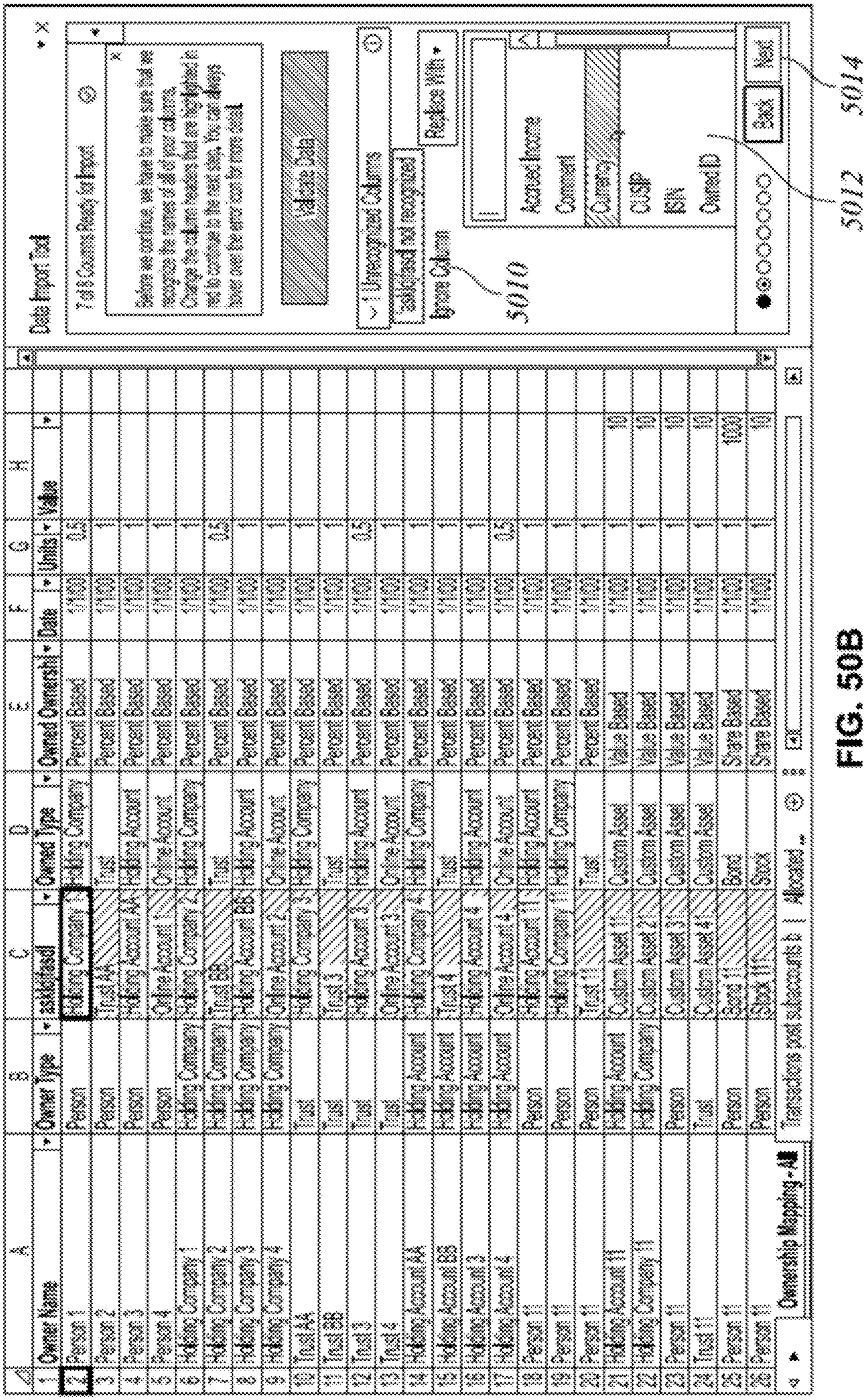

FIGS. 50A and 50B illustrate example user interfaces for performing column validation using the data import tool, in accordance with some embodiments. An importable data format may be associated with one or more required attributes and zero or more optional attributes. In a table or spreadsheet, these attributes may be represented by one or more columns. For example, position data illustrated in spreadsheet 5002 may be associated with columns 5004 corresponding to an owner name attribute, an owner type attribute, an owned name attribute, an owned type attribute, etc.

The data import tool may analyze the column names 5004 of the data to be imported, and compare the column names against one or more required column names and zero or more optional column names (e.g., as expected by the data import tool, as indicated by the graph, and/or the like). For example, as illustrated in FIG. 50A, the data import tool at 5006 presents the user with validation results indicating that two columns of the data are not recognized, and that one required column is missing. In addition, a visual effect can be applied onto the unrecognized columns 5008 (e.g., red highlighting), allowing the user to easily identify which columns of the displayed columns are not recognized.

For example, as illustrated in FIG. 50A, the data import tool indicates the column names "Owned" and "Ownership Type" are not recognized. Instead, the proper names for these columns as recognized by the data import tool are "Owned Name" and "Owned Ownership Type," respectively. The user can manually resolve the error by renaming the columns, or, in the case of optional columns, delete the columns. In some embodiments, the system may automatically resolve the error by determining a most likely match for a column, and automatically editing the column name as appropriate.

In some embodiments, the data import tool may contain one or more interface elements allowing the user resolve the detected column validation errors. For example, for each unrecognized column, the user may select from a drop-down menu 5012 or other interface element may be displayed to the user, allowing the user to select a column name from a list of recognized column names, for which to rename the unrecognized column. Alternatively, the user may select an "Ignore Column" button 5010 to instruct the data import tool to ignore a particular unrecognized column, such that the data in the unrecognized column is not imported. In some embodiments, the data import tool may further present to the user an "Ignore All" button or other interface element (not shown) that allows the user to instruct the data import tool to ignore all currently unrecognized columns.

Once the validation errors are resolved, the user may press next button 5014 to proceed to a next step of the data import tool.

In some embodiments, the data to be imported is associated with one or more entities. For example, for position data, each position is associated with an owner entity (e.g., a person, holding company, trust, and/or the like) and an owned entity (e.g., an account, a trust, a stock, a bond, an asset, and/or the like). When the data is imported, the data is mapped to the various entities and entity relationships contained within the graph (e.g., graph 202). As such, prior to importing the data, one or more entity validations may be performed to match the entities described in the data to be imported with entities present in the graph.

Figure 51:
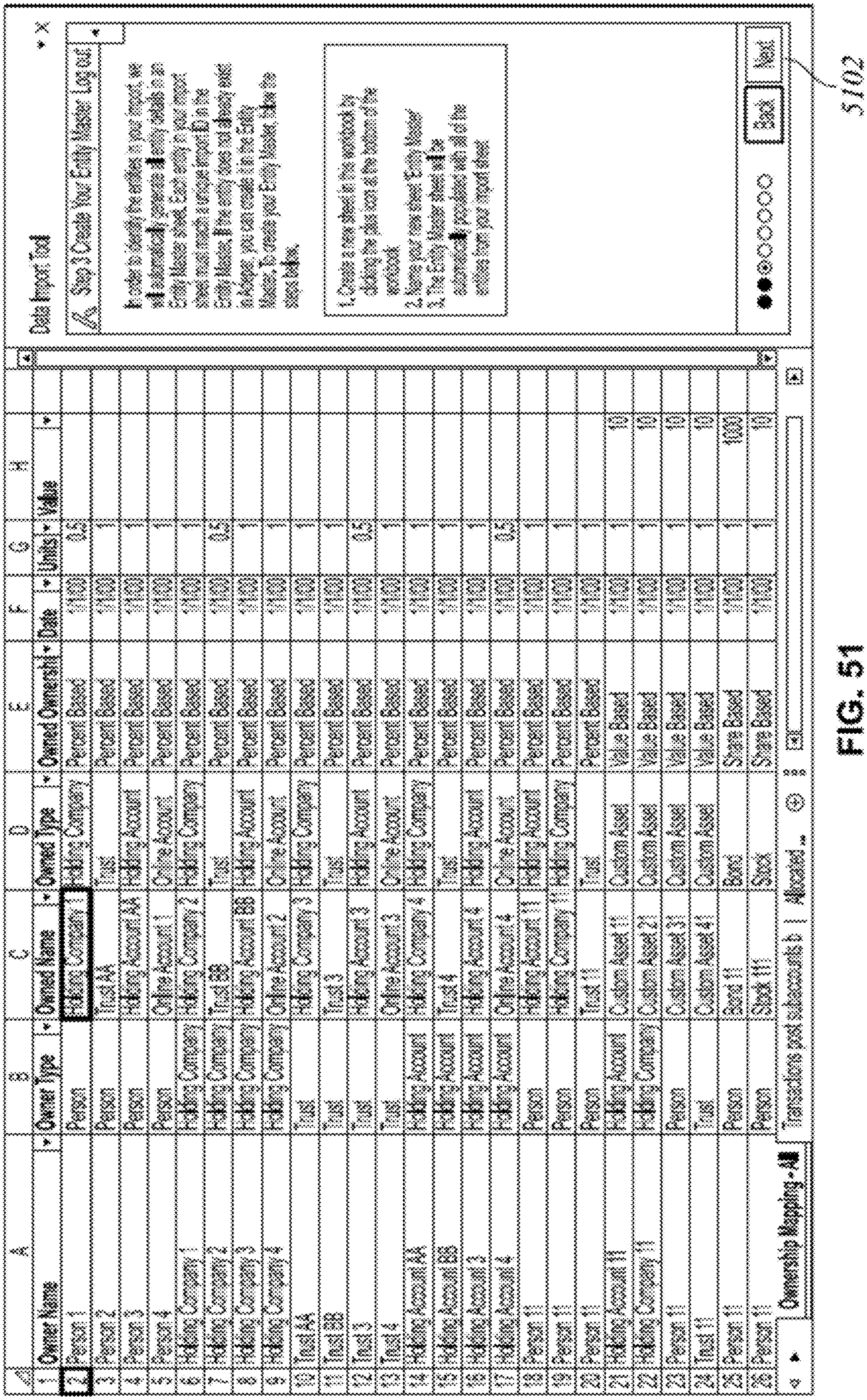
FIG. 51 illustrates an example user interface of the data import tool for validating entities, in accordance with some embodiments.

FIG. 51 illustrates an example user interface for validating entities, in accordance with some embodiments. After the columns of the data have been validated, the data import tool may identify entity references in the data through one or more recognized columns. For example, values in the "Owner Name" column and the "Owned Name" column can correspond to entity names. Other columns may correspond to other attributes associated with the entities (e.g., the "Owner Type" column comprises values corresponding to a "type" attribute associated with the entities named in the "Owner Name" column).

In some embodiments, in order to facilitate entity validation, the data import tool may create an "entity master" sheet in the spreadsheet application. By creating an "entity master" sheet, a user can view entity data contained within the data to be imported in a more organized way. In some embodiments, the data import tool creates the "entity master" sheet by extracting data from the data to be imported. For example, the values in the "Owner Name" and "Owned Name" column are extracted to form a column in the "entity master" sheet indicating entity names.

In some embodiments, the data import tool may prompt the user to create a new sheet in the spreadsheet application to serve as the "entity master" sheet. The data import tool can then populate the sheet automatically based upon the data to be imported. Alternatively, upon validation of the columns of the data to be imported, the data import tool may create the "entity master" sheet automatically.

Once the entity master sheet is generated, the user may press next button 5102 to proceed to a next step of the data import tool.

Figure 52A:
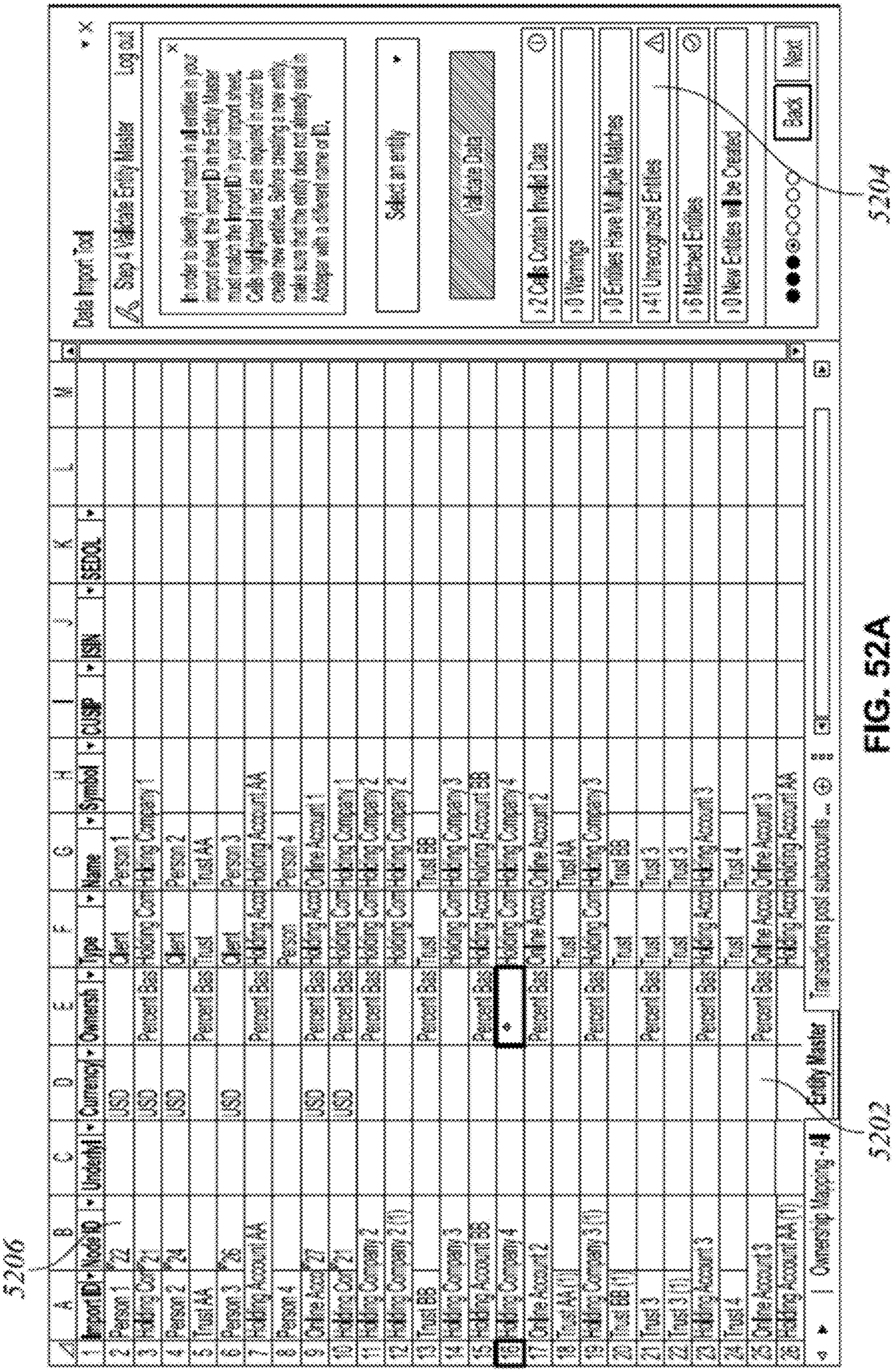
FIG. 52A illustrates an example user interface of the data import tool including an example "entity master" sheet, in accordance with some embodiments.

FIG. 52A illustrates an example user interface including an example "entity master" sheet, in accordance with some embodiments. The entity master sheet 5202 comprises a column listing the names of the entities extracted from the data to be imported, as well as zero or more additional columns corresponding to attributes associated with the entities. These may include entity type, ownership type associated with the entity, currency type associated with the entity, and/or the like. In some embodiments, different entities can be associated with different attributes. For example, an "online account" type entity may be associated with an "ownership type" or "currency" attribute, while a "person" type entity may not be associated with these attributes.

Figure 52B:
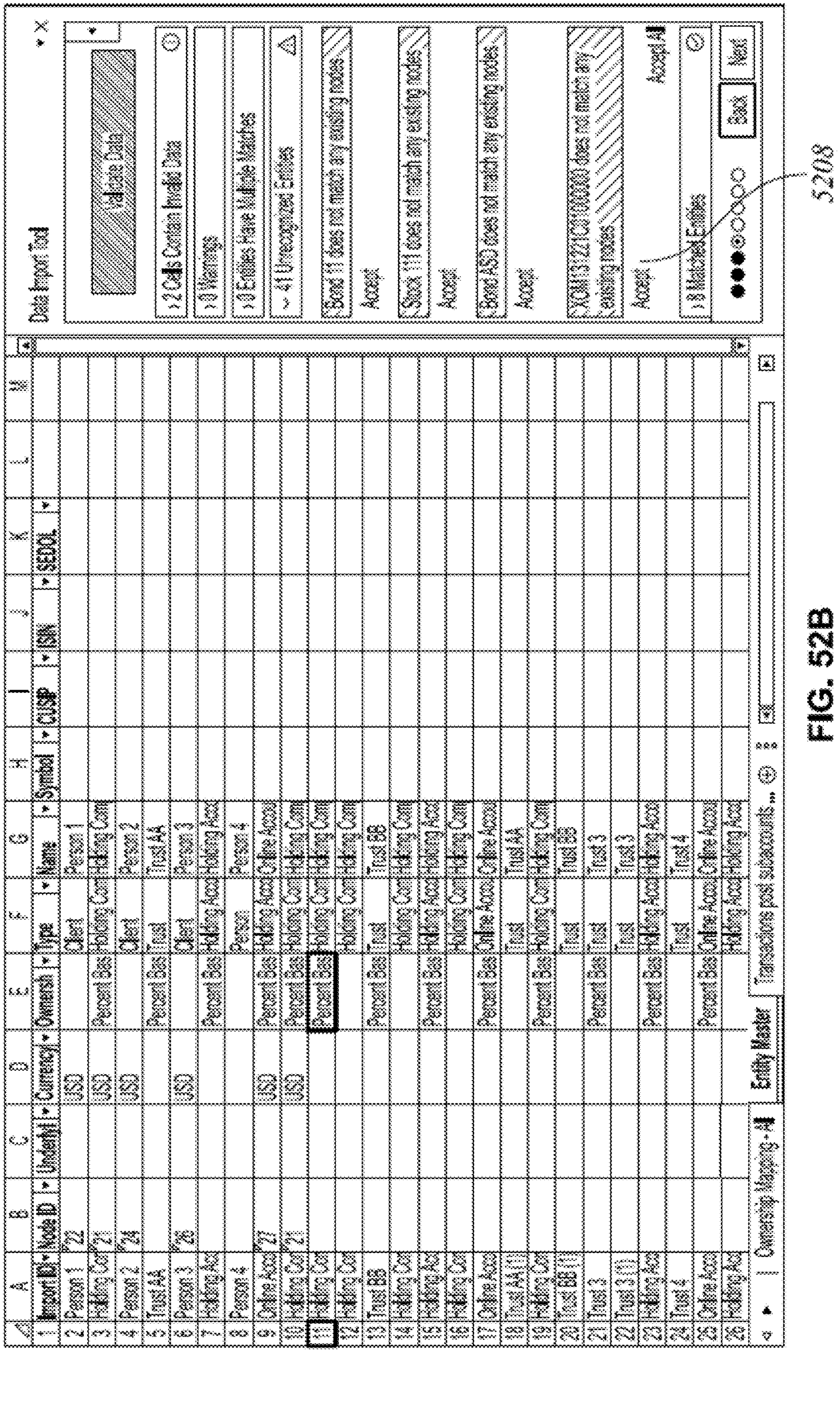
FIG. 52B illustrates an example user interface of the data import tool for allowing a user to analyze unidentified entities on the "entity master" sheet.

The data import tool attempts to match the extracted entities displayed in the "entity master" sheet with existing entities in the graph, and displays the results to the user. For example, as illustrated in FIG. 52A, the data import tool at 5204 indicates to the user that the data to be imported contains six entities that have been matched with existing entities in the graph, and 41 entities that have not been recognized. The system may match individual or combinations of the entity names, ownership, name, or any other entity attributes with the existing entities in the graph. Such matches may not be a perfect match. The system can use a "fuzzy matching" technique where the system can generate an entity match when the data to be imported corresponds with some segments of attributes of existing entities in the graph to a percentage value. The system can pre-determine the percentage value. The user can also set the percentage value for the fuzzy match. The percentage value may be low and as a result, an entity may be matched for multiple times as illustrated in FIG. 52B. In some embodiments, the data import tool may, for each matched entity, retrieve from the graph an identifier (e.g., node ID) associated with the entity, which may be displayed to the user. In some embodiments, cells of the spreadsheets corresponding to the various entities on the "entity master" sheet may contain visual indicators (e.g., color) based upon whether the entity has been matched with a graph entity (e.g., green for matched entities, yellow for unrecognized entities, and/or the like).

FIG. 52B illustrates an example user interface for allowing a user to analyze unidentified entities on the "entity master" sheet. The user may review each unmatched entity in sidebar 5208, and choose to accept the unmatched entities as new entities to be added to the graph. In addition, the user may also be presented with a user interface element allowing the user to accept all unmatched entities. The user may also edit one or more unmatched entities (via the spreadsheet or the sidebar 5208) such that they match with existing graph entities.

In addition, in some embodiments, an entity may be matched multiple times. In one example, the fuzzy matching process illustrated in FIG. 52A is defined with a low percentage value so an entity may be matched multiple times when multiple existing entities in the graph contain the same small segments of attributes. In another example, an identified entity in the data to be imported can be matched with multiple graph entities because the identified entity is a subsidiary or parent company of the multiple graph entities. These entities may be highlighted on the "entity master" sheet, prompting a user to resolve errors, if any (e.g., through manual correction). In some embodiments, one or more identified entities may be merged as they may correspond to a same entity in the graph.

Figure 52C:
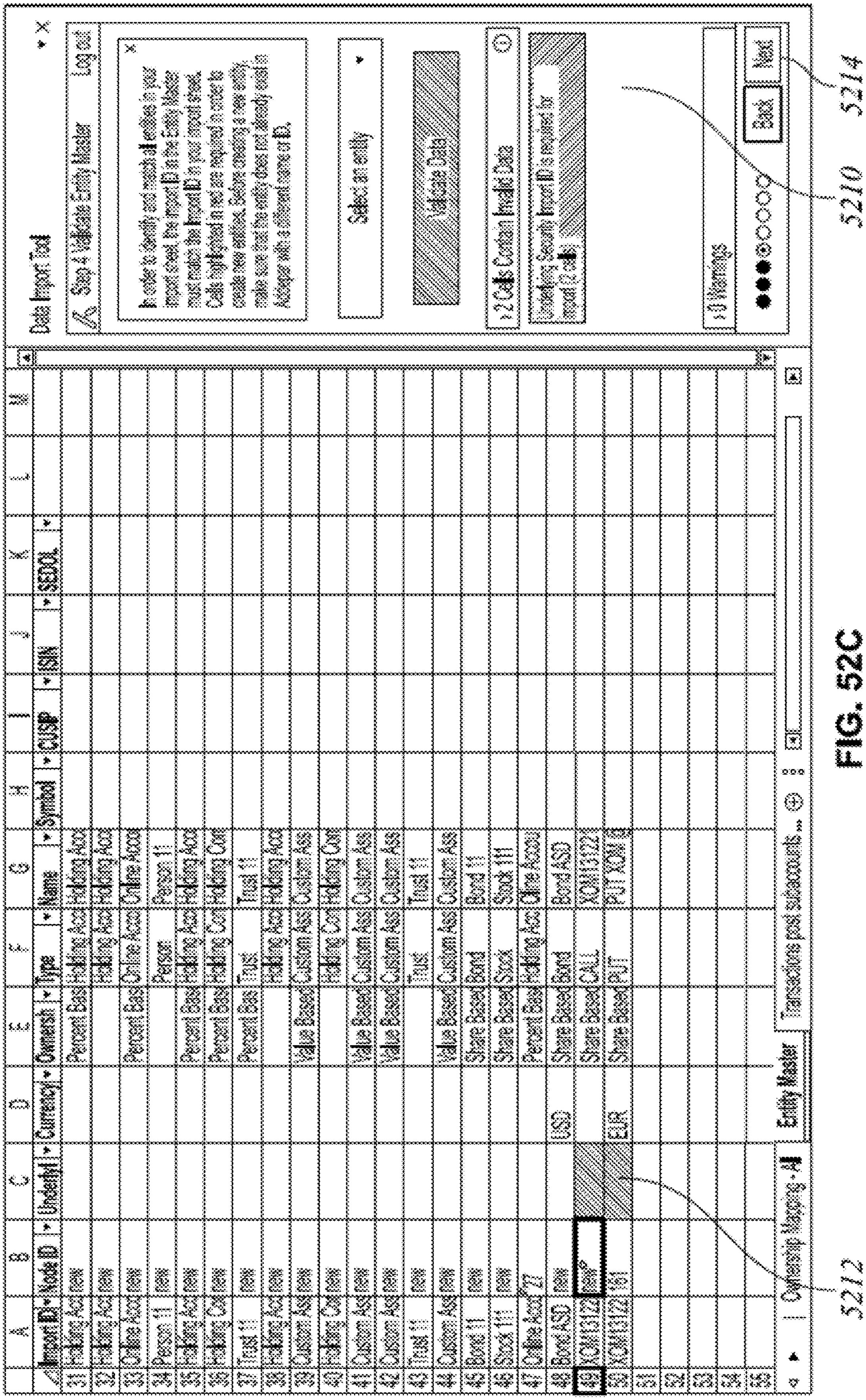
FIG. 52C illustrates an example user interface of the data import tool containing invalid entity data.

In some embodiments, one or more entities may be associated with invalid data. FIG. 52C illustrates an example user interface containing invalid entity data. For example, a particular entity may be associated with a "type" attribute that is not accepted or recognized by the graph. Some entities may need to be associated with another entity or with additional data. For example, an entity corresponding to a "Call" or "Put" option may be required to be associated with an underlying entity corresponding to a security (e.g., a stock). The user may view the detected errors in sidebar 5210. In addition, spreadsheet cells 5212 corresponding to the invalid data may be highlighted, prompting the user to correct the error (e.g., by specifying an underlying entity for the "Call" or "Put" type entity).

Once the columns and entities of the data to be imported have been validated, the data may be analyzed by the data import tool for additional warnings and/or errors. The user may proceed to this step, for example, by pressing next button 5214.

Figure 53A:
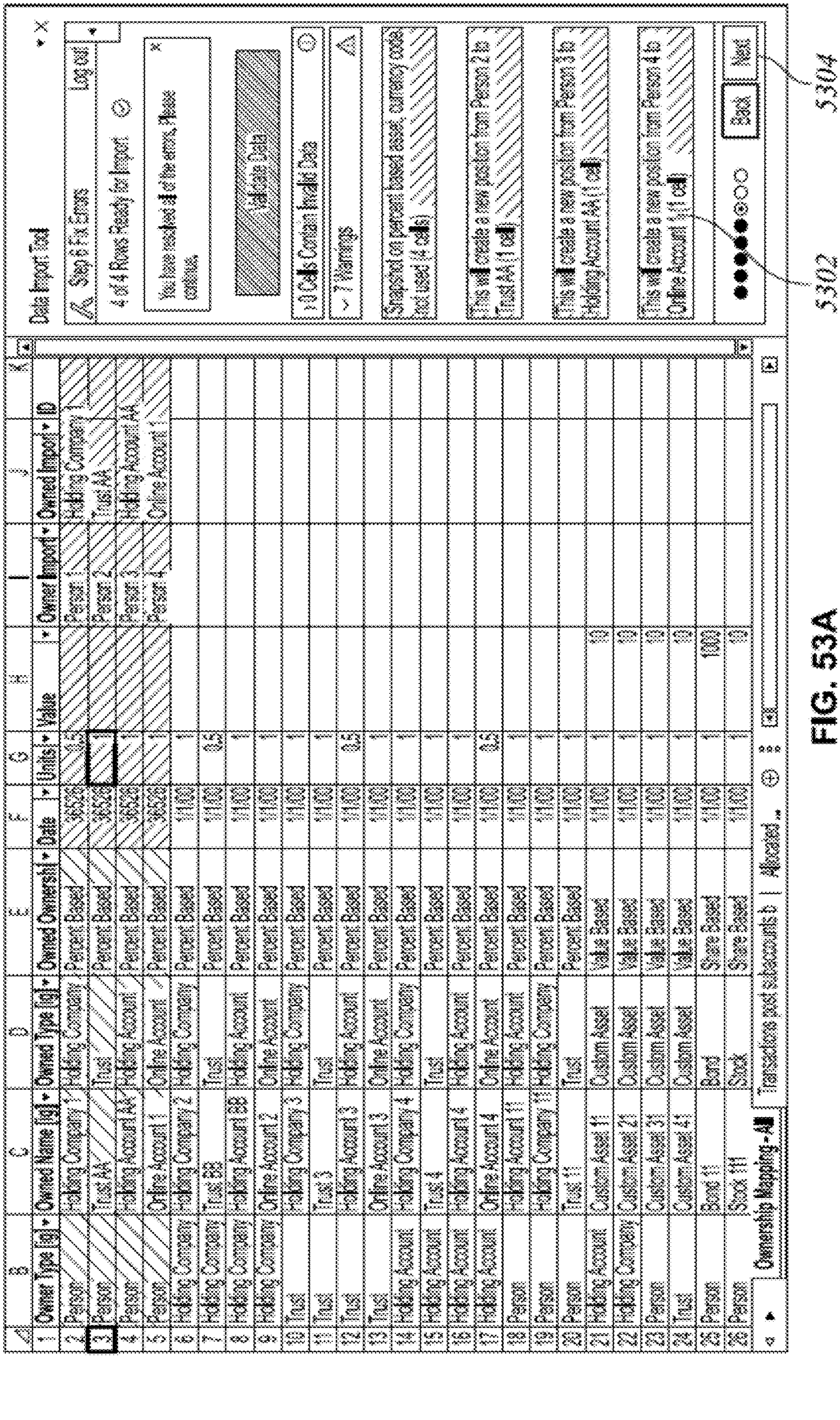
FIG. 53A illustrates an example user interface of the data import tool for validating remaining data, in accordance with some embodiments.

FIG. 53A illustrates an example user interface of the data import tool for validating remaining data, in accordance with some embodiments. For example, the data import tool may, in sidebar 5302, inform the user that importing the data will result in new positions between entities being created in the graph. This is because position relationships in the graph, once created, are difficult to undo. Thus, the user may be notified in order to verify that the new position relationships are ones that they intend to create.

Figure 53B:
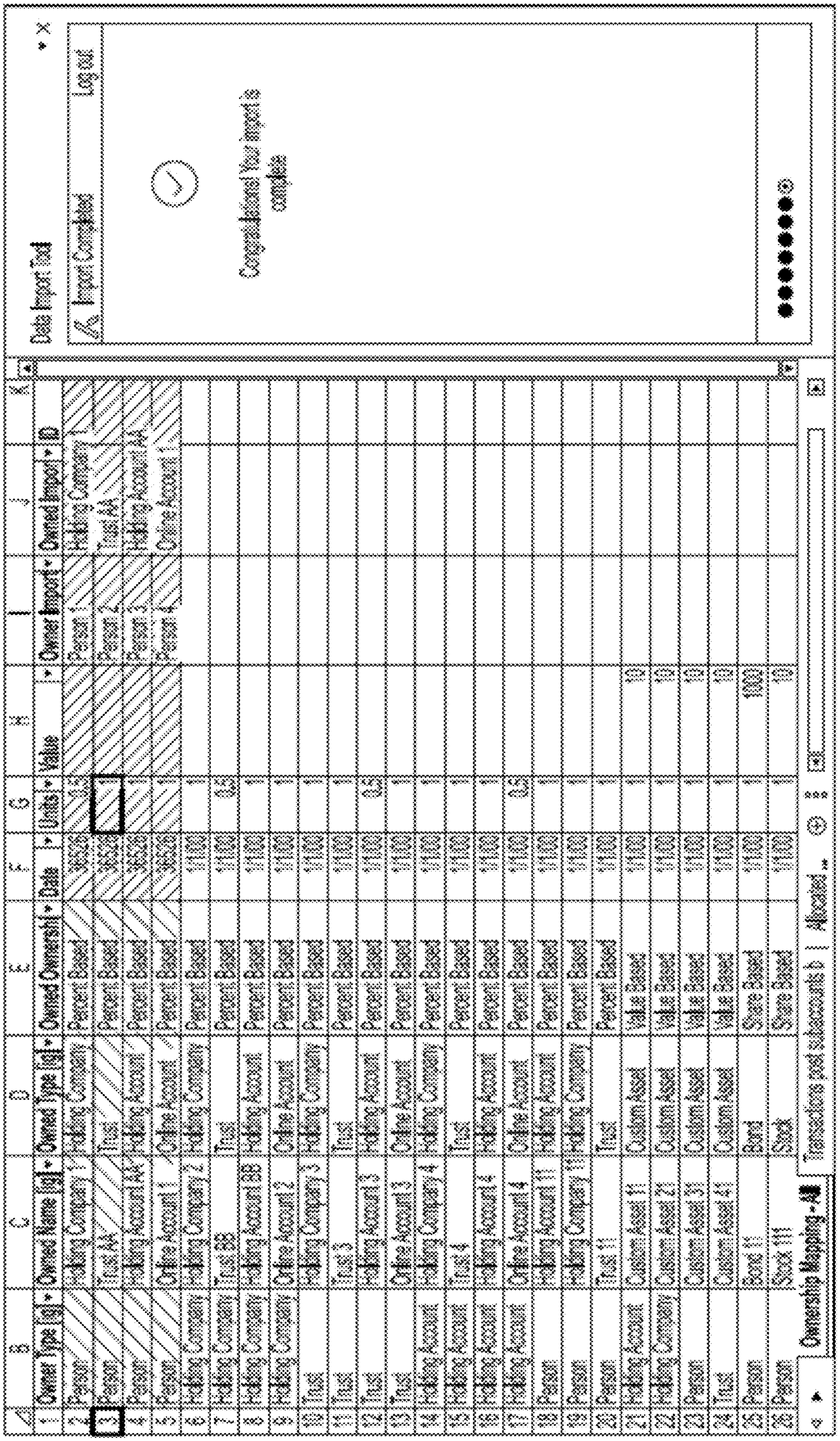
FIG. 53B illustrates an example interface of a data import tool showing a completed import.

In addition, the data import tool may analyze the data for invalid data (e.g., a value in a "Date" column that is not a date, a value in a "Units" column that is not a number, and/or the like). Once all errors and warnings have been resolved, the data may be imported by selection of next button 5304 to proceed to a next step of the data import tool. FIG. 53B illustrates an example interface of a data import tool showing a completed import.

In some embodiments, the data import tool may proceed from one step to the next automatically (for example, when data is selected or when data is validated), without the need for the user to select a "next" button in the user interface).

Figure 54:
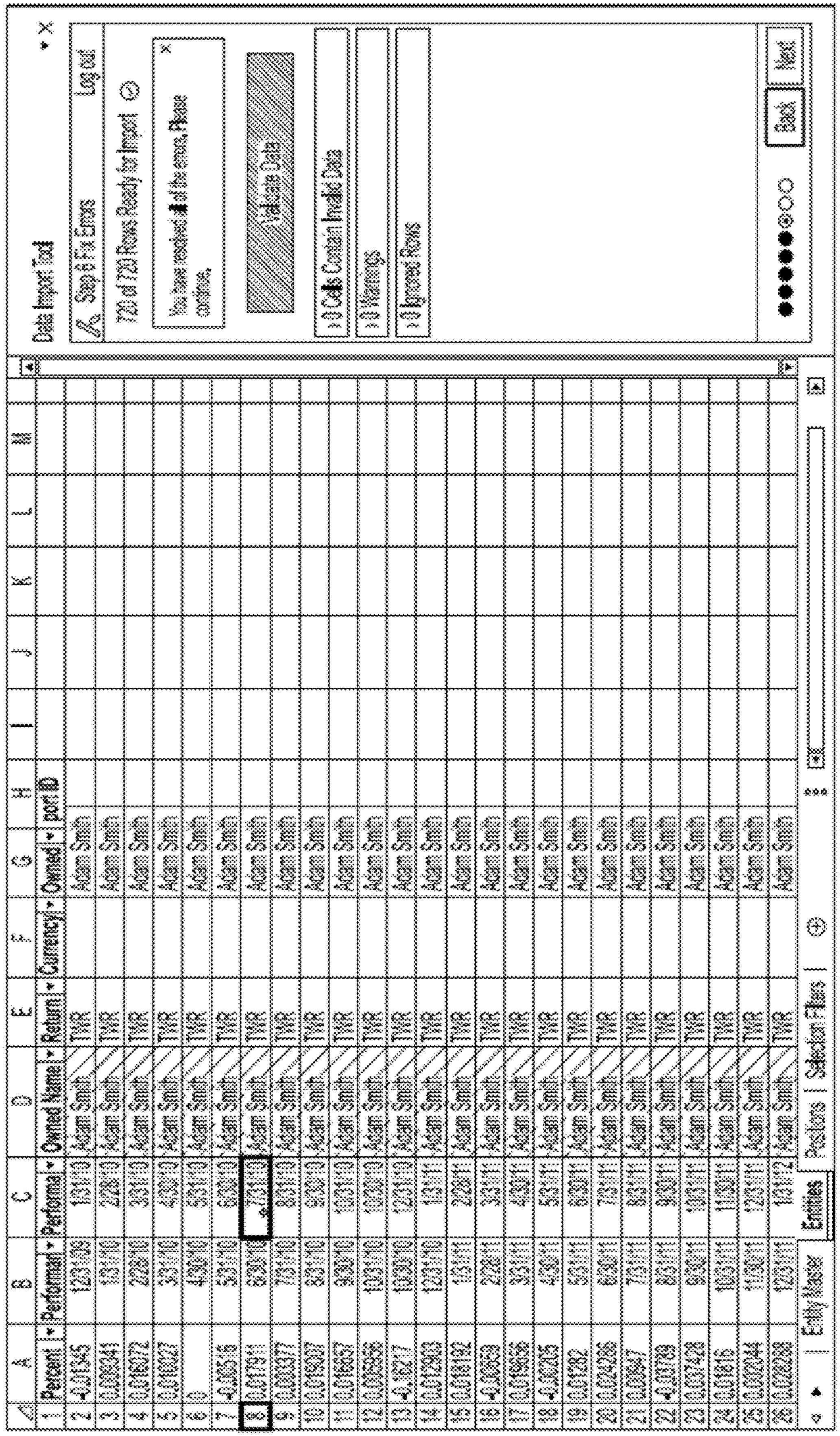
FIG. 54 illustrates another example user interface including data to be imported using a data import tool.

FIG. 54 illustrates another example user interface including data to be imported using a data import tool. In the illustrated embodiment, the data to be imported comprises historical performance data (also referred to here as "summary data"). The data may comprise columns corresponding to a performance start date, a performance end date, an entity associated with the performance (e.g., an owner name), a return metric associated with the performance (e.g., return amount, return percentage, and/or the like), and a return value. For example, the return metric may correspond to a time-weighted return (TWR) (or other metric, such as a value, cash flow, and/or the like), and the return value may indicate a value associated with that metric. In some embodiments, the values for an attribute (e.g., return metric) are required to be selected from one or more return types recognized by the graph. An error may be returned to the user if a type of the attribute is unrecognized, prompting the user to enter a recognized type.

The data import tool may perform one or more additional validations on the data. For example, the data import tool may verify that the date ranges associated with a particular entity (e.g., "Owned Name") do not overlap. In addition, the data import tool may verify that the values in a column adhere to one or more format requirements based on attribute values associated with other columns. For example, if the return type is TWR, the return value must be in the form of a percentage value. For other types of metrics, the metric value may be required to be in a different format (e.g., a dollar value).

In some embodiments, one or more model attributes may be added to the data to be imported, for example, in the instance of summary data (as described above). These model attributes may be part of a specific set of model attributes with which data may be associated. Some examples of model attributes include perspective, filters, and/or bucketing factors. Model attributes may be understood as indicating attributes associated with specific individual rows within a generated table of the user interface. Thus, the model attributes can be used as a procedural definition for looking up the associated data for calculating metrics or column factors of specific individual rows. For example, there may be various types of data associated with calculating the user-chosen metrics or column factors in a given row of the generated table. The model attributes consisting of perspective, filters, bucketing factors, and/or the like may specify a row of the generated table, but can also be used to define an "address" for which to look up in a database all the data associated with that row.

Thus, the sets of model attributes can be associated with corresponding data for import, so that data can be looked up if needed for a specific individual row in the generated table. The method of looking up relevant data can vary. In some embodiments, the set of model attributes is associated with a unique model ID, which can be used to look up in a database any data associated with that set of model attributes. In some embodiments, the data import tool may be used to import sets of summary data which may eventually be stored in a database table, such as database table 2904. The sets of summary data may be associated with specific model IDs, which are generated from unique sets of model attributes. Thus, the model attributes link the summary data, as stored in the summary data database table, with specific rows of the generated table (alternatively visualized as nodes of a bucketing tree).

Figure 55:
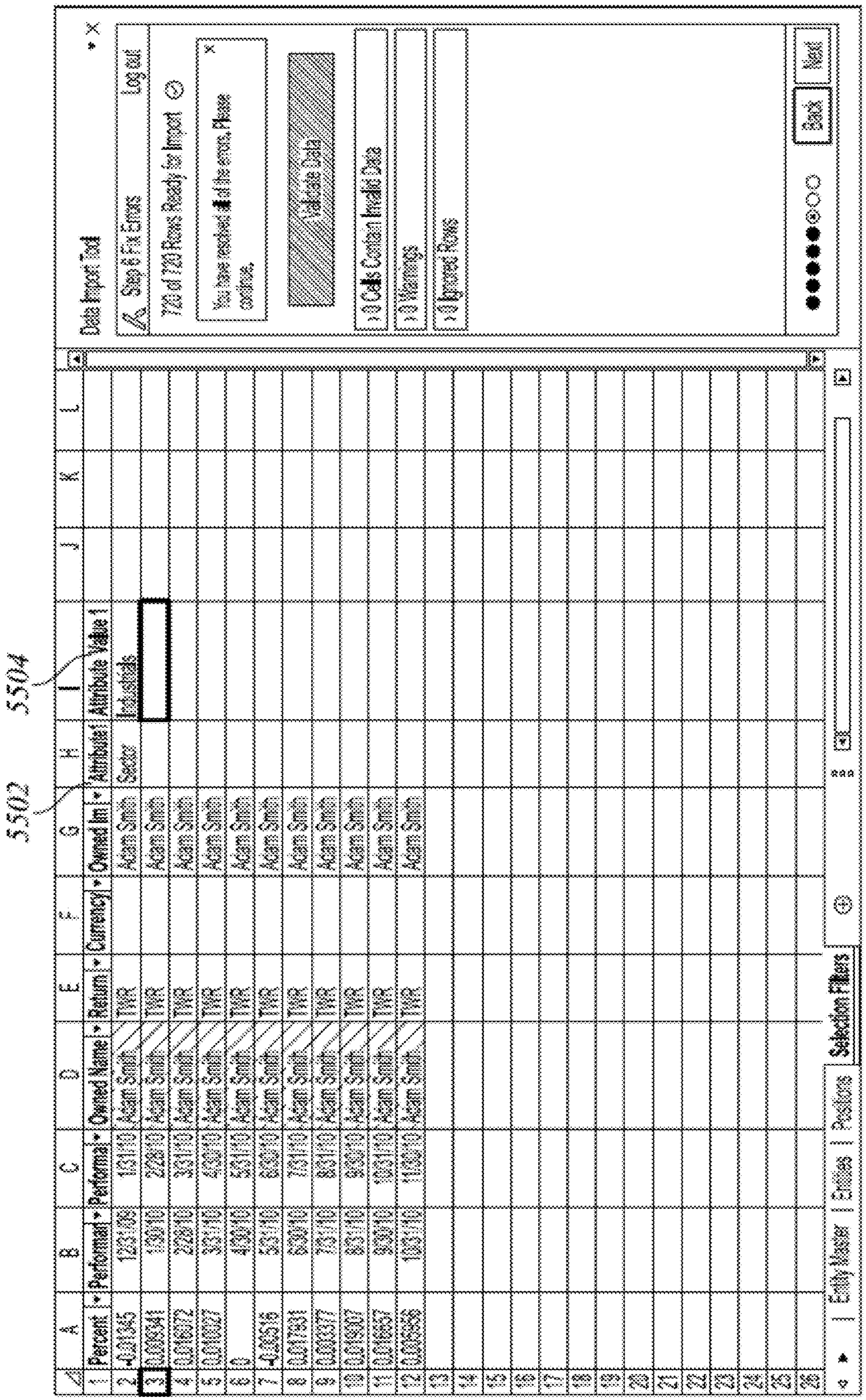
FIG. 55 illustrates an example user interface of a data import tool specifying a selection filter.

By allowing a user to define sets of model attributes to associate with sets of data, the system is able to recognize the model attributes and the associated data, and to find that associated data later when needed, such as when the user has added a specific row to the generated table that has calculations based on that data. A user may be able to define sets of model attributes through a user interface of the data import tool. For example, FIG. 55 illustrates an example user interface of a data import tool specifying model attributes, which may be used to group rows of the data to be imported by attribute value.

To create an additional model attribute to associate with a row of the generated table, an "Attribute" column 5502 corresponding to the attribute to be filtered on, and an "Attribute Value" column 5504 corresponding to values of the attribute may be created. For example, in the illustrated embodiments, the data is to by a "Sector" attribute, the value of the "Sector" attribute for the first row of data being "Industrial." In some embodiments, multiple "Attribute" and "Attribute Value" columns can be created. The data import tool may verify that the attribute and attribute values are recognized by the graph, and/or otherwise valid and/or recognized as a summary data type that may be imported into the system.

In some embodiments, different users of the system may have access to different graphs or different portions of a particular graph, based upon one or more permissions associated with the user. In an implementation, the data import tool may be used to import permissions information such that various permissions may be associated with, for example, particular nodes of the graph and/or other aspects of the system.

Figure 56:
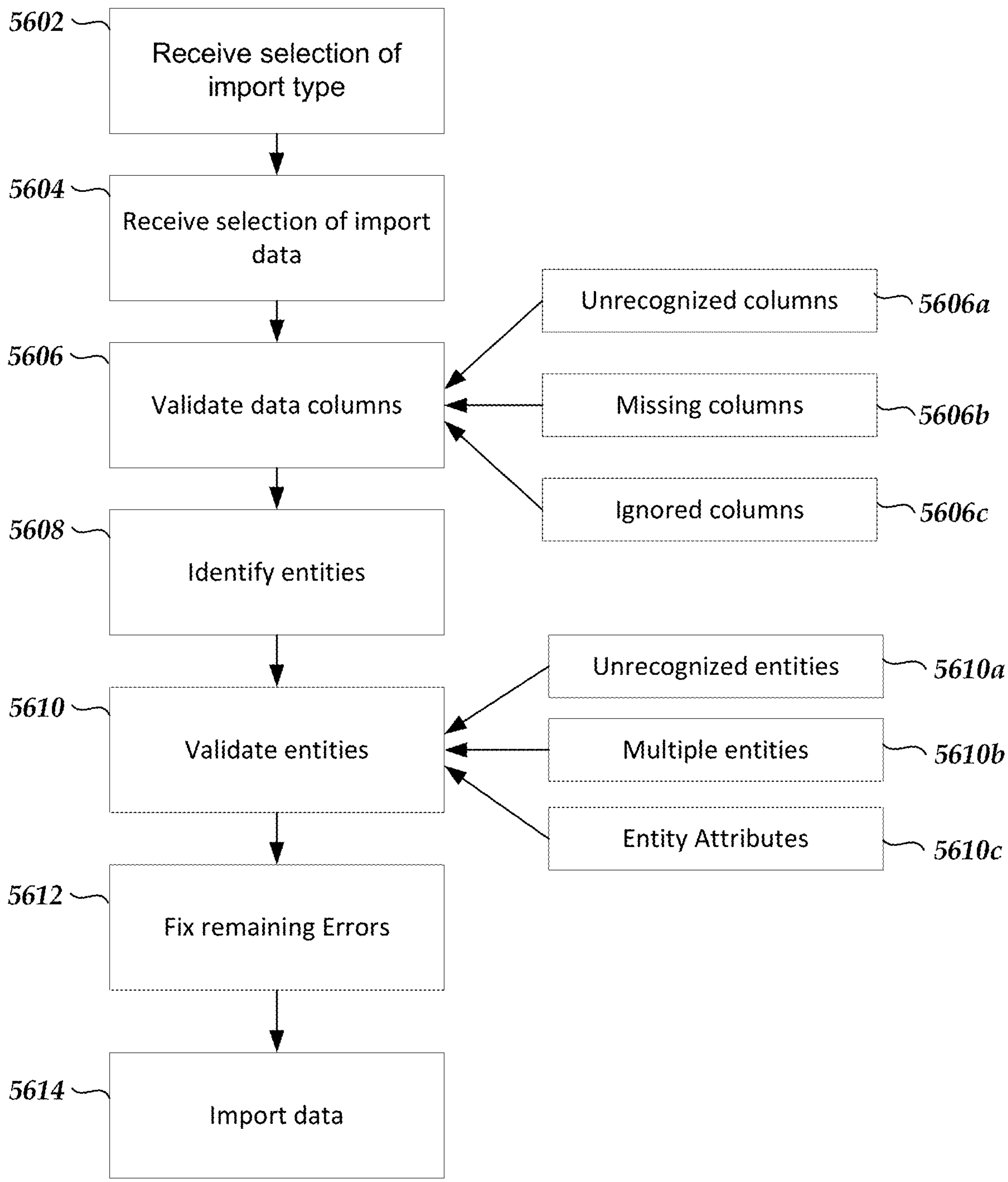
FIG. 56 illustrates a flowchart of an example process of the data import tool for importing data, in accordance with some embodiments.

FIG. 56 illustrates a flowchart of an example process for importing data, in accordance with some embodiments. At block 5602, an import type is selected. The import type corresponds to a format of data to be imported, which may include transaction data, position data, entity attribute data, historical performance data, and/or the like. The type of data to be imported can correspond to different aspects of a graph (e.g., graph 202). For example, position data may correspond to edge relationships signifying ownership interests between different nodes in the graph, entity attribute data may correspond to data for particular nodes in the graph, summary data may correspond to combinations of nodes and/or edges of the graph or model attributes, and/or the like.

At block 5604, a selection of data to be imported is received. In some embodiments, a user may select data displayed in a spreadsheet application to be imported. Alternatively, the user may specify a file containing the data. In some embodiments, the data import tool may automatically identify data to be imported.

At block 5606, one or more columns of the data to be imported are validated. Each data format may be associated with one or more required columns and zero or more optional columns. The data import tool may compare the columns of the data to be imported with the required and optional columns associated with the data format.

As a result of the comparison, the data to be imported may be found to contain one or more unrecognized columns (5606*a*) and/or one or more missing columns (5606*b*). In response, the user can add or rename one or more columns.

For example, for each unrecognized column, the user may select a recognized column name for which to rename the unrecognized column. In some embodiments, the user may elect to ignore one or more columns (5606c), such that data associated with the columns will not be imported.

At block 5608, entities contained within the data to be imported are identified. In some embodiment, the data import tool extracts entity data from one or more columns from the data to be imported. For example, when importing position data, each piece of position data may be associated with two different entities (e.g., an owner entity and an owned entity). Other types of data may be associated with different types of entities. Information for these entities may be contained in designated columns of the data, which the data import tool can recognize and extract. In some embodiments, an "entity master" table or sheet is created, allowing the user to view a list of the entities associated with the data, along with one or more attributes associated with the entities.

At block 5610, the identified entities are validated. The data import tool may compare the identified entities against existing entities in the graph. The identified entities may be determined to comprise recognized entities that match existing entities in the graph, as well as unrecognized entities (5610a). One or more unrecognized entities can be designated as new entities that will be added to the graph. Alternatively, the user may edit or change one or more unrecognized entities such that they match with existing graph entities.

In some embodiments, multiple identified entities (5610b) may be matched with a single graph entity, or vice versa. The data import tool may prompt the user to edit one or more of the matched entities (e.g., delete an entity or differentiate an entity). In some embodiments, one or more identified entities matching a single graph entity may be merged.

In some embodiments, the data import tool may also analyze the values of one or more attributes (5610c) associated with the identified entities. For example, a particular entity may be associated with an attribute value that is not accepted or recognized by the graph. Some types of entities may be required to be associated with another entity or with additional data. Any detected errors may be highlighted to the user, prompting appropriate corrections to be made.

At block 5612, remaining errors in the data to be imported are identified and corrected. The data import tool may analyze the data for invalid values, invalid value types, and/or the like. For example, a value in a "Date" column may be restricted to date values, while a value in a "Units" column may be restricted to numerical values. In some embodiments, the values in a particular column may be restricted based upon other values in the column or in other columns. For example, where the data comprises historical performance data, each row of data may be associated with a date range (e.g., a start date and an end date). The data import tool may check that data ranges associated with a particular underlying entity do not overlap with each other (e.g., a start date of a particular data range may not be between the start and end dates of another date range associated with the same entity). Any detected errors may be highlighted and displayed to the user, allowing the user to make appropriate corrections.

In addition, the data import tool may present the user with one or more warnings. For example, the warnings may inform the user that importing the data will cause certain types of actions to be performed (e.g., the creation of new positions between entities being created in the graph), and may prompt the user to verify that these actions are intended.

Once all errors and warnings have been resolved, the data may be imported. At block 5614, the data is imported to the graph.

Figure 57:
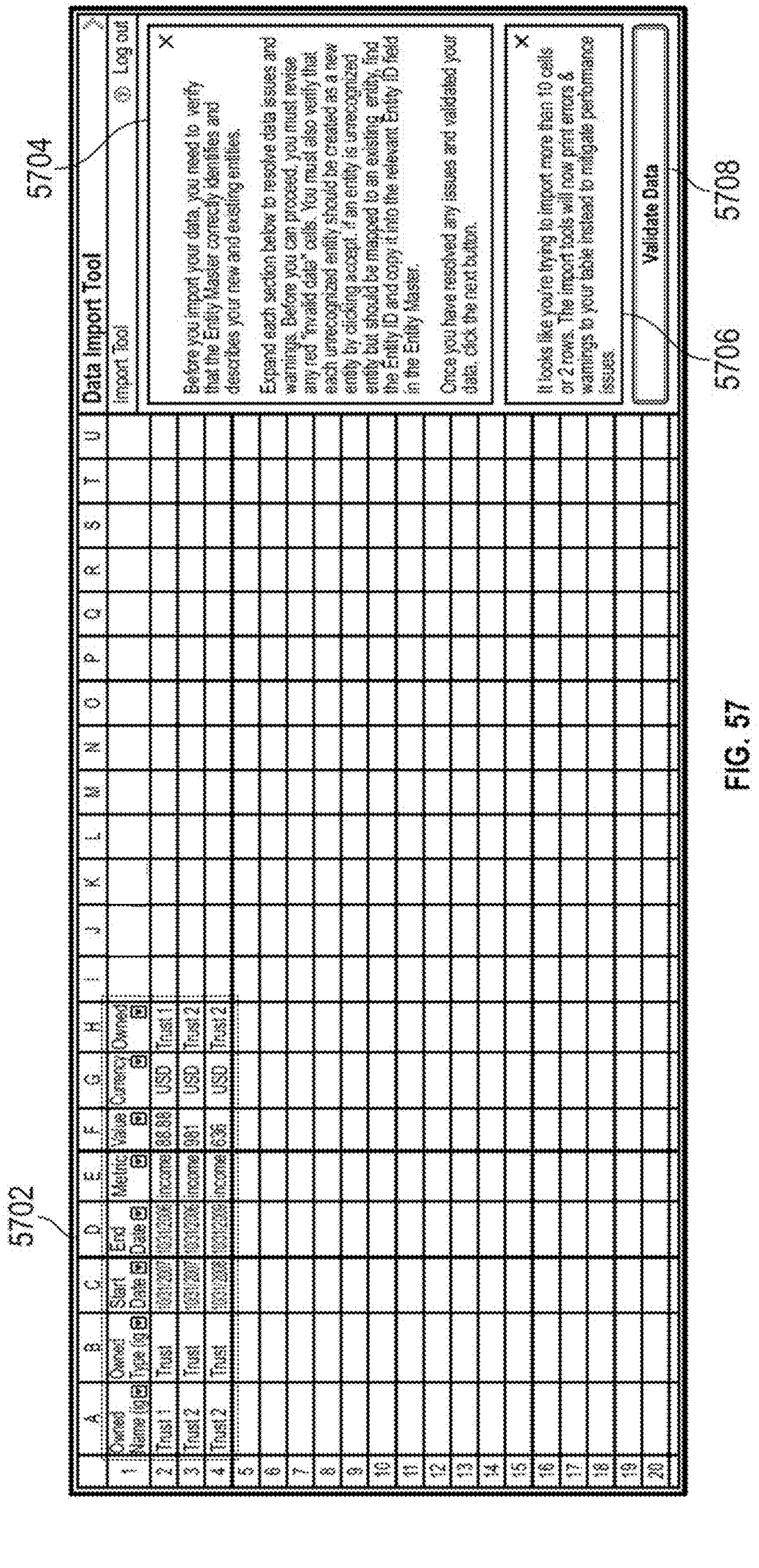
FIGS. 57 and 58 illustrate example user interfaces of a data import tool for detecting and displaying errors in a spreadsheet software application.
Figure 58:
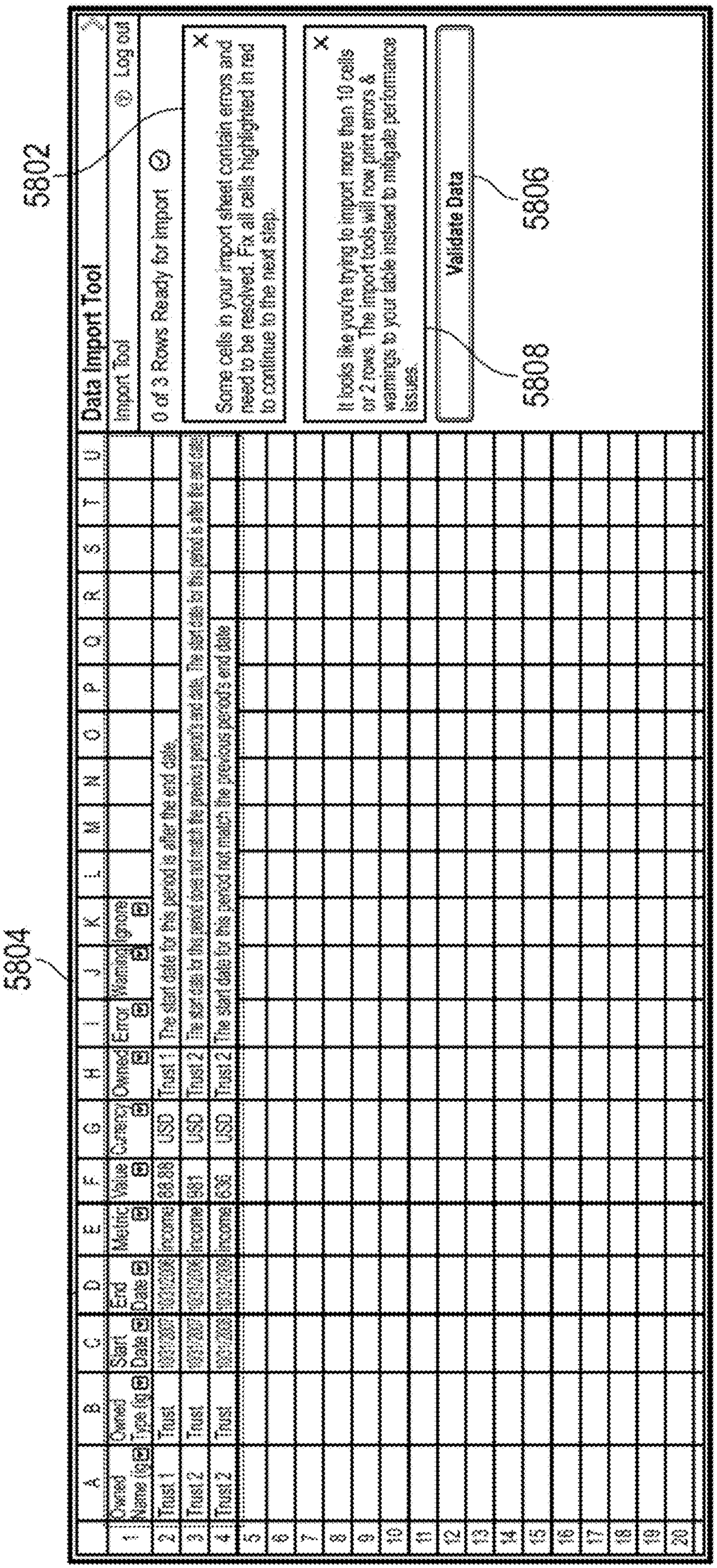

The import tool can also help detect certain invalid data and display the detected errors in the spreadsheet application as illustrated in FIGS. 57 and 58. In one implementation, the user may select one or more particular data categories to specify the types of data they wish to import as in FIG. 48. Once the user has selected data types to be imported, the data to be imported are identified by the system in a highlighted box 5702. The import tool can, via a notification box 5704, notify the user that before the data can be imported to the graph system 4610, the data need to be verified. Upon detecting the user is trying to import more than 10 cells or 2 rows (or any other amount, which may be predetermined) of data items, the import tool can, via a notification box 5706, notify the user it will print detected errors or warnings in the spreadsheet application. When the user clicks the validate data button 5708, the system can calculate and detect the data to be imported for errors. Such errors include start dates and end dates of assets, whether a first end date of an asset matches a second start date of the asset, and the like. The system may then display the errors in the column 5804, as shown in FIG. 58. The user can modify the data to be imported according to the displayed errors and then click the validate data button 5806. If the errors have been corrected, the system can proceed to transfer the data to the graph system 4610; otherwise, uncorrected or new errors can be shown in column 5804.

Now referring back to FIG. 46, in some implementations the spreadsheet software application 4606 and/or the data import tool 4608 (e.g., as implemented as a plug-in of the spreadsheet software application 4606) may include one or more technical limitations. For example, in an implementation either or both of the spreadsheet software application 4606 or the plug-in version of the data import tool 4608 may have a hard time limit on how long a main thread of those components can process data, transfer data, or wait for data or responses to requests, without timing out. Thus, in some instances, the data import tool 4608, operating as a plug-in of the spreadsheet software application 4606, may request data from the spreadsheet software application 4606 via an API (as described above). The data import tool 4608 may then perform operations on the data and/or or send data, for example, via an API (as described above) to the graph system 4610 for processing. While the data is being processed, if the processing takes longer than at time out limit of the the spreadsheet software application 4606 or the plug-in data import tool 4608 (e.g., which may operate in a plug-in web browser environment of the spreadsheet software application 4606), the data processing may fail or processed data may not be transferred correctly. An example of such as hard time limit may be a time limit of 5 seconds for processing a plug-in, which may mean that after running the data import tool for 5 seconds, the spreadsheet software application reloads the data import tool 4608 (thus canceling any previous requests or data processing). This, in some cases, such a hard time limit will not give the data import tool 4608 sufficient time to process and transfer data to and/or from the graph system 4610 via APIs, and/or to and/or from the spreadsheet software application 4606 via APIs. The problem can happen when the user tries to import huge volumes of data. The problem can also happen when the system tries to loop through the data to be imported. Insufficient processing time may cause only partial data or none of the data to be imported to the graph system 4610.

In one example of implementation, to overcome one or more of the technical limitations described above, the system may advantageously generate one or more new background scripts 4612 and run the data import tool 4608, and/or instances of the data import tool 4608, in these background scripts. The background scripts 4612 can run in the background independently of other scripts, including the main data import tool thread, and may communicate with the data import tool 4608 and/or the graph system 4610 via one or more APIs as illustrated in FIG. 46. Thus, according to an implementation, the background scripts 4612 do not interfere with the performance of the spreadsheet software application 4606 and the spreadsheet software application 4606 will not reload the data import tool 4608 even if it spends more time processing and transferring the data than the spreadsheet software application's hard time limit. Accordingly, the data import tool 4608 may have sufficient time to process and communicate the data to the graph system 4610 and/or the spreadsheet software application 4606 via the one or more APIs. In an implementation, the background scripts 4612 may be implemented as Web Workers. In other implementations, the background scripts 4612 may be implemented using any other programming techniques that can generate background scripts and perform background tasks with or without interfering with a main thread. In various implementations the background scripts 4612 may include all the functionality of the data import tool 4608, or a subset of the functionality data import tool 4608.

12.0 Additional Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure.

It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system configured to access one or more electronic data sources in response to inputs received via an interactive user interface in order to automatically determine metrics calculated based on summary data and insert the metrics into a dynamically generated table of the interactive user interface, the computing system comprising:

a computer processor; and one or more computer readable storage mediums configured to:

store a complex mathematical graph comprising nodes and edges, each of the nodes storing information associated with at least one of an account, an individual, a legal entity, or a financial asset, each of the edges storing a relationship between two of the nodes, wherein a plurality of attributes is associated with each of the nodes and each of the edges, wherein at least one of the nodes is associated with a time varying attribute;

store a database including a plurality of sets of summary data, wherein each of the sets of summary data comprises time-series data, wherein the sets of summary data are indexed in the database based on unique model identifiers, and wherein the sets of summary data comprise previously-calculated metric values at various points in time; and store program instructions configured for execution by the computer processor in order to cause the computing system to:

generate user interface data for rendering an interactive user interface on a computing device, the interactive user interface including:

a dynamically generated table including rows and columns, wherein each of the rows corresponds to a financial asset and its associated node or a group of financial assets and its associated nodes, wherein each of the columns corresponds to a metric calculable with respect to each of the financial assets or groups of financial assets; and a context selection element including a listing of a plurality of perspectives from which the dynamically generated table may be automatically updated, wherein each of the plurality of perspectives is associated with a node of the complex mathematical graph;

receive, via the interactive user interface, a selection of one of the plurality of perspectives;

determine a set of model attributes corresponding to a row of the dynamically generated table, wherein the set of model attributes comprises the perspective and one or more bucketing factors associated with the row of the dynamically generated table;

determine a unique model identifier corresponding to the row of the dynamically generated table based on the set of model attributes;

access, from the database and based on the unique model identifier, a set of summary data, wherein:

summary data comprises previously-calculated metric values that were calculated based on underlying transaction data that is unavailable for re-calculating the previously-calculated metric values, and transaction data comprises data of individual transactions and is of a data type different from a data type of the summary data;

determine one or more time intervals associated with the set of summary data;

determine one or more time intervals associated with a metric of the dynamically generated table;

identify one or more previously-calculated metric values from the set of summary data, wherein the one or more previously-calculated metric values are associated with a first period of time comprising an overlap between the one or more time intervals associated with the set of summary data and the one or more time intervals associated with the metric;

calculate a single metric value associated with the metric based at least in part on a combination of:

the one or more previously-calculated metric values associated with the first period of time from the set of summary data, and transaction data associated with a second period of time, wherein the second period of time, at least in part, overlaps with the one or more time intervals associated with the metric and, at least in part, does not overlap with the first period of time; and automatically update the dynamically generated table with the single metric value, wherein the single metric value is inserted into a cell of the table corresponding to the row and the column associated with the metric.

2. The computing system of claim 1, wherein the interactive user interface further includes an input element wherein the user inputs time varying attribute information for association with the row of the dynamically generated table via the input element, wherein the time varying attribute information includes at least two attribute values and time intervals associated with each of the at least two attribute values.

3. The computing system of claim 1, wherein the interactive user interface further includes a hierarchy selection element including a listing of a plurality of bucketing factors from which the dynamically generated table may be automatically updated, wherein each of the plurality of bucketing factors is associated with rows of the dynamically generated table, and wherein rows of the dynamically generated table are arranged hierarchically according to the selection of the plurality of bucketing factors through the hierarchy selection element of the interactive user interface.

4. The computing system of claim 1, wherein the interactive user interface further includes a metric input element wherein the user inputs the metrics corresponding to each of the columns of the dynamically generated table.

5. The computing system of claim 4, wherein the metrics corresponding to each of the columns of the dynamically generated table includes at least one of: asset value, TWR, IRR, rate of return, cash flow, or average balance.

6. The computing system of claim 1, wherein the interactive user interface further includes a summary data input element wherein the user selects the set of summary data for calculating the single metric value.

7. The computing system of claim 1, wherein the single metric value is associated with at least one of: fees, income/expenses, net cash flows, net deposit, net gain/loss, realized gain, total return, time-weighted return, unrealized gain, or asset value.

8. The computing system of claim 1, wherein the interactive user interface further includes a second context selection element wherein the user selects a particular date, and wherein the determined one or more time intervals associated with the metric are based on the particular date.

9. The computing system of claim 1, wherein the program instructions are further configured for execution by the computer processor in order to cause the computing system to:

determine a node of the complex mathematical graph associated with the selected perspective;

automatically traverse the complex mathematical graph from the determined node so as to enumerate paths within the complex mathematical graph that are associated with the determined node;

for each enumerated path, determine any rows of the dynamically generated table associated with the enumerated path based on nodes commonly associated with the enumerated path and a row of the dynamically generated table; and generate a bucketing tree comprising value nodes corresponding to the rows of the dynamically generated table and associated with the respective enumerated paths determined to be associated with the rows.

10. The computing system of claim 9, wherein automatically traversing the complex mathematical graph comprises:

traversing, from the determined node, any edges and/or other nodes connected directly or indirectly with the determined node;

determining, based on the traversal, any non-circular paths in the complex mathematical graph connected to the determined node; and designating the determined non-circular paths as the enumerated paths associated with the designated node.

11. The computing system of claim 10, wherein at least two edges of the complex mathematical graph are part of a circular reference from the designated node back to the designated node, and wherein automatically traversing the complex mathematical graph further comprises:

determining whether two sequences of two or more traversed nodes are identical, and if so, backtracking the traversal and moving to the next adjacent node or edge.

12. The computing system of claim 10, wherein each of the enumerated paths include at least one node and at least one edge of the complex mathematical graph.

13. The computing system of claim 9, wherein the program instructions configured for execution by the computer processor further cause the computing system to receive, via the interactive user interface, a selection of the one or more bucketing factors from which the dynamically generated table may be automatically updated, and wherein the value nodes of the bucketing tree are arranged hierarchically according to the selection of the one or more bucketing factors.

14. The computing system of claim 1, wherein the interactive user interface further includes a filter selection element wherein the user may select a filter that automatically updates the dynamically generated table, wherein the set of model attributes further comprises any filters selected by the user, and wherein the computer readable storage medium is further configured to store program instructions configured for execution by the computer processor in order to cause the computing system to receive, via the interactive user interface, a selection of one or more filters.

15. The computing system of claim 1, wherein the one or more previously-calculated metric values comprise a plurality of previously-calculated metric values.

16. The computing system of claim 15, wherein the transaction data associated with the second period of time comprises at least a plurality of transaction data items.

* * * * *